March 9, 1965 R. M. HAYES ETAL 3,173,129
CARD PROCESSING SYSTEM
Filed Nov. 7, 1960 77 Sheets-Sheet 11

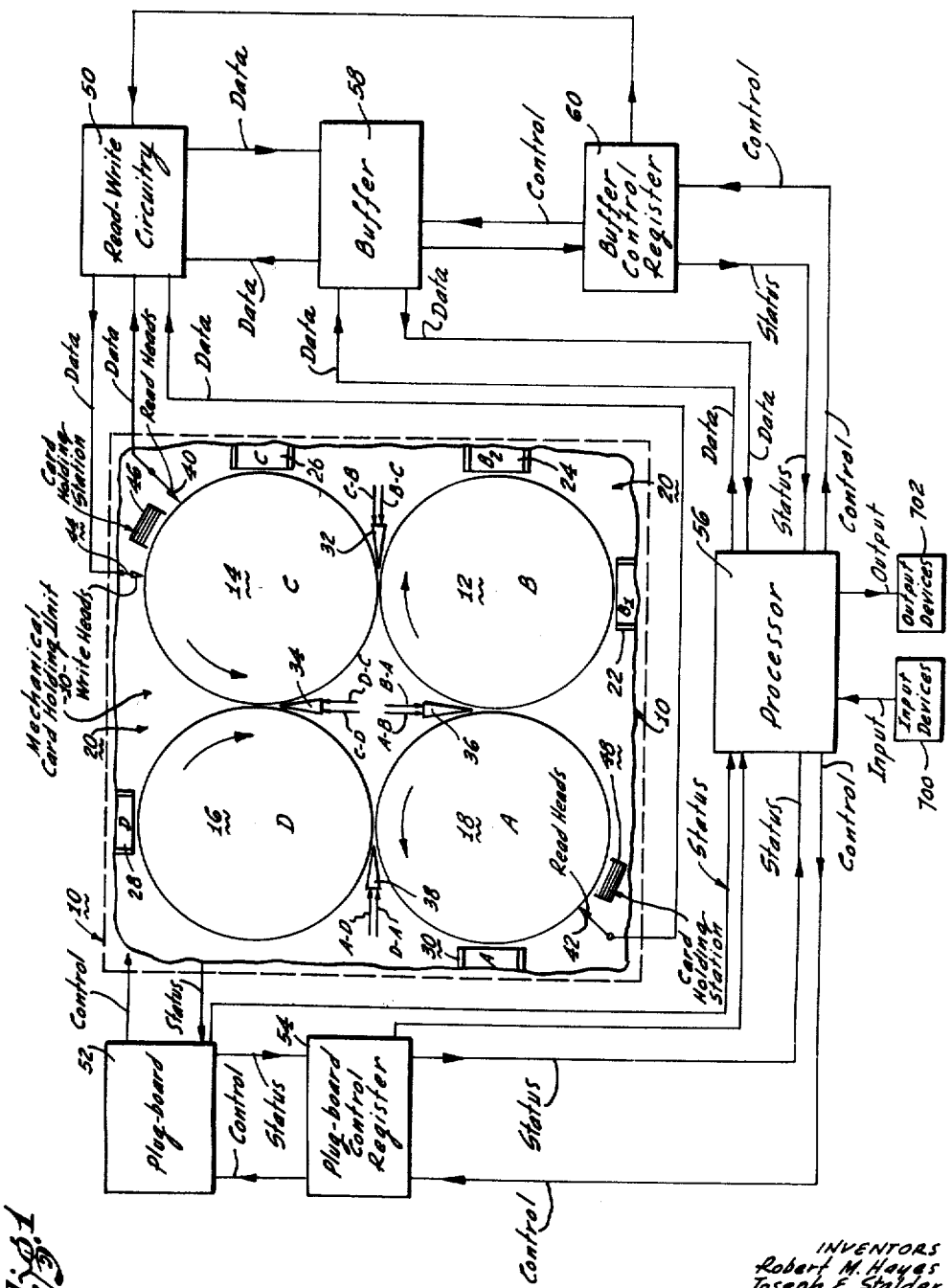

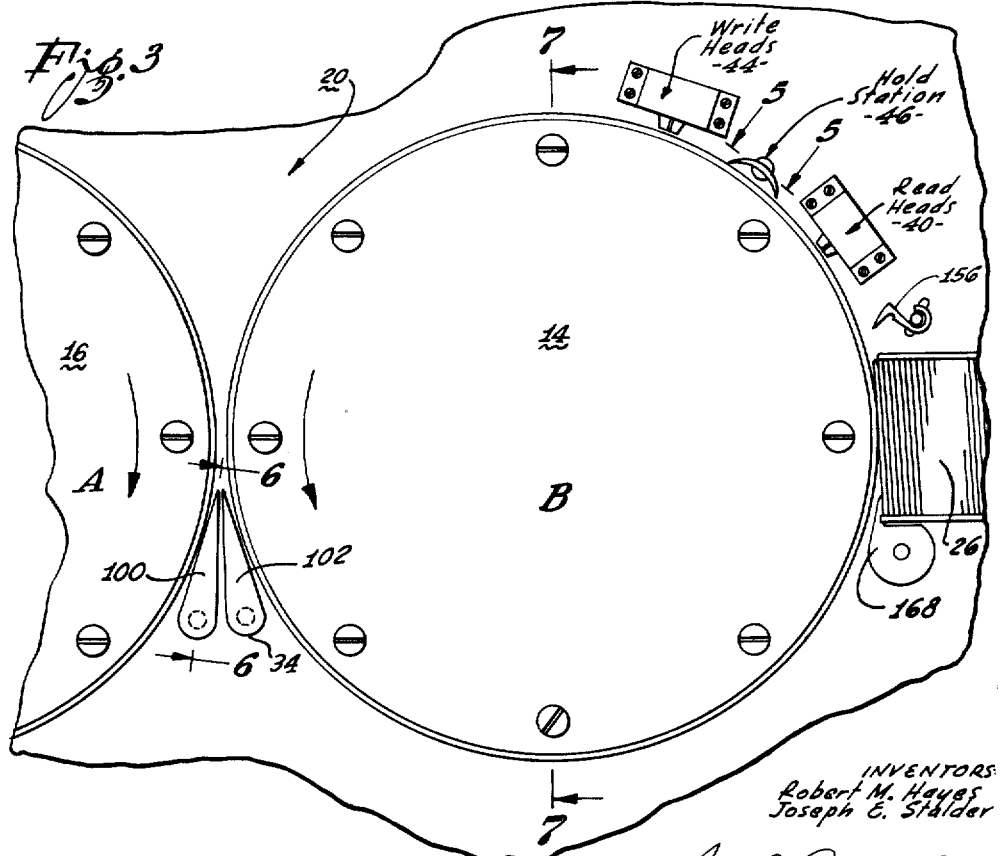

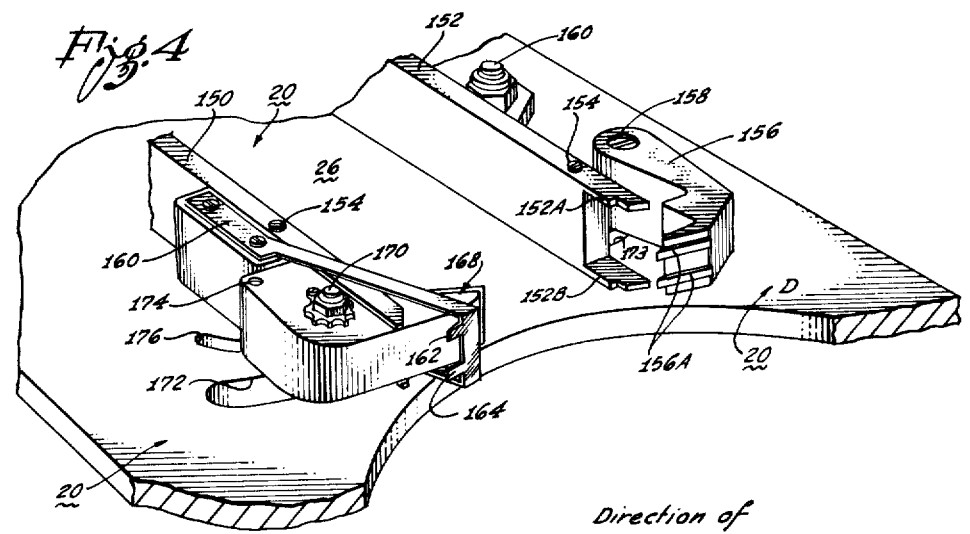

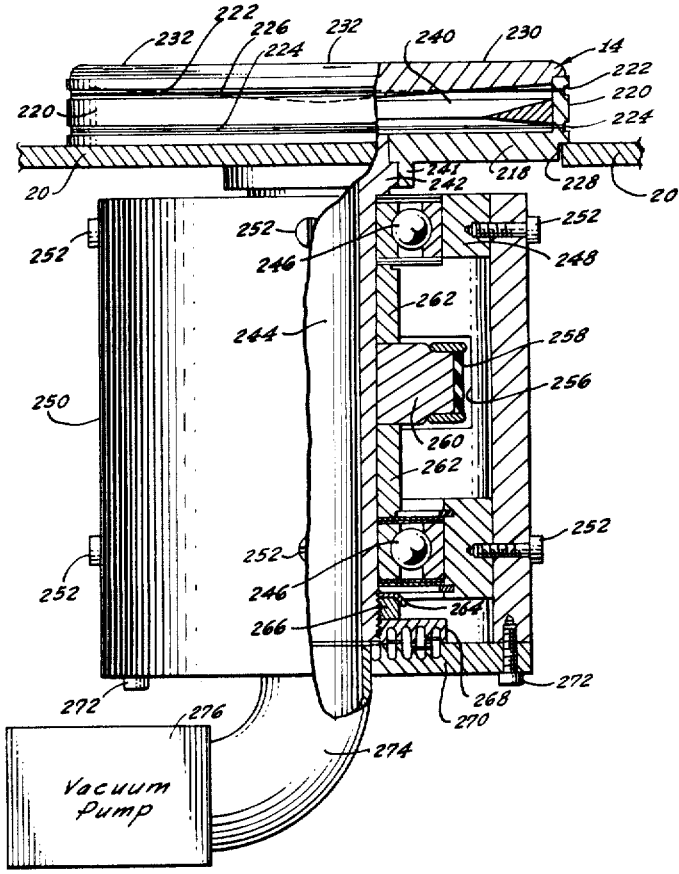

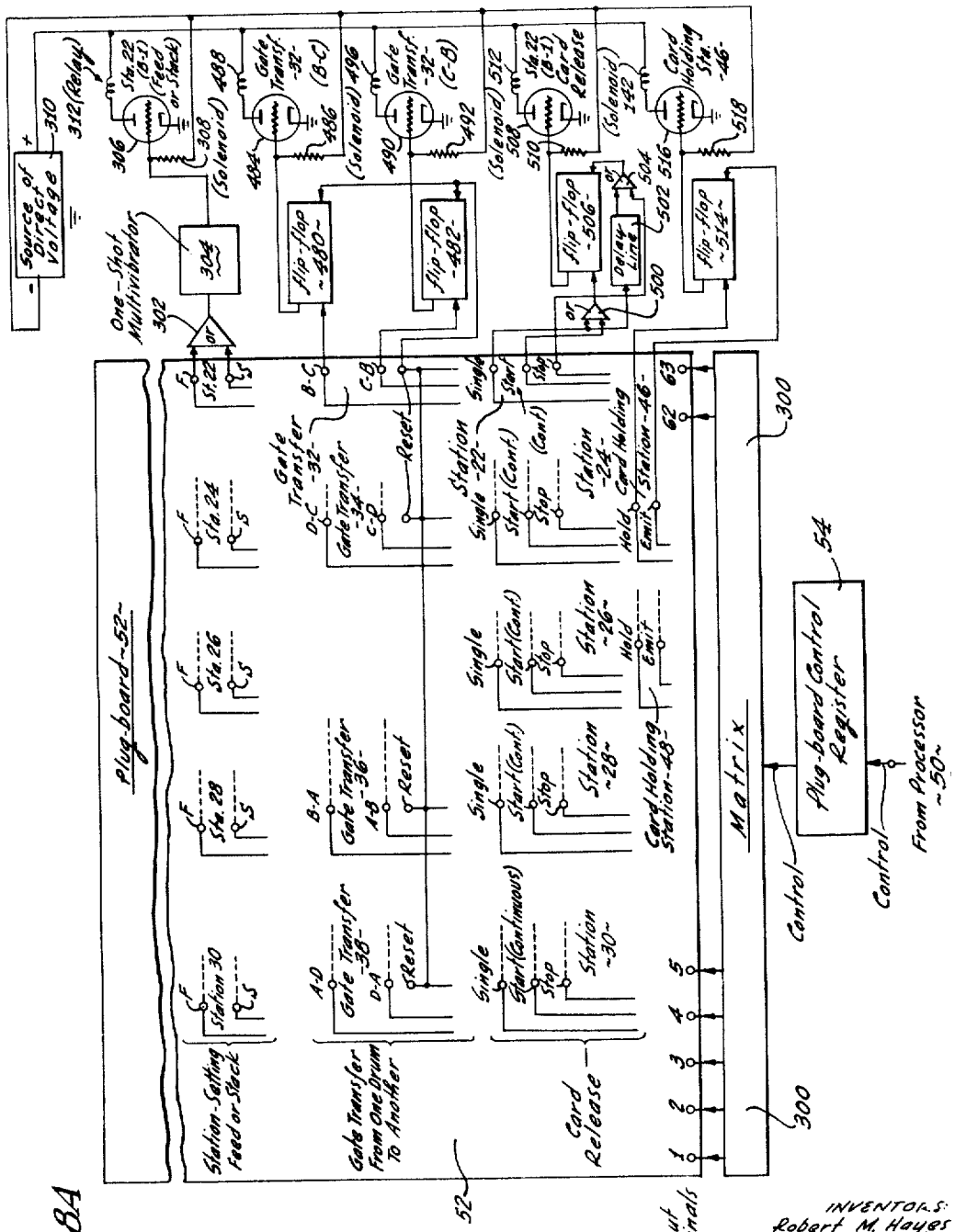

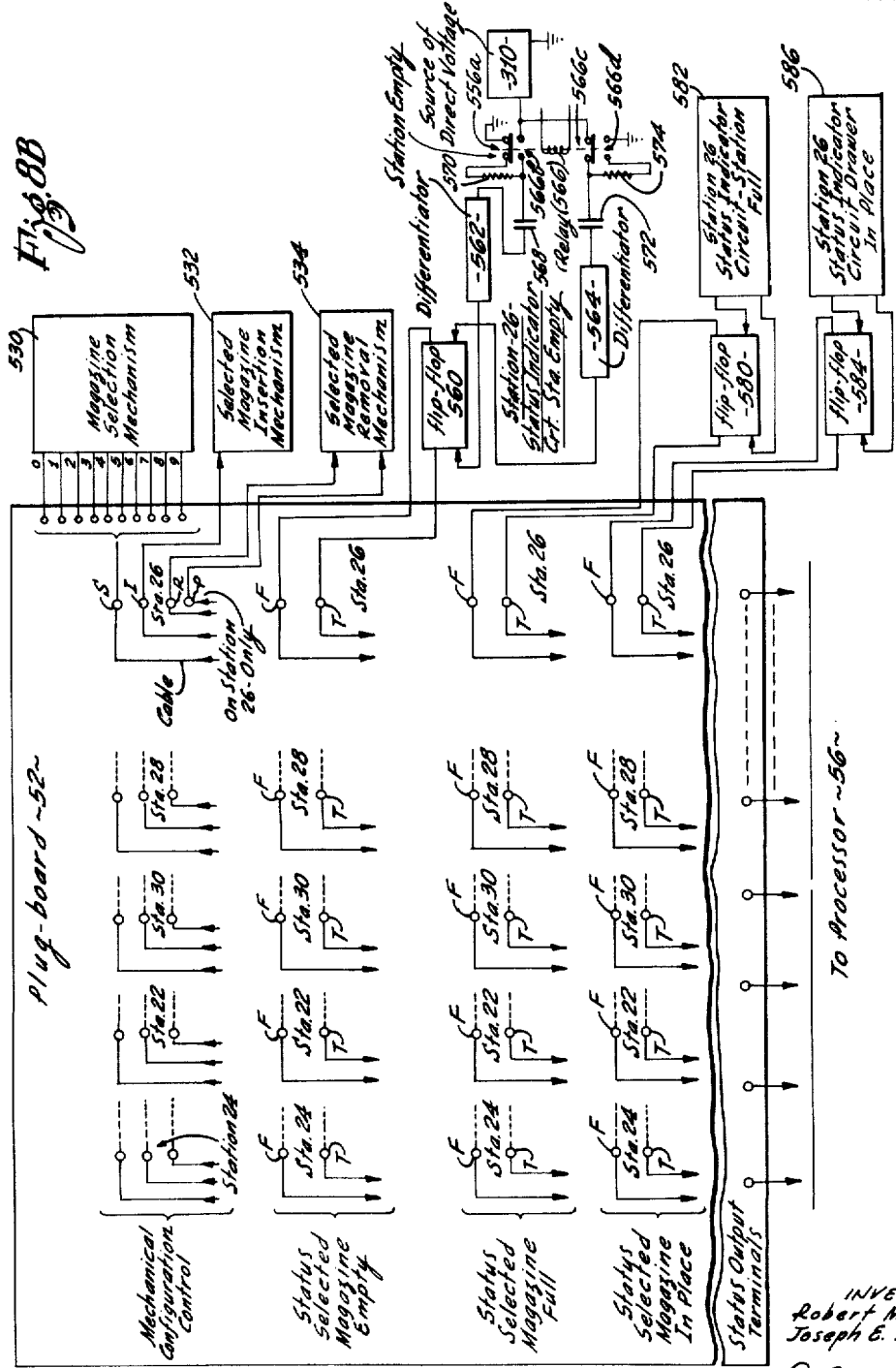

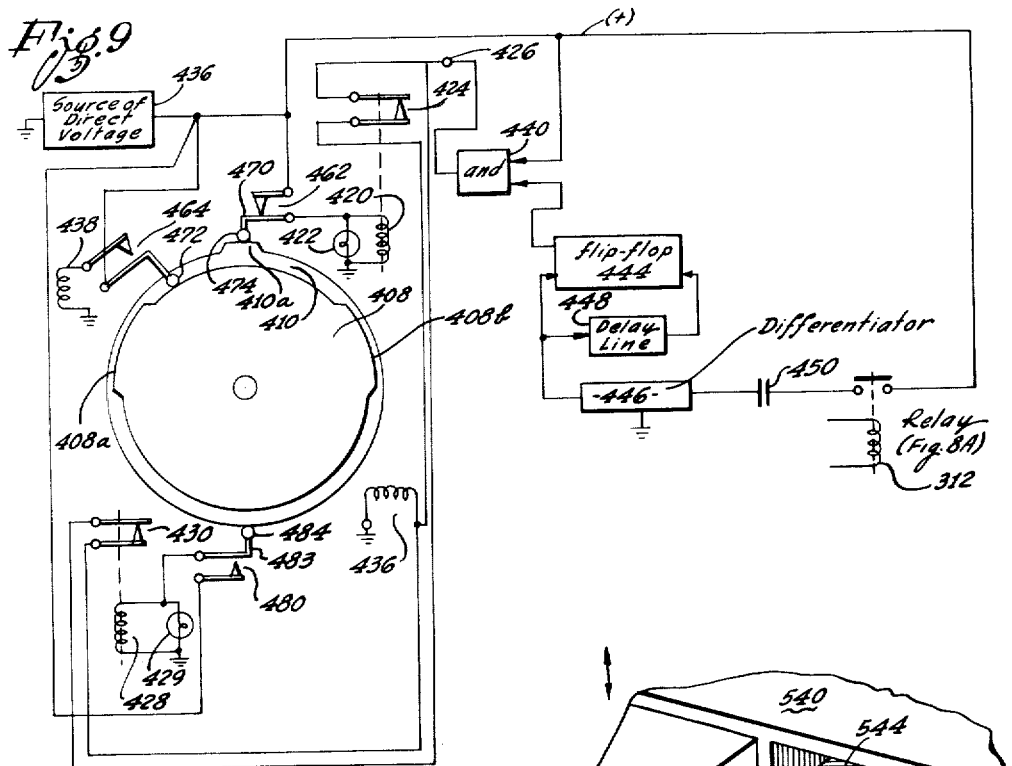
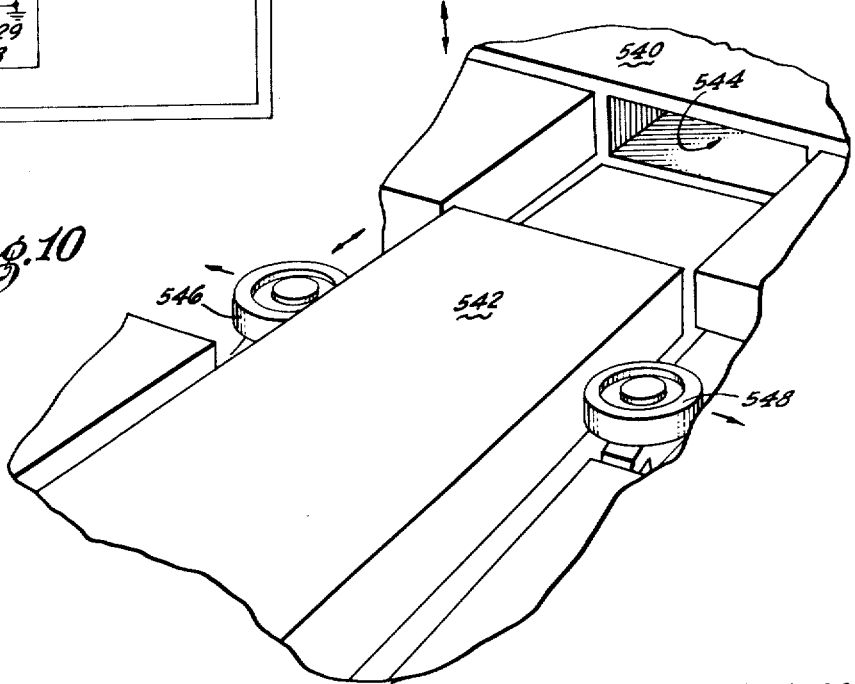

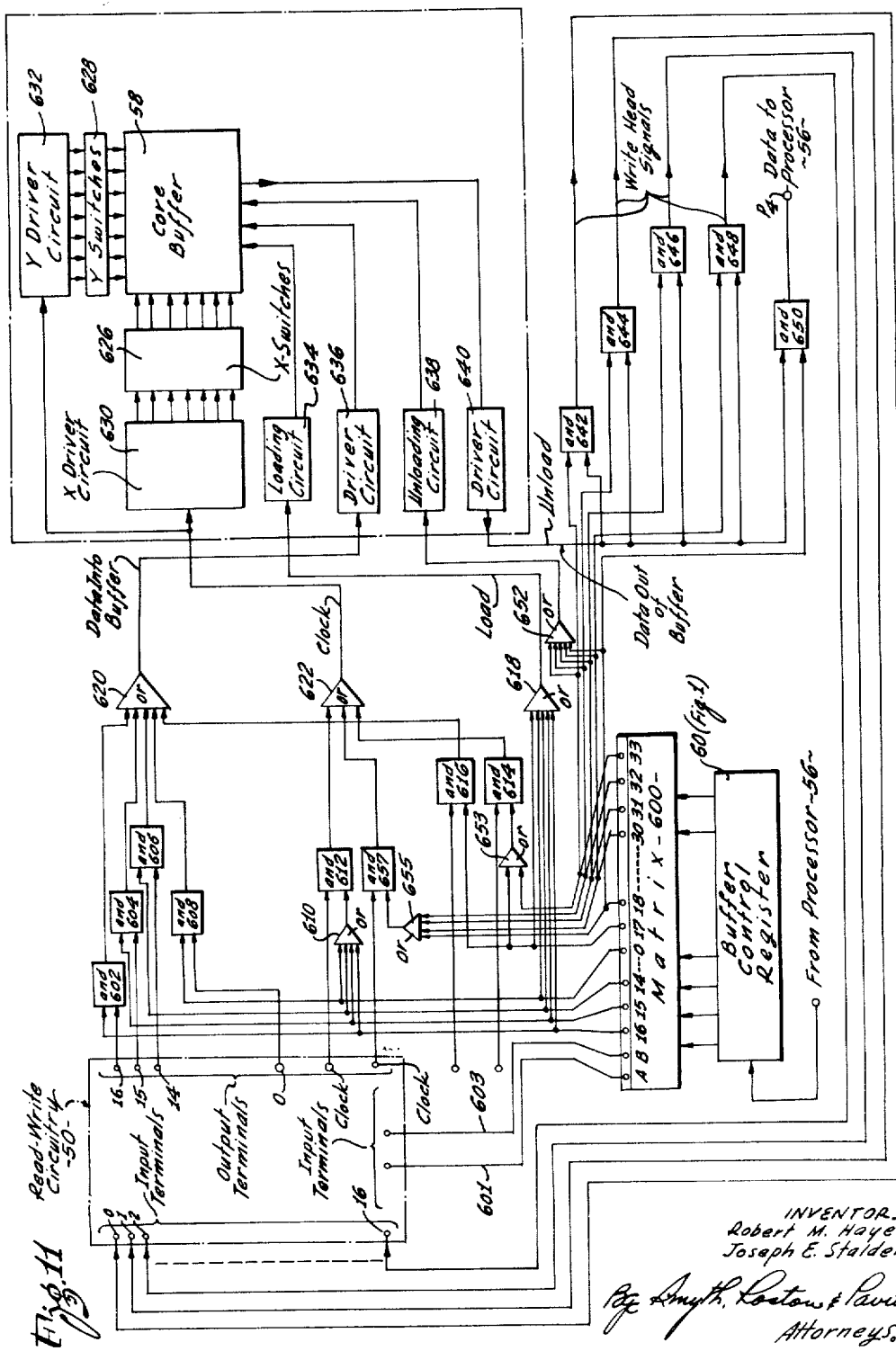

INVENTORS:
Robert M. Hayes
Joseph E. Stalder

Attorneys.

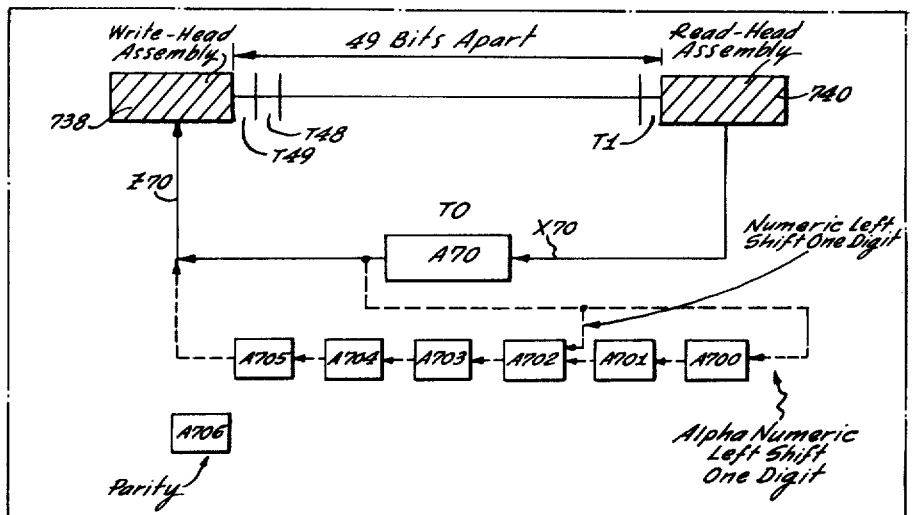
Fig. 19 — The "MQ" Register
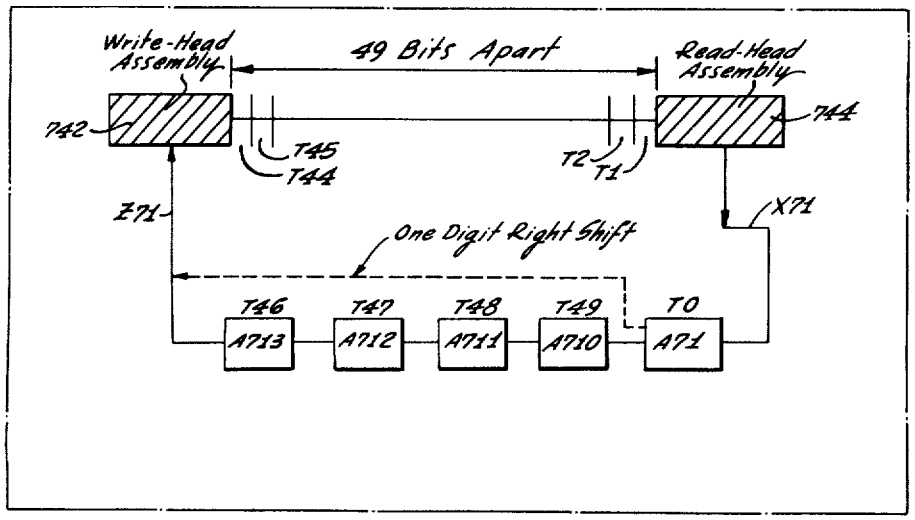
Fig. 20 — The "MR" Register

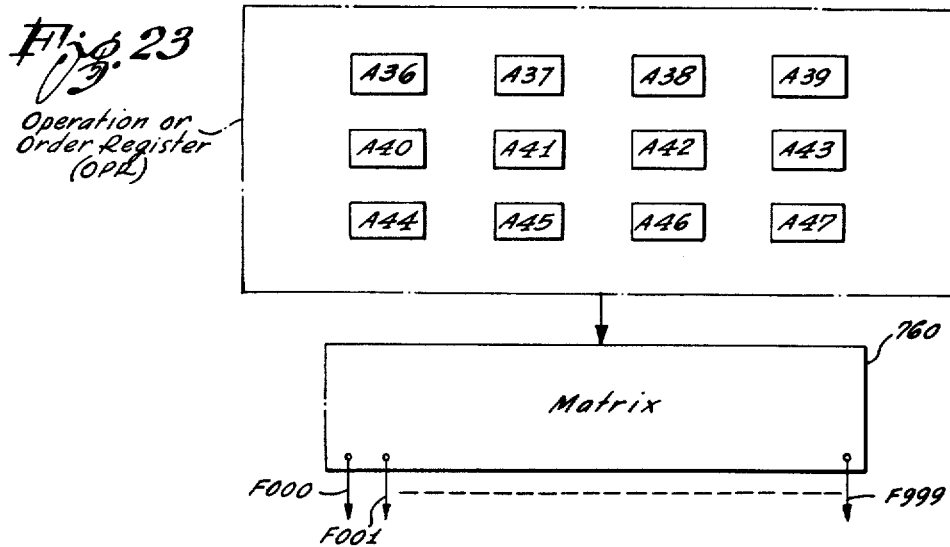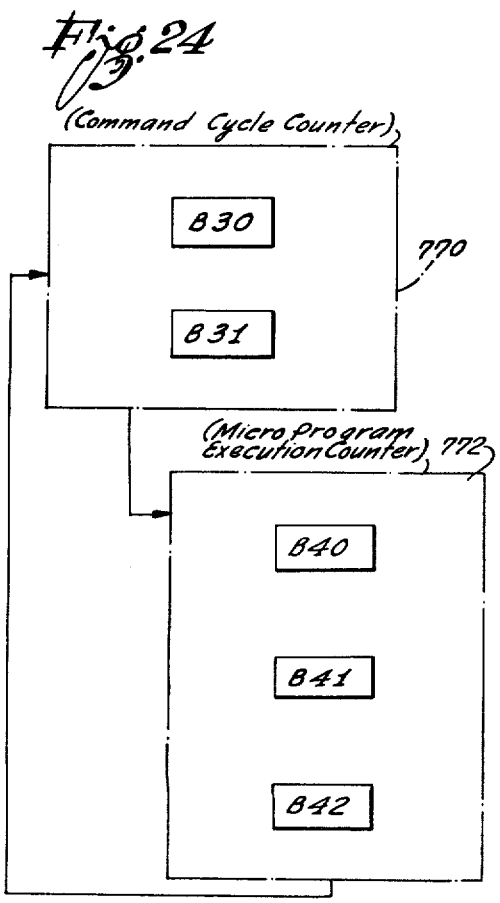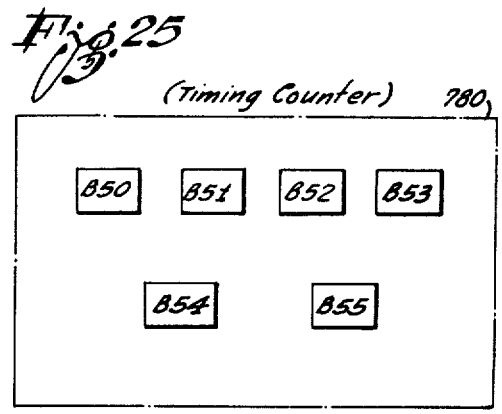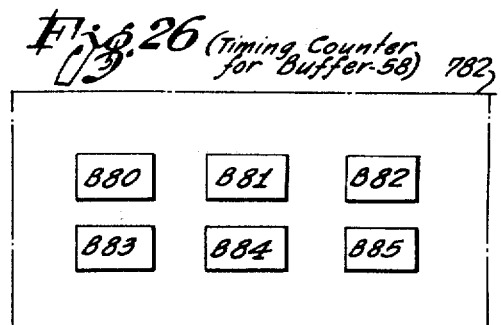

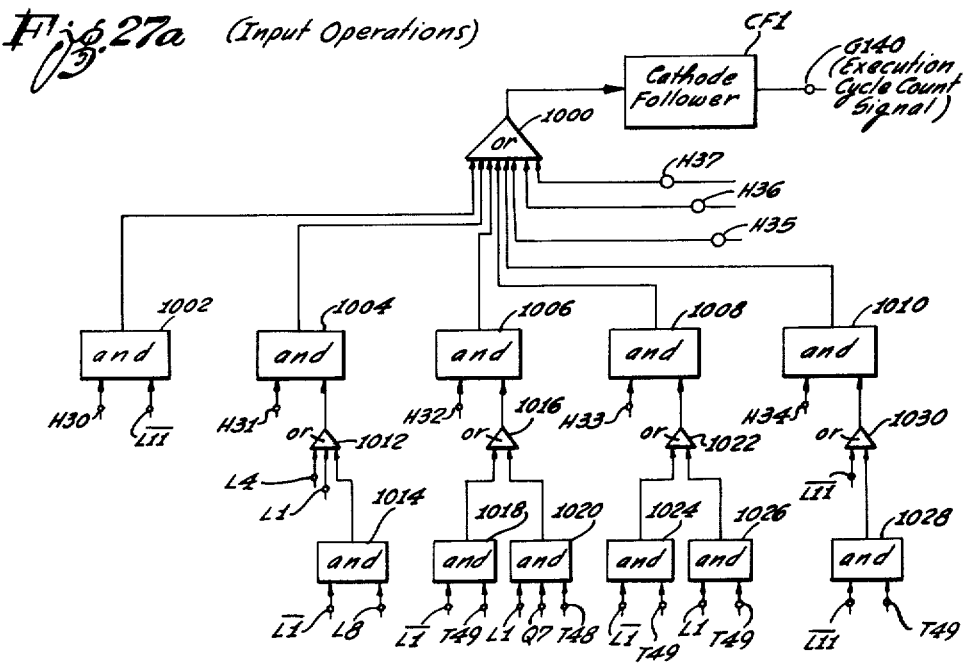
Fig. 27a (Input Operations)
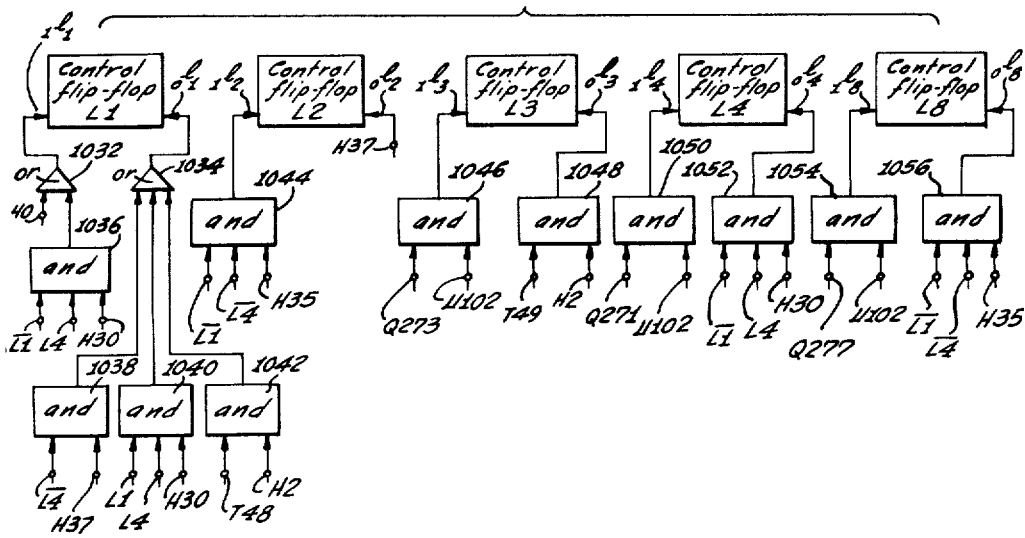
Fig. 27b

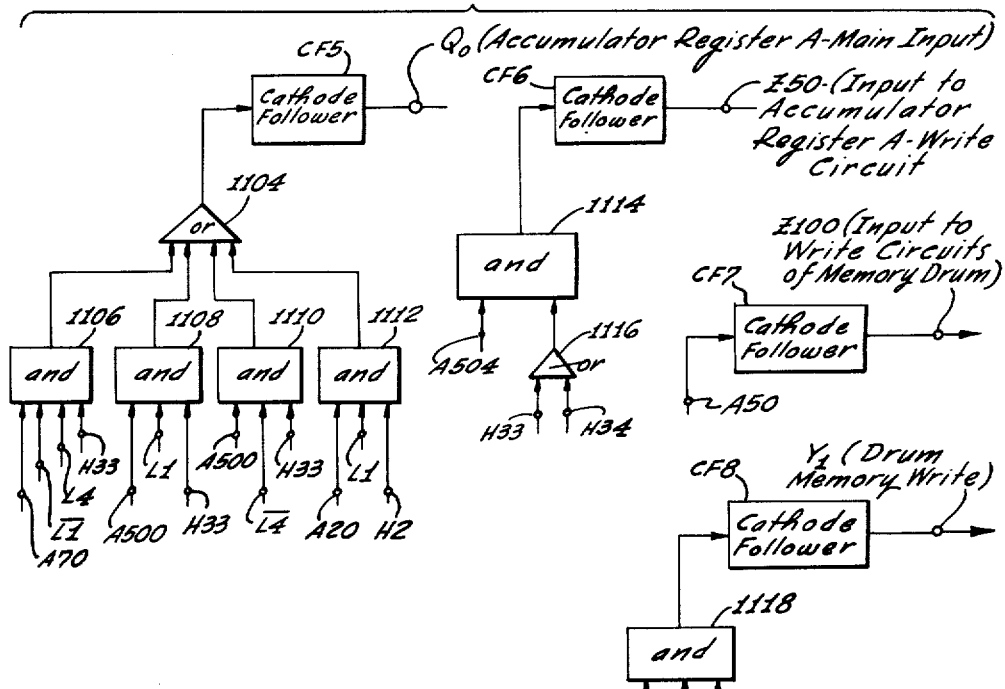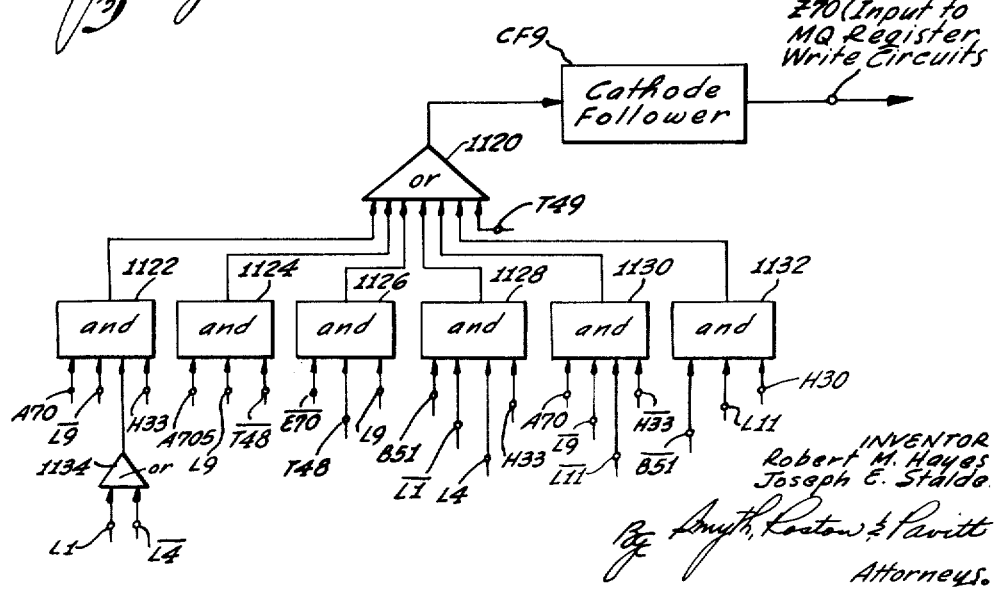

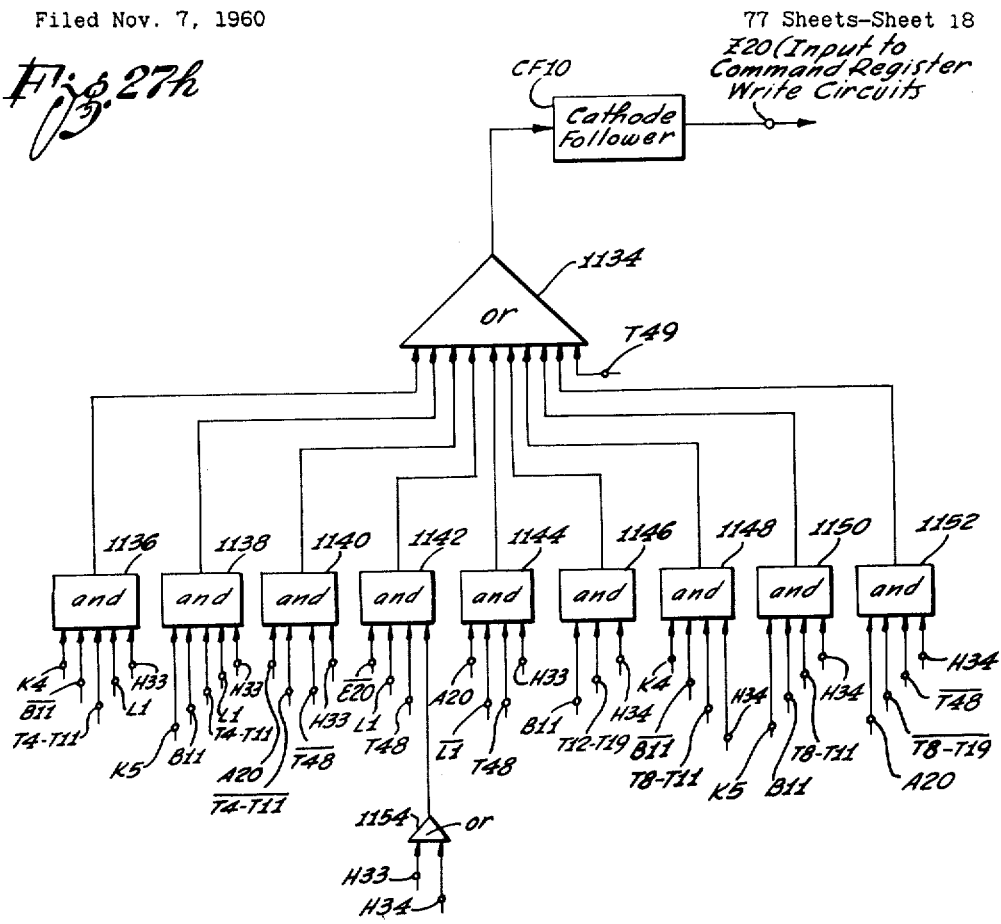
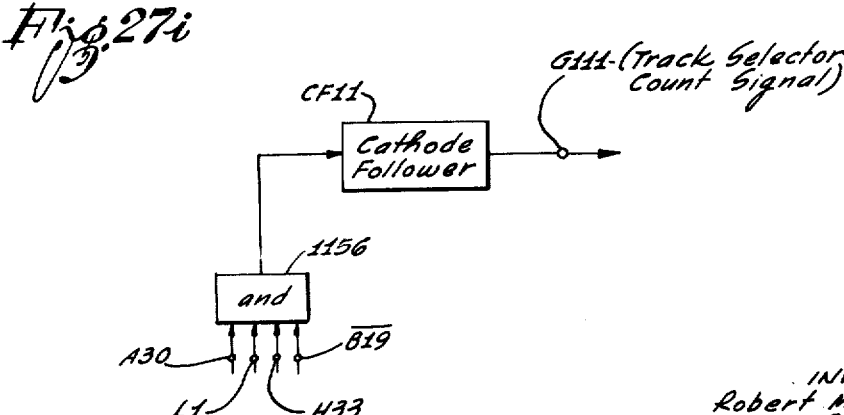

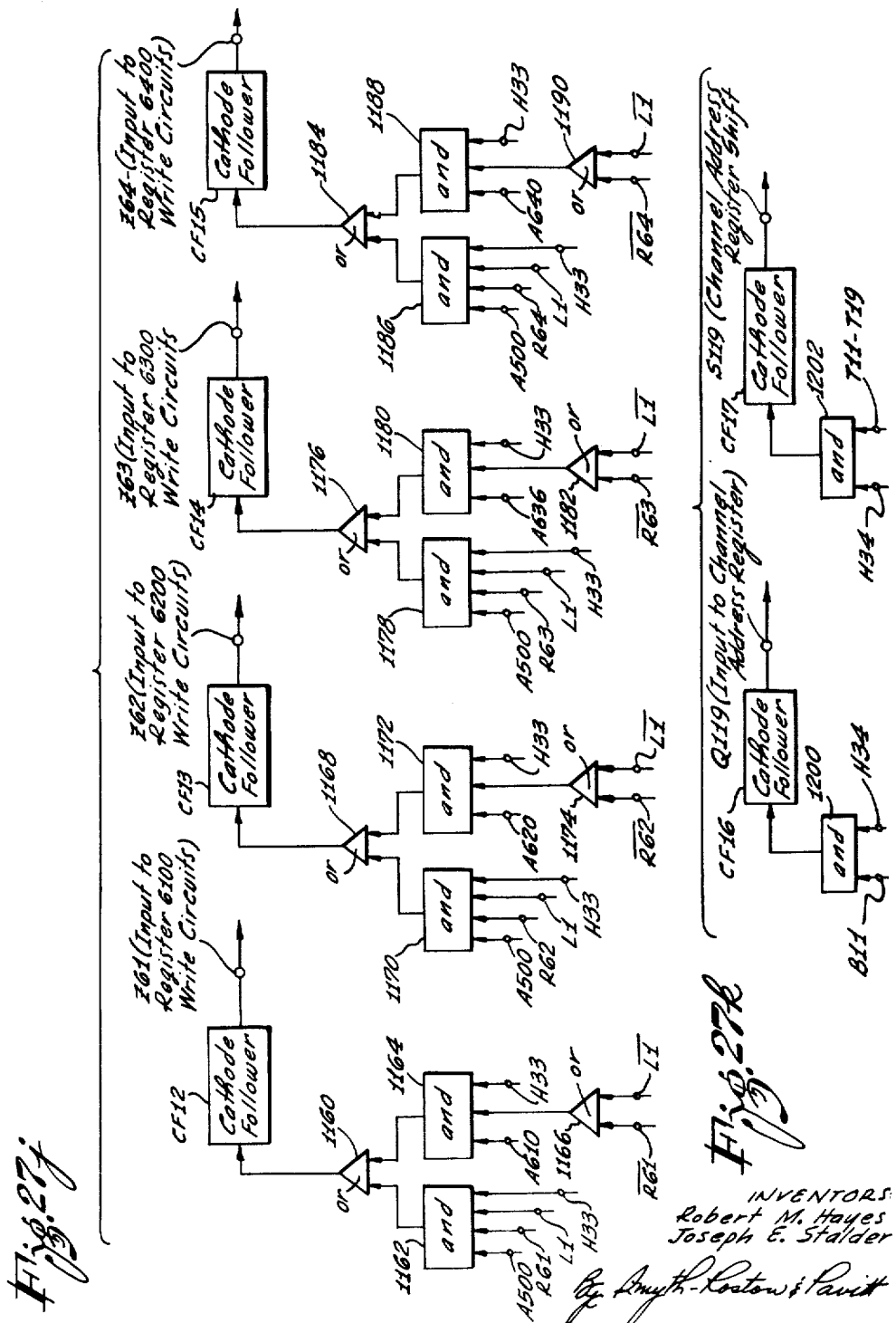

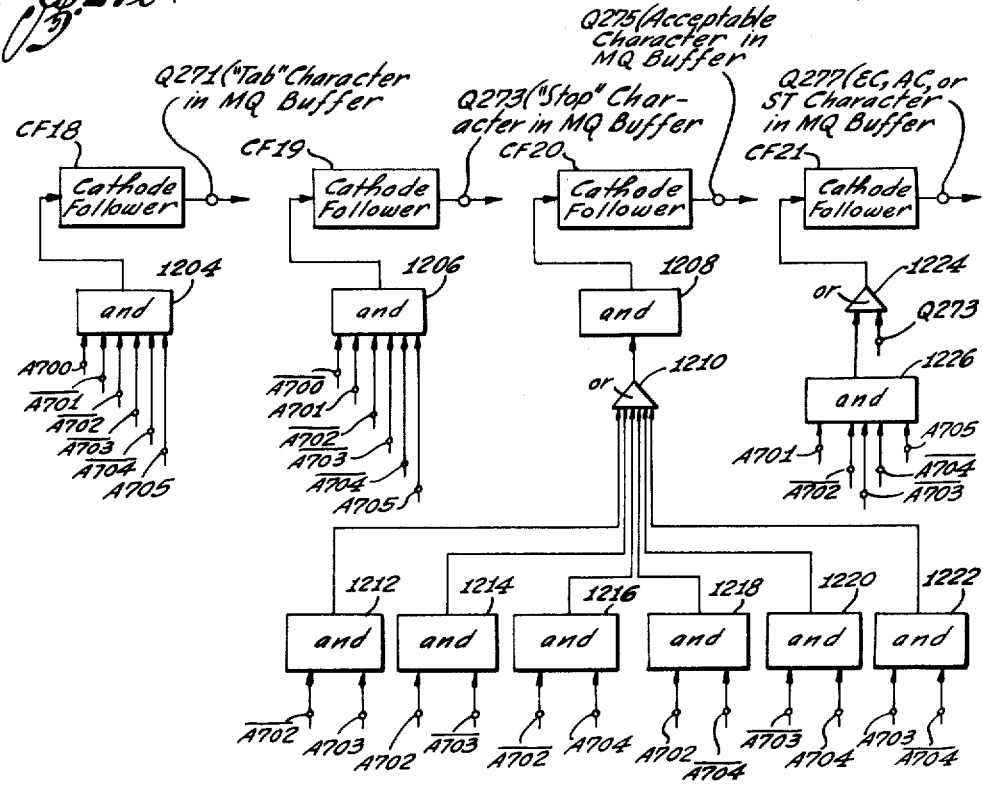
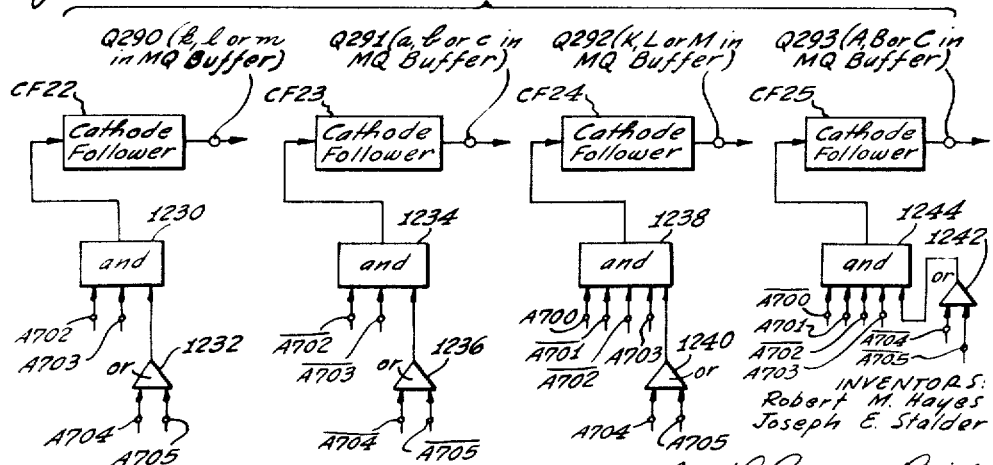

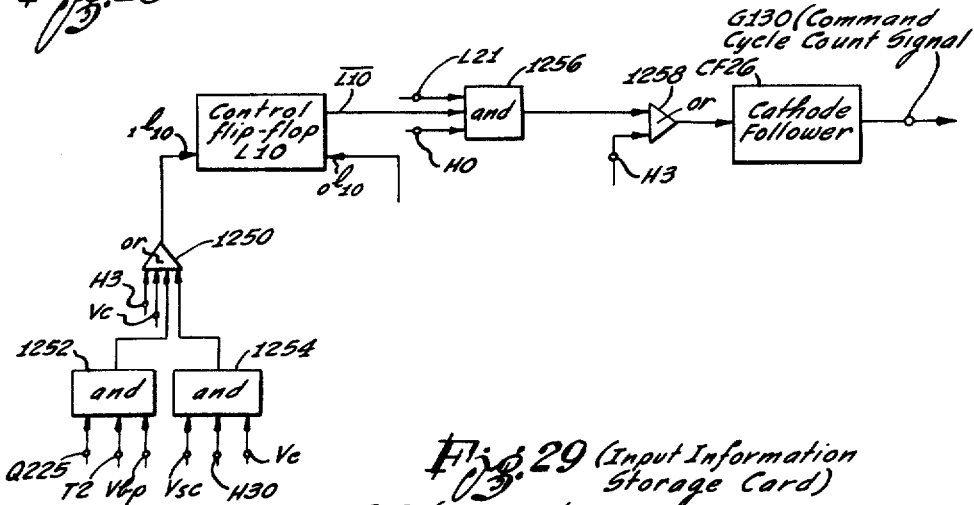
Fig. 28 (Halt)
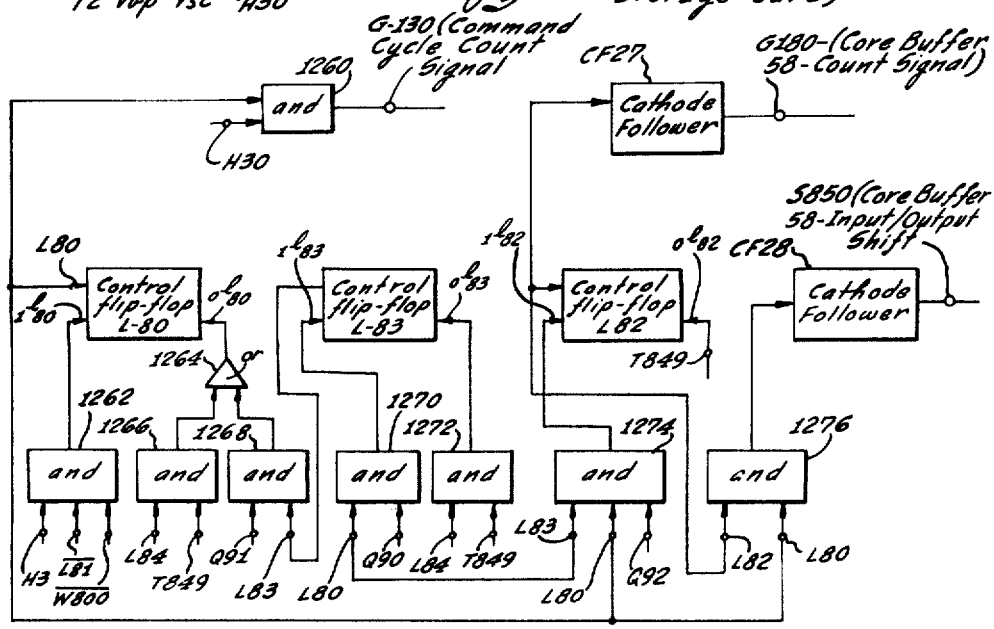
Fig. 29 (Input Information Storage Card)

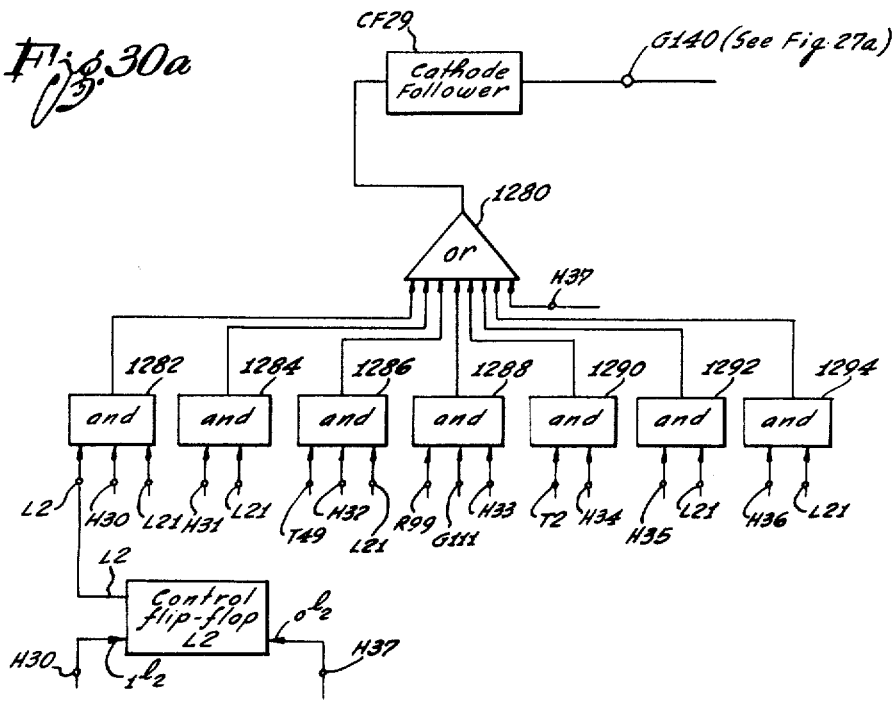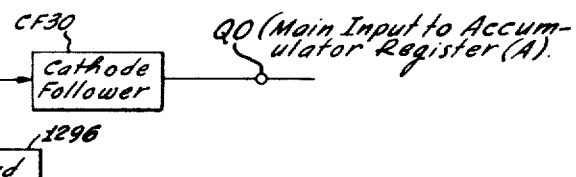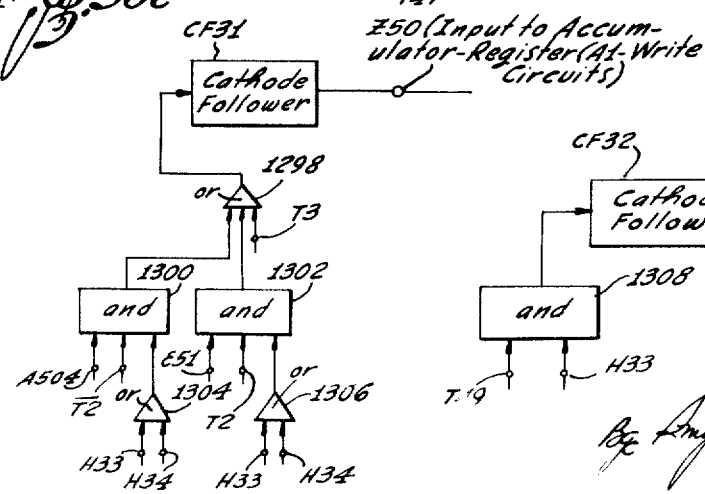

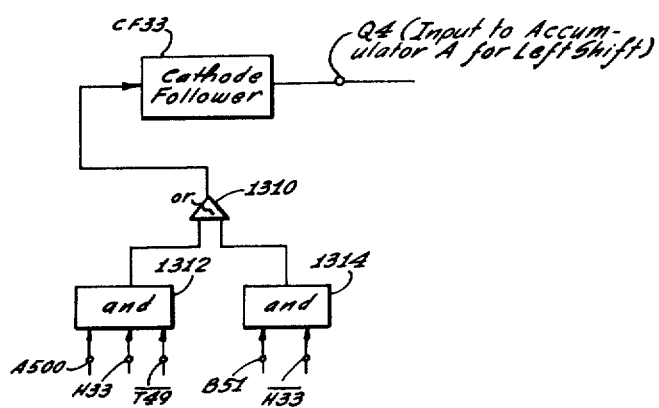
Fig. 30e
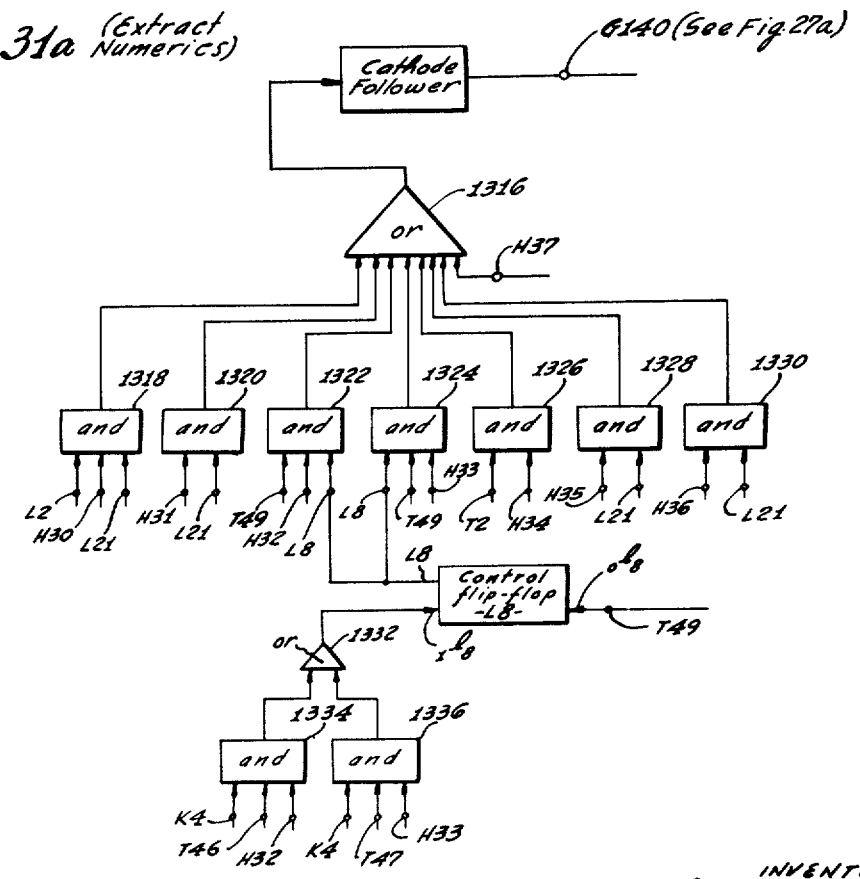
Fig. 31a (Extract Numerics)

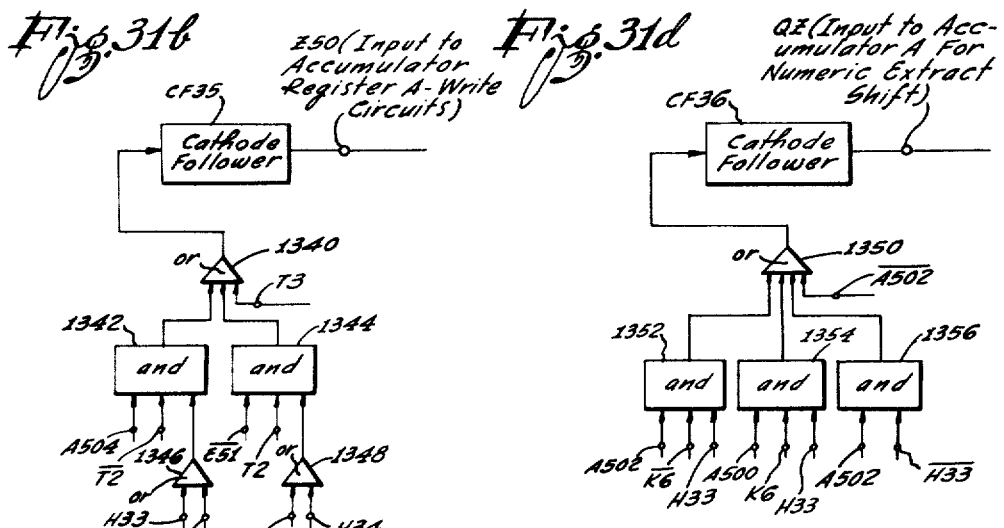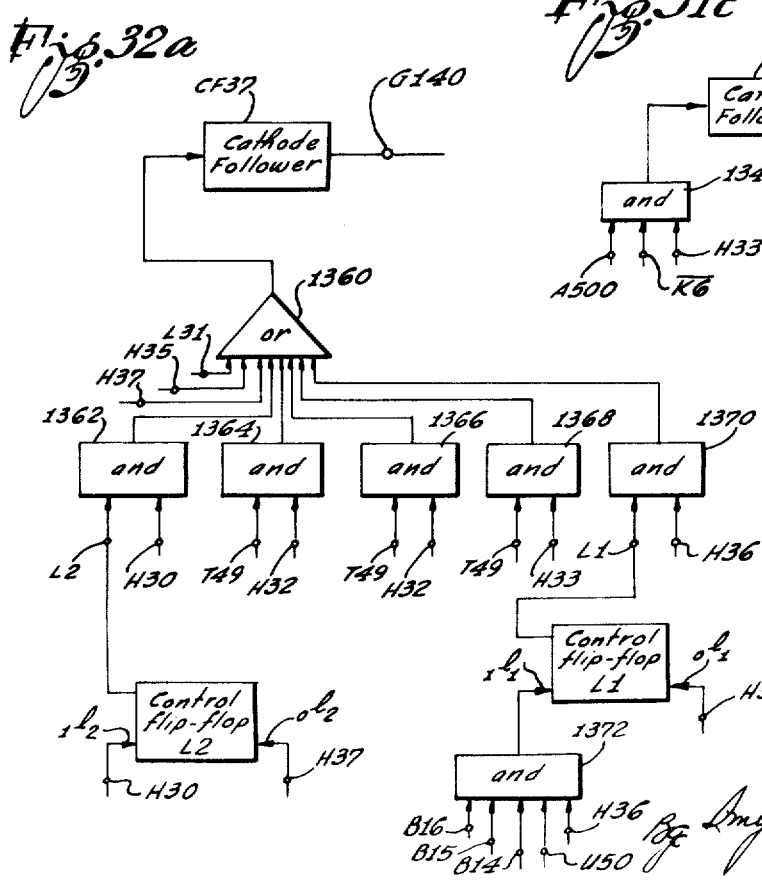

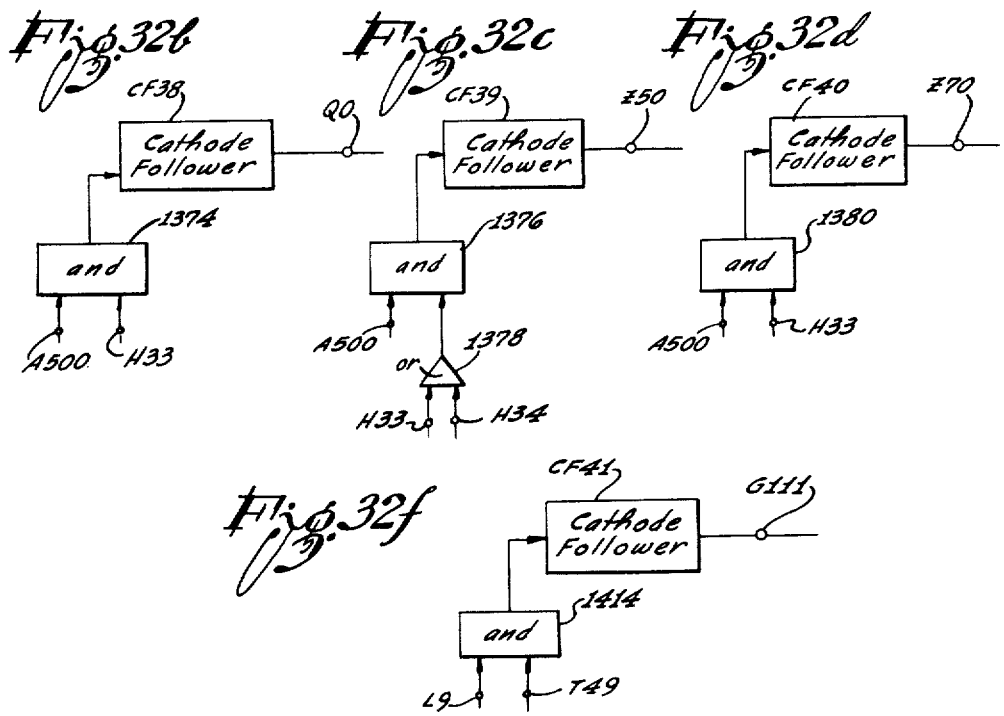
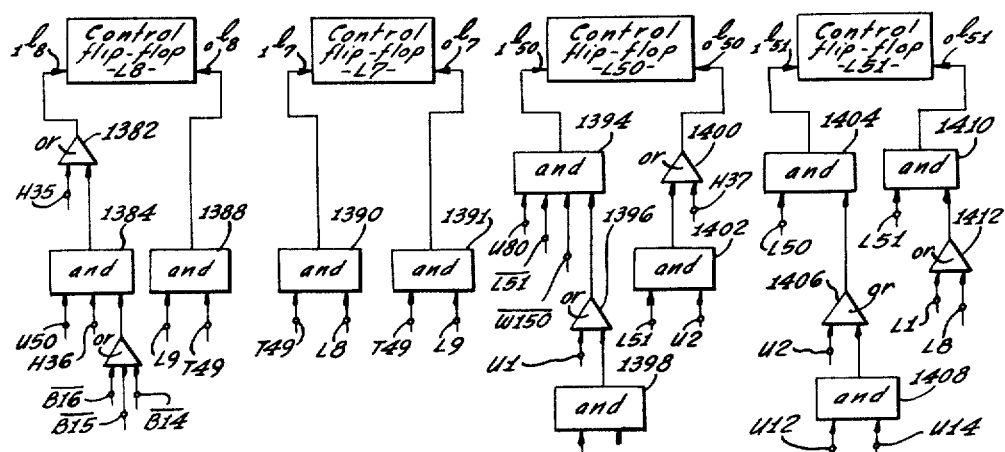

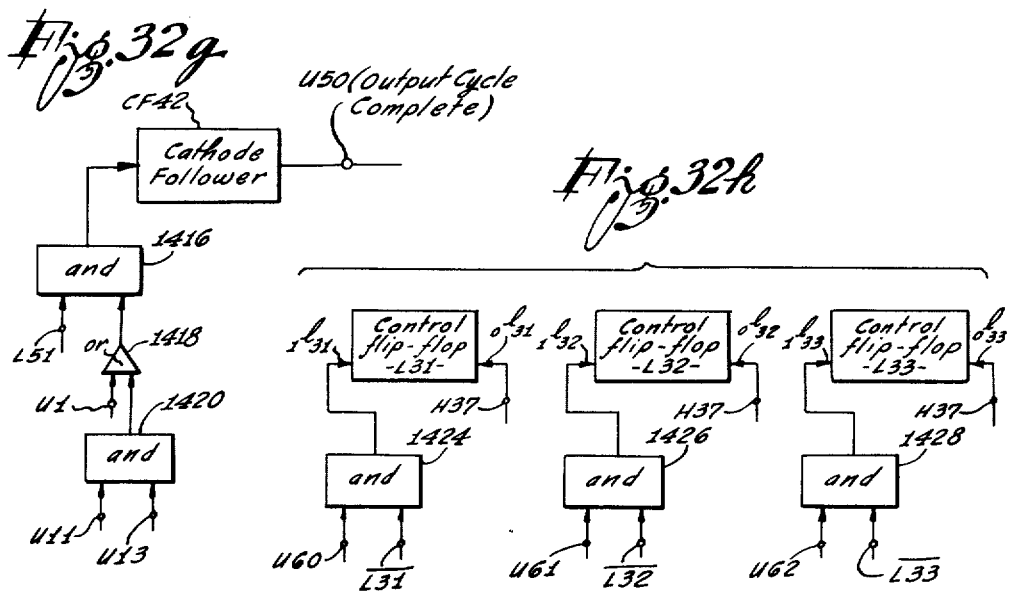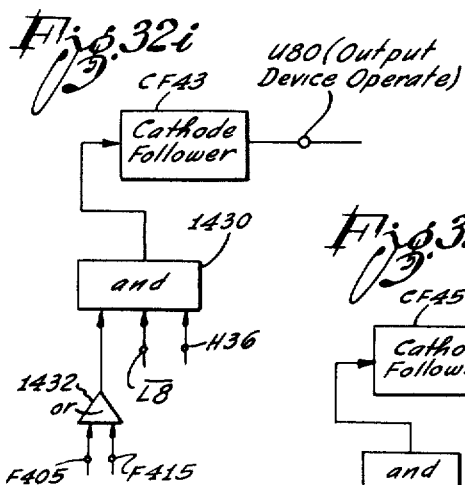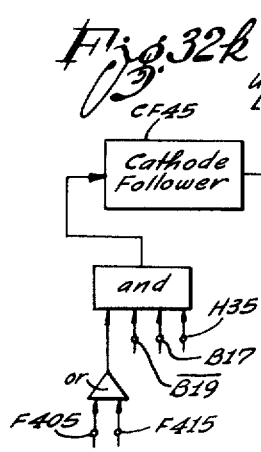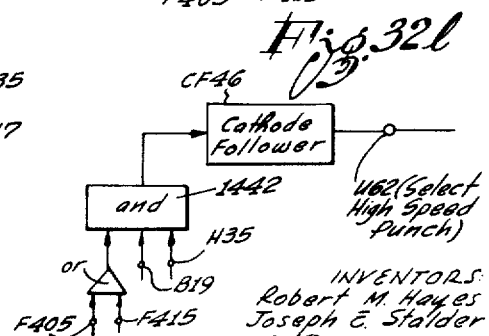

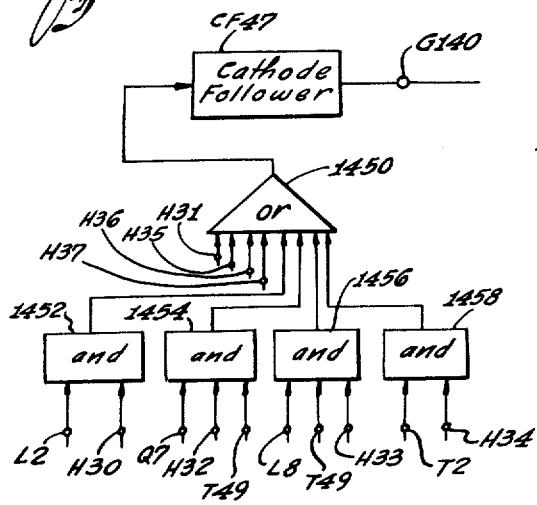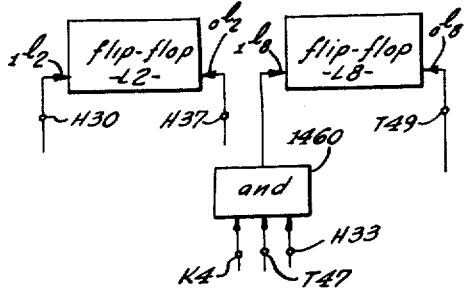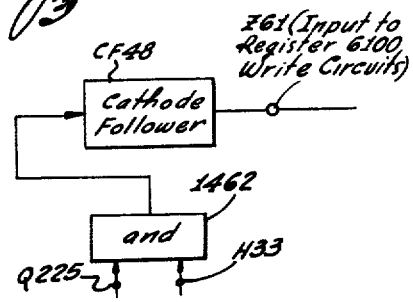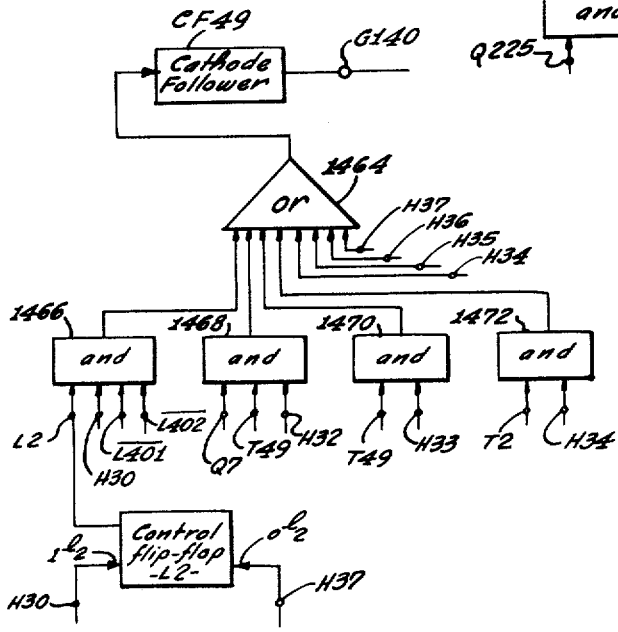

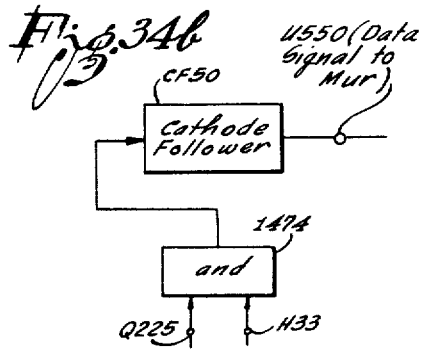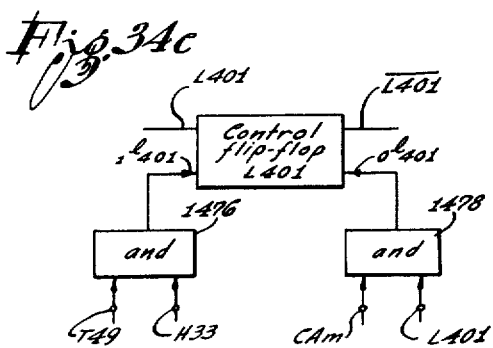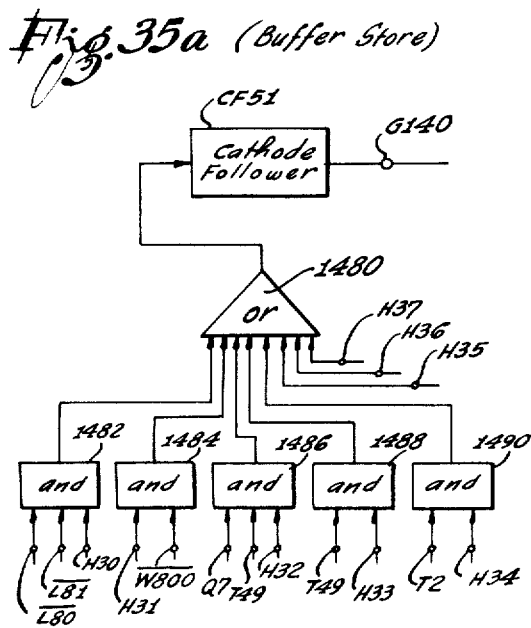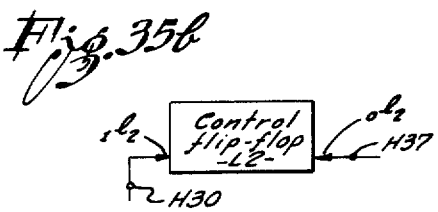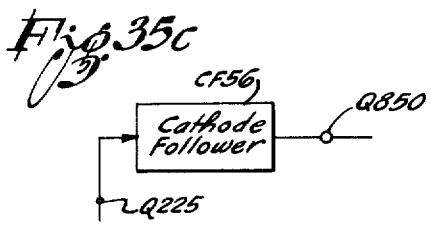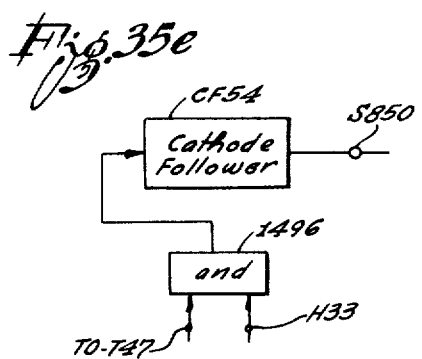

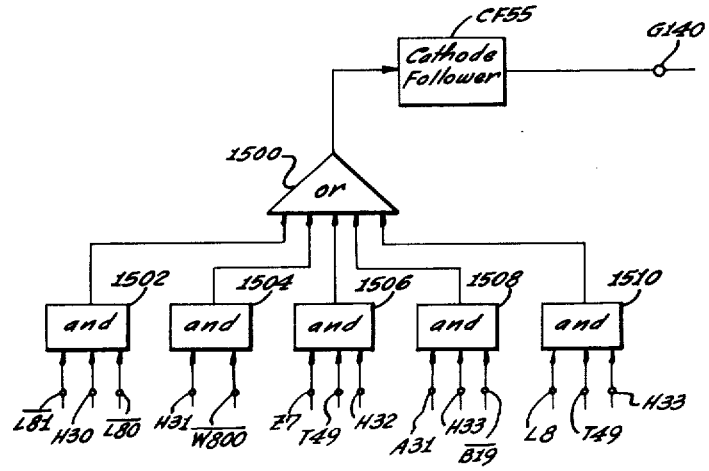
Fig. 36a Block Transfer (M Buffer-58)
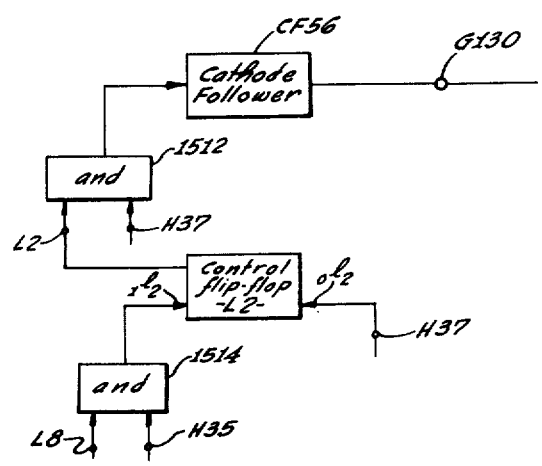
Fig. 36b

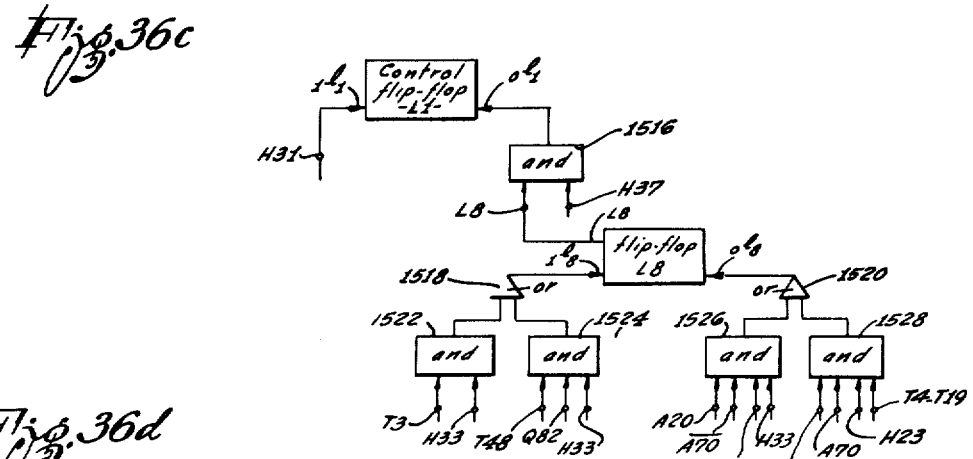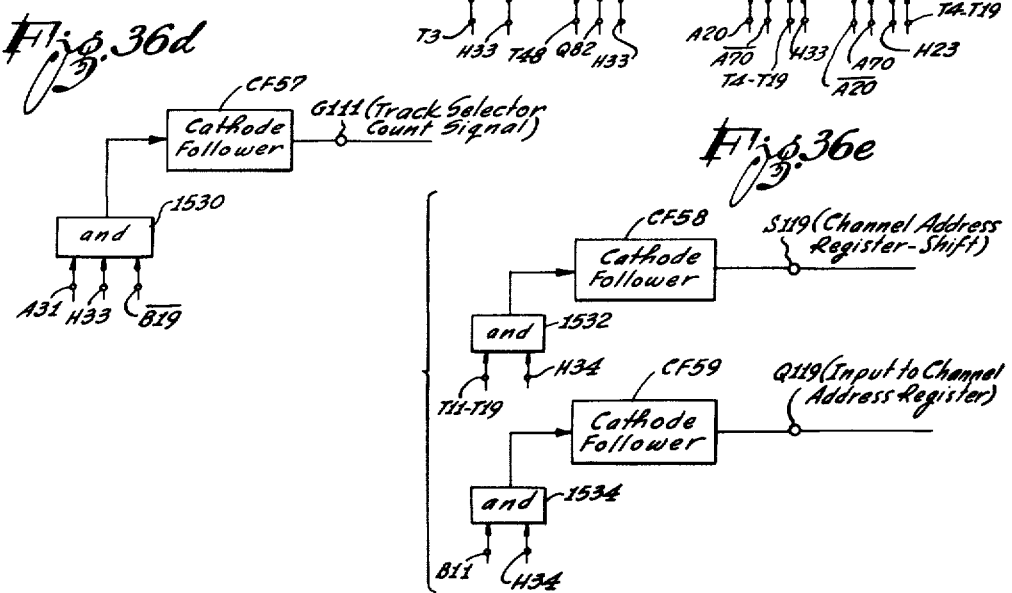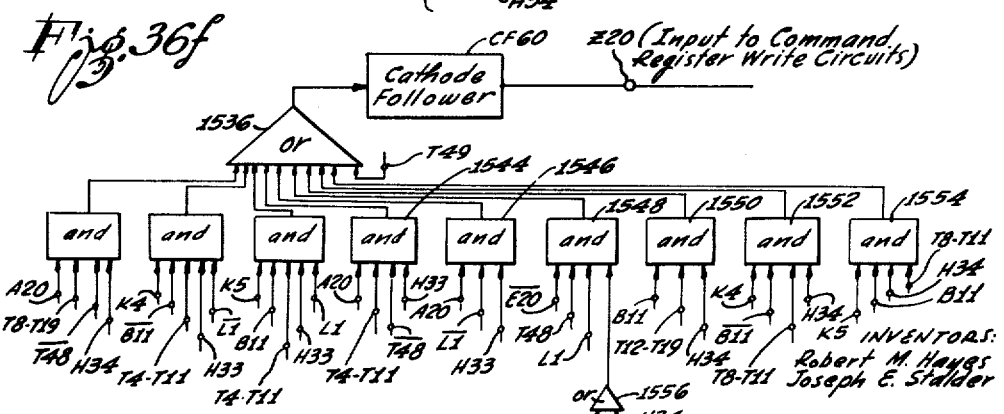

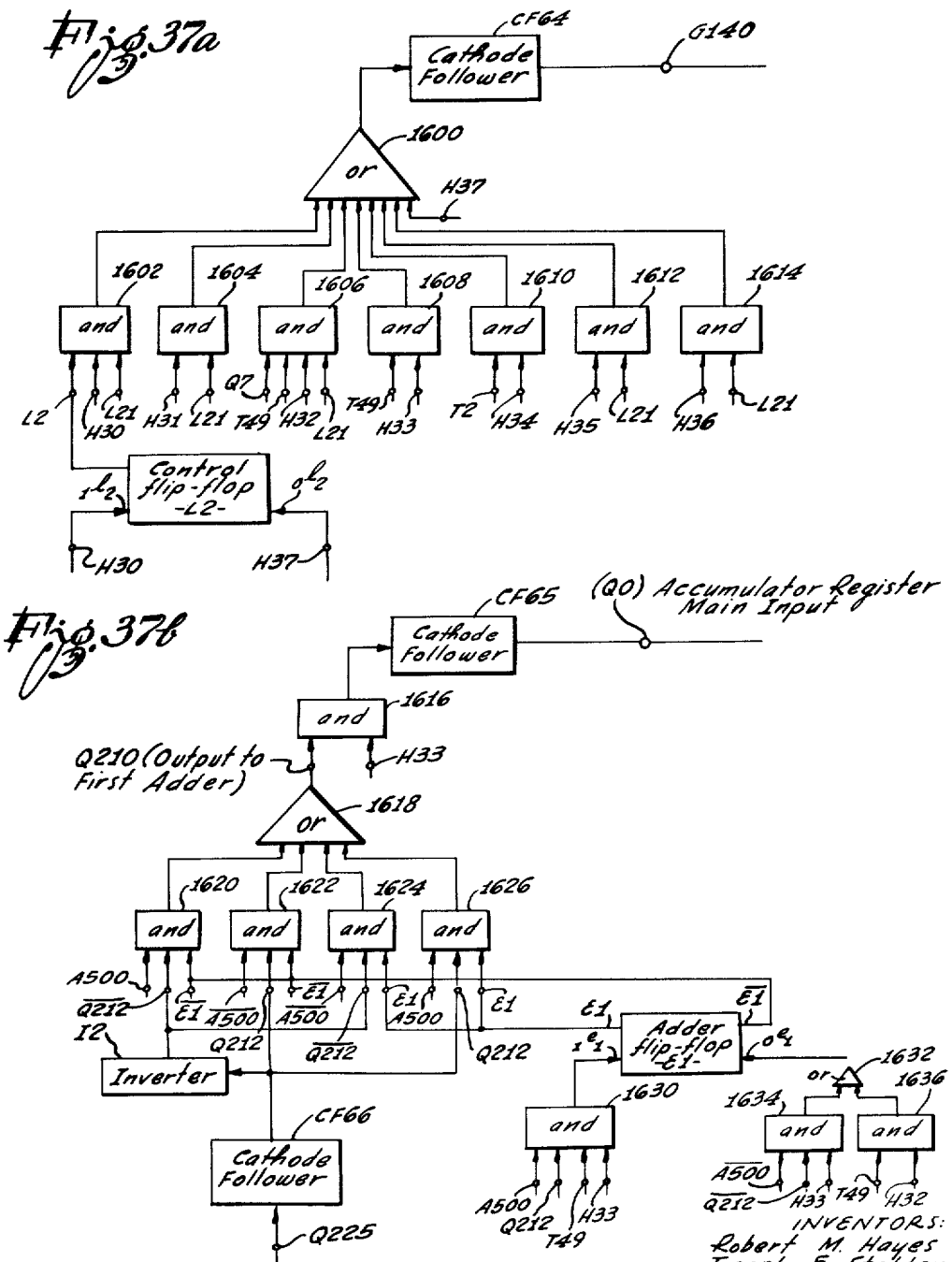

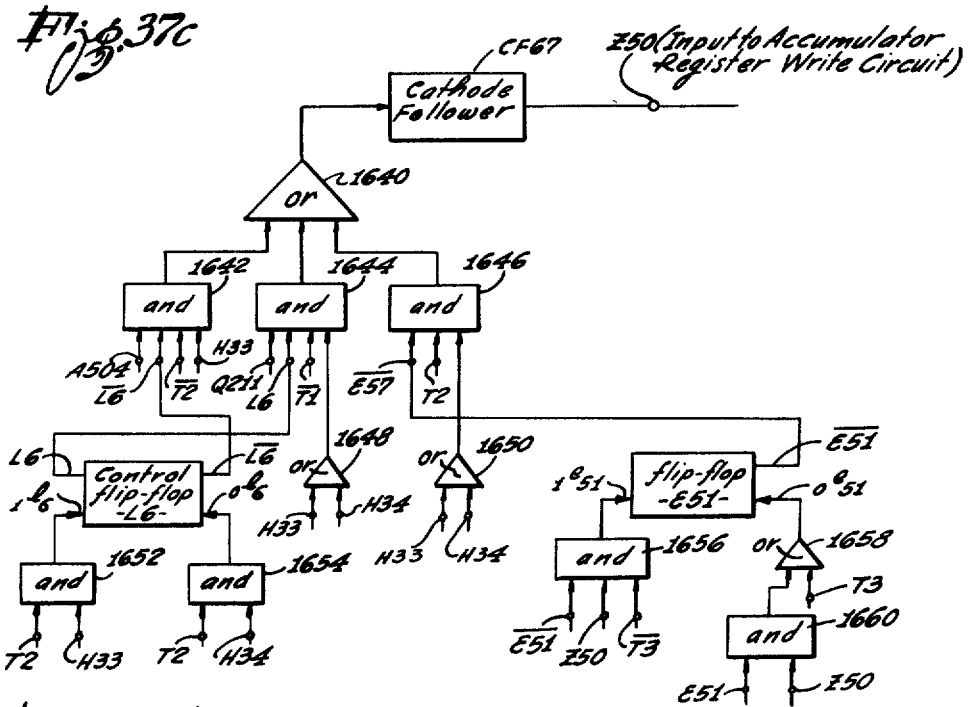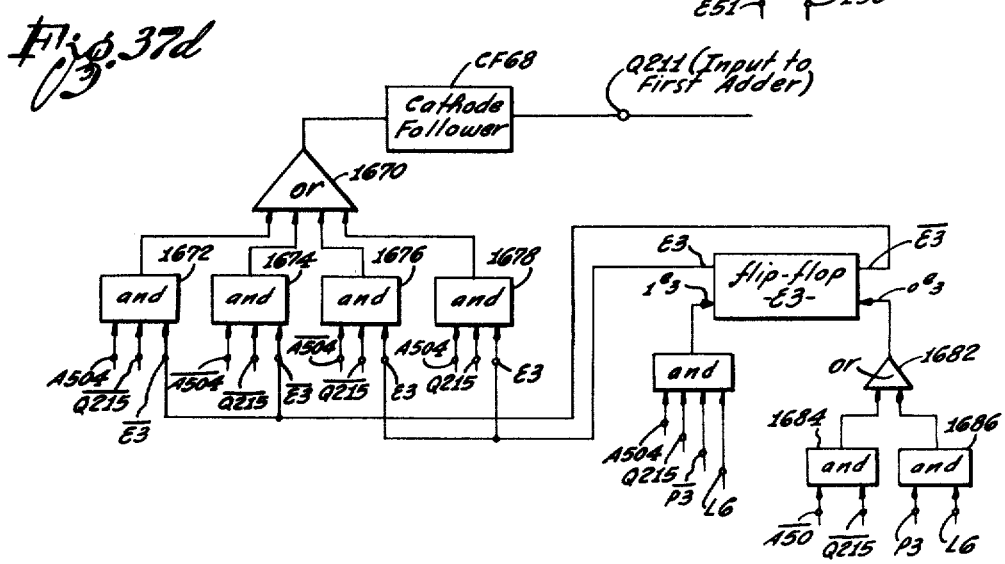

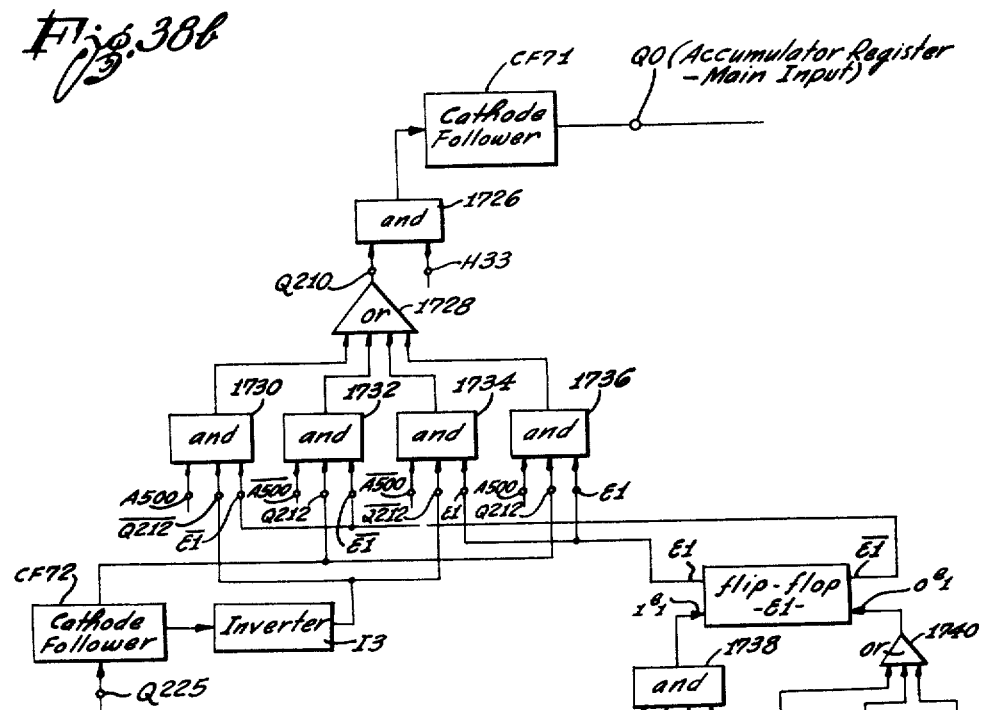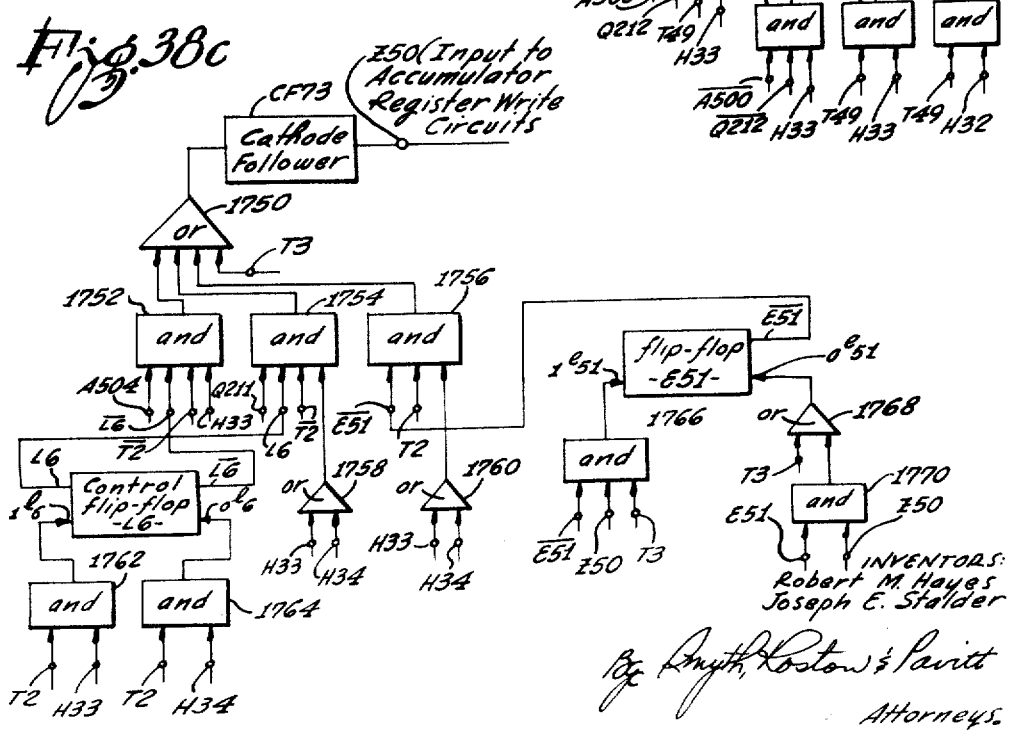

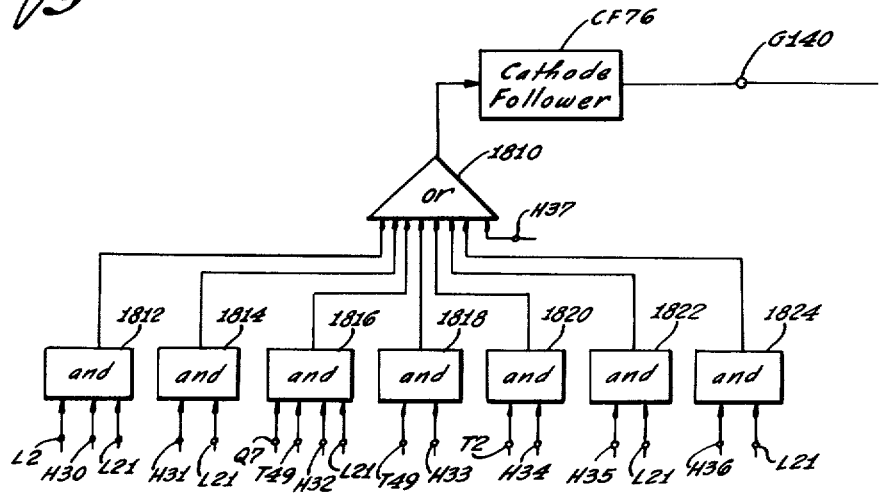
Fig. 39a (Add Binary)
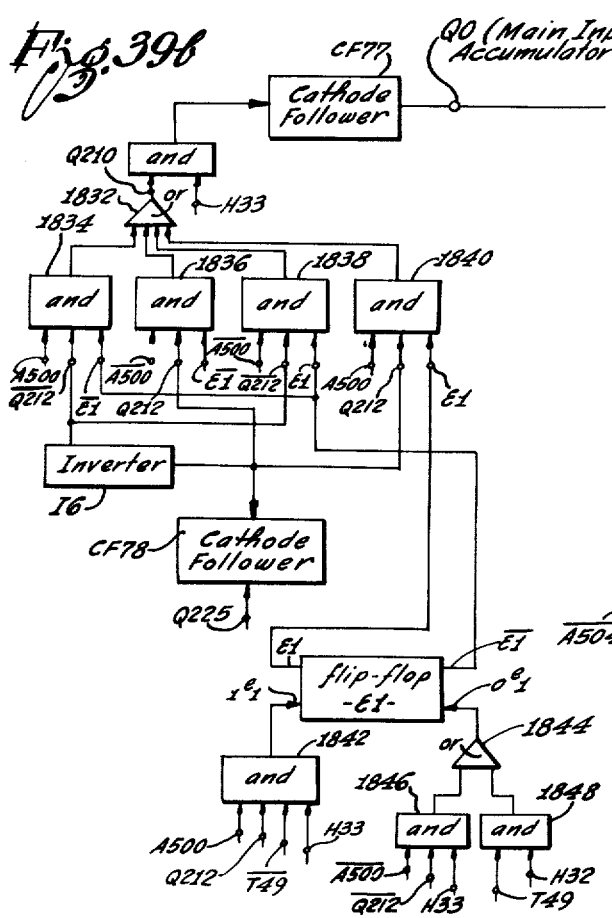
Fig. 39b
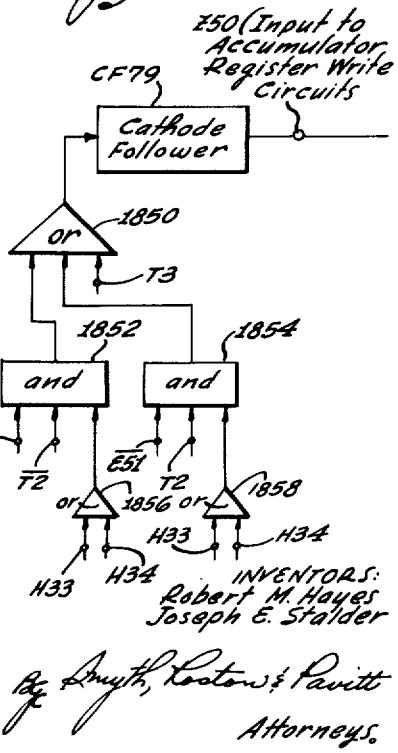
Fig. 39c
INVENTORS:
Robert M. Hayes
Joseph E. Stalder
Attorneys.

INVENTORS:
Robert M. Hayes
Joseph E. Stalder

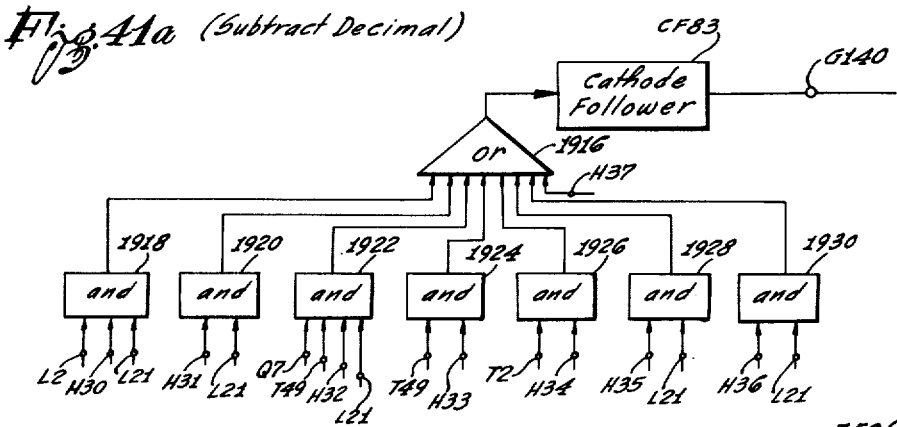
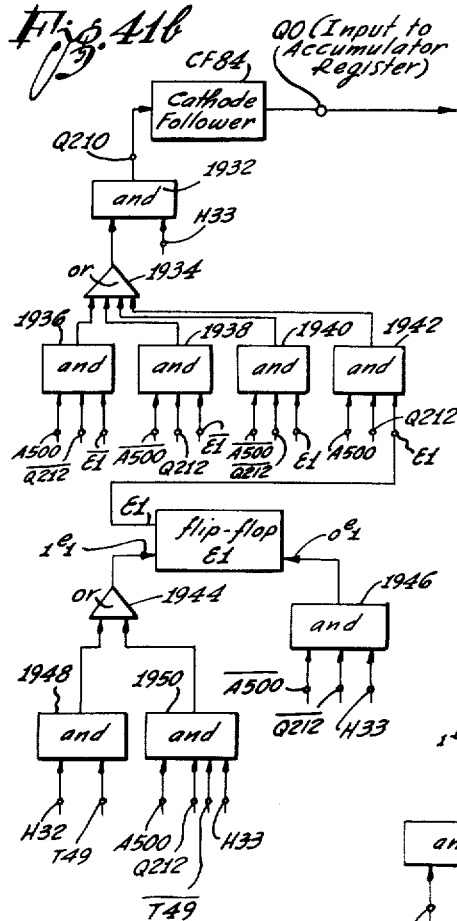
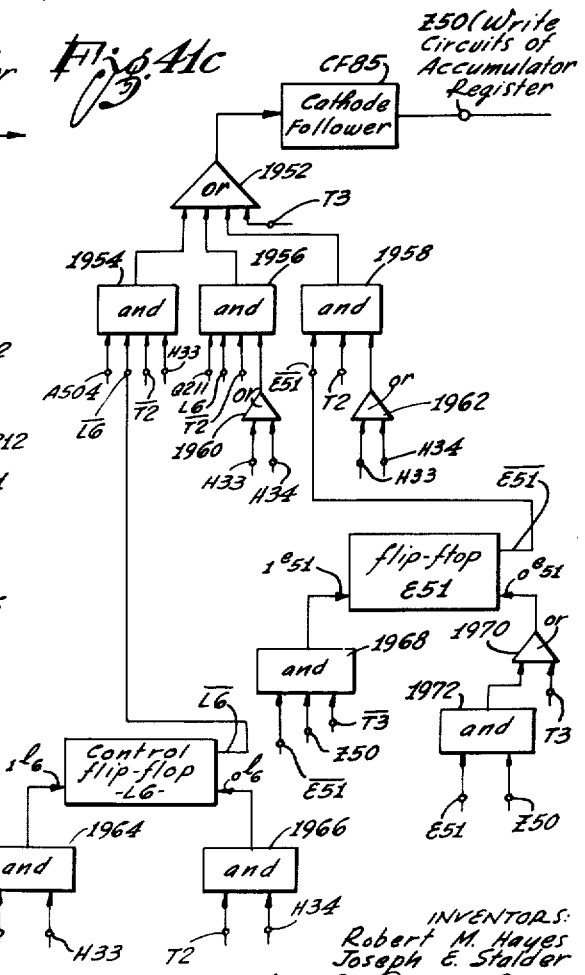

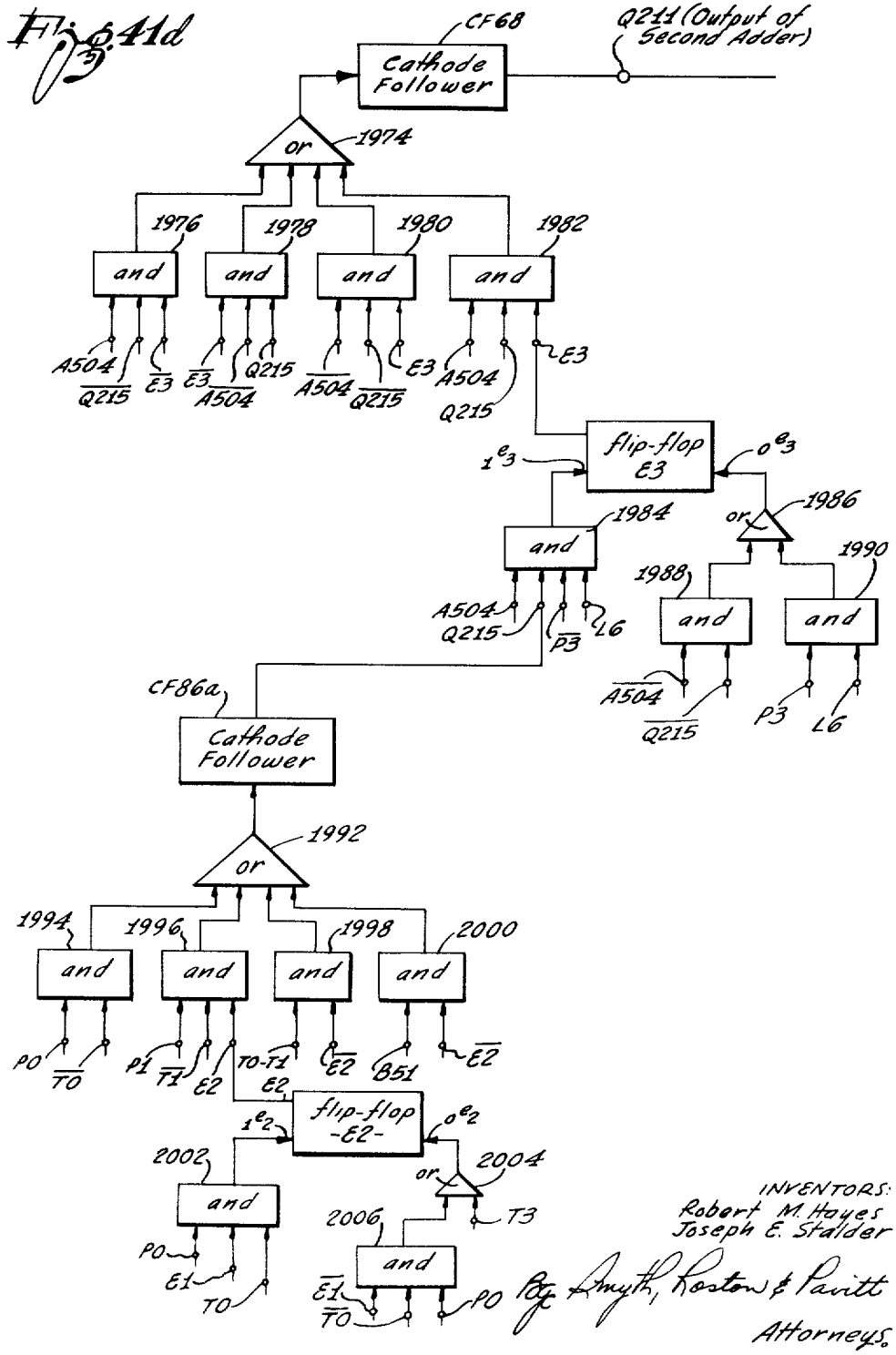

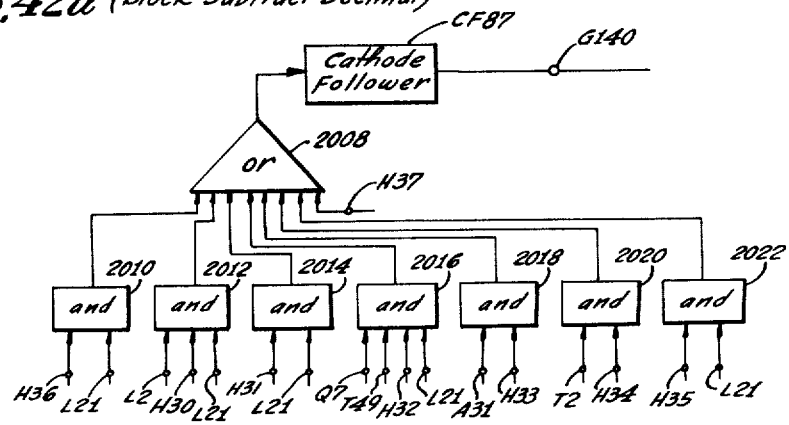
Fig. 42a (Block Subtract Decimal)
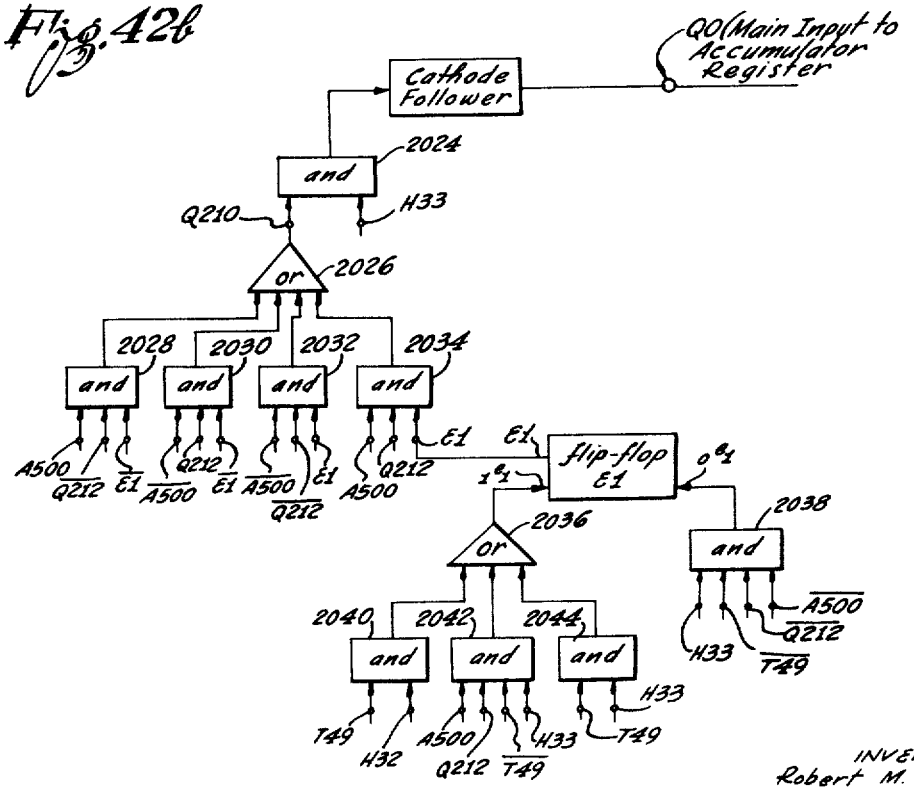
Fig. 42b

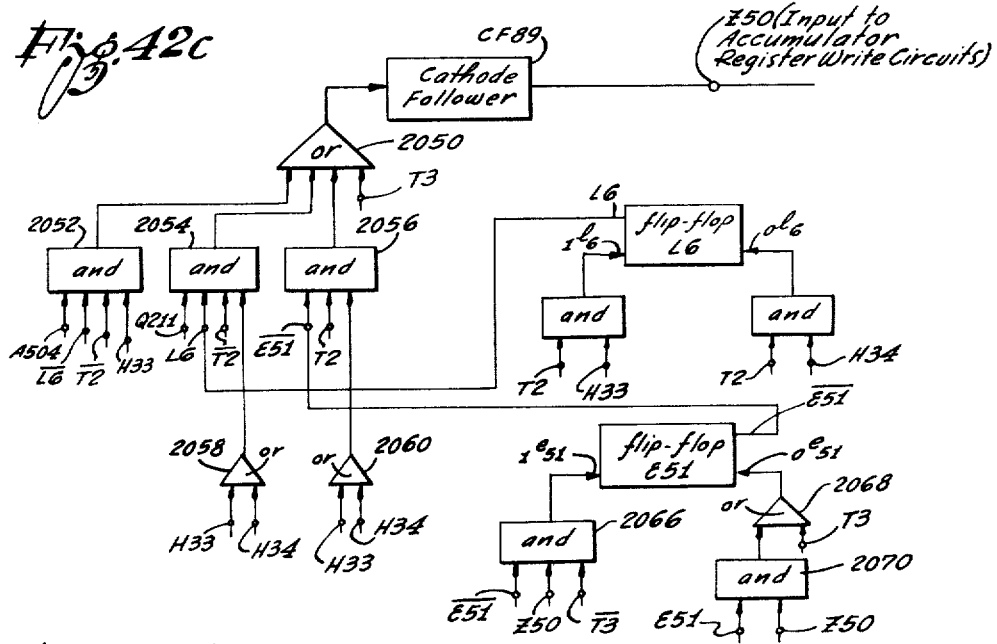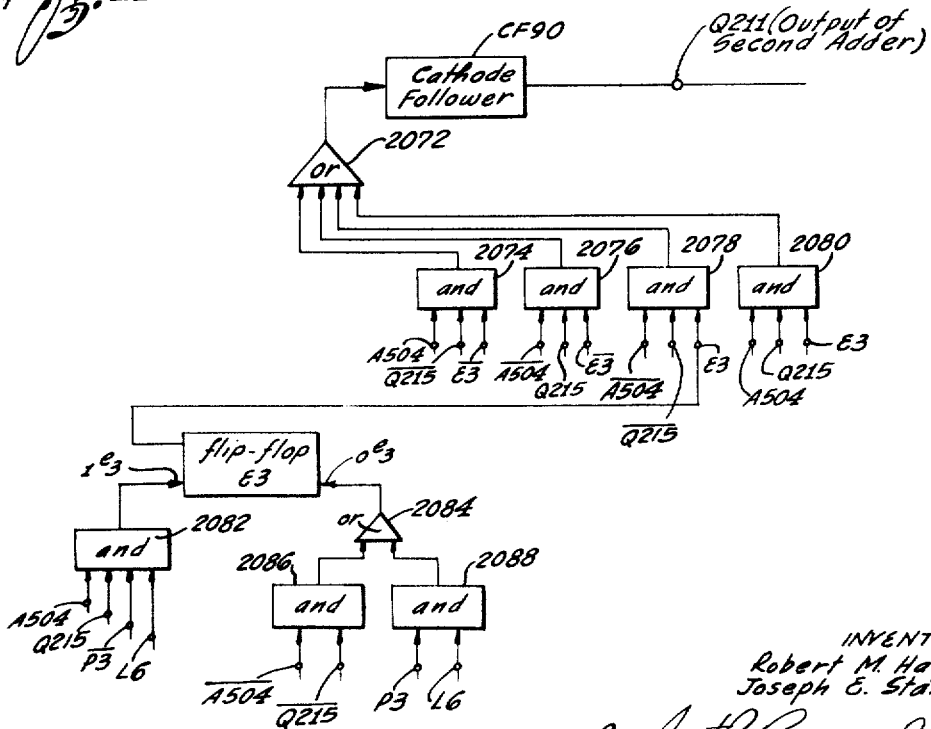

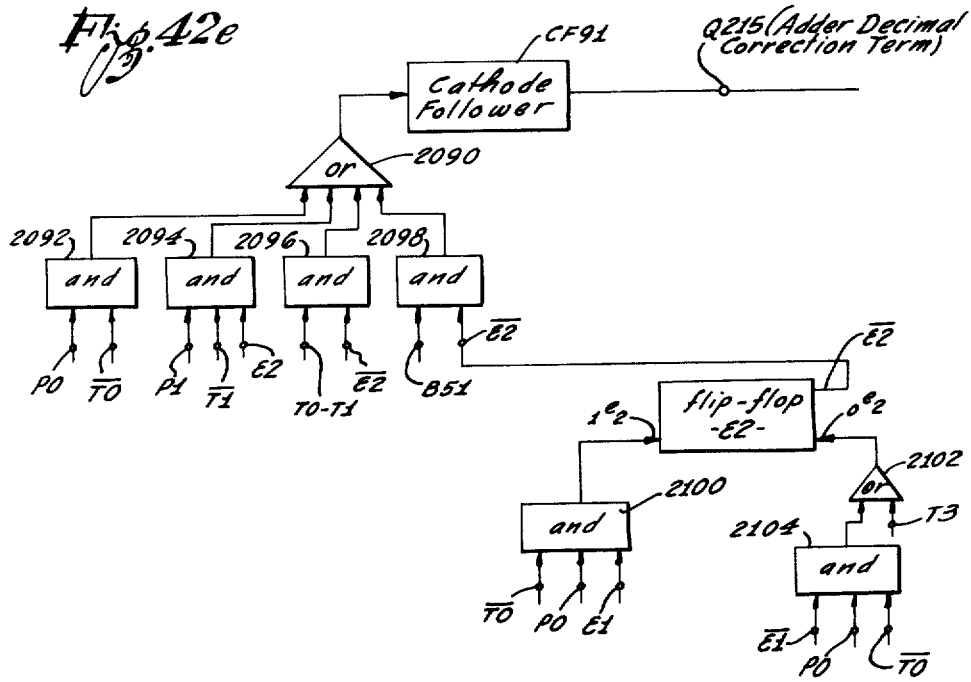
Fig. 42e
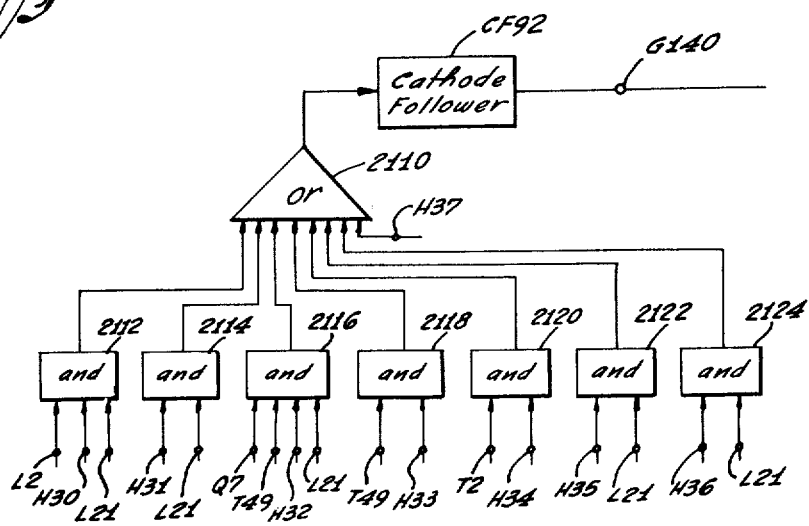
Fig. 43a (Subtract Binary)

INVENTORS:
Robert M. Hayes
Joseph E. Stalder

Attorneys

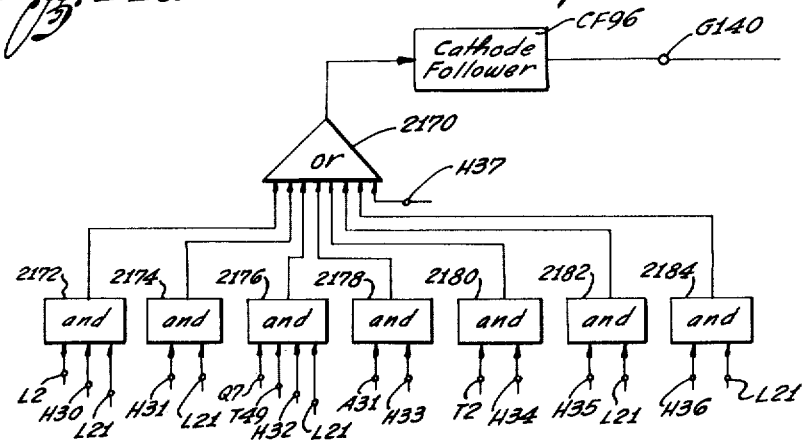
Fig. 44a (Block Subtract Binary)
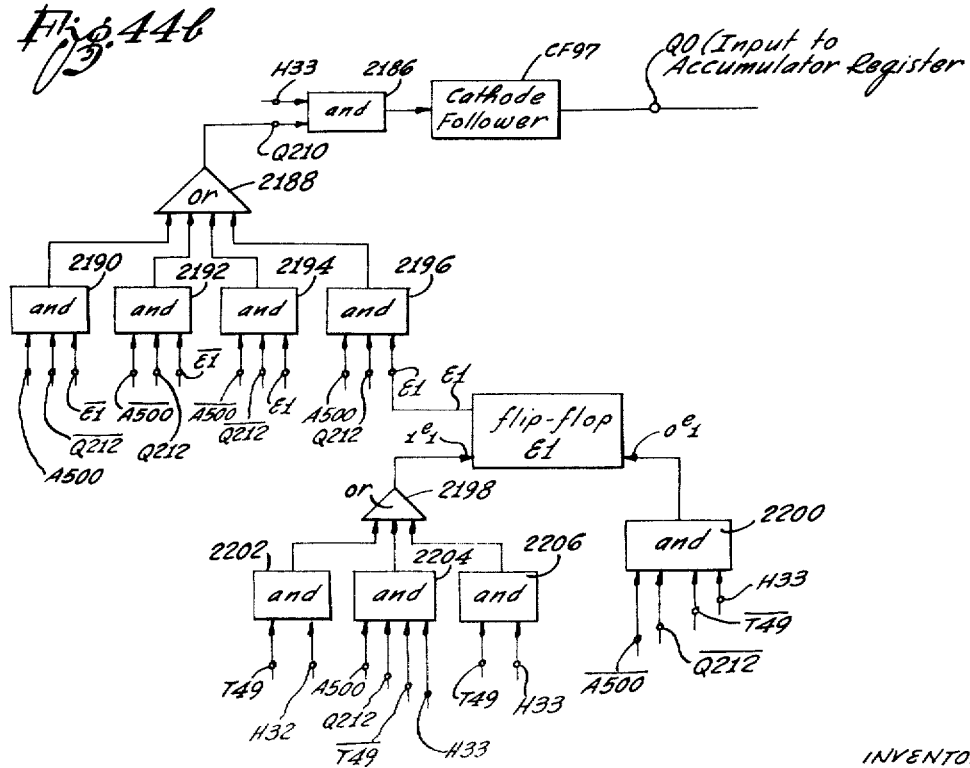
Fig. 44b

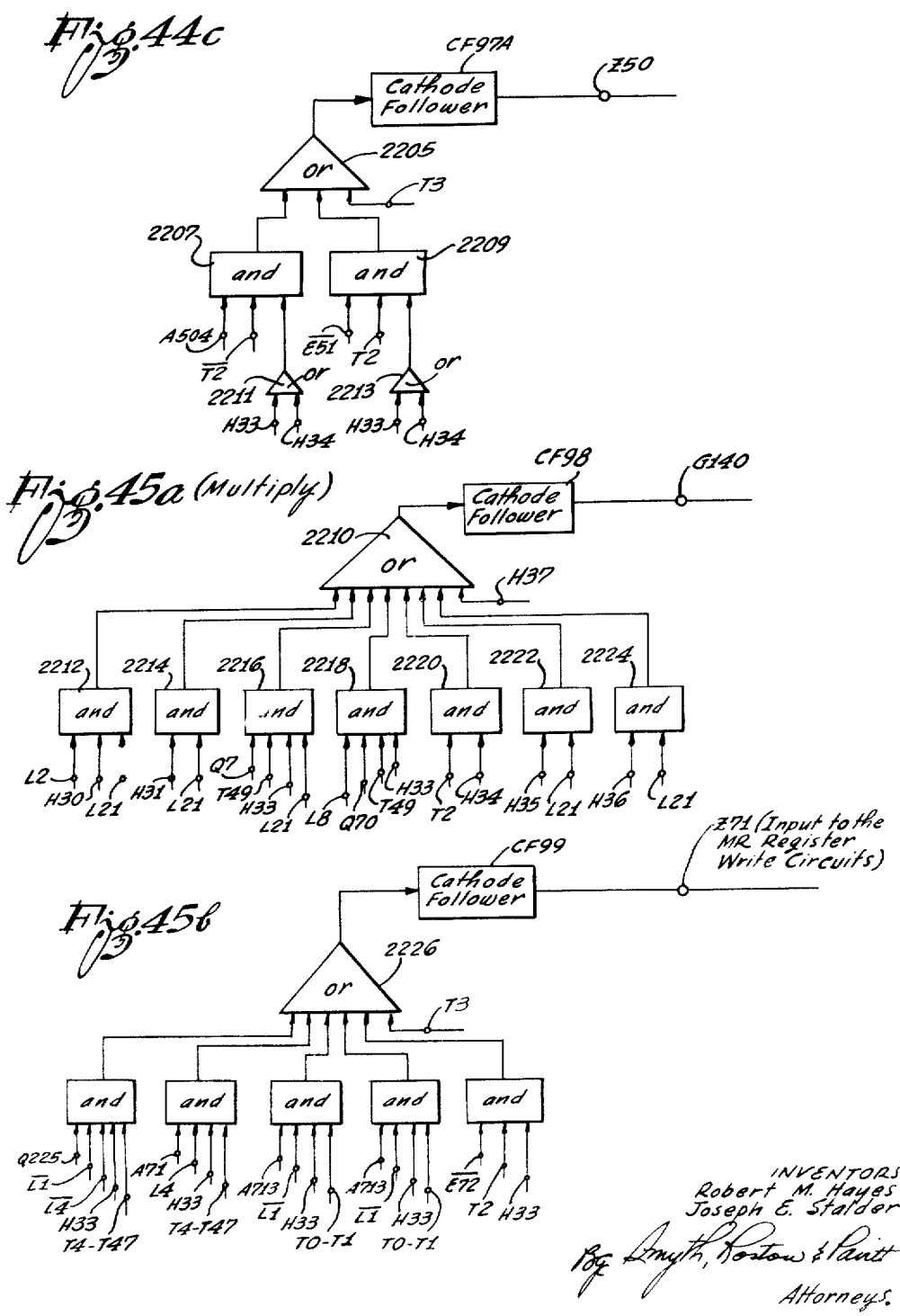

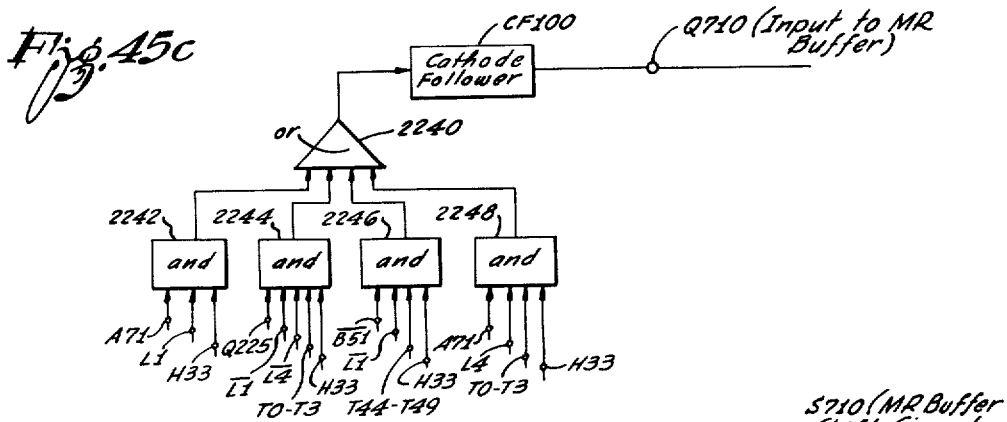
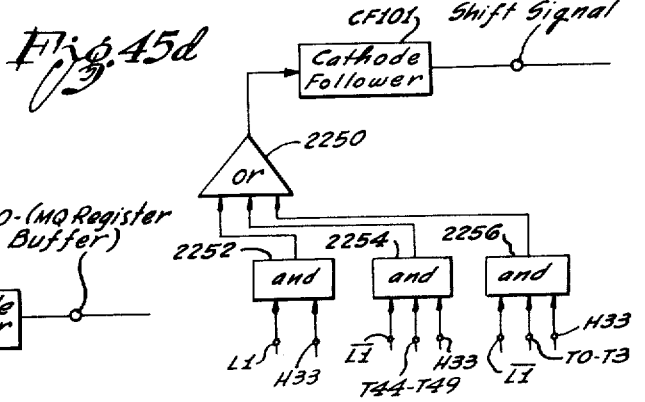
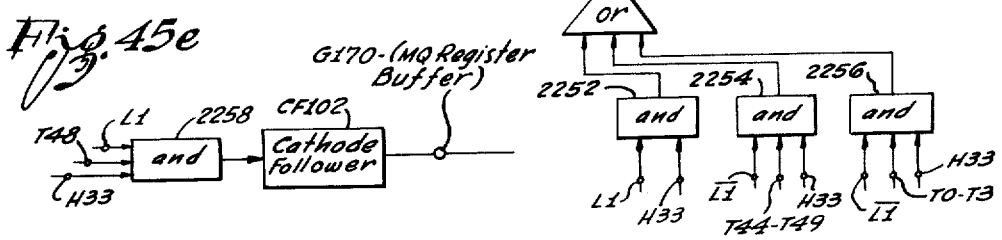
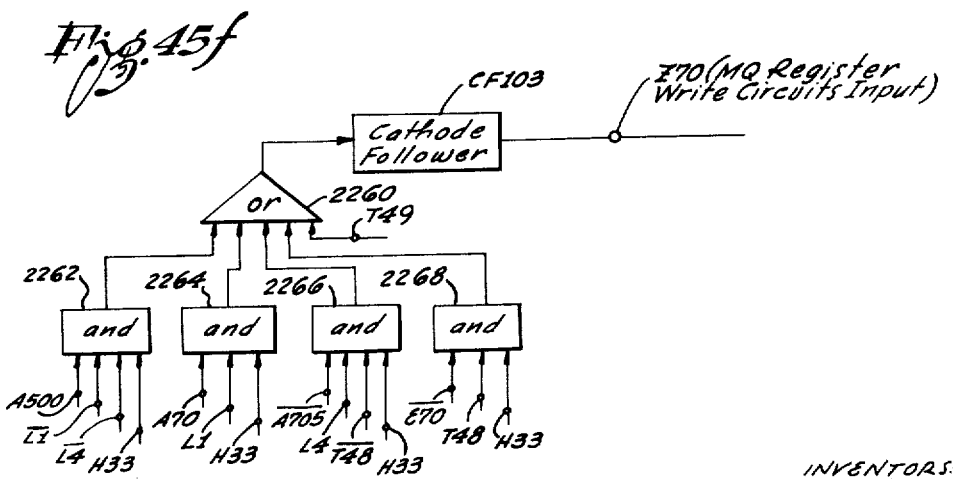

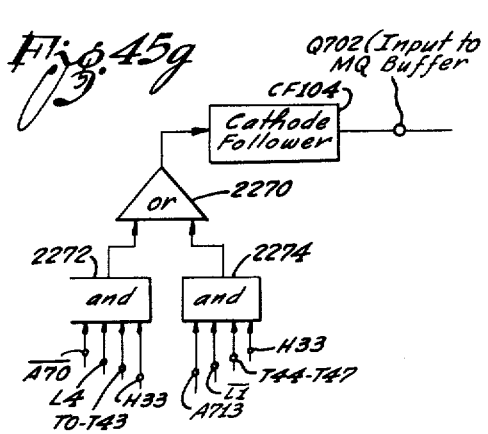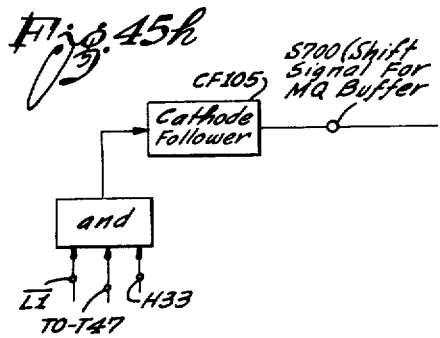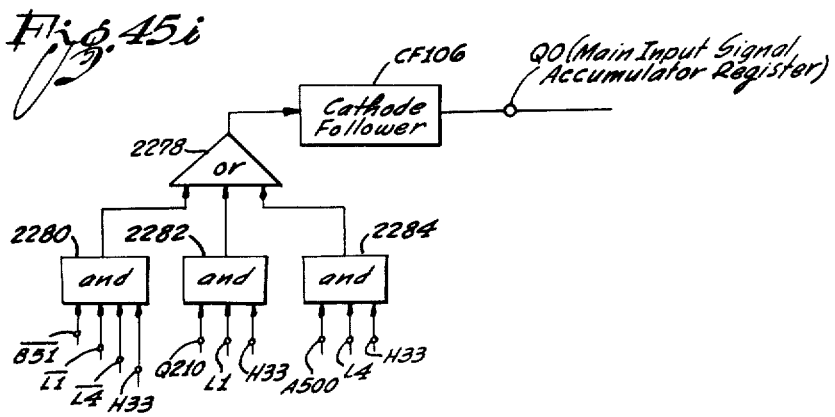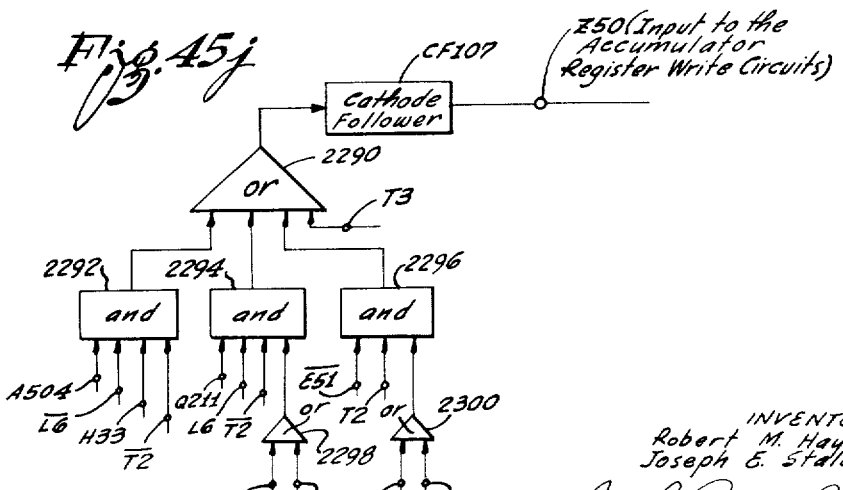

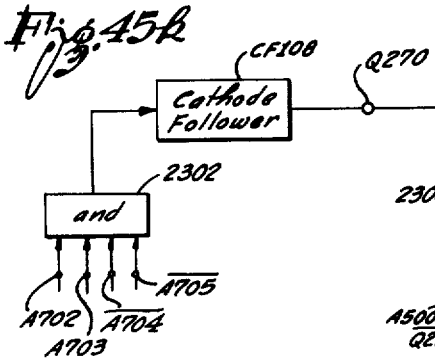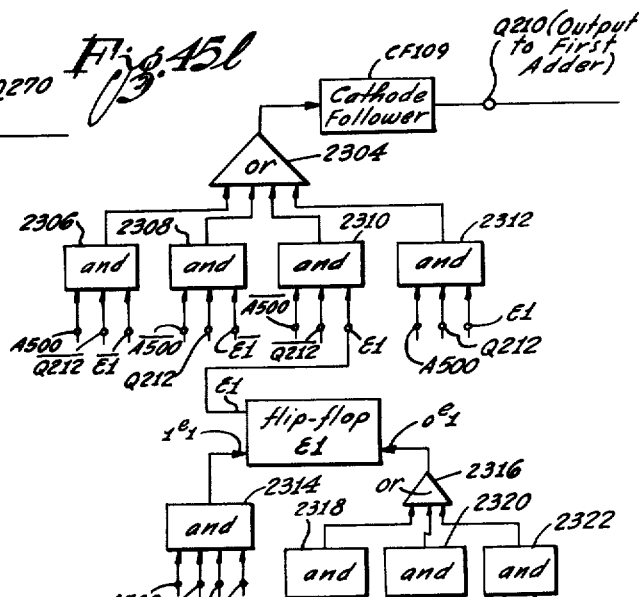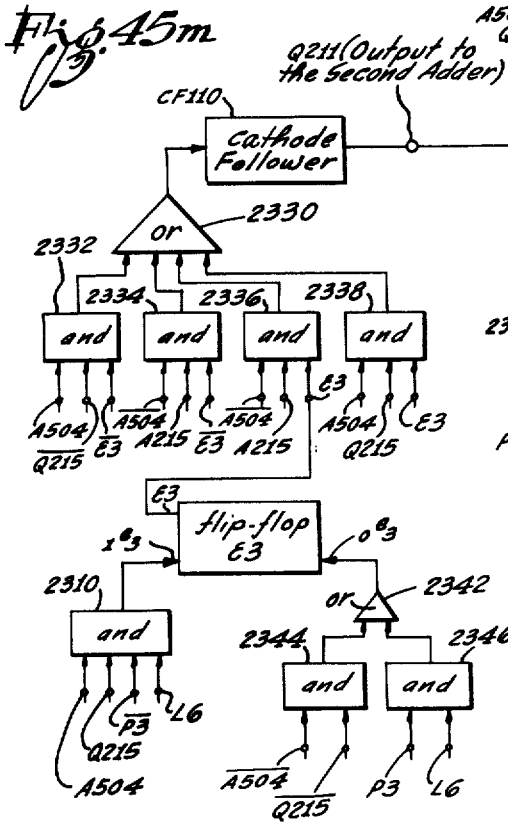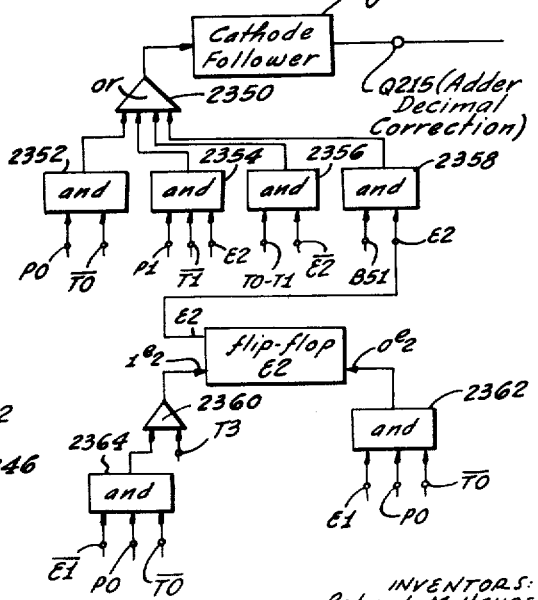

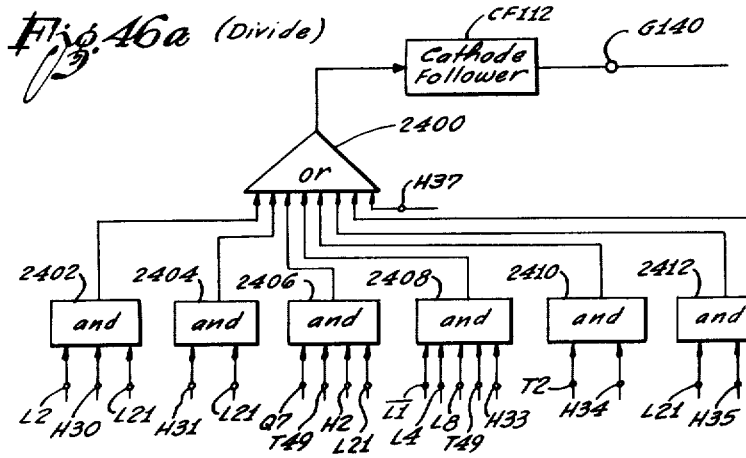
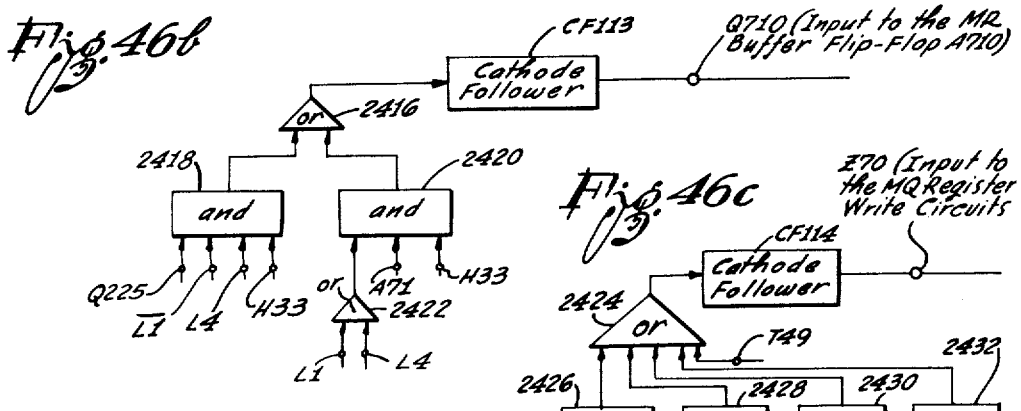
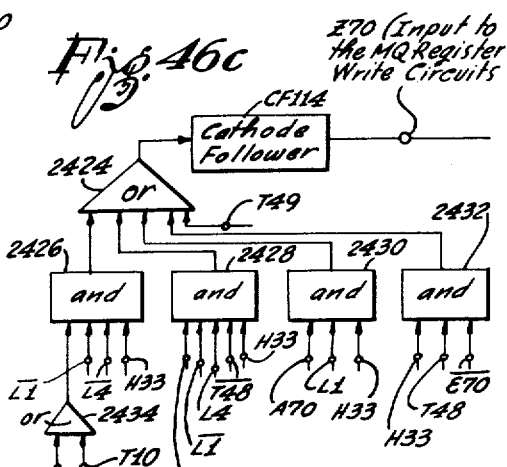
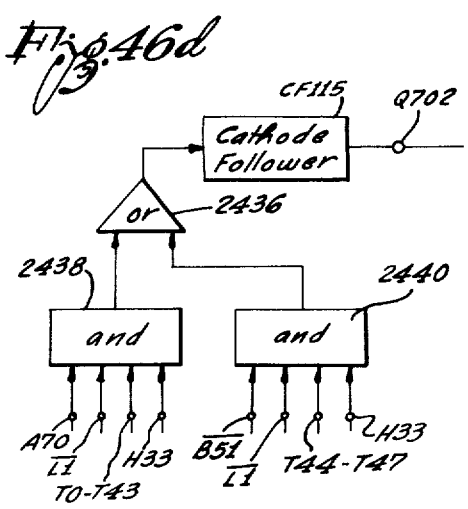

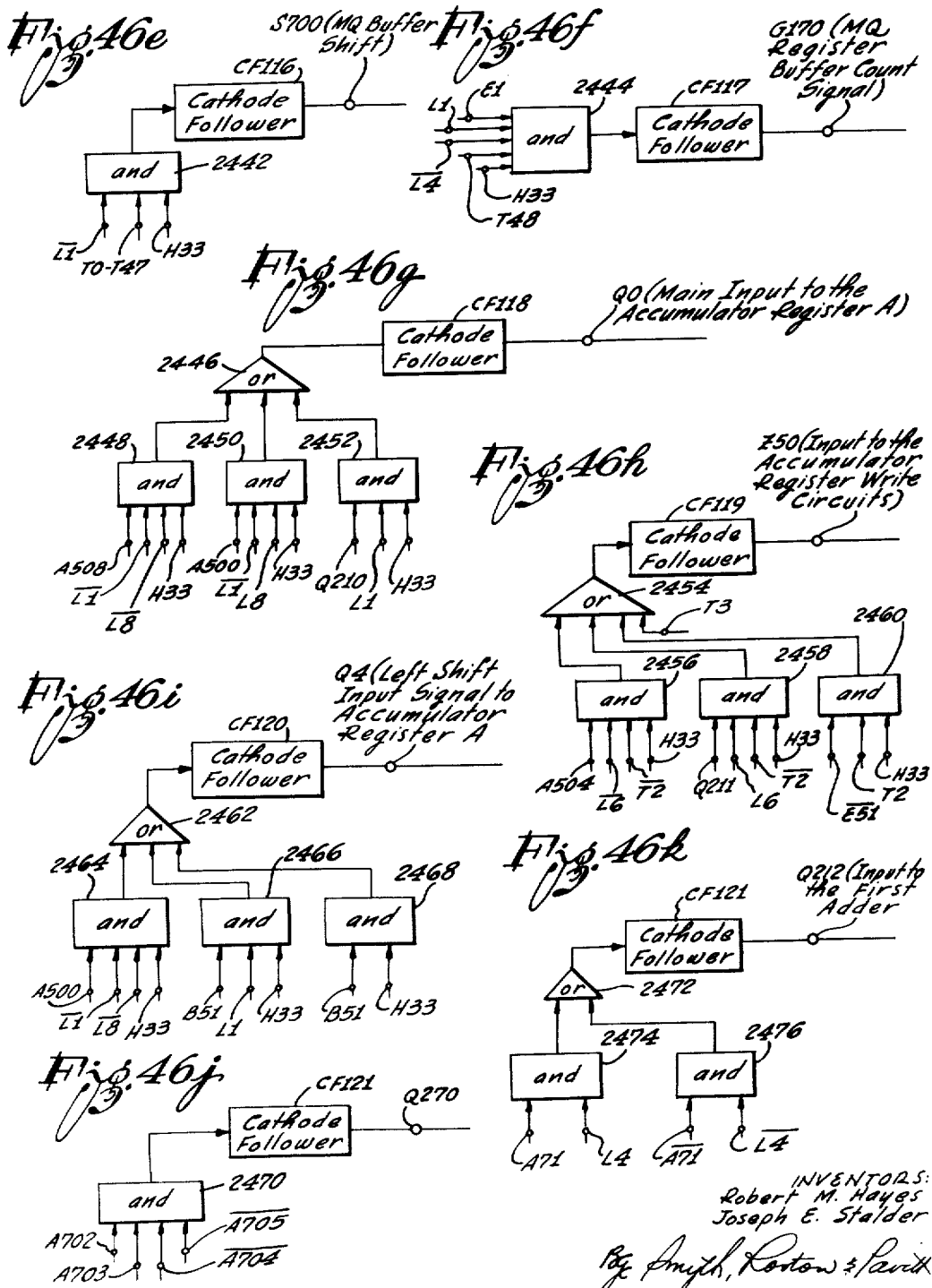

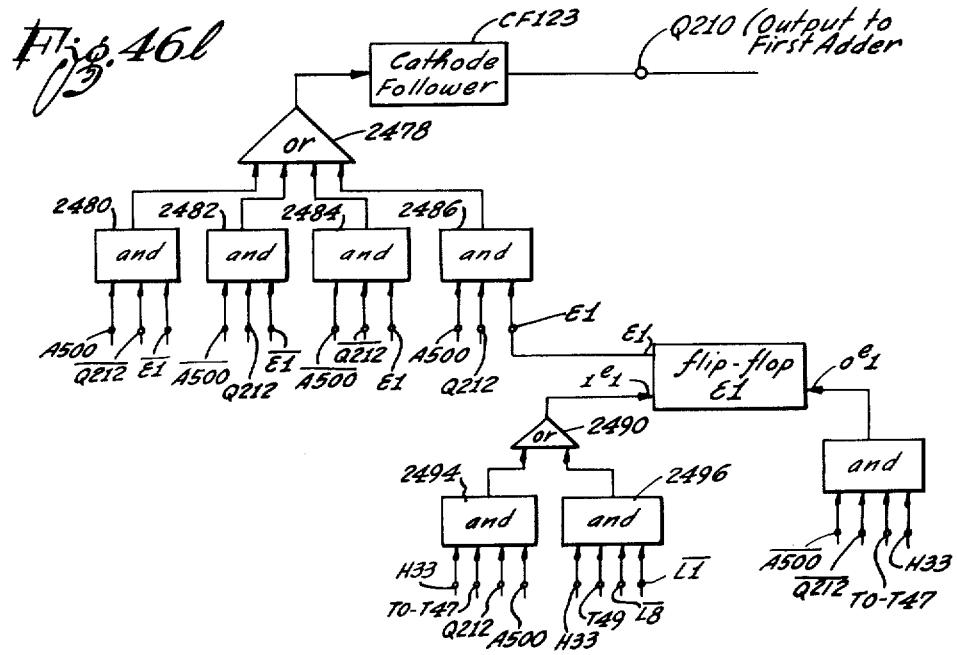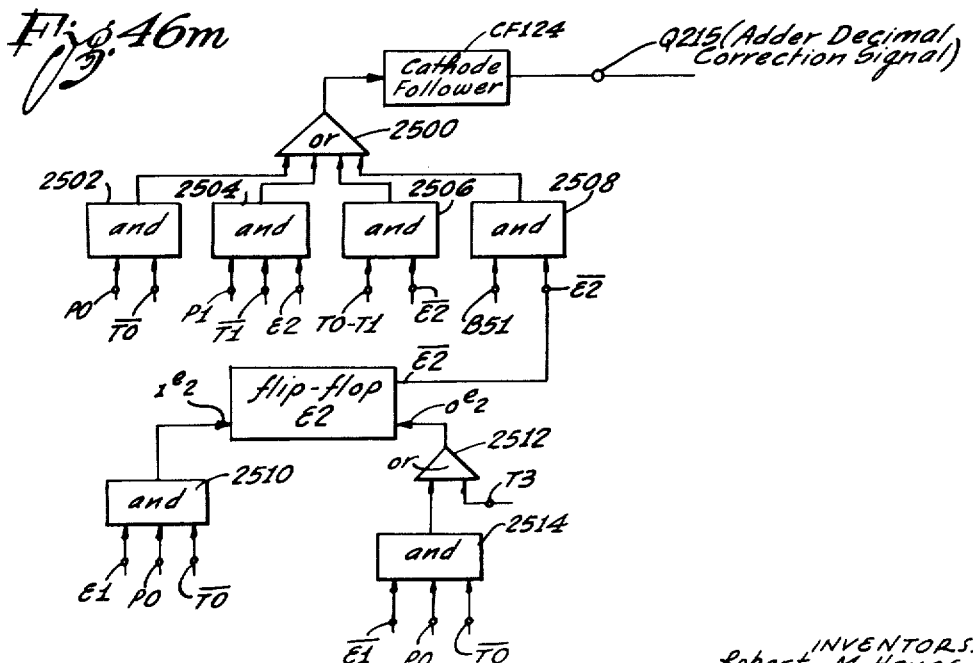

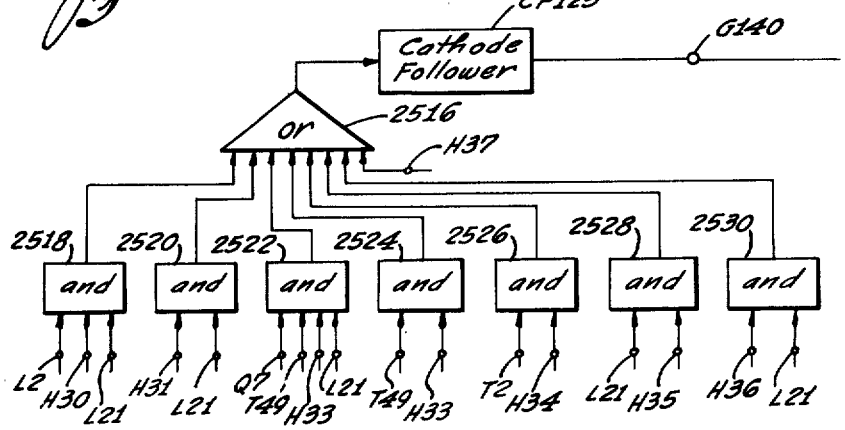
Fig. 47a (Compare Equal)
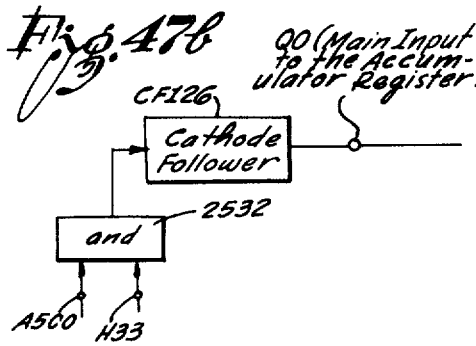
Fig. 47b
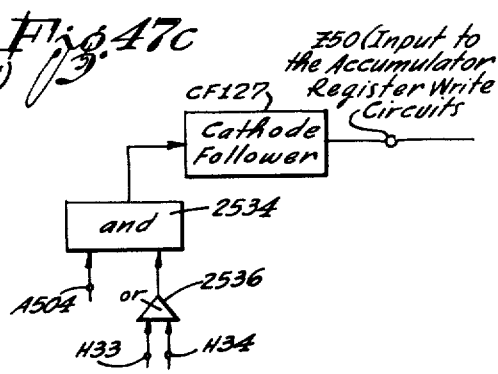
Fig. 47c
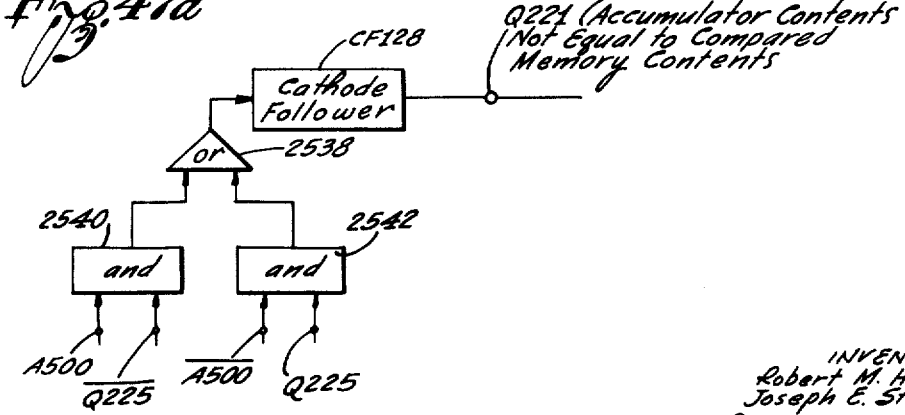
Fig. 47d
INVENTORS:
Robert M. Hayes
Joseph E. Stalder
Attorneys.

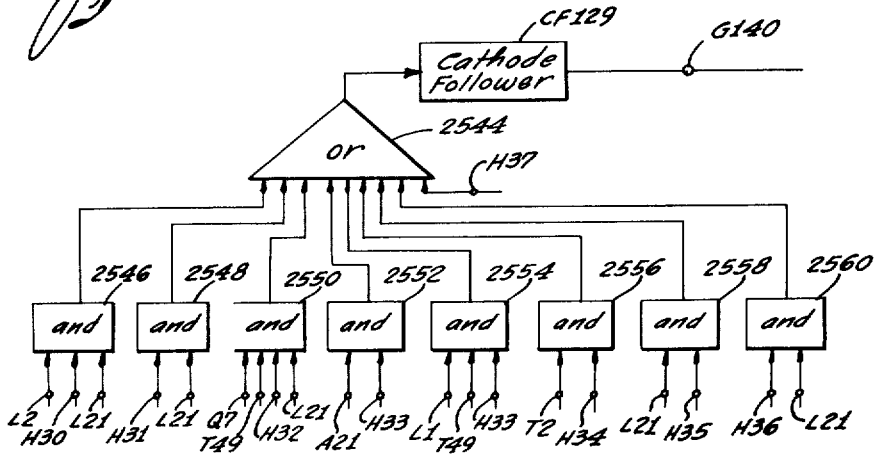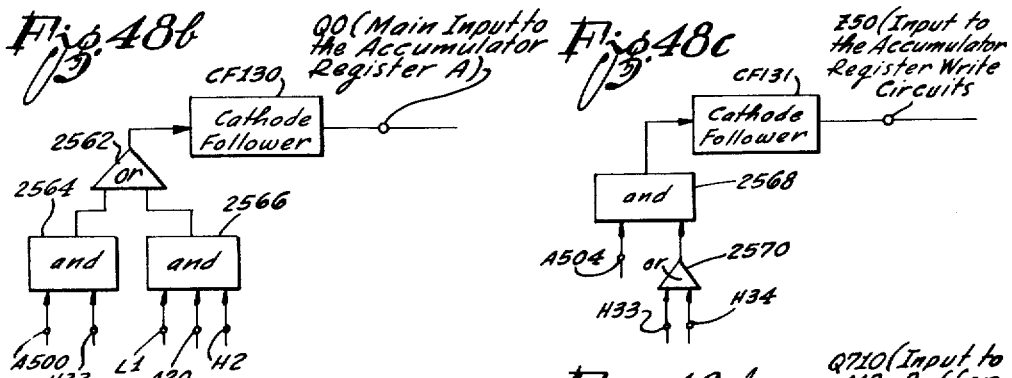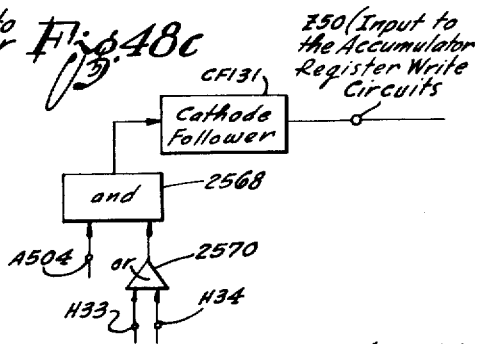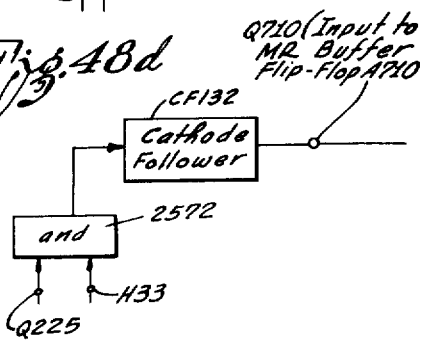

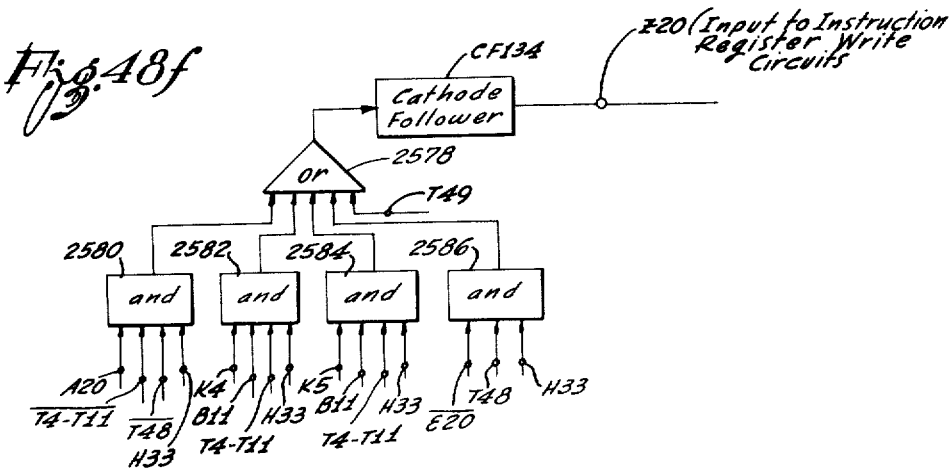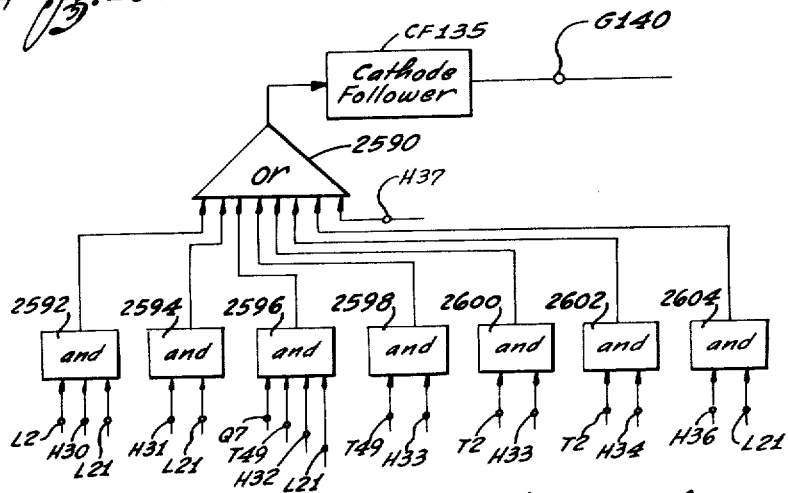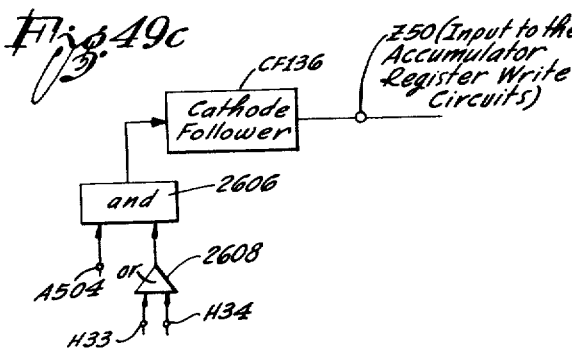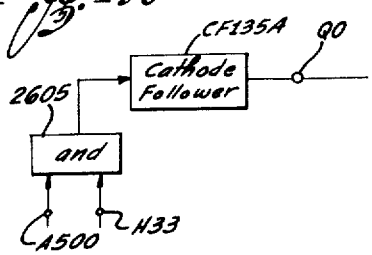

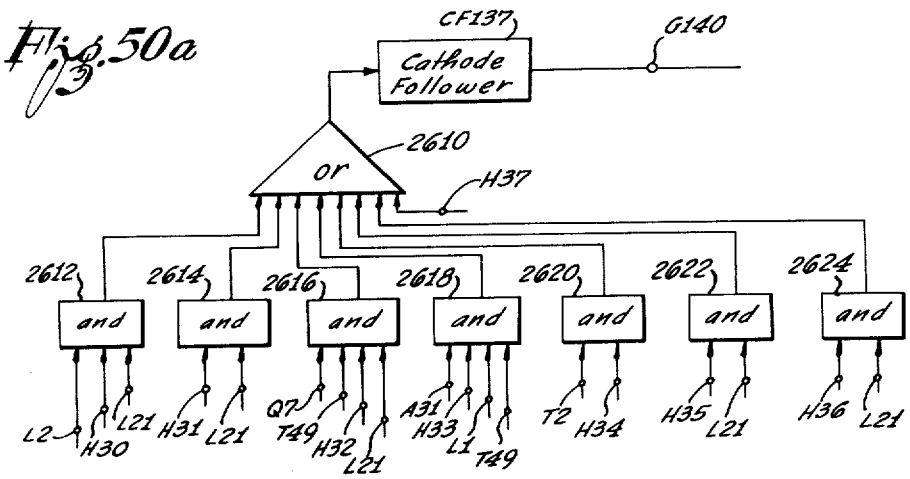
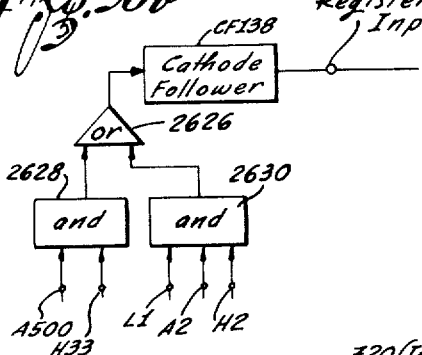
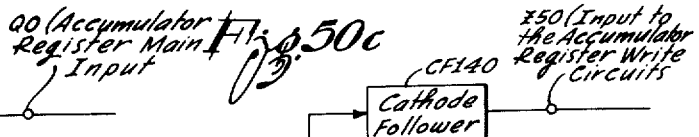
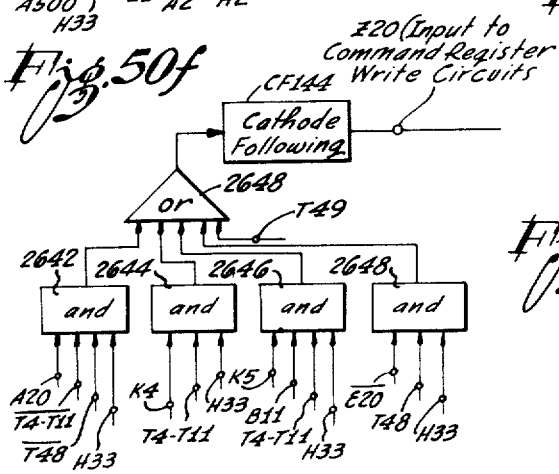
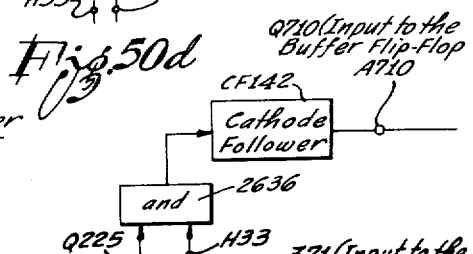
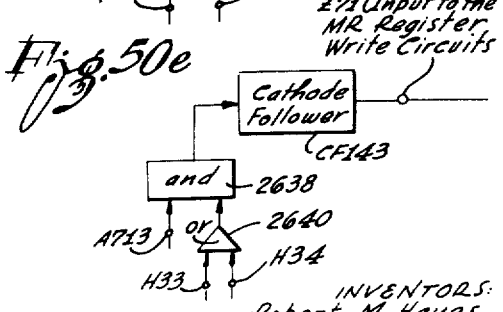

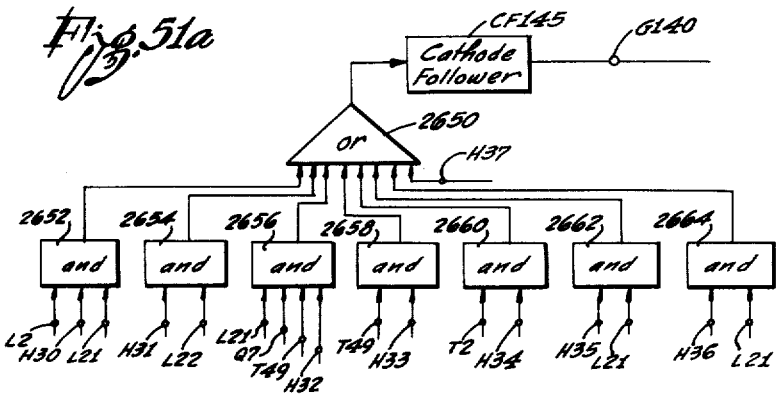
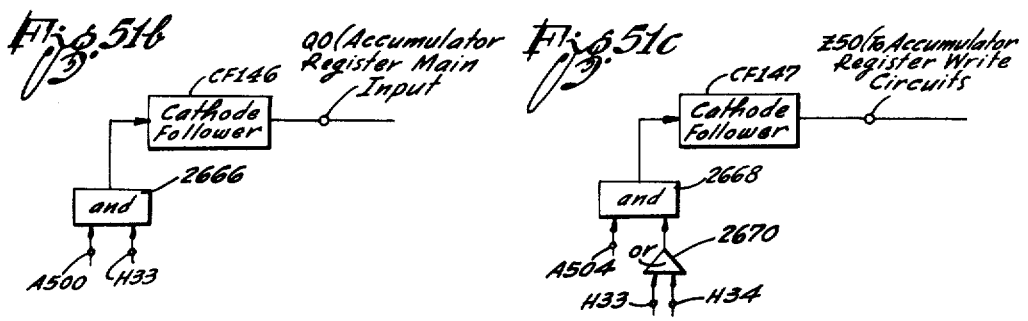
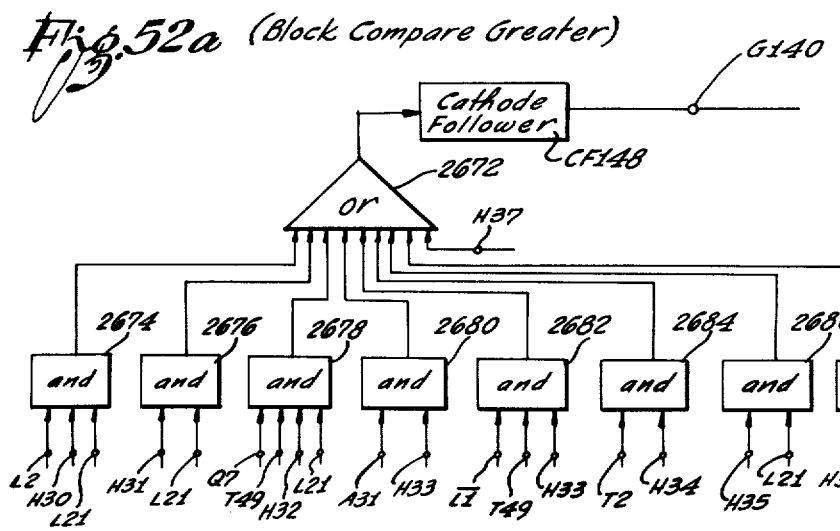

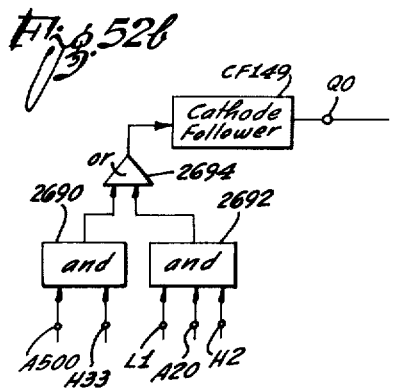
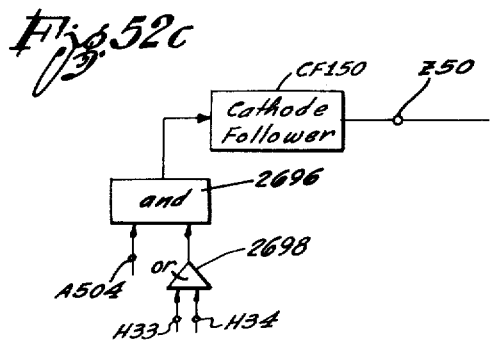
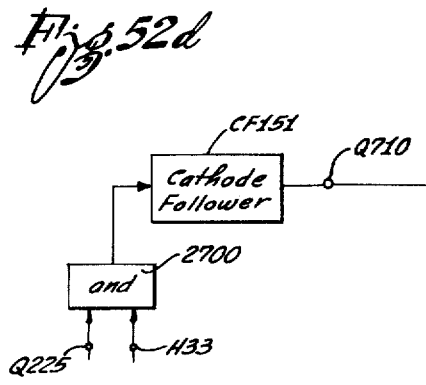
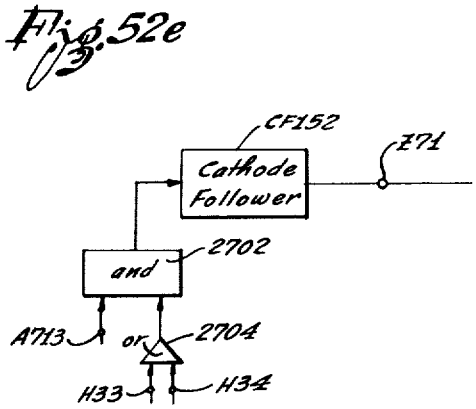
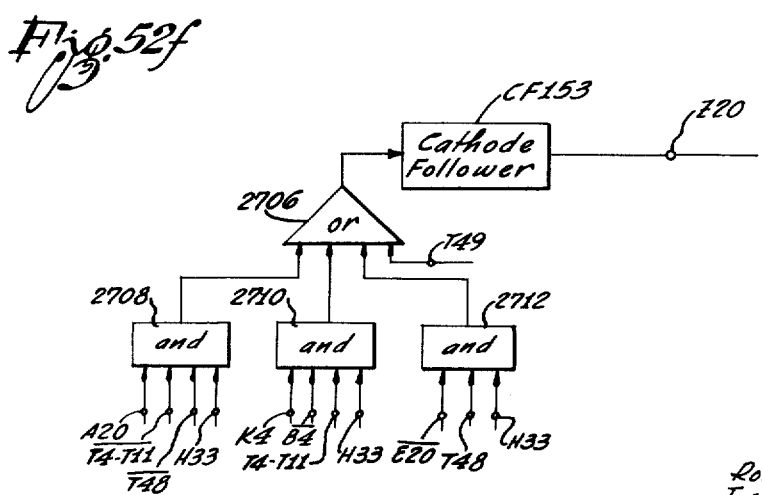

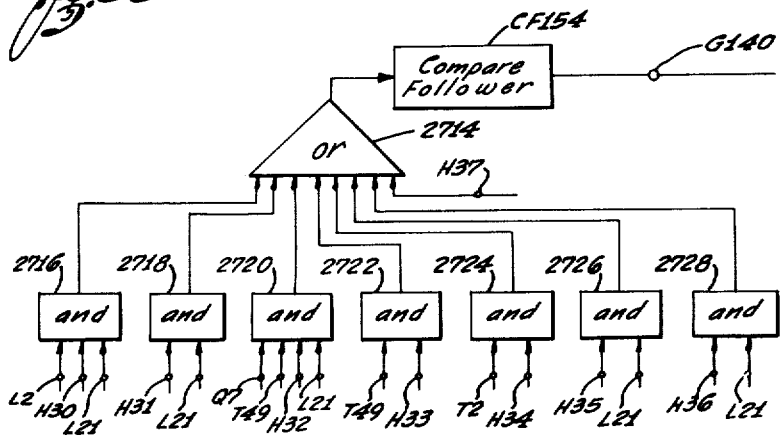
Fig. 53a (Compare Zero)
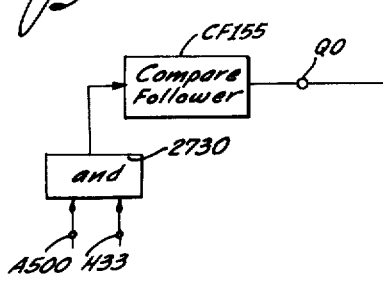
Fig. 53b
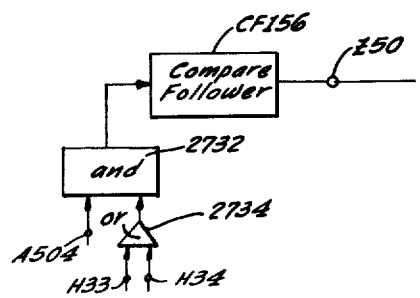
Fig. 53c
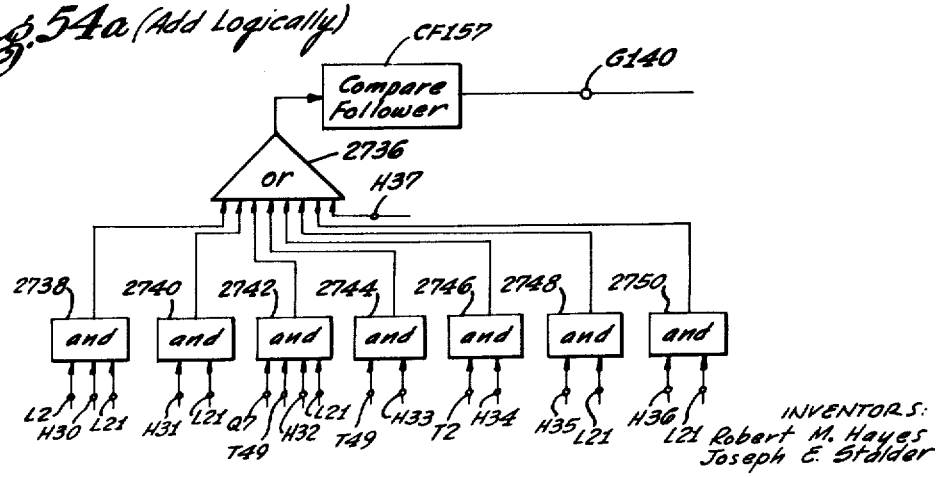
Fig. 54a (Add Logically)
INVENTORS:
Robert M. Hayes
Joseph E. Stalder
Attorneys.

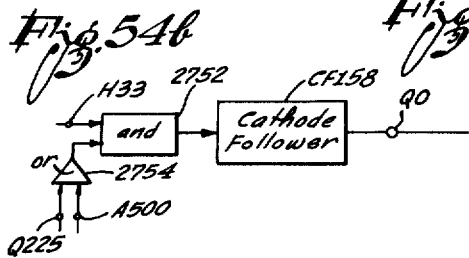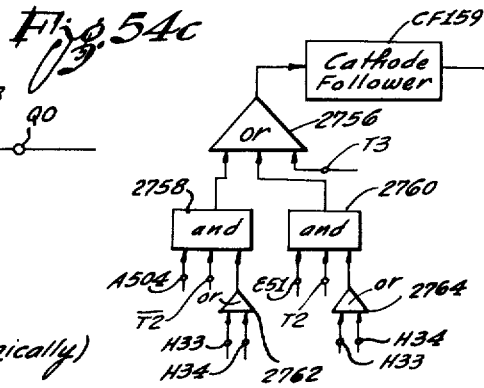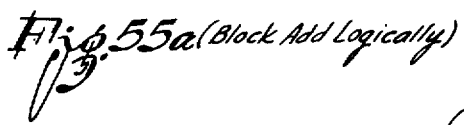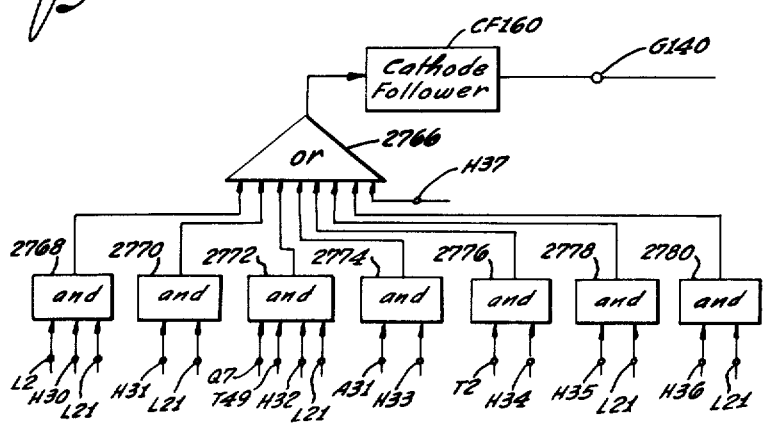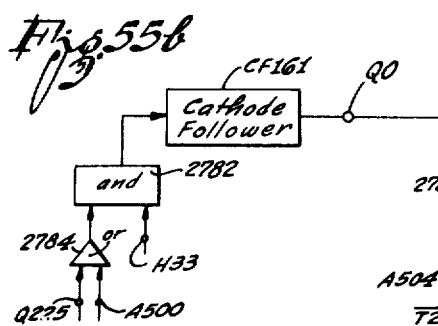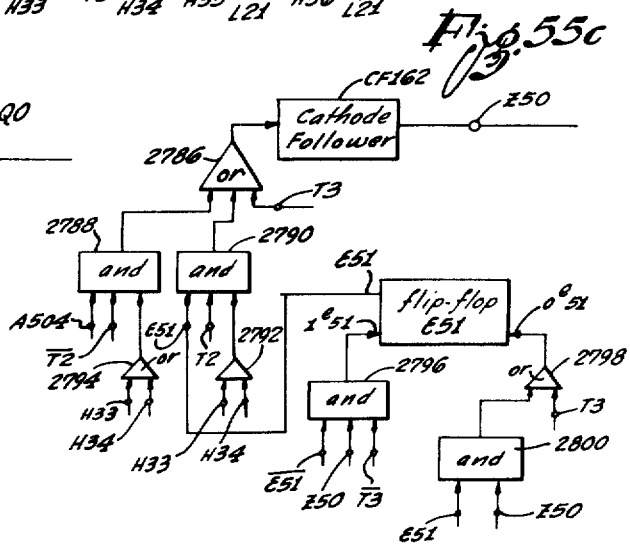

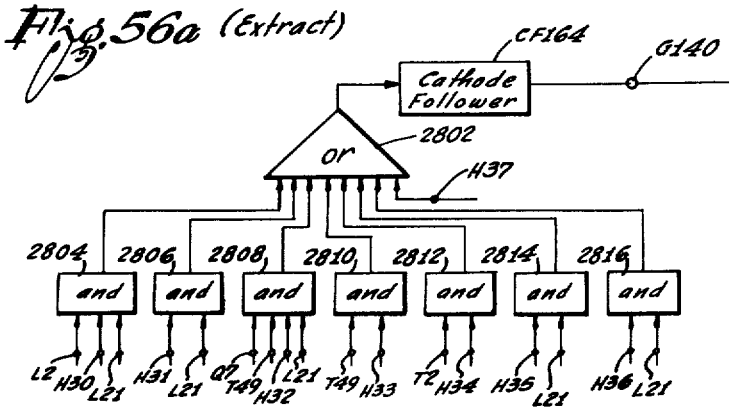
Fig. 56a (Extract)
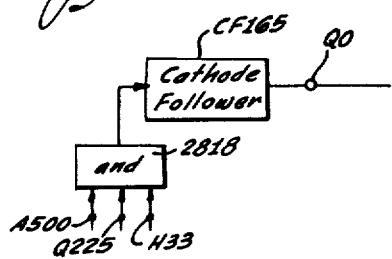
Fig. 56b
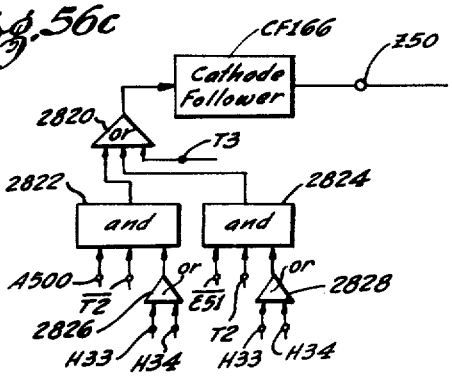
Fig. 56c
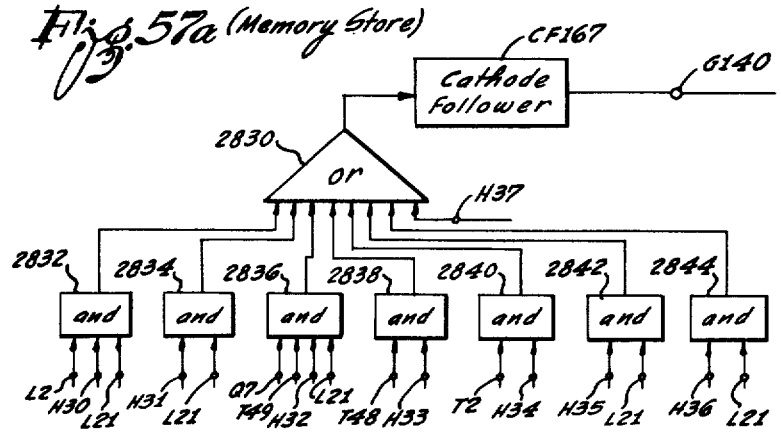
Fig. 57a (Memory Store)

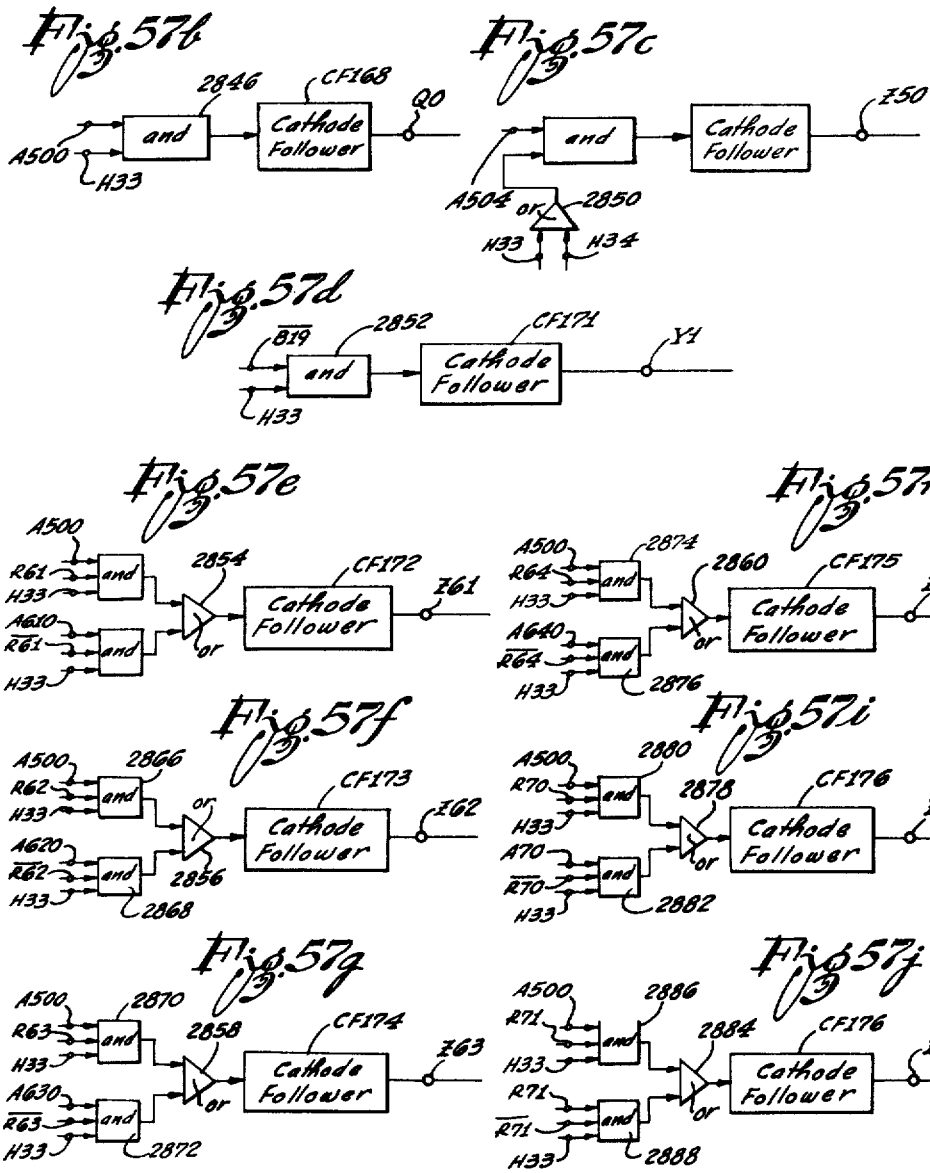

March 9, 1965     R. M. HAYES ETAL     3,173,129
CARD PROCESSING SYSTEM
Filed Nov. 7, 1960     77 Sheets-Sheet 63
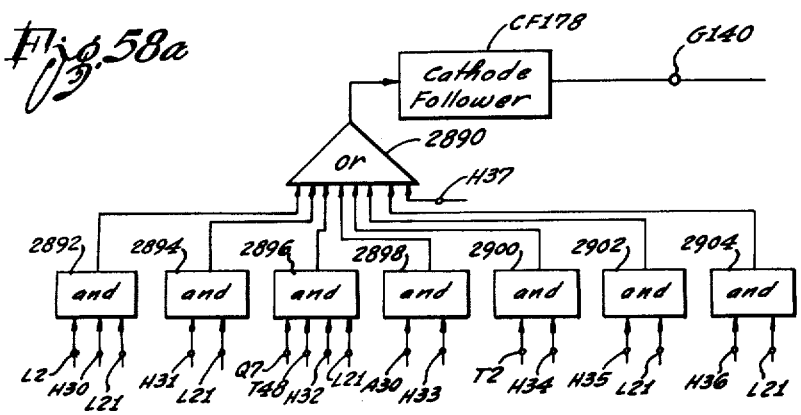
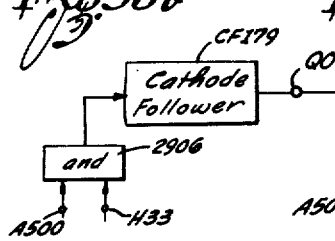
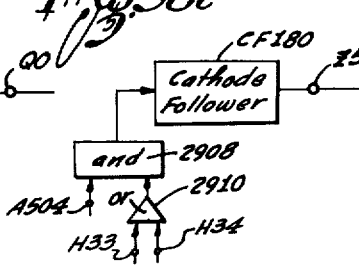
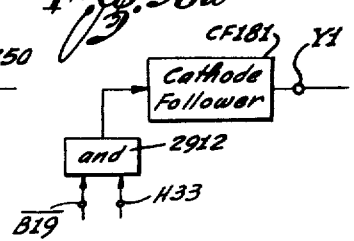
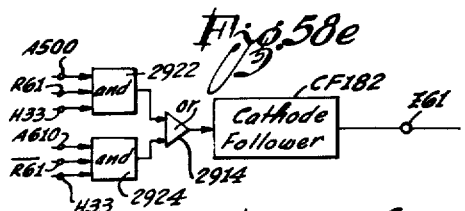
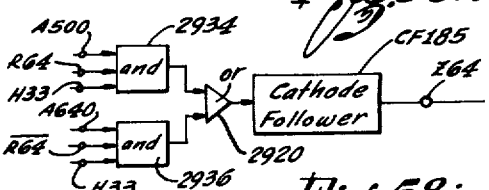
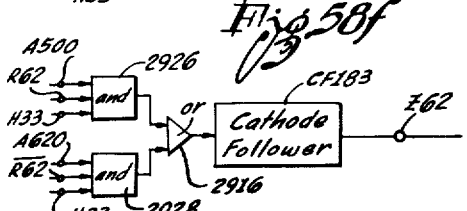
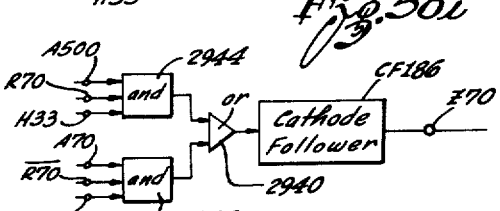
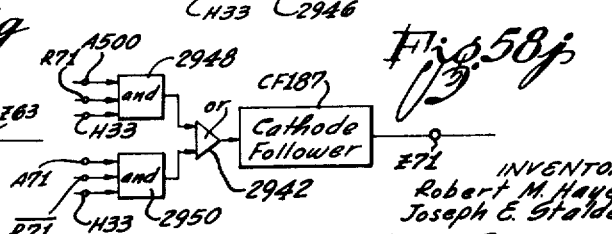
INVENTORS:
Robert M. Hayes
Joseph E. Stalder
Attorneys.

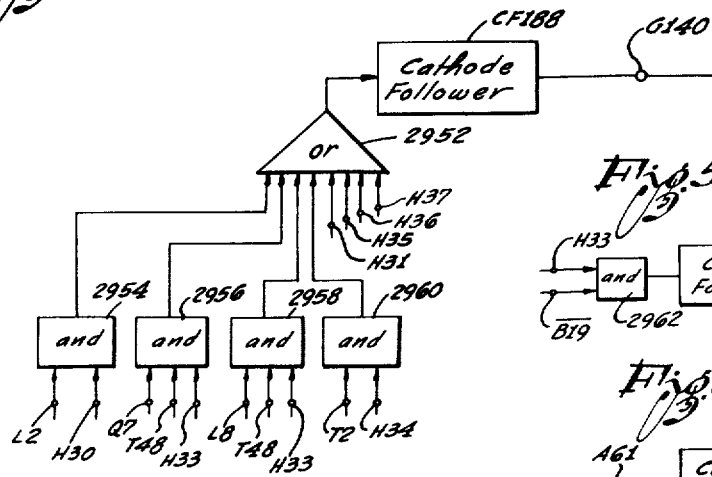
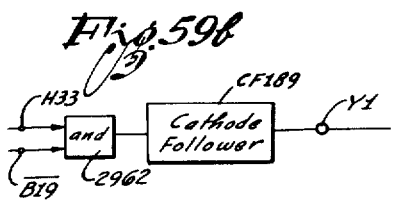
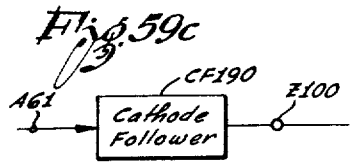
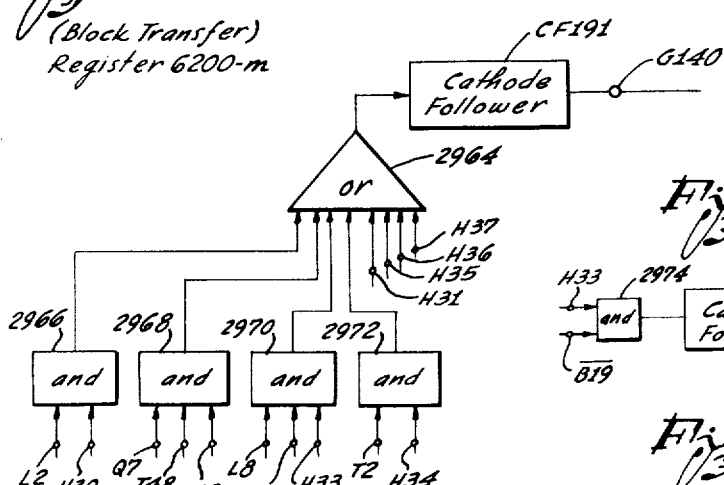
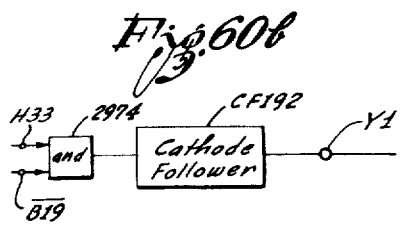
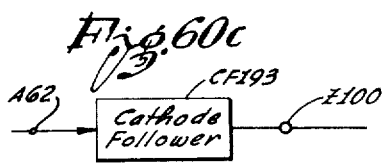

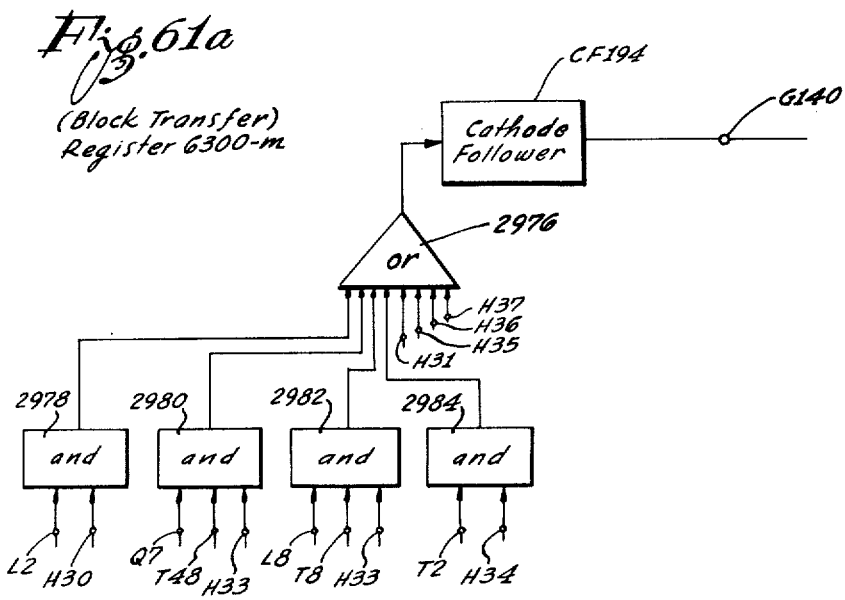
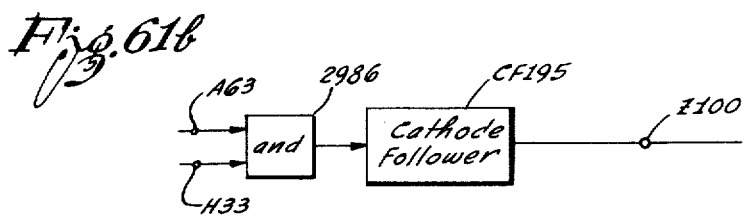
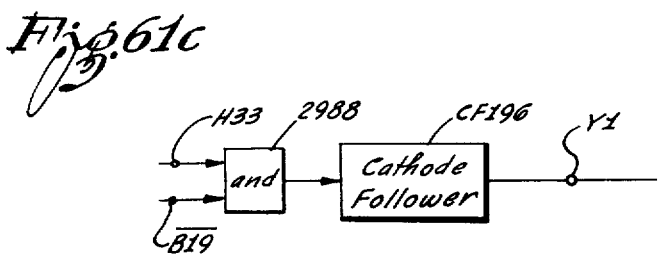

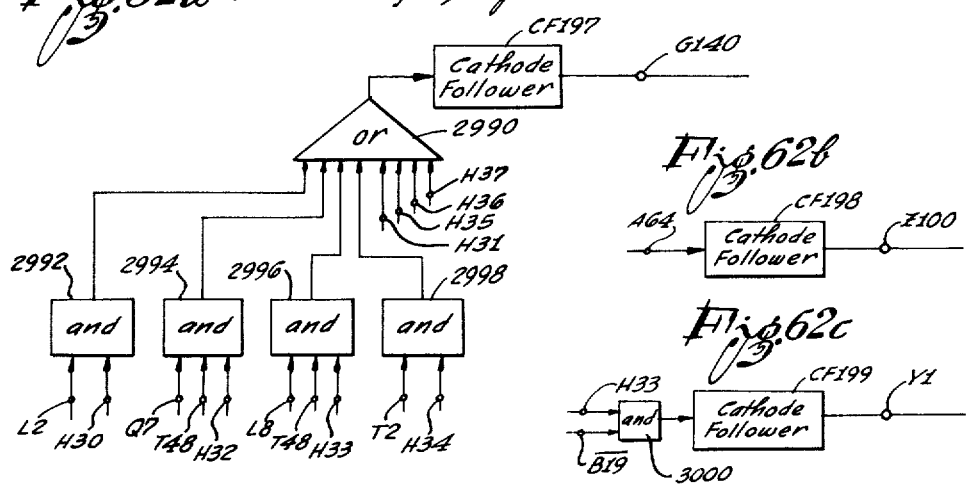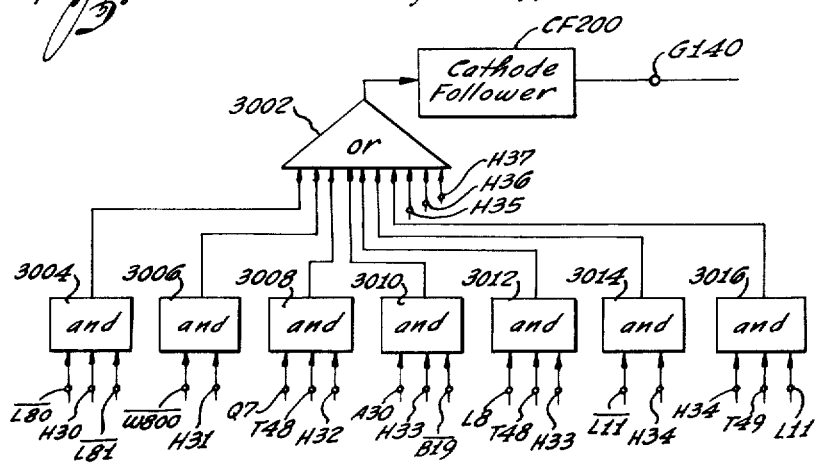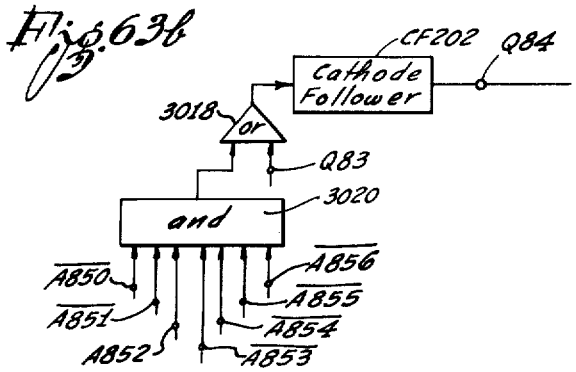

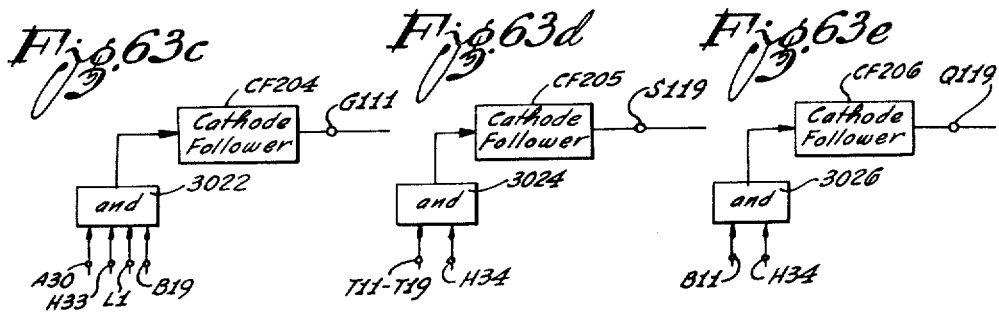
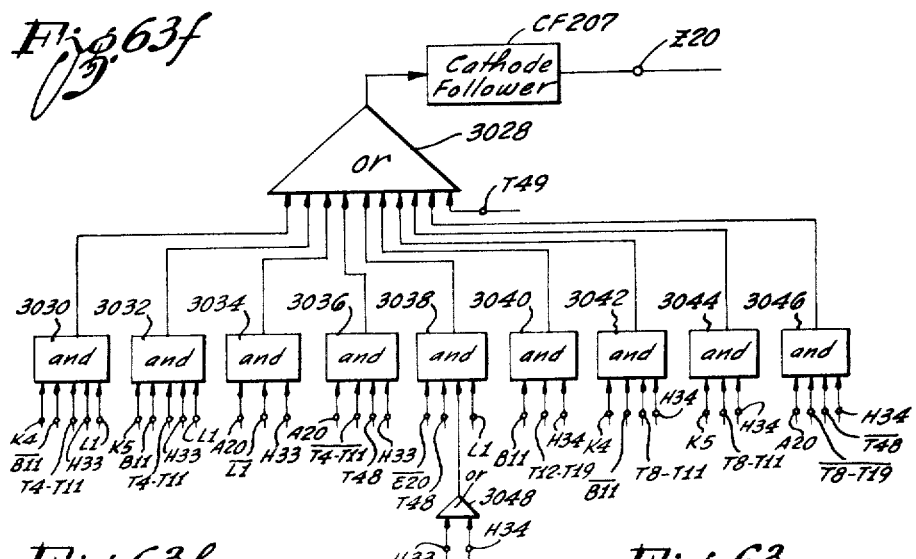
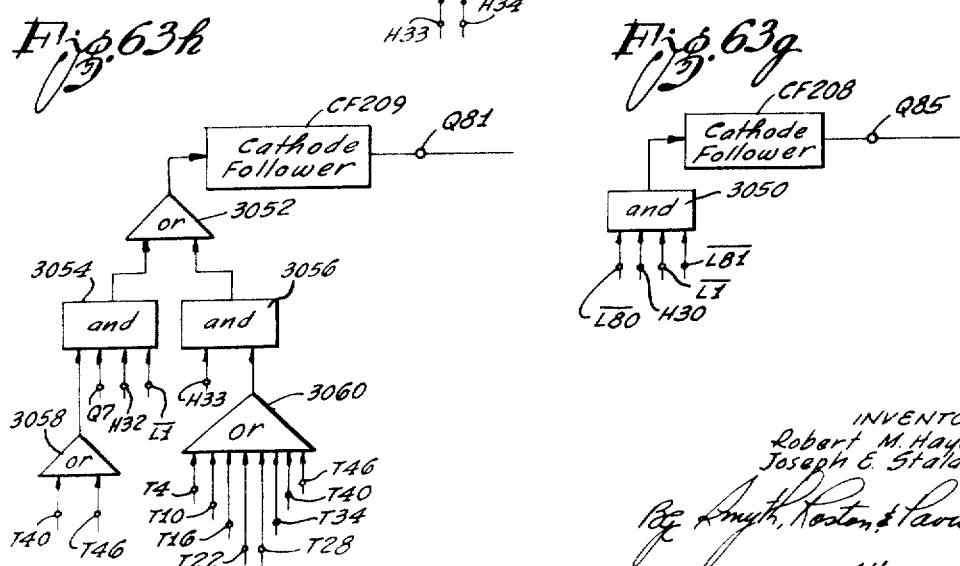

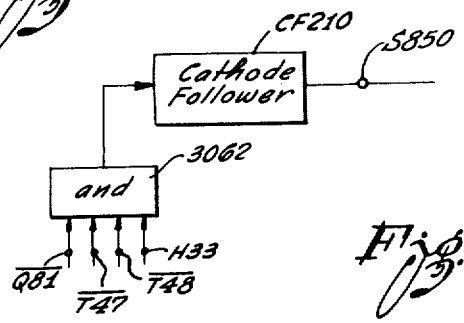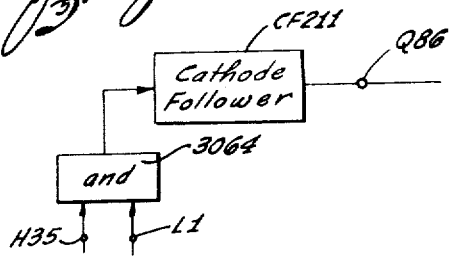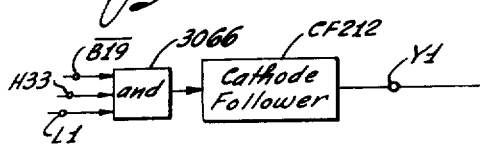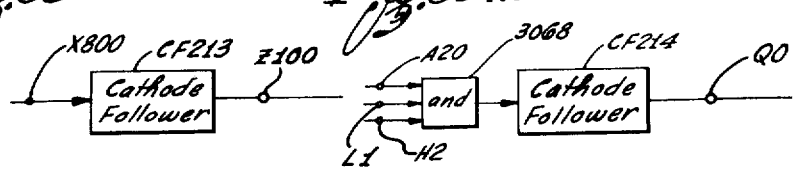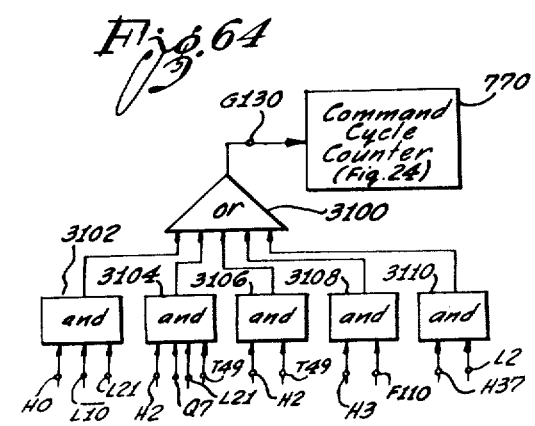

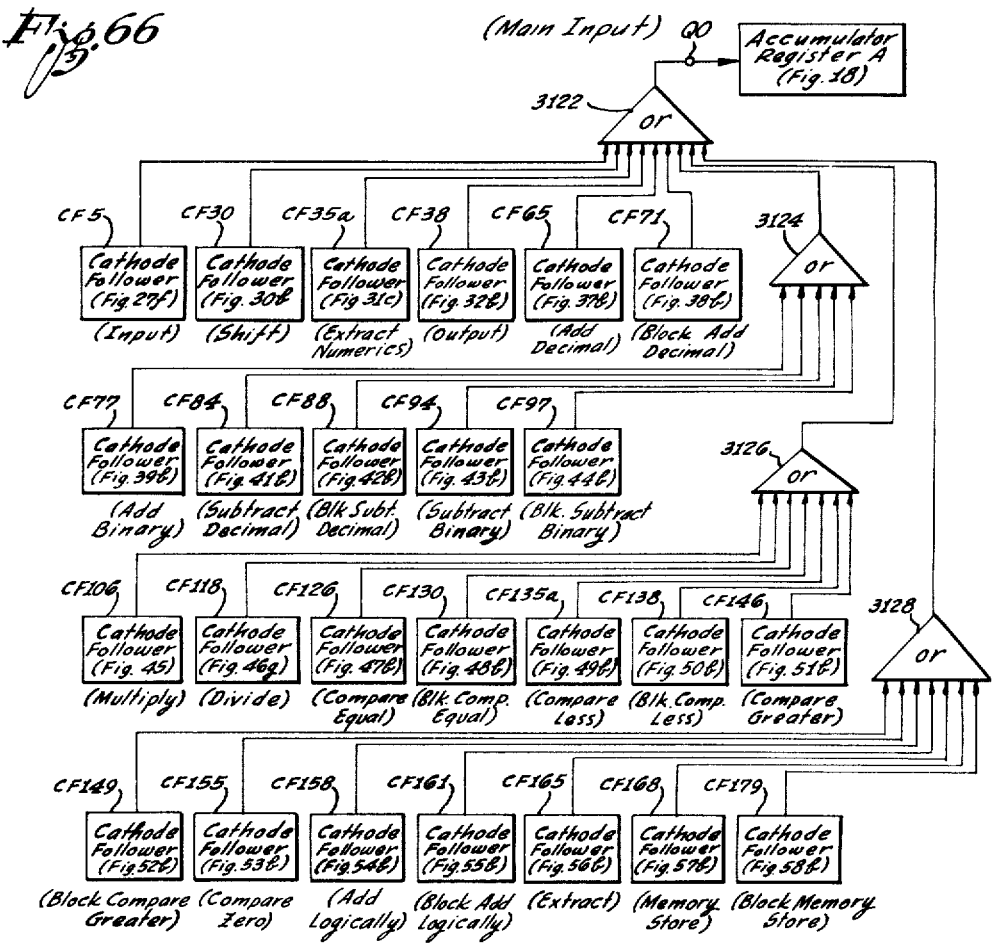
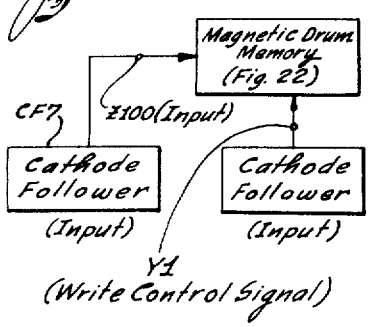
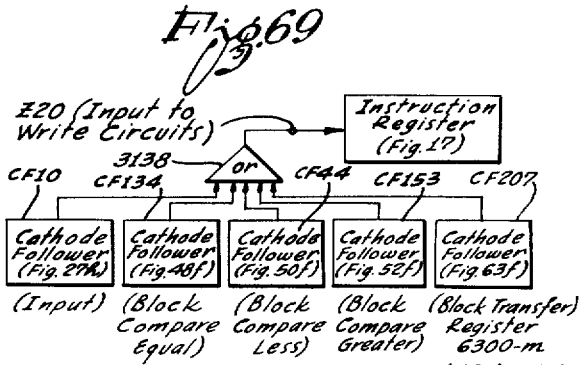

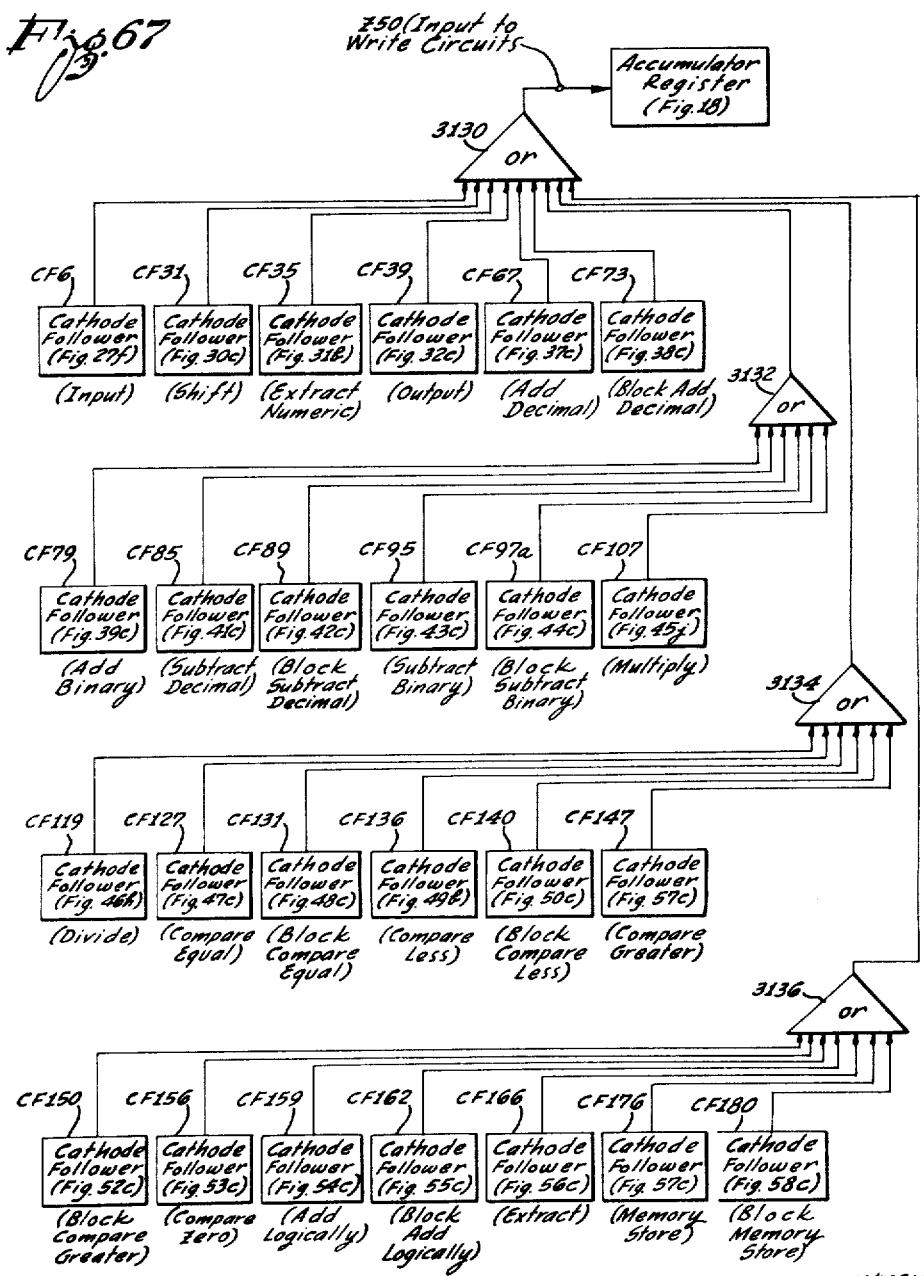

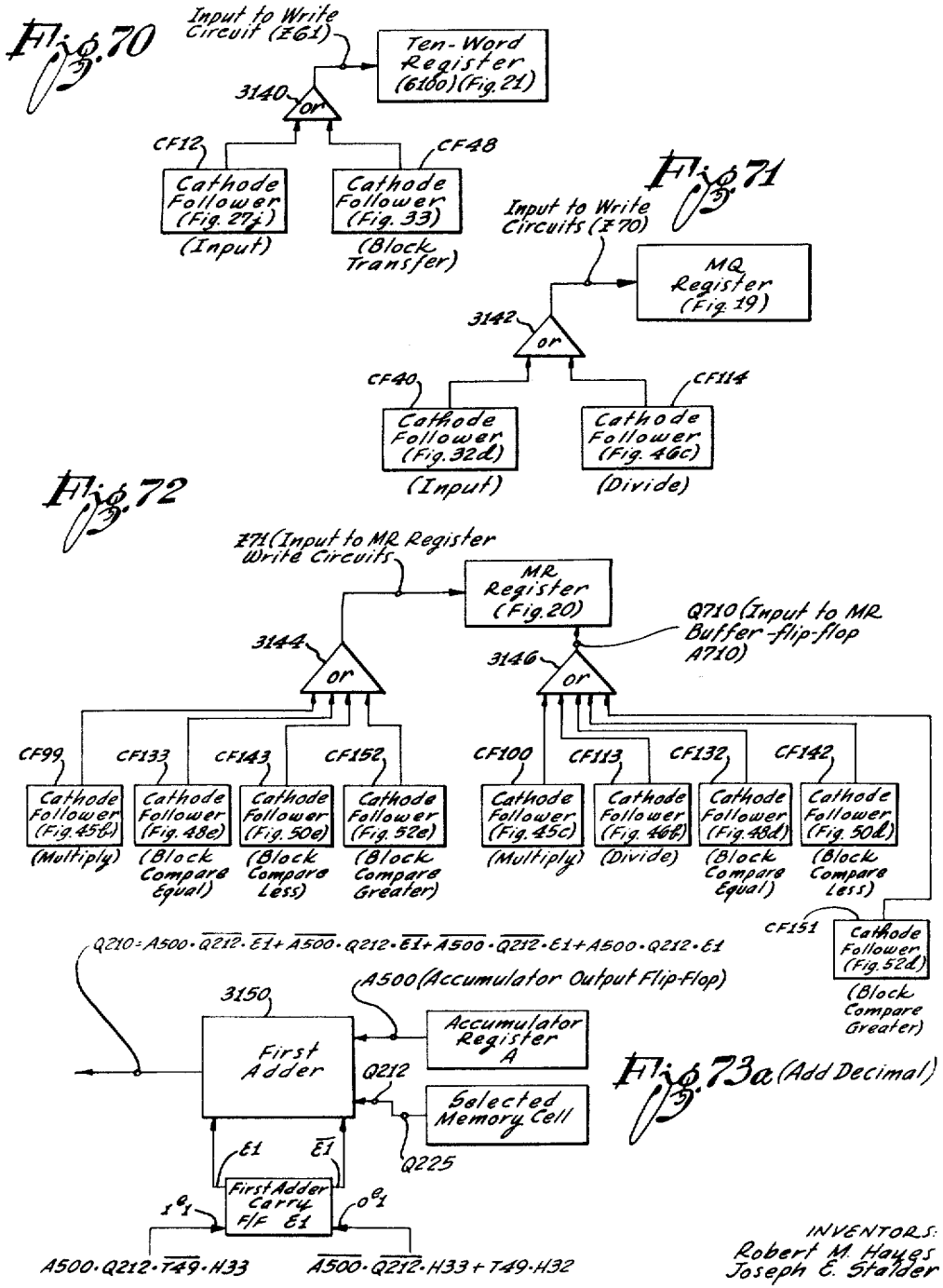

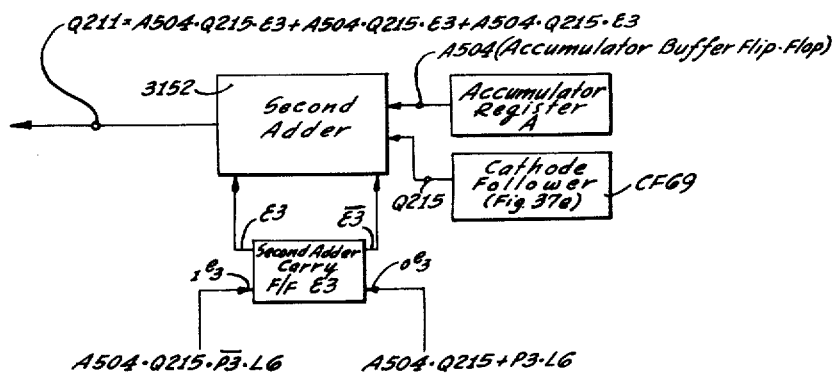
Fig. 73b
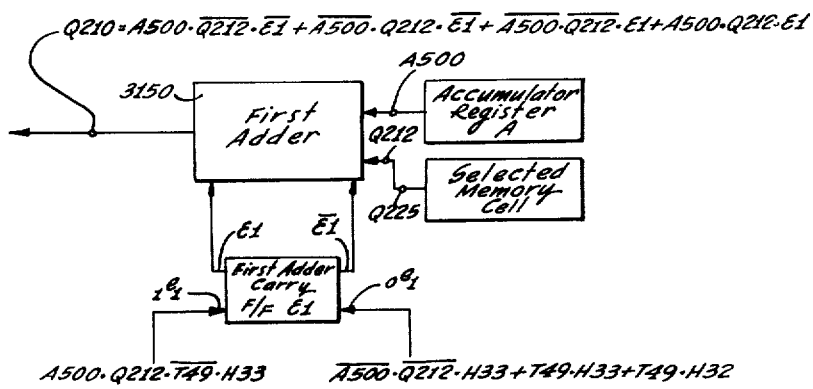
Fig. 74a (Block Add Decimal)
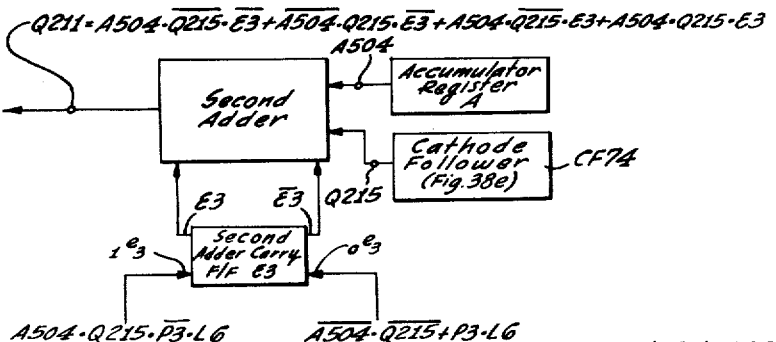
Fig. 74b March 9, 1965  R. M. HAYES ETAL  3,173,129
CARD PROCESSING SYSTEM
Filed Nov. 7, 1960  77 Sheets-Sheet 74

Fig. 75 *(Add Binary)*

$Q210 = A500 \cdot \overline{Q212} \cdot \overline{E1} + \overline{A500} \cdot Q212 \cdot \overline{E1} + \overline{A500} \cdot \overline{Q212} \cdot E1 + A500 \cdot Q212 \cdot E1$ First Adder — 3150
A500 — Accumulator Register A
Q212
Selected Memory Cell
Q225
E1  $\overline{E1}$
First Adder Carry F/F E1
$1\,e_1$   $0\,e_1$ $A500 \cdot Q212 \cdot T49 \cdot H33$   $\overline{A500} \cdot \overline{Q212} \cdot H33 + T49 \cdot H32$

Fig. 76 *(Block Add Binary)*

$Q210 = A500 \cdot \overline{Q212} \cdot \overline{E1} + \overline{A500} \cdot Q212 \cdot \overline{E1} + \overline{A500} \cdot \overline{Q212} \cdot E1 + A500 \cdot Q212 \cdot E1$ First Adder — 3150
A500 — Accumulator Register A
Q212
Selected Memory Cell
Q225
E1  $\overline{E1}$
First Adder Carry F/F E1
$1\,e_1$   $0\,e_1$ $A500 \cdot Q212 \cdot T49 \cdot H33$   $\overline{A500} \cdot \overline{Q212} \cdot H33 + T49 \cdot H33 + T49 \cdot H32$

Fig. 77a *(Subtract Decimal)*

$Q210 = A500 \cdot \overline{Q212} \cdot E1 + \overline{A500} \cdot Q212 \cdot \overline{E1} + \overline{A500} \cdot \overline{Q212} \cdot E1 + A500 \cdot Q212 \cdot E1$ First Adder — 3150
A500 — Accumulator Register A
Q212
Selected Memory Cell
Q225
E1  $\overline{E1}$
First Adder Carry F/F E1
$1\,e_1$   $0\,e_1$ $T49 \cdot H32 + A500 \cdot Q212 \cdot T49 \cdot H33$   $\overline{A500} \cdot \overline{Q212} \cdot H33$ INVENTORS.
Robert M. Hayes
Joseph E. Stalder
By Smyth, Roston & Pavitt
Attorneys.

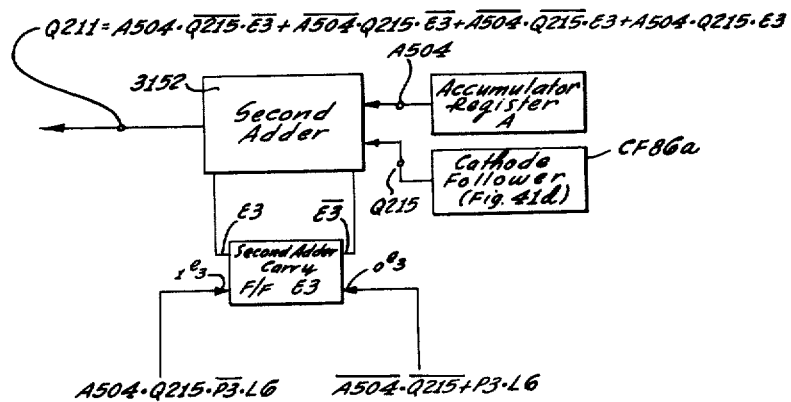
Fig. 77b
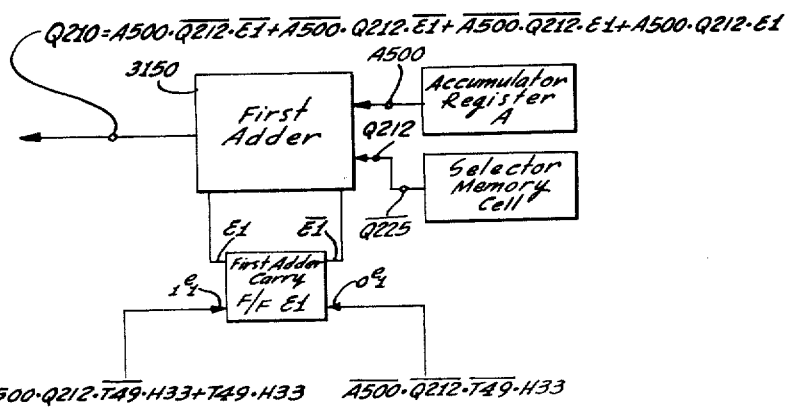
Fig. 78a (Block Subtract Decimal)
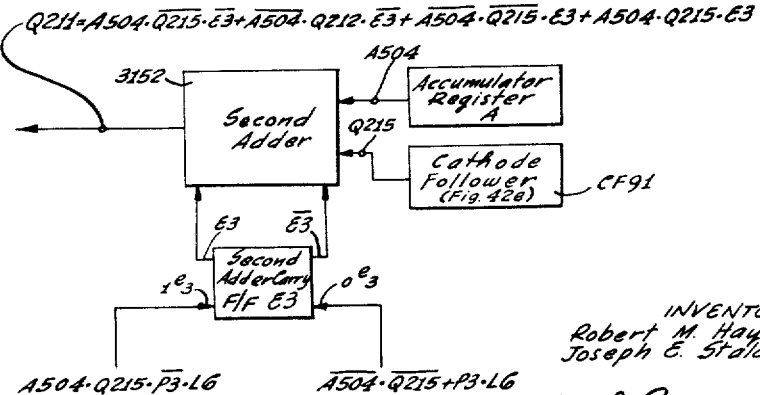
Fig. 78b March 9, 1965 R. M. HAYES ETAL 3,173,129
CARD PROCESSING SYSTEM
Filed Nov. 7, 1960 77 Sheets-Sheet 76
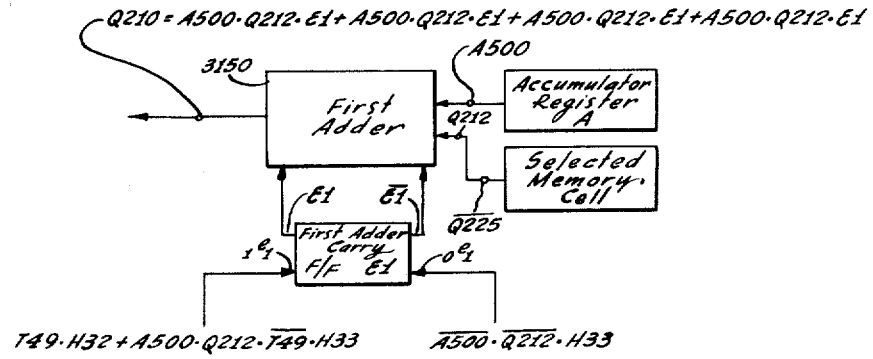
Fig. 79 (Subtract Binary)
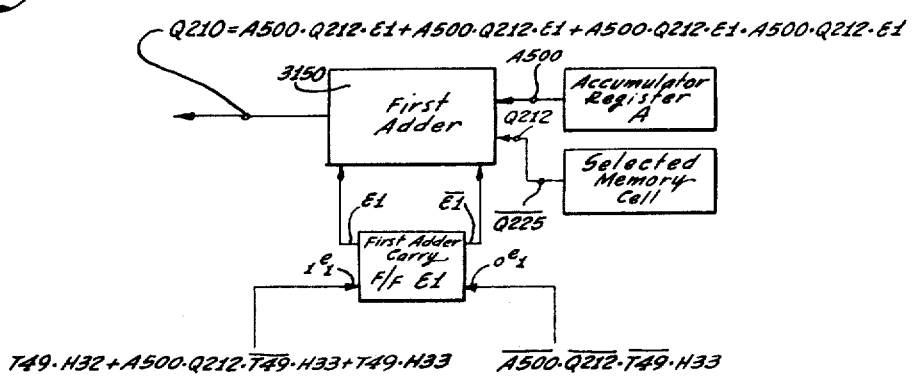
Fig. 80 (Block Subtract Binary)
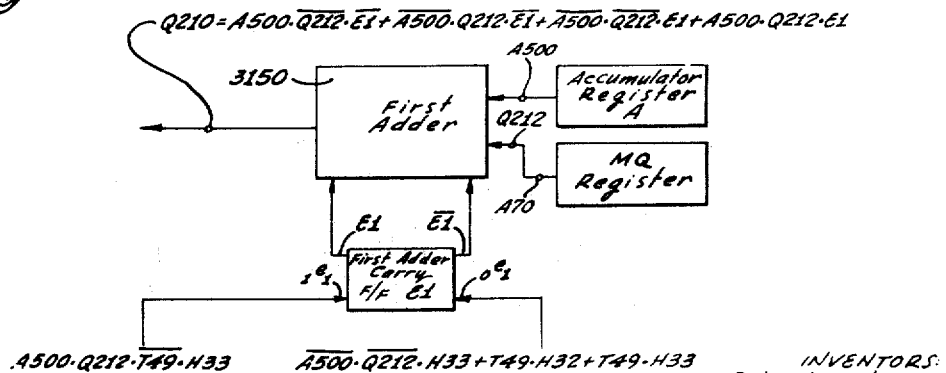
Fig. 81a (Multiply)
INVENTORS:
Robert M. Hayes
Joseph E. Stalder
Attorneys.

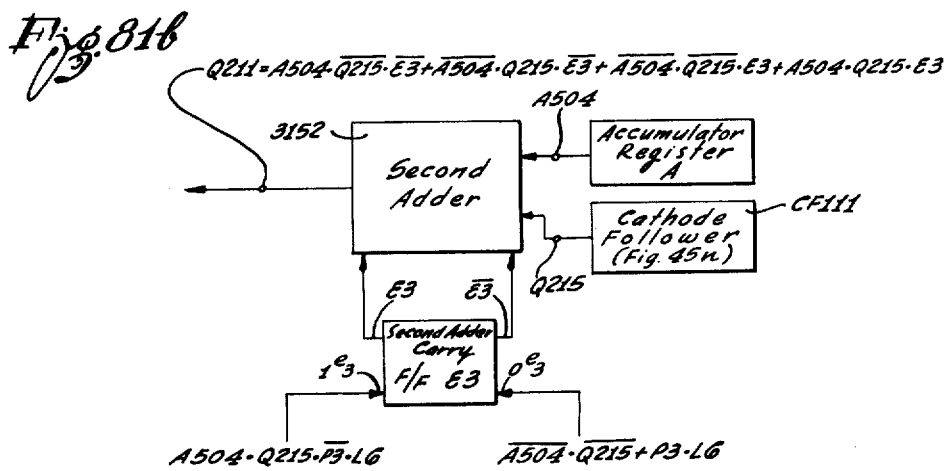
Fig. 81b
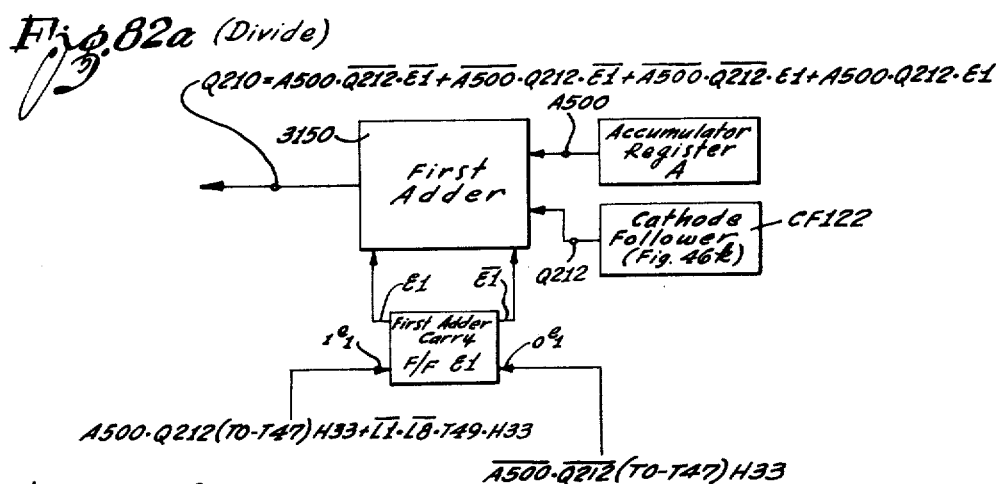
Fig. 82a (Divide)
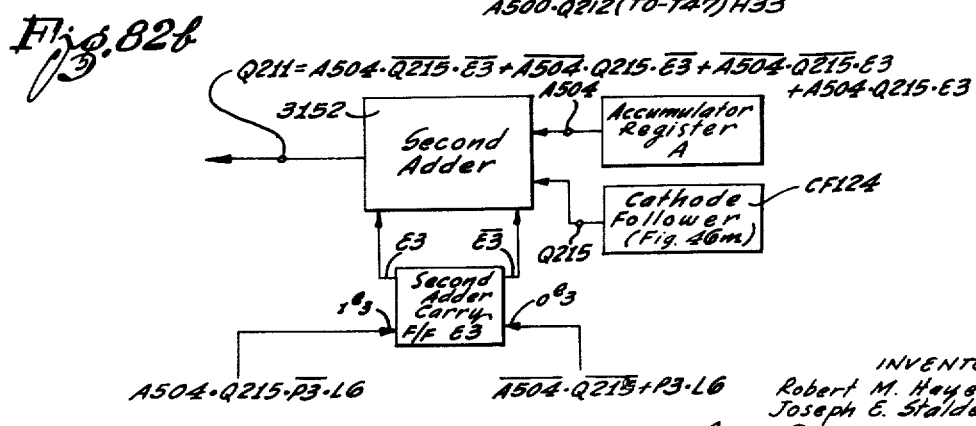
Fig. 82b

United States Patent Office 3,173,129
Patented Mar. 9, 1965

3,173,129
CARD PROCESSING SYSTEM
Robert M. Hayes, Sherman Oaks, and Joseph E. Stalder, Manhattan Beach, Calif., assignors to The Magnavox Company, Torrance, Calif., a corporation of Delaware
Filed Nov. 7, 1960, Ser. No. 82,144
25 Claims. (Cl. 340—172.5)

TABLE OF CONTENTS

| Subject matter: | Starting in column |
|---|---|
| General Discussion | 2 |
| Description of Figures | 4 |
| Block Diagram of System (Figs. 1 and 2) | 7 |
| Construction of Card | 9 |
| File Search Operation | 10 |
| Binary Sort | 10 |
| Merge-Sort | 11 |
| Transcribing | 12 |
| Gate Transfer Mechanism (Figs. 3 and 6) | 12 |
| Card Holding Mechanism (Figs. 3 and 5) | 13 |
| Feeding-Stacking Station (Figs. 3 and 4) | 14 |
| Vacuum Transport Drum (Figs. 3 and 7) | 16 |
| Plugboard (Figs. 8a and 8b) | 17, 21, 25 |
| Control System for Feeding-Stacking Station (Fig. 9) | 18 |
| Mechanism for Inserting Magazines (Fig. 10) | 24 |
| Buffer System (Fig. 11) | 27 |
| Data Processor (Fig. 12) | 31 |
| Data Processor Word (Fig. 13) | 33 |
| Command Word (Fig. 14) | 33 |
| General Data Flip-Flops | 34 |
| Instruction Register (Fig. 17) | 39 |
| Accumulator Register (Fig. 18) | 39 |
| (MQ) Register (Fig. 19) | 39 |
| (MR) Register (Fig. 20) | 40 |
| Ten-Word Registers (Fig. 21) | 40 |
| Channel Address Register (Fig. 22) | 41 |
| Operation Register (Fig. 23) | 42 |
| Command Cycle Counter (Fig. 24) | 42 |
| Timing Counters (Figs. 25 and 26) | 42 |
| Input Operations | 44 |
| System for Carrying out Input Operations (Fig. 27) | 46 |
| Off-Line Operations (Fig. 28) | 52 |
| Input the Information Storage Card Data (Fig. 29) | 52 |
| Extract, Shift and Store Operations (Figs. 30 and 31) | 53 |
| Output Operations (Fig. 32) | 56 |
| Block Transfer (Fig. 33) | 59 |
| Output to Mechanical Unit Control Register (Fig. 34) | 60 |
| Buffer Store (Fig. 35) | 61 |
| Block Transfer between the Memory of the Computer and the External Buffer (Fig. 36) | 62 |
| Arithmetic Operations | 65 |
| Add Decimal (Fig. 37) | 65 |
| Block Add Decimal (Fig. 38) | 67 |
| Add Binary (Fig. 39) | 69 |
| Block Add Binary (Fig. 40) | 70 |
| Subtract Decimal (Fig. 41) | 71 |
| Block Subtract Decimal (Fig. 42) | 73 |
| Subtract Binary (Fig. 43) | 76 |
| Block Subtract Binary (Fig. 44) | 77 |
| Multiply (Fig. 45) | 78 |
| Divide (Fig. 46) | 81 |
| Compare Operations | 84 |
| Compare Equal (Fig. 47) | 84 |
| Block Compare Equal (Fig. 48) | 85 |
| Compare Less (Fig. 49) | 86 |
| Block Compare Less (Fig. 50) | 87 |
| Compare Greater (Fig. 51) | 88 |
| Block Compare Greater (Fig. 52) | 89 |
| Compare Zero (Fig. 53) | 90 |
| Logical Operations | 91 |
| Add Logically (Fig. 54) | 91 |
| Block Add Logically (Fig. 55) | 91 |
| Extract (Fig. 56) | 92 |
| Data Transfer | 93 |
| Memory Store (Fig. 57) | 93 |
| Block Store (Fig. 58) | 95 |
| Block Transfer Between Registers and Main Memory (Figs. 59, 60, 61 and 62) | 96 |
| Block Transfer From External Buffer to Main Memory (FIG. 63) | 98 |
| Stepping Counters (Figs. 64 and 65) | 100 |
| Feeding Inputs to the Registers and to the Main Memory of the Computer (Figs. 66 to 72, inclusive) | 101 |
| Logical Adding Circuitry (Figs. 73 to 82) | 102 |

The present invention relates to card processing apparatus and system for use with a plurality of separate information storage cards on which information is stored in accordance with an appropriate digital code, or in any other appropriate manner.

The term "cards" will be used in a generic sense in the following specification and claims. This term is intended to cover a plurality of different types of discrete elements, such as plates, panels, sheets, and the like, on which information may be recorded and subsequently reproduced. The information storage cards utilized in the apparatus and system of the invention may have information stored on them, for example, in the form of individual magnetic dots or areas of one magnetic polarity or the other. These dots may conveniently be arranged in rows and columns forming one or more fields on the card. For example, each column of magnetic dots may represent one or more digits of a multi-digit number, with the dots in the individual columns, representing binary bits of different cardinal significance. For that purpose, the magnetic dots of one magnetic polarity may represent binary "1," and the magnetic dots of the opposite magnetic polarity may represent binary "0."

The information storage cards utilized by the apparatus to be described may be self-clocking. Alternately, a row of magnetic dots may be provided of a single polarity along the card to constitute the clock row. Then, each magnetic dot in the clock row will represent a different column which, in turn, corresponds to a different position of the card being processed.

Although the use of magnetic areas for recording the data on the individual cards is preferred to present, other recording techniques can be used. For example, the data may be recorded on the individual cards in the form of punched holes. Then, the presence of a hole at a particular position may represent, for example, a binary "1," and the absence of a hole at a particular position may represent a binary "0." Alternately, photographic recordings, such as opaque markings, may be used for recording the data on the cards. With photographic recordings, the presence of an opaque marking may represent, for example, binary "1," and the absence of a marking at a particular position may represent binary "0."

The only material difference in the system and apparatus of the invention as applied to cards using different recording methods resides in the transducers which are used to scan and process the cards and to transform their recordings into electrical signals, and vice versa. It is apparent that when magnetic recordings are used, these transducers will take the form of suitable electric-magnetic read and write heads. Likewise, appropriate transducers for the other types of recordings are known and will be used to transform such recordings into electrical signals, and vice versa, as mentioned above.

It is often required in present day data processing systems of the type using information storage cards, that the cards so used in the systems be sorted, collated or otherwise processed in accordance with information recorded on the cards. It is also required in most instances that desired cards may be quickly selected from a stack of cards, so that the information on the desired cards may be read or so that new information may be recorded on them.

An important objective of the present invention is to provide an improved apparatus and system of the type under consideration and which are capable of universal applications, in that the system or apparatus may be controlled to perform any desired one of a large number of different card handling operations and card processing operations.

For example, the improved system and apparatus of the invention is capable of performing a plurality of card handling operations, including, for example, a merge sort, a binary sort, a file search, and many others. The system and apparatus of the invention are also capable of performing many processing operations on the cards including, for example, the transcribing process in which new information may be written on the individual cards or information already on the cards may be read and utilized.

In general, the improved system and apparatus of the invention is constructed to have universal application in the reading and recording of data on any selected ones of a plurality of information storage cards, and in the handling of such cards in accordance with information recorded on them or in accordance with other information.

The embodiment of the invention to be described includes a mechanical card handling unit. This unit, as will be described in detail, includes a plurality of vacuum transport drums which serve to carry the information cards in succession from one station to another in the apparatus. These drums may be constructed, for example, in the manner described and claimed in copending application 600,975, which was filed July 30, 1956, now Patent No. 2,883,189, in the name of Loren R. Wilson. It will be evident, however, as the present description proceeds, that other suitable types of transport media for the cards can be used.

The embodiment of the invention to be described also includes a plurality of feeding stacking stations which are positioned in the mechanical card holding unit adjacent corresponding ones of the transport drums. These stations are capable of holding the information storage cards in a stacked condition. The stations, moreover, have a first operating mode in which the cards in the station may be controllably fed to the adjacent transport drum. In addition, the stations may be conditioned to a stacking mode in which cards on the transport drum may be selectively introduced to the station.

A plurality of electro-magnetic transducer heads are also included in the mechanical handling unit of the embodiment of the invention to be described. These heads are positioned adjacent certain ones of the drums, and they serve to read the recordings on the cards to transfer the same into electrical signals, or to convert input electric signals into magnetic recordings on the different cards. In this manner, the transducer heads serve to process the cards from the feeding-stacking stations. Appropriate read-write circuitry is coupled to the heads. It will be appreciated that other types of transducers than magnetic transducers may be used when the cards store information in forms other than magnetic forms.

In accordance with the concepts of the present invention, appropriate means which may conveniently take the form of a typical plug board is provided which is adapted to be coupled to the mechanical card handling unit referred to above. This plug board is capable of providing a plurality of different controls to the feeding-stacking stations and to the other components of the card handling unit. For example, the plug board is capable of causing the different feeding-stacking stations to be actuated to their stacking mode or to their feeding mode. The plug board is also capable of controlling the transfer of the cards from one drum to another, of causing selected cards to be held stationary on a drum surface, and of performing other controls to be described.

Finally, a computing apparatus, such as an appropriate duplicator or processor, is included in the system to close the loop between the read-write circuitry and the plug board. The output signals from the computing apparatus control the connections from the plug board to the components of the mechanical handling unit in accordance with a particular program set up in the computer. This enables the card handling unit to exert any desired control on the cards and in a logical sequence.

In the manner described in the preceding paragraphs, therefore, the invention provides an improved card processing apparatus which has universal application and which may be conveniently set up to perform any desired handling or processing operation on the information storage cards.

As mentioned above, several of the magnetic card handling and processing operations of which the mechanism of the invention is capable of performing include: (*a*) a file search in which one or more cards are rapidly selected from a stack of cards, the selected cards being so selected on the basis of their leading certain established criteria; (*b*) a binary sort which involves the separation of a stack of cards into two stacks on the basis of a single bit position on each card, and the continuation of such separations until a full sort is achieved; (*c*) a merge sort in which cards from a stack are sorted by a succession of merging passes and on the basis of an entire sort control field; and (*d*) a general transcibe operation concerned with writing information on the cards or reading information from the cards.

The concepts of the present invention, together with further advantages and features of the invention, will be more fully understood by a consideration of the following description of one embodiment of the invention.

In the drawings:

FIGURE 1 is a schematic representation of one embodiment of the system of the invention, this representation including a top plan view of a mechanical card handling unit included in the system and also including a block diagram illustrating other components included in the system;

FIGURE 2 illustrates on an enlarged scale a typical information storage card and also illustrates the manner in which information may be recorded in a series of rows and columns on the card;

FIGURE 3 is a fragmentary top plan view of the card handling unit particularly to show a vacuum transport drum which is included in the unit and various components which are associated with the drum;

FIGURE 4 is an enlarged perspective view of a card feeding-stacking station which is included, with other similar stations, in the card handling unit to feed information storage cards to the transport drums included in the unit, and for receiving cards from the transport drums;

FIGURE 5 is an enlarged sectional view substantially on the line 5—5 of FIGURE 3 and showing in more detail a card holding station which is included in the card handling unit;

FIGURE 6 is an enlarged sectional view substantially on the line 6—6 of FIGURE 3 and showing the details of one of a plurality of gate transfer mechanisms which are included in the card handling unit, and which mechanism controls the transfer of cards between the transport drums of the card handling unit;

FIGURE 7 is a sectional view, substantially on the line 7—7 of FIGURE 3, and showing the details of one of the vacuum pressure transport drums which are included in the card handling unit;

FIGURES 8a and 8b are schematic diagrams of a plug board unit and associated circuitry included in the illustrated embodiment of the system of the invention;

FIGURE 9 is a diagrammatic representation of a control mechanism and circuitry for conditioning the feeding-stacking station of FIGURE 4 to its feeding mode and to its stacking mode;

FIGURE 10 is a perspective view of a magazine of information storage cards suitable to be inserted in the feeding-stacking station of FIGURE 4, and of a movable file block for supporting the magazine;

FIGURE 11 is a block logic diagram of a control system and buffer for use in conjunction with certain read-write circuitry and transducers included in the system to be described;

FIGURE 19 is a schematic representation of certain components of a multiplicand-quotient "MQ" register which is included in the data processor;

FIGURE 20 is a schematic representation of certain components of a multiplier-divisor "MR" register which is included in the processor;

FIGURE 23 is a block diagram showing the various flip-flops which are included in an order register which, in turn, is included in the processor of FIGURE 12; and showing a matrix which is coupled to the order register for developing a plurality of different output signals respectively corresponding to the different operations to be performed by the processor;

FIGURE 24 is a block diagram of a group of flip-flops which make up a pair of counters; which counters will be referred to in the subsequent discussion as the "command cycle counter" and the "micro program execution counter" respectively, and which counters serve to control the timing and execution of each of the different operations performed by the processor;

FIGURES 25 and 26 are diagrams illustrating groups of flip-flops which are included in certain timing counters of the processor;

FIGURES 27a–27m are logic circuit diagrams of a suitable system for carrying out the input operations of the computer;

FIGURE 28 represents the logic control system required to carry out a "halt" instruction in the computer;

FIGURE 29 is a representation of the logic system required for carrying out the instruction which causes the data from an information storage card to be fed into the computer section of the system;

FIGURES 30a–30e represent the logic control circuitry for carrying out certain "shift" instructions in the computer;

FIGURES 31a–31d show suitable logic for carrying out an "extract numerics" instruction in the computer section of the system;

FIGURES 32a–32l represent logic control systems for carrying out the output operations of the computer;

FIGURES 33a–33c illustrate the logic circuitry for carrying out a "block transfer" operation in the computer;

FIGURES 34a–34c show logic circuitry for executing an "output to mechanical unit register" instruction;

FIGURES 35a–35e show logic circuitry for carrying out a "buffer store" instruction in the computer;

FIGURES 36a–36h represent the logic control systems for carrying out a block transfer between the memory of the computer and an external buffer;

FIGURES 37a–37e illustrate logic circuitry for carrying out the arithmetic operation "add decimal" in the computer;

FIGURES 38a–38e show logic circuitry for executing an arithmetic instruction in the computer for carrying out a "block add decimal" operation;

FIGURES 39a–39c represent logic circuitry for carrying out an "add binary" instruction in the computer;

FIGURES 41a–41d show the logic circuitry for executing the "subtract decimal" instruction in the computer;

FIGURES 42a–42e show logic circuitry for carrying out a "block subtract decimal" instruction in the computer;

FIGURES 43a–43c show control systems for performing the logic operations necessary to carry out a "subtract binary" instruction in the computer section of the system;

FIGURES 44a–44c illustrate the logic circuitry for carrying out a "block subtract binary" instruction;

FIGURES 45a–45n illustrate certain control systems which are required to execute the "multiply" instruction in the arithmetic section of the computer;

FIGURES 46a–46m show logic circuitry for carrying out the "divide" instruction;

FIGURES 47a–47d illustrate the logic control systems for carrying out a "compare equal" instruction in the computer;

FIGURES 48a–48f represent logic circuitry for executing a "block compare equal" instruction in the computer section of the system;

FIGURES 49a–49c illustrate the logic circuitry for executing a "compare less" instruction;

FIGURES 50a–50f show the logic for executing a "block compare less" instruction;

FIGURES 51a–51c show the logic circuitry for executing a "compare greater" instruction in the computer;

FIGURES 52a–52f illustrate logic circuitry for executing a "block compare greater" instruction in the computer section of the system;

FIGURES 53a–53c illustrate the logic components and associated circuitry for carrying out a "compare zero" instruction in the computer;

FIGURES 54a–54c illustrate logic control systems for executing an "add logically" command;

FIGURES 55a–55c show appropriate logic circuitry for executing a "block add logically" command;

FIGURES 56a–56c represent certain logic control systems for carrying out an "extract" instruction;

FIGURES 57a–57j show the logic circuitry for executing a "memory store" instruction;

FIGURES 58a–58j show the logic circuitry for carrying out a "block store" instruction;

FIGURES 59a–59c illustrate the logic circuitry for carrying out a "block transfer" instruction by which information is transferred from a register into the memory of the computer;

FIGURES 60a–60c show the logic circuitry for carrying out an instruction similar to the instruction of FIGURES 59a–59c;

FIGURES 61a–61c represent the logic circuitry for carrying out an instruction similar to the instruction of FIGURES 59a–59c;

FIGURES 62a–62c show the logic control circuitry for carrying out an instruction similar to the instruction of FIGURES 59a–59c;

FIGURES 63a–63m illustrate the logic control systems for executing a "block transfer" instruction whereby information from an external buffer is transferred to the main memory of the computer;

FIGURE 64 represents the logic circuitry used to step the command cycle counter of FIGURE 24 from one configuration to another;

FIGURE 66 illustrates the logic circuitry which is used for feeding the main input into the accumulator register of FIGURE 18;

FIGURE 67 shows the logic circuitry for feeding inputs to the write circuits of the accumulator register;

FIGURE 68 illustrates the data input and control signals introduced to the main memory of the computer;

FIGURE 69 illustrates appropriate logic circuitry for providing inputs to the write circuits of the instruction register of FIGURE 17;

FIGURE 70 illustrates the logic circuitry for introducing inputs to the write circuits of one of the ten-word registers in FIGURE 21;

FIGURE 71 illustrates the logic circuitry appropriate for introducing inputs to the write circuits of the MQ register of FIGURE 19;

Figure 12:
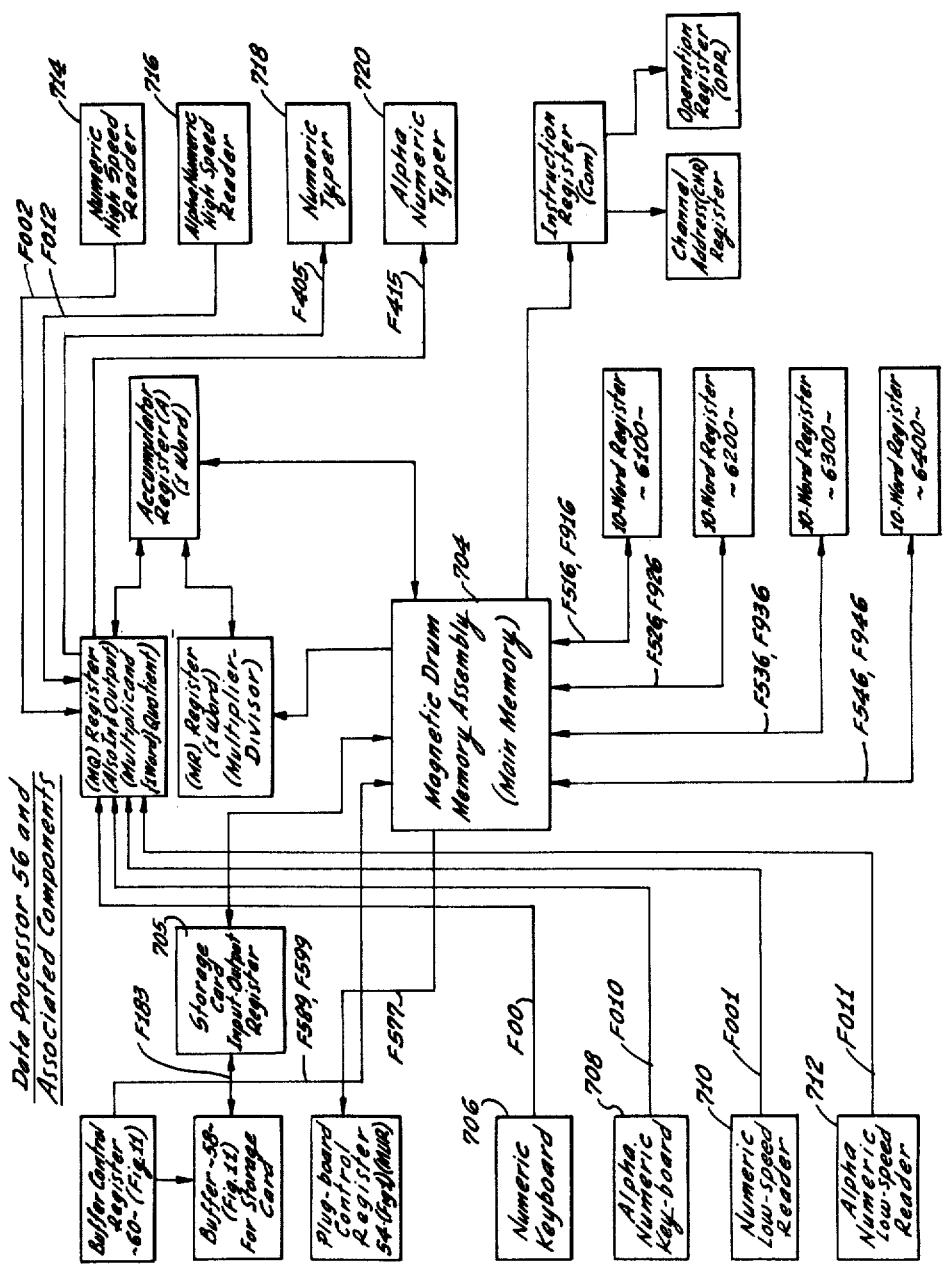
FIGURE 12 is a block diagram of a data processor which is included in the system of the invention, and which responds to particular program signals to develop control signals for carrying out a particular sequence of operations in the system of the invention.

FIGURE 72 illustrates the logic circuitry for introducing inputs to the write circuits of the MR register of FIGURE 20; and FIGURES 73a, 73b, 74a, 74b, 75, 76, 77a, 77b, 78a, 78b, 79, 80, 81a, 81b, 82a and 82b illustrate the logic circuitry associated with a first adder and a second adder in the arithmetic section of the computer section of the system and which is used for carrying out the different arithmetic instructions in the computer section.

As illustrated in FIGURE 1, the system of the present invention includes a mechanical card handling unit 10. This unit, as mentioned above, includes a plurality of vacuum pressure transport drums 12, 14, 16 and 18. These drums are rotatably mounted on a table top 20. The drums 12 and 16 are driven by any appropriate means, not shown, to be rotatable in a clockwise direction. The drums 14 and 18, on the other hand, are driven to be rotatable in a counter-clockwise direction. The four vacuum pressure transport drums 12, 14, 16 and 18 are positioned adjacent one another on the table top 20. As also mentioned above, the vacuum pressure transport drums 12, 14, 16 and 18 may be constructed in the manner disclosed and claimed in copending application 600,975, which was filed July 30, 1956, in the name of Loren R. Wilson.

A pair of feeding-stacking stations 22 and 24 are mounted on the table top 20 with their mouths adjacent the peripheral surface of the drum 12. A feeding-stacking station 26 is positioned with its mouth adjacent the periphery of the drum 14. Likewise, a pair of feeding-stacking stations 28 and 30 are respectively positioned with their mouths adjacent the drums 16 and 18. Each of these feeding-stacking stations may be constructed in the manner to be described in conjunction with FIGURE 4. Each of the stations is controllable to a first mode in which cards held in the station in a stacked condition may be controllably fed in sequence to the periphery of the adjacent transporting drum. Moreover, each of the stations is controllable to a stacking mode in which cards transported to the mouth of the station by the corresponding drums are deposited in the particular station.

A first gate transfer mechanism 32 is mounted on the table top 20 between the drums 12 and 14. This mechanism will be described in more detail in conjunction with FIGURES 3 and 6. The mechanism may be constructed in accordance with the teachings of copending application 685,581, which was filed September 23, 1957, now Patent No. 3,001,549, in the name of Alfred Nelson et al., and entitled "High Speed Valve."

The gate transfer mechanism 32 is controllable to effectuate the transfer of cards from the periphery of the drum 12 to the periphery of the drum 14. Conversely, the gate transfer mechanism 32 is controllable to effect the transfer of cards from the drum 14 to the drum 12. A similar gate transfer mechanism 34 is positioned between the drums 14 and 16. Further similar gate transfer mechanisms 36 and 38 are positioned between the drums 18 and 12 and 16 and 18.

A first plurality of read heads are mounted on the table top 20 adjacent the drum 14, these read heads being designated 40. When magnetic recordings are used on the cards, the read heads 40 may be any suitable electromagnetic transducer. For example, the read heads may be constructed in accordance with the teachings of copending application 688,202, which was filed October 14, 1957, now Patent No. 3,029,021, in the name of Eric Azari et al. The individual read heads in the plurality designated 40 may be positioned to scan individually different rows of data on the cards carried by the drum 14. In like manner, a plurality of read heads 42 are mounted on the table top 20 adjacent the periphery of the drum 18. A plurality of write heads 44 are mounted on the table top 20 adjacent the periphery of the drum 14. The heads 42 and 44 may also be constructed in a manner similar to that described in the copending Azari application.

A first card holding, or arresting, station 46 is mounted on the table top 20 adjacent the periphery of the drum 14. This card holding station is positioned between the read heads 40 and write heads 44. A similar card holding, or arresting, station 48 is mounted on the table top 20 adjacent the drum 18. The card holding station 48 is displaced from the read heads 42 in the direction of rotation of the drum 18. The card holding stations 46 and 48 may be similar in their construction, and the structural details of a typical card holding station will be described in conjunction with FIGURE 5.

The read heads 40 and 42 read the data magnetically recorded on the information storage cards carried by the drums 14 and 18 respectively. The resulting data control signals are introduced to appropriate read-write circuitry included in a block 50. The read-write circuitry in the block 50 also introduces control signals to the write heads 44 so that data may be recorded on the cards carried by the drum 14, if such recording is desired.

A plug board 52 is provided, and the plug board introduces control signals to the various components of the mechanical handling unit 10 in a manner to be described in detail. The various components of the mechanical handling unit are equipped with appropriate controls which cause "status" control signals to be returned to the plug board 52 which indicate the operational modes of these components.

The plug board 52 is capable of producing different control signals which, in turn, are capable of exerting a plurality of different controls on the components of the card handling unit. For example, and as noted above, the plug board is capable of causing the different feeding-stacking stations 22, 24, 26, 28 and 30 to be selectively actuated to their stacking mode of operation or to their feeding mode of operation. The plug board is also capable of controlling the gate transfer mechanisms 32, 34, 36 and 38 to regulate the transfer of cards from one drum to another. Moreover, the plug board exerts controls on the card holding stations 46 and 48 to cause selected cards to be held stationary on the corresponding drum surfaces for controlled intervals. A plug board control register is coupled to the plug board 52, and this register responds to a succession of instructions from a data processor 56. These instructions produce different configurations in the register which, in turn, cause the plug board to exert the above-described controls on the card handling unit 10. These controls are exerted in accordance with a particular program established in the data processor 56. The plug board control register 54 introduces appropriate control signals to the plug board 52 in accordance with the different configurations of the register, and the plug board returns status signals to the register when the designated operations have been effectuated.

The data processor 56 referred to in the preceding paragraph is in the form of a computer. Various inputs originating from the read-write circuitry 50 are introduced to the data processor 56, and outputs are produced by the data processor in representation of computations made on the inputs in accordance with a selected program established in the computer. The data processor 56 introduces its output signals to the plug board control register 54 to establish a sequence of operations by which the register 54 is to control the plug board 52. Both the plug board control register 54 and the plug board 52 return status signals to the data processor 56.

The read-write circuitry of the block 50 introduces to a buffer 58 data signals which are read from the cards processed by the card handling unit 10. The buffer 58 is controlled by a buffer control register 60 which, in turn, is controlled by the data processor 56. The data processor 56 supplies control signals to the buffer control register 60, and it receives status signals from the register. The processor also supplies data signals to the buffer 58, and it receives status signals from the register. The processor also supplies data signals to the buffer 58 and receives data signals from the buffer.

A typical card for use in the apparatus and system of the invention is illustrated on an enlarged scale in FIGURE 2. The number of channels used on the illustrated card, and the number of bits in each channel are by the way of example only. The illustrated card may be constructed in accordance with the concepts of copending application 758,517, filed September 2, 1958, in the name of George T. Walker et al.

As illustrated in FIGURE 2, the information is recorded on the particular card in eighteen parallel channels, for example, and these channels extend lengthwise of the card. The bit density in each channel may, for example, be of the order of 100 to the inch. Of the eighteen channels, one channel may constitute a clock channel, although it is possible to use self-clocking (as noted previously) so that all eighteen channels could be used as significant information or data channels. The total capacity of a channnel may, for example, be of the order of 275 bits. For practical purposes, each channel may be provided with 256 bits, of which 250 bits may represent five processor words of 50 bits each, and six bits may represent a parity check character for the particular channel. Of the 50 bits representing a single computer word, 48 may be information bits, one may be a parity bit for use by the internal processor logic, and may be an inter-word spacer.

As mentioned above, the magnetic recordings on the cards, such as the card of FIGURE 2, may be in the form of discrete magnetic areas of north or south polarity. When such areas are used, a north polarity may, for example, represent binary "1." Conversely, a south polarity may, for example, represent binary "0."

In a manner to be described, the mechanical card handling unit 10 of FIGURE 1 may be controlled to perform a variety of card handling and card processing operations. These operations may include, for example, the file search, binary sort, merge sort and transcribe operations mentioned above.

For a file search operation, it may be assumed that a stack of cards is located in the feeding-stacking station 30, and that these cards are in a sequence established by control numbers located in a particular field of each card. A single control number is programmed into the processor 56, and that number represents the number of the card in the station 30 for which the search is to be made.

During the searching process, if a card is found whose control number is equal to, or greater than, the control number in the computer, the search is halted. This particular card will then be transferred from the vacuum pressure transport drum 18 to the vacuum pressure transport drum 12 by the gate transfer mechanism 36 and then to the drum 14 by the gate transfer mechanism 32. The card transferred to the drum 14 will then be processed by the read heads 40 or the write heads 44. This enables the information on the selected card to be transcribed into suitable output equipment, or new information to be recorded on the selected card from appropriate input equipment.

The cards whose control numbers are less than the desired control number in the computer are transferred to the drum 16 by the gate transfer mechanism 38 and stacked in the feeding-stacking sation 28. At the termination of the processing of the card on the drum 14, the card may be returned to the station 30. Following this return, the cards in the station 28 may be sequentially returned to the station 30, so that the stack is restored in its original sequence in the station 30. For the above transcribing operation, the plug board 52, under the control of the register 54 and the data processor 56, provides the appropriate controls so that the necessary operations as outlined above can be carried out.

The binary sort process with respect to particular multi-digit numbers respectively recorded on successive ones of a plurality of cards is carried out by reading the least significant bit of the multi-digit number on each card in a first path, and by depositing the "0's" in a first feeding-stacking station and the "1's" in a second feeding-stacking station. For the next pass, the bits at the next level of significance are examined, the cards from the first station being read in sequence and followed by a sequential reading of the cards from the second station. The "0's" from this latter examination are now placed in a third feeding-stacking station and the "1's" are placed in a fourth feeding-stacking station. The cards are now recycled between the two pairs of stations, with the bits of an increased level of significance being read in each successive pass. These passes are continued up to a reading of the most significant bit of the number, and at the completion of this latter pass, the cards will be sorted into an ascending or descending progression with respect to the particular multi-digit numbers on the successive cards to which the bit-by-bit sorting passes have been applied.

In the manner described in the preceding paragraph, the stations of one pair serve as input means in alternate passes of the cards to release the cards sequentially for processing, and the stations of the other pair serve as output means to receive the cards in accordance with the processing of the cards in these alternate passes.

In other passes, the stations of the second pair serve as the input means and the stations of the first pair serve as the output means to process the cards into a sorted condition.

For the binary sort operation by the apparatus and system of the invention, a stack of cards may be placed in the feeding-stacking station 30, and cards from the stack may be fed successively to the drum 18 and read by the read heads 42. The processor 56 examines the specified bit position on each card, and it determines whether the corresponding card should be stacked in the feeding-stacking station 22 or in the feeding-stacking station 26 on the basis of whether a "1" or a "0" occurs at that bit position. This operation continues until the feeding-stacking station 30 is empty. Then the cards from the feeding-stacking station 28 are fed in succession to the drum 16 and transferred by the gate transfer mechanism 38 to the drum 18 for similar processing by the read heads 42. Again the processor 56 examines the specified bit position and determines whether the cards should be stacked in the feeding-stacking station 22 or transferred by the gate transfer mechanism 32 to the drum 14 for stacking in the feeding-stacking station 26. This latter operation continues until the feeding-stacking station 28 is empty.

When the feeding-stacking station 28 is empty, the first pass is completed. For the second pass the cards are fed in like manner in succession from the feeding-stacking station 26 to the vacuum pressure transport drum 14 for examination by the read heads 40, and they are then fed in succession from the feeding-stacking station 22 for transfer to the drum 14 for similar examination by the read heads 40. For the second pass, the processor 56 decides on the basis of the second bit position on each card, whether a particular card is to be placed in the feeding-stacking station 30 or in the feeding-stacking station 28. These passes are continued from one bit to another until the complete binary sort has been achieved. Binary sorting of the cards, in accordance with the operations described above, is disclosed and claimed, for example, in copending application Serial No. 699,132, filed November 26, 1957, now Pat. No. 3,021,005.

For the merge sort in the apparatus and system of the invention, it is assumed that the control field on each of the information storage cards is located in a single channel, and it is also assumed that the cards in the individual stations which are to be merge-sorted into a single station have previously been sorted as to the information recorded in that channel. This means that such information is represented in one or more logical sequences from one card to the next in each of the feeding-stacking stations. Each of the sequences, for example, may be an ascending sequence, or each may be a descending sequence. Moreover, each of the sequences may, for example, be an alphanumeric sequence.

Merge sorting of the type referred to briefly in the preceding paragraph is described, for example, in copending application Serial No. 703,080, filed December 16, 1957, now Patent No. 3,039,603, in the name of Jerome B. Wiener.

For the merge sort operation of the card handling unit 10 of FIGURE 1, a first stack of cards may be placed in the feeding-stacking station 30 and a second stack may be placed in the feeding-stacking station 26. It will be assumed that the cards in each of the stations have individual control numbers recorded on them in a particular channel, and that the cards in the stations 30 and 26 are arranged so that the control numbers from one card to the next in each of the stations form a plurality of sequences.

The purpose of each pass of the merge-sort is to take the first sequence from the feeding-stacking station 30 and the first sequence from the feeding-stacking station 26 and merge them together, the resulting sequence being stacked in the feeding-stacking station 28. The second sequence from the station 30 and the second sequence from the station 26 are similarly merged, but they are stacked in the station 22. The process continues with alternate pairs of sequences being merged and stacked in the stations 22 and 28.

To carry out a merge-sort operation requires that the number in the selected channel control field of a card from one of the two stations 26 and 30 be compared by the processor 56 with the number in the selected single channel control field of the previous card from that station and with the number in the selected single channel control field of a card from the other station, as explained in copending application Serial No. 703,080. It is also required that the card holding stations 46 and 48 be controlled during this operation. The merging passes are continued, back and forth between the stations 30, 26 and 22, 28 and between the stations 22, 28 and 30, 26 until a full merge-sort of the cards with respect to the numbers in the selected control field has been achieved.

For transcription in the apparatus and system of the invention, it may be assumed that a card is circulated on the rotatable vacuum pressure transport drum 14. A card is then released from the feeding-stacking station 22 to the rotatable vacuum pressure transport drum 12 and transferred from that drum to the drum 14. Two cards then circulate on the drum 14. Each time one of the cards is carried past the write heads 44 by the drum 14, information is recorded on that card. Likewise, each time one of the cards is carried past the read heads 40 by the drum 14, the information previously recorded on that card by the write heads 44 is read back for verification. In this manner, a complete channel is written on each of the two cards and read back in each pass. The passes continue until the transcription is complete as to all of the channels on both cards. Then the card originally on the drum 14 is transferred back to the transport drum 12, and that card is stacked in the feeding-stacking station 22.

The fragmentary top plan view of FIGURE 3 illustrates the rotatable vacuum pressure transport drums 16 and 18 and their associated components in somewhat more detail.

As illustrated in FIGURE 3, the gate transfer mechanism 34 may comprise a first pneumatic unit 100 and a second pneumatic unit 102. The pneumatic unit 100 is controllable to direct streams of pressurized fluid, such as compressed air, tangentially of the periphery of the drum 14. Any card carried by the drum 14 and coming under the influence of such streams has its leading edge stripped from the drum and moved outwardly from the periphery. Then, as the card is moved by the drum, its leading edge moves outwardly over the units 100 and 102 and into the vicinity of the periphery of the drum 16. This causes the card to come under the influence of the vacuum pressure established at the periphery of the drum 16. Continued rotational movement of the drum 16 causes the card to be stripped from its periphery and transferred to the periphery of the drum 16. In like manner, the unit 102 is positioned to controllably direct streams of pressurized fluid tangentially of the periphery of the vacuum pressure transport drum 16 to effectuate a similar transfer of cards from the periphery of the drum 16 to the periphery of the drum 14.

A suitable construction for the pneumatic unit 100 of the gate transfer mechanism 38 is shown by the side sectional view of FIGURE 6. As illustrated in FIGURE 6, the unit 100 includes a body portion 104 which has a tear-drop configuration when viewed in plan, as in FIGURE 3. The interior of the body 104 includes a bell-shaped compartment 106 which extends to the narrow end of the body. The narrow end is closed by a strip 108 which has a plurality of apertures 110 formed in it.

A channel 112 extends through the body 104 and communicates with the chamber 106 and with a threaded tubular fitting 114, the fitting extending out through the bottom of the unit 100.

The fitting 114 extends through an aperture in the table top 20, and it receives a nut 116 on the under side of the table top. The nut 116 holds the pneumatic unit 100 in the desired angular position on the table top 20. A pipe line 118 extends into the fitting 114, and this pipe line communicates with a suitable source of pressurized fluid, such as compressed air. A solenoid valve 120 is interposed in the pipe line 118. This solenoid valve is controllable to an open condition in which the pressurized fluid passes from the source into the chamber 106 to be emitted as pressurized streams through the apertures 110. These streams serve to effect the transfer of cards from the drum 14 to the drum 16 in the described manner. The units 100 and 102 are positioned so that when the solenoid valve 120 is de-activated, the cards are carried on their respective drums past the gate transfer mechanism 38 and are not transferred.

The gate transfer mechanism described above may be similar to that described in copending application Serial No. 689,347, filed October 10, 1957, now Patent No. 2,905,466, in the name of Eric Azari et al. and entitled "Card Processing Apparatus."

The card holding mechanism 46 of FIGURE 1 is further illustrated in FIGURE 3, and the mechanism is shown in a side elevational view in FIGURE 5. The card holding mechanism 46 is mounted on the table top 20, as mentioned above, and it is positioned adjacent the periphery of the transport drum 16. The card holding mechanism is displaced angularly from the read heads 40 by a slight amount in the direction of rotation of the drum, and it is interposed (as mentioned) between the read heads 40 and the write heads 44. The card holding mechanism 46 is constructed to have an arcuate shaped surface which includes a pair of fingers 130 at its leading edge. These fingers extend into contiguous relationship with the peripheral surface of the vacuum pressure transport drum 14, and they serve to withdraw the information storage cards from the drum for movement over the arcuate shaped surface of the card holding mechanism.

The surface of the card holding mechanism 46 has a series of orifices 132 extending across its width, and a vacuum pressure is selectively established at these orifices controllably to arrest the information storage cards passing over the surface. The card holding mechanism 46, therefore, serves to hold any card transported to it by the vacuum pressure transport drum 16 against further rotation by the drum until the vacuum pressure at the surface of the arcuate shaped member is removed.

The card holding mechanism 46 may be constructed in the manner described in the copending application Serial No. 689,347, referred to above. The axially spaced integral fingers 130 at the leading edge of the arcuate shaped body member 134 of the mechanism at its leading edge extend into respective peripheral grooves in the transport drum 14. These grooves are formed adjacent slots in the drum, which will be described, and through which vacuum pressure is established to retain the cards on the peripheral surface of the drum. The extremities of the fingers 130 extend into the grooves and flush with the outer surface of the peripheral edge of the drum 14. The outer surface of the arcuate shaped member 134 is bulged outwardly in a radial direction from the peripheral surface of the drum.

The arcuate shaped body member 134 of the card holding mechanism 46 is supported by a tubular element 136 which extends through the table top 20 and which is secured to the table top by means of a nut 138 threaded to that element. The portion of the tubular element 136 extending under the table top 20 is also threaded to receive a conduit 140. A solenoid actuated valve 142 is interposed in the conduit 140 to control the vacuum pressure exerted through the conduit at the surface of the arcuate shaped body member 134.

The arcuate shaped body member 134 has a series of orifices 132 across its outer surface as described above. The tubular element 136 communicates with these orifices. Also, a rubber-like element 144 is inset on the surface of the arcuate shaped member 134 adjacent the orifices 132. This element 144 exhibits a relatively high coefficient of friction to the cards.

The conduit 140 is coupled to an appropriate vacuum pump, and the solenoid valve 142 selectively controls the vacuum pressure exerted by the pump at the surface of the element 144 through the orifices 132. In the absence of a vacuum pressure through the solenoid valve 142, any card transported on the periphery of the drum 16 engages the fingers 130 of the arcuate shaped body member 134. The card is then forced upwardly over the outer surface of the member 134, and it is then moved by the drum 16 over the member and returned to the drum. However, the control provided by the solenoid valve 142 to produce a vacuum pressure at the surface of the element 144 causes a selected card to become arrested on that surface. The card is held in this manner by the vacuum pressure through the orifices 132 and against the force exerted on it by the vacuum pressure at the periphery of the drum 14. This holding may continue for a selected interval to change the position of the particular card on the periphery of the drum 14, or to fulfill any other particular requirement, as will be described. At the end of the selected interval, the card may be released by de-energizing the solenoid controlling the valve 142 so that the card may continue to be transported by the drum 14.

The feeding-stacking station 26 of FIGURE 1 is shown in more detail in FIGURE 4. It will be understood that the feeding-stacking stations 24, 28, 30 and 22 of FIGURE 1 may be similarly constructed. It should also be pointed out, that the feeding-stacking stations may be constructed in a manner similar to that disclosed in copending application 645,639, which was filed March 12, 1957, now Patent No. 2,969,979, in the name of Alfred Nelson et al.

The feeding-stacking station 26 as illustrated in FIGURE 4 includes a pair of guide rails or walls 150 and 152. These guide rails are secured to the table top 20 by a plurality of screws, such as the screws 154. The guide rails are mounted on the table top in spaced parallel relationship, and they are spaced from one another a distance corresponding to the length of the individual cards which are utilized in the apparatus and system of the invention. The cards are supported on the table top 20 in an upright stacked condition between the guide rails 150 and 152. The cards are so supported with their lower edges resting on the top surface of the table top 20.

A resiliently biased card follower member (not shown) is mounted between the guide rails 150 and 152. This card follower member, as described in the copending application 645,639, resiliently biases the stack of cards toward the mouth of the station and against the periphery of the drum 14. In this way, th eresiliently biased card follower serves to maintain the cards in an upright stacked condition in the station 26.

The guide rails 150 and 152 extend radially outwardly from the periphery of the drum 14. The forward ends of these guide rails form the mouth of the station which is adjacent the periphery of the drum 14 and which faces the drum. The forward portion of the guide rail 152 has a pair of tongues 152a and 152b which extend into close proximity with the periphery of the drum 16. These tongues are spaced from the drum a distance which is slightly greater than the thickness of a single card, and which is less than the combined thickness of a pair of cards. The tongues 152a and 152b define a feed throat with the periphery of the drum 14, and the feed throat permits one card at a time only to pass from the station 26 to the periphery of the drum.

A stack head 156 is supported on an appropriate lever arm by means of a screw 158. The lever arm is pivoted to the underside of the table top 20 by a pivot shaft 160. The lever arm is controlled, in a manner fully described in the copending application 645,639, to move the stack head 156 from a stand-by position to an operative position. When the stack head 156 is in its stand-by position, it is moved back from the periphery of the drum 14 and does not interfere with the transport of cards by the drum past the mouth of the station 26. However, when the stack head 156 is moved forward to an operative position, it enters the space between the tongues 152a and 152b to fill the feed throat defined by the wall 152, as mentioned above. Also, the stack head 156 includes a pair of fingers 156a which extend into peripheral grooves in the drum 14. This enables the stack head to strip each card carried to the mouth of the station 26 by the drum 14, the cards being so stripped by the stack head from the periphery of the drum and arrested in a position across the mouth of the station 20.

A pick-off member 160 is mounted adjacent the guide rail 150. The pick-off has a rectangular configuration and includes an end portion 162 which extends into a closely adjacent position with respect to the drum 14. A pair of fingers 164 are formed integral with the end portion 162, and these fingers extend into the peripheral grooves on the drum 16. The fingers 164 and the end portion 162 of the pick-off are bulged outwardly, so that any card arrested by the stack head 156 across the mouth of the station 26 has its trailing end shifted outwardly from the periphery of the drum 14. This permits the next succeeding card to pass under the preceding card and strip it from the periphery of the drum 14 to be deposited in the station 26. In this manner, the cards carried by the drum 14 to the mouth of the station 26 may be deposited in proper sequence in the station.

The guide rail 156 has a bifurcated end portion which receives a feed head 168. The feed head 168 may be constructed in the manner described in detail in the copending application 645,639, referred to above. The feed head is mounted by means of a shaft 170 on a lever arm (not shown) which extends along the underside of the table top 20. The lever arm is pivoted on a suitable pivot shaft (not shown) and may be controlled to move the feed head between an operative position and a stand-by position. The shaft 170 extends up through a slot 172 in the table top 20, whereas the stack head shaft 158 extends up through a slot 173 in the table top. As described in the copending application, the stack head 156 and the feed head 168 are controlled in unison so that the feed head is retracted back to a stand-by position when the stack head is moved forward to its operative position, and vice versa.

A pin 174 extends down from the feed head 168 into a slot 176 in the table top 20. The engagement of the pin 174 with the slot 175 causes the feed head 168 to rotate on the shaft 170 as it is moved between its operative position and its stand-by position.

As described in the copending application 645,639, a vacuum pressure may be established at the face of the feed head 168 when the feed head is moved forward to its operative position. However, when the feed head is retracted to its stand-by position, the rotation of the head about the shaft 170 shuts off the vacuum pressure so that a continuous energizing of a solenoid valve for that purpose is not required.

When the feed head 168 is moved forward to its operative position, the cards in the station 26 are held by the vacuum pressure of the feed head in that station. However, any interruption of the vacuum pressure causes the cards to be released from the station in a one-by-one sequence through the feed throat formed by the tongues 152a and 152b of the guide rail 152 and the periphery of the drum 14. The interruption of the vacuum pressure at the feed head 168 may be controlled so that one card only may be released from the station 26 for each such interruption. Alternately, the vacuum pressure to the feed head may be interrupted for a relatively long interval to permit a sequence of cards to be released in a one-by-one manner from the station.

It follows, therefore, that each of the feeding-stacking stations may be controlled to assume either a feeding mode or a stacking mode. When any one of these stations is in a feeding mode, it may further be controlled to release cards singly or in succession. The latter control is usually accomplished by interposing a solenoid valve in the feed line supplying vacuum pressure to the feed head 168.

The constructional details of the vacuum transport drum 14 are shown in FIGURE 7. It is to be understood that the other drums may be constructed in the same manner. It is also to be understood that other transport media may be used in the mechanical handling units, and that the invention is not limited to the use of rotatable transport drums, or of any particular type of transport medium.

The illustrated drum is similar in its construction to the rotatable transporting drum disclosed and claimed in copending appliaction Serial No. 600,975, filed July 30, 1956, in the name of Loren R. Wilson. As shown in FIGURE 7, the vacuum transport drum 14 is made up of a lower section and an upper section. The lower section includes a disc-like bottom portion 218 and an integral annular side portion 220. The disc-like bottom portion and the annular side portion together make up the lower section of the drum.

A pair of axially spaced peripheral orifices 222 and 224 extend through the annular side portion 220. Each of these orifices is discontinuous in that it is interrupted at selected intervals about its annular length by ribs 226 which are integral with the side portion 220. The orifices 222 and 224 each has an external peripheral annular channel for receiving the fingers 156a of the stack head 156 and the fingers 164 of the pick-off 160, these fingers being shown in FIGURE 4 and described above. As noted, this engagement of the fingers of the stack head and the pick-off with the annular channels in the drum permits the cards to be removed from the periphery of the drum and deposited in the station 56.

The disc-like bottom portion 128 of the lower section of the drum is undercut as shown at 228. This enables the edge of the table top 20 to extend beyond the outer limits of the annular side portion 220. Therefore, even without excessively close tolerances between the edge of the table top and the rotating surface of the drum 14, the cards supported endwise on the table top in the station 56 have no tendency to slip down between the table and the drum 14 as the cards are transferred to and from the periphery of the drum. There is, therefore, no tendency for the cards to become misplaced or damaged.

The upper section of the drum 14 is in the form of a disc-like member 230 which engages the annular side portion 220 of the lower section. The member 230 forms an enclosure with the lower section of the drum, with the member 230 being positioned parallel to the disc-shaped bottom portion 218 of the lower section. The member 230 is held in place on the annular side portion 220 by a plurality of screws 232.

A deflector ring 240 is supported within the interior of the drum 14 in press-fit with the inner surface of the annular side portion 220. This deflector ring is tapered towards the center of the drum to prevent turbulence and to provide a streamlined path for air that is drawn in through the orifices 222 and 224.

The bottom portion 218 of the lower section of the drum 14 contains a central opening which is surrounded by an annular collar 241. The collar 241 surrounds a shoulder 242 which is provided at one end of a hollow shaft 244. The drum 14 is supported on the shoulder 242, and the end of the shaft 244 extends into the opening in the bottom portion 218 in press-fit with that portion. Therefore, rotation of the hollow shaft 244 causes the drum 14 to rotate. Also, the interior of the hollow shaft 244 communicates with the interior of the drum.

A pair of bearings 246 are provided at opposite ends of the shaft 244. The inner races of these bearings are mounted on the shaft, and their outer races are held by bushings 248. The bushings are secured to a housing 250 by means of screws 252. An arcuate opening 256 is provided in the housing 250 between the bearings 246. This opening enables a drive belt 258 to extend into the housing and over the pulley 260. The pulley 260 is keyed to the shaft 244 between the bearings 246, and it is held against axial movement by a pair of sleeves 262 which are supported on the shaft between the bearings 246.

In this way, the shaft 244 and the drum 16 can be rotated by a suitable motor (not shown) the motor being mechanically coupled to the pulley 260 by the drive belt 258.

The bearings 246 and the sleeves 262 are held on the shaft 244 by a nut 266. This nut is screwed on a threaded portion at the lower end of the shaft, and a lock washer 264 is interposed between it and the lower bearing 246. A sealing disc 268 is also screwed on the threaded portion at the lower end of the shaft 244. The disc 268 operates in conjunction with a bottom plate 270 to prevent the movement of air between the interior of the housing 250 and the interior of the hollow shaft 244 when a pressure differential exists between the housing and the shaft.

The bottom plate 270 is fastened to the housing 250 by a plurality of screws 272, and this plate serves to close the lower end of the housing. A circular central opening is provided in the bottom plate 170, and a hollow conduit 274 extends into the opening in press-fit with the plate 270. A conduit 274 is axially aligned with the hollow shaft 244 so that air may be exhausted by a vacuum pump 276 from the hollow interiors of the shaft and the conduit. The vacuum pump 276 may be of any suitable known construction and, for that reason, is shown merely in block form.

The vacuum pump 276 draws air inwardly through the orifices 222 and 224, through the interior of the drum 14, down the hollow interior of the shaft 244 and through the conduit 274. This creates a vacuum pressure at the outer peripheral surface of the annular portion 220 of the lower section of the drum. This vacuum pressure serves firmly to retain the cards received from the feeding-stacking stations on the periphery of the drum as such cards are transported by the drum.

Details of the plug board 52 and of certain components and circuitry associated with the plug board are shown in FIGURES 8a and 8b. As shown in FIGURE 8a, the plug board control register 54 is coupled to a matrix 300 which in turn is coupled to a plurality of input terminals (1–63) of the plug board 52.

The data processor 56 introduces successive instructions in serial form to the plug board control register 54. This registration may, for example, by a typical flip-flop register. As each instruction is received by the register from the processor, the flip-flops in the register assume a configuration corresponding to that instruction. The matrix 300 responds in known manner to the different configurations of the flip-flops in the control register 54 selectively to introduce signals to different ones of the input terminals of the plug board. These input terminals are numbered, for example, from 0–63. An input signal is introduced to a different input terminal for each different instruction from the processor 56, as such instructions are introduced to the register 54, and by the register to the matrix 300.

In accordance with known plug board techniques, the input terminals 0–63 are connected to different groups of output terminals on the plug board, so that each instruction from the processor 56 can be made to initiate one or more operations in the mechanical card handling unit 10 of FIGURE 1.

A first group of output terminals, to which the input terminals 0–63 may be selectively connected, are identified as the "station setting feed or stack" group. This group of terminals consists of a plurality of pairs, with the individual terminals of each pair being designated as "F" and "S" to represent "feed" or "stack." Each of the feeding-stacking stations 22, 24, 26, 28 and 30 of the card handling unit 10 of FIGURE 1 has feeding-stacking control circuitry connected to a corresponding pair of these terminals. Typical circuitry associated with the station 22 is illustrated in FIGURE 8a by way of example, and it will be understood that identical control circuitry may be associated with the other feeding-stacking stations.

As illustrated, the terminals "F" and "S" associated with the feeding-stacking station 22 are connected to an "or" gate 302. The output from the "or" gate is introduced to a one-shot multivibrator 304. The multivibrator 304 is connected to the control grid of a triode 306 and to a resistor 308. The resistor 308 is connected to the negative terminal of a source of direct voltage 310, that source having a positive terminal and also having a grounded common terminal. The cathode of the triode 306 is grounded, and its anode is connected to the energizing winding of a relay 312. The other terminal of the energizing winding of the relay 312 is connected to the positive terminal of the direct voltage source 310.

The triode 306 is normally non-conductive, so that no current normally flows through the energizing winding of the relay 312. However, whenever a pulse is received through appropriate plug board connections at the terminal "F" or at the terminal "S" connected to the "or" gate 302, the multivibrator 304 is triggered. Then, in accordance with known one-shot multivibrator action, a pulse of a duration determined by the parameters of the multivibrator is introduced by it to the control grid of the triode 306. This pulse causes the triode to be conductive for a predetermined interval to energize the relay 312 for that interval.

As will be described in conjunction with FIGURE 9, and as fully described in copending application Serial No. 645,639, filed March 12, 1957, each time the relay 312 is energized, the feeding-stacking station 22 changes from one of its modes of operation to the other. Therefore, a pulse introduced to the terminal "F" may condition the station 22 to its feeding mode of operation, a subsequent pulse to the terminal "S" may condition the station to its stacking mode of operation, and so on. Similar connections to the other pairs of "F" and 'S" terminals of the group can produce similar controls to the other feeding-stacking stations.

As mentioned above, in the description of FIGURE 4, the feed head 168 and the stack head 156 may be mounted on appropriate lever arms, and these lever arms may be cam actuated so that the station can be set to a feeding mode or to a stacking mode. The cam in this station, and in the other stations such as the station 22, may be coupled to a pair of switch actuator cams 408 and 410. Then, as the cam of the station moves from a stacking position to a feeding position, and vice versa, the switch actuator cams 408 and 410 are similarly moved.

These cams actuate a plurality of switches 462, 464 and 480 associated with the cams. It will be seen from FIGURE 9 that the cam 410 has a raised portion 410a which actuates the cam follower 474 of the switch 462 and the cam follower 484 of the switch 480. The switch 462 is actuated by the cam follower 474 and is closed by the portion 410a for a particular angular position of the cam 410. The switch 462 is held closed for an angular increment of the cam 410 of, for example, 40 degrees. The switch 480, on the other hand, is closed when the portion 410 is displaced 180 degrees from its position in which the cam follower 474 was actuated. Therefore, for one position of the cam 410 corresponding, for example, to 0 degrees, the switch 462 is closed. For a second position of the cam 410 corresponding, for example to 180 degrees, the switch 480 is closed. The cam 408 has two raised portions 408a and 408b which are separated from one another by an angular distance of, for example, 180 degrees, and each of these latter raised portions extends for an angular distance of 60 degrees. The portions 408a and 408b actuate the cam follower 472 portions 408a and 408b actuate the cam follower 472 to close the switch 464 for corresponding portions of the angular travel of the cam 408.

The armature of the switch 462 is connected to one side of the energizing winding of a relay 420. The other side of this relay winding is grounded, and the winding may be shunted by an indicator lamp 422. The relay 420 includes a normally open relay switch 424. The fixed contact of the relay switch 424 is connected to one side of a solenoid 436 the other side of this winding being grounded. As described in the copending application 645,639, the solenoid 436 controls a clutch mechanism, and each time that solenoid is energized, the control mechanism for the feeding-stacking station moves through 180 degrees to change the operating mode of the station. The armature of the relay switch 424 is connected to an input terminal 426 of the control system.

The armature of the switch 480 is connected to one side of the energizing winding of a relay 428. The other side of this winding is connected to ground and the winding is shunted by an indicator lamp 429. The relay 428 includes a normally open relay switch 430. The fixed contact of the switch 430 is connected to the ungrounded side of the energizing winding of the solenoid 437. The armature of the switch 430 is connected to the input terminal 426.

The fixed contact of the switch 480, together with the fixed contact of the switch 462, and the armature of the switch 464, are connected to the positive terminal of a source of direct voltage 436. The fixed contact of the switch 464 is connected to one side of the energizing winding of a solenoid 438. The other side of this winding is grounded. As described in the copending application 645,639, this solenoid controls the vacuum pressure at the surface of the feed head of the station, and that vacuum pressure is removed from the feed head when this winding is energized.

An "and" gate 440 is connected to the input terminal 426. One of the input terminals of the "and" gate 440 is connected to the positive terminal of the source of direct voltage 436. The other input terminal of the "and" gate 440 is connected to the left output terminal of a flip-flop 444. The output terminal of a differentiator 446 is connected to the left input terminal of the flip-flop 444 and to the input terminal of a delay line 448. The output terminal of the delay line is connected to the right input terminal of the flip-flop 444. A capacitor 450 is connected to the input terminal of the differentiator 446, and a pair of normally open contacts of the relay 312 described in conjunction with FIGURE 8a are interposed between the capacitor and the positive terminal of the source of direct voltage 436.

In explaining the operation of the system of FIGURE 9, it will be assumed that the station is in its feeding mode. When the station is in that condition, the switch 470 is held closed, and the relay winding 420 and its indicator lamp 422 are energized. This causes the relay switch 424 to be closed so that a circuit from the input terminal 426 to the clutch actuating solenoid winding 436 is prepared. During this operating condition, the normally open contacts of the relay 312 are open. However, when the relay 312 is energized to close its contacts, the capacitor 450 is connected to the positive terminal of the source 436 so that a surge of current flows into the capacitor. This produces a current pulse which is differentiated and sharpened in the differentiator 446 and applied to the left input terminal of the flip-flop 444.

The flip-flop 444 is triggered by the pulse from the differentiator 446 into its true state in which a relatively high voltage appears at its left output terminal. This relatively high voltage causes the "and" network 440 to be conductive, so that the positive voltage from the positive terminal of the source 436 is introduced to the input terminal 426 and through the prepared circuit of the relay switch 424 to the clutch actuating solenoid 437. The delay line 448 returns the flip-flop 444 to its false state a short time thereafter effectively to remove the voltage from the clutch actuating solenoid winding 436. This control is such that the winding 436 is energized long enough to release the clutch and cause the cams 408 and 410 to move through 180° in the manner described in the copending application 645,639.

The switch actuator cams 408 and 410 are now rotated through 180° in, for example, a counter-clockwise direction. As the cam 410 turns, the portion 410a moves out of engagement with the cam follower 474 so that the switch 462 opens. This de-energizes the relay winding 420 and opens the conditioning circuit through the relay switch 424 from the input terminal 426 to the energizing winding of the clutch actuating solenoid 436.

After a rotation of the cams through a suitable angular distance, such as approximately 30°, the stack head of the station is brought into its operating position. The stack head is brought completely into its operating position after 80° of rotation, for example.

After rotation through a suitable angular distance, such as approximately 90°, the portion 408b of the cam 408 engages the cam follower 472 to close the switch 464. This causes the vacuum pressure at the feed head of the station to be turned off. After rotation through a suitable angular distance, such as approximately 100°, the feed head of the station begins to move back to its stand-by position. During this motion, and as described in the copending application 645,639, a mechanical valve in the feed head closes the feed head to the vacuum pressure line and bleeds the feed head to the atmosphere.

The feed head is moved fully to its stand-by position after 150° of rotation of the actuating cam and at this position, the mechanical valve is completely turned off. At this instant, and because the solenoid 438 is no longer needed, the portion 408b of the switch actuator cam 408 moves out of engagement with the cam follower 472 so that the switch 464 is opened. This de-energizes the solenoid 438 and allows vacuum pressure to be resumed through the solenoid valve. However, this vacuum pressure is arrested by the mechanical valve in the feed head which, as stated, is now closed.

After a suitable angular rotation, such as approximately 160°, the portion 410a of the switch actuator cam 410 engages the cam follower 484. This causes the switch 480 to close and the relay winding 428 and its indicator lamp 429 to be energized. When the relay winding 428 is energized, the relay switch 430 is closed to prepare a circuit from the input terminal 426 to the energizing winding of the clutch actuating solenoid 437. The control mecanism is now stopped until the solenoid 437 is again energized, and the associated feeding-stacking station is now conditioned to function in its stacking mode.

Therefore, and in the manner described briefly above, successive input pulses introduced to the one shot multivibrator 304 of FIGURE 8a causes the station 22 to be alternately conditioned to its stacking mode and to its feeding mode. Appropriate plug board connections from selected input terminals to the "F" and "S" terminals at the station 22 position enable the station 22 to be conditioned to a feeding or to a stacking mode in response to predetermine different instructions received from the processor 56. Likewise, by appropriate connections to similar terminals of the station setting feed or stack group, the different stations 24, 26, 28 and 30 can be conditioned to a feeding mode or to a stacking mode in response to other predetermined instructions from the processor.

A second group of terminals on the plug board 52, as illustrated in FIGURE 8a, are those which are used to control the gate transfer mechanism 32, 34, 36 and 38. This group of terminals is designated "gate transfer from one drum to another." A first pair of terminals in the group is designated B–C and C–B. These terminals control the gate transfer mechanism 32 to effectuate transfers between the drum 12, 14 and 14, 12 respectively.

A second pair of terminals are designated D–C and C–D. This latter pair of terminals are associated with the gate transfer mechanism 34, and they serve to control the transfer of cards between the drums 14, 16 and 16, 14 respectively. A third pair of terminals in the group is designated B–A and A–B. The terminals of this third pair are associated with the gate transfer mechanism 36. These terminals control the transfer of cards between the drums 12, 18 and 18, 12 respectively. Finally, a pair of terminals A–D and D–A is included in the group, and this latter pair is associated with the gate transfer mechanism 38. The terminals of the latter pair control the transfer of cards between the drums 16, 18 and 18, 16 respectively. Each of the pairs of terminals referred to above includes a reset terminal.

In accordance with usual plug board techniques, appropriate connections may be made between certain ones of the input terminals 0–63 of the plug board and different ones of the terminals of the gate transfer group. Such connections provide that the selected terminals be activated in accordance with corresponding predetermined instructions from the processor 56. When one of these terminals is activated, its gate transfer mechanism is caused to emit streams of pressurized fluid so as to provide a desired transfer of cards coming within the influence of the jets between the corresponding drums.

Appropriate logic circuitry is illustrated in FIGURE 8a for controlling the operation of the gate transfer mechanism 32, this circuitry being connected to the terminals B–C and C–B of the first pair referred to above. It will be understood that similar circuitry may be associated with the other pairs of terminals of the group under discussion to provide like control for the other gate transfer mechanism 34, 36 and 38. The illustrated logic control circuitry includes a first flip-flop 480 and a second flip-flop 482.

The terminal B–C is connected to the left input terminal of the flip-flop 480, and the terminal C–B is connected to the left input terminal of the flip-flop 482. The associated reset terminal is connected to the right input terminals of the flip-flops 480 and 482. The left output terminal of the flip-flop 480 is connected to the control grid of a triode 484 and to a resistor 486. The resistor 486 is connected to the negative terminal of the source of direct voltage 310. The cathode of the triode 484 is grounded, and its anode is connected to the energizing winding of a solenoid 488. The other terminal of the energizing winding of the solenoid 488 is connected to the positive terminal of the source of direct voltage 310. The solenoid 488 is connected in the pressurized fluid line which extends to the B–C portion of the gate transfer mechanism 32. Whenever the solenoid is energized, an associated valve opens so that the B–C section of the gate transfer mechanism emits jets of pressurized fluid to effectuate card transfers between the drums 12 and 14.

The triode 484 is normally non-conductive, so that the solenoid 488 is normally in a de-energized condition. However, whenever the flip-flop 480 is triggered to a true state, the triode 484 is rendered conductive to cause the solenoid 488 to be energized. The flip-flop 480 is triggered to a true state in response to an input signal introduced to the B–C terminal. The flip-flop is then returned to a false state in response to a signal introduced to the reset terminal associated with the B–C terminal. Therefore, in response to a particular instruction from the processor 56, the flip-flop 480 can be triggered true at a particular time, and it can be held true for a predetermined interval. In this manner, one or more selected cards can be transferred from the drum 12 to the drum 14 in response to such an instruction.

The left output terminal of the flip-flop 482 is connected to the control grid of a triode 490 and to a resistor 492. The resistor 492 is connected to the negative terminal of the source of direct voltage 310. The cathode of the triode 490 is grounded, and the anode of the triode is connected to the energizing winding of a solenoid 496. The other terminal of the winding of the solenoid 496 is connected to the positive terminal of the source 310.

The solenoid 496 controls a valve in the pressurized fluid feed line to the B–C section of the gate transfer mechanism 32. In a manner similar to that described in conjunction with the solenoid 488, the flip-flop 482 causes jets of pressurized fluid to be emitted from the B–C section of the gate transfer mechanism 32 whenever it is triggered to its true state. An input signal introduced to the terminal C–B triggers the flip-flop 482 to its true state, and the reset signal described above causes the flip-flop to be returned to its false state.

A further group of terminals is included on the plug board 52, and this group (as illustrated in FIGURE 8a) is designated the "card release" group. These latter terminals are associated with the different feeding-stacking stations 22, 24, 26, 28 and 30. Each station has associated with it a first terminal designated "single," and whenever an input signal is introduced to that terminal, a single card is released from the corresponding station. Each station also has a further pair of terminals designated respectively "start" and "stop." Each time a signal is introduced to a start terminal, the corresponding station begins to release cards one after another to its associated transport drum. This successive release of the cards continues until a signal is introduced to the corresponding stop terminal. It is evident that the terminals of the card release group are effective only when the corresponding station is first conditioned to its feeding mode, by the terminals of the station setting-feed or stack group described above.

Appropriate logic circuitry is illustrated in FIGURE 8a for controlling the card release of the station 22. This circuitry is illustrated as connected to the corresponding "single," "start" and "stop" terminals associated with the station 22 in the card release group of the plug board 52. It will be understood, that similar logic circuitry may be connected to the other terminals of the card release group.

The "single" terminal is connected to an "or" gate 500 and to the input terminal of a delay line 502. The output terminal of the delay line 502 is connected to an "or" gate 504. The "or" gate 500 is connected to the left input terminal of a flip-flop 506, and the "or" gate 504 is connected to the right input terminal of that flip-flop. The left output terminal of the flip-flop 506 is connected to the control grid of a triode 508 and to a resistor 510. The resistor 510 is connected to the negative terminal of the source 310. The cathode of the triode 508 is grounded, and the anode of that triode is connected to the energizing winding of a solenoid 512. This solenoid is included in the vacuum pressure feed line to the feed head associated with the feeding-stacking station 22.

Whenever the solenoid is energized, it causes its associated valve to close so as to cut off the vacuum pressure at the feed head. This enables the leading card in the feeding-stacking station 22 to be fed to the vacuum transport drum 12. The "start" terminal associated with the station 22 of the card release group on the plug board 52 is also connected to the "or" gate 500, and the "stop" terminal is connected to the "or" gate 504.

As in the previous instances, appropriate plug board connections can be made to the "single," "start" and "stop" terminals on the plug board, so that input signals are fed to these terminals under the control of instructions from the processor 56. Whenever an input signal is introduced to the "single" terminal associated with the station 22, that signal causes the flip-flop 506 to be triggered to its true state. This, in turn, causes the triode 508 to become conductive so that the vacuum pressure at the feed head of the station 22 is interrupted. The pulse from the "single" terminal also passes through the delay line 502, and the resulting delayed pulse from the delay line passes through the "or" gate 504 to return the flip-flop 506 to its false state and thereby restore the vacuum pressure at the feed head after a predetermined time interval. This time interval is made equivalent to the time required to cause a single card to be released from the station.

Therefore, each time an input signal is introduced to the "single" terminal, the flip-flop 506 is triggered true long enough to release a single card. However, when a signal is introduced to the "start" terminal, that signal is passed through the "or" gate 500 to trigger the flip-flop 506 true. However, the signal is not introduced to the delay line 502, and the flip-flop 506 remains true until a signal is introduced to the "stop" terminal. The latter signal is passed through the "or" gate 504 to the flip-flop 506 to return the flip-flop to its false state. As mentioned above, as long as the flip-flop 506 remains in a true state, cards are successively released from the station.

A plug board 52, as illustrated in FIGURE 8a, also includes a first pair of terminals which are associated with the card holding station 48 of FIGURE 1, and a second pair of terminals associated with the card holding station 46. The terminals of each pair are designated "hold" and "emit" respectively. The logic circuitry associated with these terminals is such that when a signal is introduced to a "hold" terminal the corresponding holding station is caused to arrest the next card carried to it by its corresponding drum. The card is arrested by the holding station until a subsequent signal is introduced to an "emit" terminal. Appropriate plug board connections from the input termianls to the card holding terminals can cause selected instructions from the processor 56 to exert a desired program of controls on the card holding stations 46 and 48. The logic circuitry associated with the card holding station 46 is illustrated in FIGURE 8a, and it is to be understood that similar circuitry may be used for controlling the card holding station 48.

The logic control circuitry associated with the card holding station 46 includes a flip-flop 514. The corresponding "hold" terminal is connected to the left input terminal of the flip-flop 514, and the corresponding "emit" terminal is connected to the right input terminal of that flip-flop. The left output terminal of the flip-flop 514 is connected to the control grid of a triode 516, and to a resistor 518. The cathode of the triode 516 is grounded, and the resistor 518 is connected to the negative terminal of the source 310. The anode of the triode 516 is connected to the energizing coil of the solenoid valve 142, the other terminal of this winding being connected to the positive terminal of the source 310. It will be remembered from the description of FIGURE 5, that the solenoid valve 142 is included in the vacuum pressure feed line 140. When the energizing winding of the solenoid valve 142 is energized, the valve opens to create a vacuum pressure at the surface of the holding station. When a signal is introduced to the "hold" terminal, the flip-flop 514 is triggered true, so that the triode 516 is rendered conductive. This causes the solenoid valve 142 to be energized, and the vacuum pressure to be established at the card holding station 46.

Therefore, each time a signal is introduced to the "hold" terminal, the card holding station 46 is activated. This activation of the card holding station 46 causes it to arrest the first card transported to it by the drum 14.

The card is arrested by the holding station until a signal is introduced to the "emit" terminal. When that occurs, the flip-flop 514 is triggered false so that the triode 516 again becomes non-conductive to interrupt the vacuum pressure at the card holding station 46.

The plug board 52 has a further group of terminals which are illustrated in FIGURE 8b, and which are designated "mechanical configuration control." As described in copending application 685,539, which was filed September 27, 1957, in the name of Allan Orner, now Patent No. 2,901,247, the feeding-stacking stations 22, 24, 26, 28 and 30 may be constructed to receive removable magazines which contain the stacks of cards. These magazines may be mounted in a file block at each station in the manner described in that copending application and in copending application Serial No. 808,824, which was filed April 24, 1959, in the name of Emanuel A. Knefel, now Patent No. 2,968,480. An appropriate selection mechanism described in the copending application Serial No. 808,824 causes the file block to move up and down with respect to the corresponding station so that its magazines may be selectively positioned at the rear end of the corresponding station.

The selection of the magazines described above is under the control of a magazine selection mechanism, such as the mechanism designated by the block 50 in FIGURE 8b. The mechanism, for example, has a plurality of input terminals which are numbered from 0 to 9. Whenever a signal is introduced to a particular one of these input terminals, the magazine selection mechanism by an appropriate servo control causes the file block to move the crresponding magazine to the rear of the station. Then, a magazine insertion mechanism, such as indicated by the block 532 is activated to move the selected magazine into place in the station.

At the completion of the processing of the cards in the selected magazine, a removal mechanism, such as represented by the block 534 is activated to remove the magazine from the station and return it to its position in the file block. A suitable magazine insertion and removal mechanism is described in the copending application 808,824, and such a mechanism is illustrated in FIGURE 10. The illustration of FIGURE 10 shows merely a few details of the magazine insertion and removal mechanism in order to aid in the present description and to facilitate an understanding of the present invention. Complete details of the mechanism will be found in the copending application 808,824.

The terminals of the mechanical configuration control group on the plugboard are associated with the feeding-stacking stations 22, 24, 26, 28 and 30. Each station includes a terminal "I" which operates a selected magazine insertion mechanism such as represented by the block 532. Likewise, each station includes a terminal "R" which controls the selected magazine removal mechanism, such as represented by the block 534. Each of the stations includes a plurality of terminals "S" which are connected to input terminals of a magazine selection mechanism, such as represented by the block 530. The latter group of terminals has an appropriate cable connection which permits an input signal to be introduced to any one of them so that a corresponding magazine may be selected by the magazine 530.

Appropriate connections may be made from the input terminals of FIGURE 8a to the different terminals of the mechanical configuration control group, so that under the direction of the data processor 56, different magazines may be inserted in the different feeding-stacking stations for processing of selected stacks of the information storage cards contained in those magazines. The station 26 also includes a terminal "P" which is connected to the selected magazine removal mechanism 534. This latter terminal causes the removal mechanism to withdraw the magazine by a predetermined amount. This permits a card to be circulated on the drum 14 any desired number of times, without interference by the cards in the station 26. When it is desired to return the partially removed magazine into operative position, a subsequent signal introduced to the terminal "I" will accomplish that purpose.

As shown in FIGURE 10, a file block 540 may be provided which serves to support a plurality of magazines 542 in individual compartments, such as the compartment 544, with the compartments being disposed one above the other. A suitable drive mechanism is provided which is capable of moving the file block 540 up or down with respect to the floor of the station 22, for example. This drive mechanism incorporates appropriate servo controls which are represented by the block 530 in FIGURE 8b. An input signal introduced to a particular one of the input terminals associated with that block causes a corresponding servo mechanism to move the file block 530 up or down until a selected one of the magazines 542 is positioned at the rear of the station 22.

The individual magazines are held by the file block 540 in such a manner that they protrude outwardly from the front surface of the file block. Then, as the file block is moved up and down, the protruding front ends of the magazines move between a pair of rotatable drive members 546 and 548 (FIGURE 10). These drive members are movable in the manner explained in the copending application 808,824 between a disengaged position, in which each of the members is spaced outwardly from the sides of the magazine 542, and an engaged position in which the rotatable members engage the opposite sides of the magazine 542 which is positioned at the rear of the station 22.

The members 546 and 548 are driven in a first angular direction in which they are capable of withdrawing a particular magazine 542 from the file block 540 when the rotatable members are in their engaged position. The withdrawn magazine 542 is moved forwardly in the station 22 into its operative position in the station. At the end of the processing, the rotatable members 546 and 548 may be driven in the reverse angular direction and moved to their engaged position so that the magazine 542 may be returned to its compartment 544 in the file block 540.

The magazine selection mechanism 530 is, therefore, first controlled to move the file block 540 up or down to bring a selected magazine 542 into alignment with the station 22. The selected magazine insertion mechanism 532 is then controlled to cause the rotatable members 546 and 548 to move inwardly and engage the sides of the front protruding portion of the selected magazine. The rotatable members 546 and 548 are then caused to rotate by the insertion mechanism 542 in a direction to move the selected magazine out of its compartment 544 in the file block 540 and into its operative position in the station 22. At the end of processing, the activation of the selected magazine control mechanism 534 of FIGURE 8b causes the members 546 and 548 to reverse their rotation and move the selected magazine back into its compartment, as noted above. Then, the members 546 and 548 are moved to a disengaged position, so that the file block 540 may be moved by the selection mechanism 530 of FIGURE 8b to bring another selected magazine into alignment with the station 22. As noted above, complete details of the insertion mechanism shown in FIGURE 10 may be found in the copending application 808,824.

The plugboard of FIGURE 8b includes a plurality of output terminals which are designated "status output terminals." These output terminals are connected to the processor 56, and they serve to indicate to the processor the status of the magazines in the various feeding-stacking stations 22, 24, 26, 28 and 30. For example, signals are supplied to the processor to indicate which of the individual magazines are empty, which of the individual magazines are full, and which of the selected magazines are in place in the corresponding station and ready for operation, etc.

The first group of status terminals, for the above mentioned purpose is designated in FIGURE 8b as "status-selected magazine empty." A pair of these terminals are associated with each of the feeding-stacking stations, and the terminals are connected to corresponding ones of the output terminals referred to above. One terminal of each pair is designated "F," and this terminal exhibits a particular voltage when the corresponding magazine is in fact not empty, and a second terminal of each pair is designated "T" and that terminal is established at a particular voltage when the corresponding magazine is in fact empty.

Logic circuitry associated with the station 26 and connected to the pair of "status-selected magazine empty" terminals at that station is illustrated in FIGURE 8b. It will be understood that similar logic circuitry may be used at the other feeding-stacking stations.

The logic circuitry referred to above includes a flip-flop 560. The right output terminal of the flip-flop 560 is connected to the terminal "F," and the left output terminal of the flip-flop is connected to the terminal "T" associated with the station 26. A differentiator 562 is connected to the left input terminal of the flip-flop 560, and a differentiator 564 is connected to the right input terminal of that flip-flop.

The feed head associated with the station 26, and the feed heads respectively associated with the other stations, may each be equipped with appropriate switching contacts which close when the last card leaves the corresponding station. Such contacts, and suitable actuators, are described in the copending application Serial No. 645,639, filed March 12, 1957, in the name of Alfred M. Nelson et al. The contacts on the feed head associated with the station 26 are connected to a suitable energizing source and to the energizing winding of a relay 566 in FIGURE 8b. The relay 566 has a first pair of normally closed contacts 566a and a first pair of normally open contacts 566b. The normally open contacts 566b are connected to a capacitor 568 and to the positive terminal of the source of direct voltage 310. The normally closed contacts 566a are connected to a resistor 570 and to ground. The resistor 570 is connected to the capacitor 568, and the capacitor 568 is connected to the input terminal of the differentiator 562.

The relay 566 has a second pair of normally closed contacts 566c, and it has a second pair of normally open contacts 566d. The contacts 566c are connected to a capacitor 572 and to the positive terminal of the source 310. The normally open contacts 566d are connected to a resistor 574 and to ground. The resistor 574 is connected to a capacitor 572, and the capacitor 572 is connected to the input terminal of the differentiator 564.

Whenever there are cards in the station 26, the relay 566 is de-energized. This causes the resistor 570 to form a discharge path for the capacitor 568, so that the capacitor 568 is discharged. Also, the contacts 566a complete a circuit from the capacitor 572 to the source of direct voltage 310. When this first occurs, the resulting flow of current into the capacitor 572 causes the differentiator 564 to produce a sharp output pulse which is introduced to the left input terminal of the flip-flop 560. That pulse causes the flip-flop 560 to be triggered false to place a selected voltage on the terminal "F," thereby indicating that the station 26 is not empty.

When the last card leaves the station 26, the relay 566 becomes energized. This causes the contacts 566b to close so that a current flows into the discharged capacitor 568 from the source 310. This current causes the differentiator 562 to produce a sharp output pulse, and that output pulse triggers the flip-flop 560 true. The triggering of the flip-flop 560 to a true state causes a particular voltage to appear at the terminal "T" to indicate that the station 26 is in fact empty. The energizing of the relay 566 causes the contacts 566d to close. This causes the resistor 574 to be connected in circuit with the capacitor 572 to discharge that capacitor.

A similar group of terminals to those described above is included in the plugboard 52 to indicate when the different feeding-stacking stations 22, 24, 26, 28 and 30 are full. These terminals are designated "status-selected magazine full." As before, each of the feeding-stacking stations 26 includes a first terminal which indicates that the magazine is in fact not full and which is the "false" terminal "F," and each includes a second terminal which indicates when the selected magazines at the different stations are full, and these latter terminals are the "true" terminals and are designated "T." These latter terminals are also connected to corresponding ones of the status output terminals of the plugboard.

Each of the pairs of terminals of the "status-selected magazine full" group has a flip-flop, such as the flip-flop 580 connected to them. The flip-flop 580 is shown as having its left output terminal connected to the "T" terminal of the station 26, and as having its right output terminal connected to the "F" terminal of that station. A similar logic circuit such as described in conjunction with the flip-flop 560 may be used to control the flip-flop 580, and that circuitry is represented by the block 582. The relay corresponding to the relay 566 and which is included in the circuitry of the block 582 may be controlled by a micro-switch appropriately positioned in the magazines to be activated when the magazines are full of cards.

A further group of status terminals is included on the plugboard 52. This latter group indicates when the magazines introduced to the different feeding-stacking stations 22, 24, 26, 28 and 30 are actually in place and ready for operation. Each of the stations includes an "F" terminal and a "T" terminal of the "status-selected magazine in place" group. These terminals of the station 26, for example, are controlled by a flip-flop 584. Whenever that flip-flop is in its true state, the resulting voltage at the "T" terminal indicates that the selected magazine is in place. However, when the flip-flop 584 is in its false state, the resulting voltage at the "F" terminal indicates that the selected magazine is not yet in place.

The flip-flop 584 may be controlled by circuitry similar to the logic circuitry controlling the flip-flop 560 and which is represented by the block 586. In the latter instance, however, the circuitry may be initially controlled by a micro-switch which is actuated by the selected magazine, and which is closed when the selected magazine is moved into place in its corresponding station.

In a manner to be described, the data processor 56 responds to certain input signals and to commands which conform to a particular program, to produce a series of instructions and to introduce these instructions to the plugboard control register 54. The program in each instance is chosen upon the basis of the desired operations to be performed on the cards. These operations, as mentioned above, may include a binary sort, a merge sort, etc. The input signals introduced to the processor include status signals from the plugboard 52, and from the buffer control register 60 of FIGURE 1. The input signals introduced to the processor also include data signals derived from the buffer 58 of FIGURE 1, as will be described in more detail.

The plugboard control register 54 assumes different configurations in response to the different instructions received from the processor 56. This causes the matrix 300 of FIGURE 8a to introduce different input signals to the different input terminals 0–63 of the plugboard in response to the different instructions from the processor. In this manner, and by appropriate connections in the plugboard, the card handling unit 20 can be made to perform a different card handling operation in response to each different instruction from the processor.

Appropriate logical components which may be associated with the buffer 58 of the read-write circuitry 50 (FIGURE 1), and with its control register 60 are illustrated in FIGURE 11. These components are shown in block form, because the actual logic circuitry which forms the components in itself may assume any of several appropriate and well known configurations.

As illustrated in FIGURE 11, the buffer control register 60 is connected to a matrix 600. The control register itself, like the control register 54 of FIGURE 1, may contain a plurality of flip-flops which are caused to assume different configurations, in accordance with the binary coded instructions received from the processor 56. The matrix 600, like the matrix 300 of FIGURE 8a, may include a plurality of diode or transistor networks, and it has a plurality of output terminals. Each of the output terminals is connected to assume a distinctive signal voltage level in response to a particular corresponding configuration of the flip-flops in the control register 60. In the illustrated embodiment, the output terminals of the matrix 600 are lettered A, B and numbered 0–33.

The output terminals "A" and "B" of the matrix 600 are connected to the read-write circuitry 50 of FIGURE 1. This read-write circuitry 50, as mentioned above, includes amplifiers and other circuitry for responding to the output signals from the read heads 40 and 42 of FIGURE 1 to introduce appropriate signals to the buffer 58, and which responds to signals from the buffer 58 to introduce appropriate signals to the write heads 44.

The lead 601 connecting the terminal "A" of the matrix 600 to the read-write circuitry 50 enable the latter circuitry to select the read heads 40 associated with the drum 14 in FIGURE 1. The heads 40 are selected by the circuitry 50 in response to a particular instruction from the data processor, so that the signals developed by those read heads in response to the data read on the cards transported past them may be introduced to the buffer 58. In like manner, the lead 603 connecting the terminal "B" of the matrix to the read-write circuitry responds to a particular instruction from the processor to cause the read heads 42 associated with the drum 18 to be selected so that the signals from the latter read heads may be utilized. The selection of the read heads 40 or 42 is in accordance with instructions received from the processor 56 by the buffer control register 60, as noted above.

The output terminals 16, 15, 14 and 0 of the matrix 600 are connected respectively to a plurality of "and" gates 602, 604, 606 and 608. These terminals are also connected to different input terminals of an "or" gate 610. "And" gates are well known to the electronic and digital computer art. These gates include appropriate diode or transistor circuitry which permits a signal to be translated through the network so that the output signal of the network may be considered true, only when all the input signals are in a true state. "Or" networks are also well known to the electronic and digital computer arts, and these latter networks produce an output term which is true, whenever any one of its input terms is true.

As described in conjunction with FIGURE 2, the cards in a particular embodiment of the invention include seventeen information channels and a clock channel. Each of the information channels is read by a different read head in the group of read heads 40, or in the group of read heads 42; and a separate read head in each of these groups is used to process the clock channel on the cards. The read-write circuitry 50 has a plurality of output terminals designated 0–16 and "clock." These output terminals are connected to different read heads in the group 40 or in the group 42, as selected by the controls exerted in the read-write circuitry 50 by the signals derived on the leads 601 and 603 from the terminals 0 and 1 of the matrix 600.

The output terminal "0" of the read-write circuitry 50 is connected to the "and" gate 608, and the output terminals 14, 15 and 16 are connected to the "and" gates 606, 604 and 602 respectively. The other output terminals 1–13 (not shown) are respectively connected to similar additional "and" gates which are similarly connected into the circuitry being described. The output terminals 1–13 (not shown) of the matrix 600 are also respectively connected to such additional "and" gates. The "clock" output terminal of the read-write circuitry 50 is connected to an "and" gate 612, as is the "or" gate 610.

The output terminal 17 of the matrix 600 is connected to an "and" gate 616. This terminal, together with the output terminals 0 . . . 14, 15, 16 of the matrix 600, are also connected to an "or" gate 618.

An output terminal of the processor 56 is connected to the "and" gate 616, and this output terminal supplies binary coded data to the "and" gate 616 in response to an appropriate instruction in the processor. The data so supplied to the "and" gate 616 is intended to be recorded on selected ones of the cards in the card handling unit 10 of FIGURE 1. The processor 56 also supplies a clock signal from an appropriate output terminal to the "and" gate 614.

The "and" gates 602, 604, 608 and 616 are all connected to an "or" gate 620. The "and" gates 612 and 614, on the other hand, are connected to an "or" gate 622.

The core buffer 58 is used to store temporarily the information introduced to the buffer from the reading of the cards in the mechanical card handling unit 10 of FIGURE 1. The core buffer may also be used to store temporarily information from the processor 56 to be subsequently recorded on the cards.

The core buffer 58 may include a plurality of magnetic cores having interconnected windings, as is well known to the art. A core matrix of the type under discussion is described, for example, in an article by Jay W. Forrester entitled "Digital Information Storage in Three Dimensions Using Magnetic Cores," Journal of Applied Physics, volume 22, page 44, January 1951.

The core buffer 58 is controlled by a group of X-switches 626 and by a group of Y-switches 628. These switches may be of the usual magnetic type and they control the currents through the windings of the core matrix 624 so that one core at a time is conditioned to be actuated by a corresponding input signal received through a driver circuit 636 to which the "or" gate 620 is connected.

The X-switches are driven by an X-driver circuit 630, and the Y-switches are driven by a Y-driver circuit 632. These driver circuits are of usual composition and are connected to an "or" gate 630.

The core buffer 58 is conditioned to a loading mode by the actuation of a loading circuit 634 which is connected to the "or" gate 618. The core buffer 58 is conditioned to an unloading mode by an unloading circuit 638. The unloading circuit is connected to an "or" gate 652. When the core buffer is conditioned to its unloading mode, successive actuation of the core buffer by the switches 626 and 628 causes output signals to be successively introduced to a driver circuit 640.

The read-write circuitry 50 includes an output terminal "clock." This latter output terminal is connected to a read head associated by the write heads 44, and which reads the clock pulses on each card as the same is processed by the write heads. This output terminal is connected to an "and" gate 657, as is an "or" gate 655. The output terminals 18 . . . 30, 31, 32 of the matrix 600 are connected to the "or" gate 655. The "and" gate 657 is connected to the "or" gate 622.

The output terminals 18–33 of the matrix 600 are also connected to the "or" gate 652, which is connected to the unloading circuit 638 of the core buffer 58. These output terminals are also connected to respective "and" gates such as the "and" gates 642, 644, 646 and 648. The driver circuit 640 is also connected to these "and" gates. The "and" gates 642, 644, 646, 648 are respectively connected to input terminals 0, 1, 2 . . . 16 of the read-write circuitry 50.

The purpose of the buffer 58 is to control the introduction of data from the information storage cards transported in the card handling unit 10 of FIGURE 1 to the processor 56, and vice versa. The use of such a buffer is required because of the different clock frequencies used in the processor 56 as compared with the card handling unit. The clock rate of the processor, for example, may be of the order of 150 kilocycles, whereas the clock rate of the cards may be of the order of 30 kilocycles.

When, for example, it is desired to read the channels of a card circulating on the drum 14 in the card handling unit 10 of FIGURE 1 and to supply the information from those channels to the processor 56, the processor first introduces an appropriate instruction to the control register 60 so that a signal will appear at the output terminal A (for example) of the matrix 600. This causes the read heads 40 to be selected for reading by the read-write circuitry 50. An appropriate instruction may then be introduced to the control register 60 from the processor to cause a signal to appear at the output terminal "0" of the matrix 600.

Then as an information card transported by the drum 14 in the card handling unit 10 of FIGURE 1 is first carried past the read heads 40, its clock pulses are passed through the "and" gate 612 and through the "or" gate 622 to the driver circuits 630 and 632 of the buffer 58. The "and" gate 612 is conditioned for conduction by the signal from the terminal "0" of the matrix 600. The data signals from the first row of the card are passed through the "and" gate 608 and through the "or" gate 620 to the driver circuit 636, the "and" gate 608 being conditioned for conduction by the signal from the terminal "0" of the matrix 600. Also, the signal from the terminal "0" of the matrix 600 is passed through the "or" gate 618 to the core matrix loading circuit 634. In response to this first instruction, therefore, the core buffer 58 is placed in its leading mode. The clock pulses from the card being processed in the card handling unit activate the core buffer driver circuits 630, 632 so that its cores are successively activated, and the data from the first channel of that card is serially read through the driver circuit 636 into the core buffer.

At the terminal of the reading of the first channel of the card, an appropriate instruction from the processor 56 may then be introduced to the control register 60 to cause an output signal to appear at the terminal 1 (not shown) of the matrix 600. This latter output signal causes the information from the second channel on the card being processed to be fed into the core matrix 624 in the described manner. In this way, by successive instructions introduced to the control register 60 from the processor 56, one or all of the channels of the card being processed may be read successively into the core buffer 58. This card may be circulating on the drum 14 of the card handling unit 10 of FIGURE 1 in which case the heads 40 are selected, as mentioned; or it may be circulating on the drum 18, in which case the heads 42 will be selected by means of an appropriate instruction from the processor which causes the matrix 600 to produce an output signal at the "B" terminal.

At the termination of the processing of the particular card in the card handling unit 10 of FIGURE 1, and in the manner described above, the information derived from that card is stored in the core buffer 58. At this time, further cards may be similarly processed, and the information from such further cards may also be stored in the core buffer 58. It will be appreciated that the activation of the driver circuits 630 and 632 by each group of clock pulses causes a different group of cores in the core matrix to be activated, so that information can be continuously loaded into the core buffer until all its cores have reached a loaded condition.

Now, should it be desired to unload the contents of the core buffer 58 into the processor 56, the processor introduces an appropriate instruction to the control register 60 so that its output terminal 33 is activated. This activates the unloading circuit 638, and it also conditions the "and" gate 650 for conduction. This permits the contents of the core buffer 58 to be loaded into the data processor by way of the terminal P4. The activation of the terminal 17 of the matrix 600 also conditions the "and" gate 614 for conduction, so that the clock pulses from the processor are passed to the driver circuits 630 and 632. These latter clock pulses continue as long as the particular instruction remains in the control register 60, and this is controlled to establish the required interval to read the desired data out of the core matrix 624 and into the data processor 56.

On the other hand, when it is desired to introduce data from the processor 56 to a particular card being processed in the card handling unit 10 of FIGURE 1, an appropriate instruction is introduced to the control register 60 to activate one of the terminals 18–32 of the matrix 600. The activation of these terminals produces a corresponding writing of information on a selected channel of the card circulating on the drum 14 of FIGURE 1.

When the terminal 17 of the matrix 600 is activated, for example, the "and" gates 614 and 616 are conditioned for translation, and the loading circuit 634 is activated. This permits the clock pulses introduced to the input terminal P2 from the processor 56 to activate the driver circuits 630 and 632, and it also permits data signals from the processor 56 to pass through the "and" gate 616 from the input terminal P3 to the driver circuit 636. Therefore, as long as the instruction exists, information is loaded from the processor into the core buffer 58.

Now should an instruction be received by the control register 60 such that the output terminal 18 of the matrix 600 is activated, the core matrix unloading circuit 638 is activated, and the "and" gate 642 is conditioned for conduction. Also, the "and" gate 657 is conditioned for conduction so that the clock pulses from the card circulating on the drum 14 may activate the driver circuits 630 and 632 of the core buffer 58 as the card passes the write heads 44. This then permits information from the core buffer 58 to be written into the first column of the card as it passes the write heads 44. In like manner, subsequent instructions from the processor 56 may cause the output terminals 19–32 of the matrix 600 to be successively activated, and this will cause information from the core buffer 58 to be written into other columns on the card.

In the manner described, therefore, the system of FIGURE 11 is controllable by the processor 56 to cause information to be read from the cards processed by the card handling unit 10 and introduced to the processor 56; or, conversely, to cause information from the processor to be written on the cards processed by the card handling unit.

Different components may be included in a data processor to function as the data processor 56 of FIGURE 1. These components are shown in FIGURE 12. The data processor, as described above, sends instructions and data words to the various buffers and other assemblies associated with the mechanical handling unit 10 of FIGURE 1. The instructions are in the form of numbers which are sent to the plugboard control register 54 (MUR) associated wtih the plugboard 52, and to the buffer control register 60, as described above. These numbers are utilized by the plugboard register 54 and by the circuitry, as described above, and the resulting controls are used to initiate the different operations which the system is capable of carrying out. The data (or processor) words, on the other hand, are sent to the buffer 58 to be recorded on the cards in the described manner, or data words may be received from the buffer 58 as a result of the reading of the cards, as also described.

It will be evident as the description proceeds, that other known types of data processors and computers may be used. The data processor of FIGURE 12 may be a special purpose, internally programmed, digital computer. The computer to be described uses a magnetic drum assembly to serve as a main memory for the computer, and also to provide circulating loops for various registers included in the computer.

A plurality of suitable input units may be coupled to the data processor. These may include a numeric keyboard 706, an alphanumeric keyboard 708, a numeric low speed reader 710, an alphanumeric low speed reader 712, a numeric high speed reader 714 and an alphanumeric high speed reader 716. These units may have any known construction, and various types are presently available commercially. The data processor may also be coupled to suitable output units, such as a numeric typer, or punch, 718; and to an alphanumeric typer, or punch, 720. These latter units are also well known and are available commercially.

The input units are used, as is well known, to introduce new data into the data processor, and the output units are used to receive data from the data processor. The data processor includes a register (MQ) which (as will be described in detail) is used for multiplication operations, and this register is also used for input and output operations. For that reason, the input and output units are coupled to the (MQ) register.

The magnetic drum memory assembly is represented in FIGURE 12 by a block 704. The information used by the computer is stored on the memory drum in a plurality of two-track channels. The memory may include, for example, a plurality of permanent storage channels, and it may also contain additional channels for providing circulating loops for a plurality of ten-word registers which will be described. The magnetic memory drum may also include additional channels for providing circulating loops for a plurality of one-word registers which, as will be described, are used in the multiply and divide orders and for quick access storage. In addition, the magnetic memory drum is also used to provide circulating loops for a one-word accumulator register (A) and for a one-word instruction register (COM). These registers, as will be described in more detail subsequently, are all of the circulating type, and they circulate information stored in them through the allocated channels on the magnetic drum.

The data processor of FIGURE 12 also includes, for example, a group of 4 ten-word registers which are designated as 6100, 6200, 6300 and 6400 respectively. These ten-word registers, as indicated above, are also of the circulating type; and each of the registers uses a channel on the magnetic drum 704 to serve as its circulating loop.

The processor 56 also includes a multiplier-divisor (MR) register and a multiplicant-quotient (MQ) register, the later having been referred to previously. The multiplier is stored in the (MR) register during a multiplication operation, and the multiplicand is stored in the (MQ) register during that operation. During a division operation, the divisor is stored in the (MR) register and the quotient is stored in the (MQ) register. The accumulator register (A) and its associated logic circuitry, operates on or modifies data being transferred into or out of the magnetic drum memory.

The data processor 56 also includes a pair of static registers, one of which is termed the operation (OPR) register, and the other of which is termed the channel address (CHR) register. The instruction register (COM), the operation register (OPR), the channel address regsiter (CHR) and the logic circuitry associated with these registers, all serve to control the operation of the data processor. These components and circuits set up the necessary micro-program steps for the execution of each operation in the mechanism. The sequence of the commands to be executed, and of the words to be operated on, are also under the control of these registers.

Figure 13:
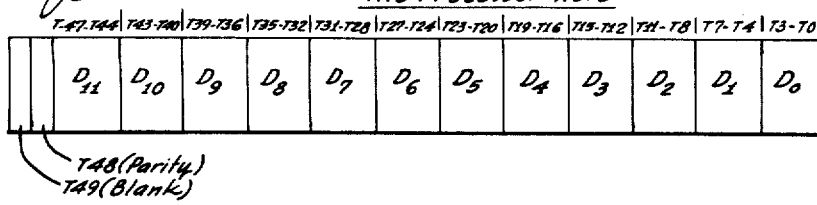
FIGURE 13 is a diagrammatic representation of the composition of a "processor" word as used to constitute operands in the data processor of FIGURE 12.

A typical processor data word is shown in FIGURE 13. The "T's" define the bit positions within the word. The least significant bit is designated T0. The processor word, as illustrated is fifty bits in length. The first forty-eight bits (T0–T47) contain information; the forty-ninth bit (T48) of every word is the parity bit, and the fiftieth bit (T49) is blank.

Data may be carried within the computer in "excess-three" coded decimals. The following bit positions of a word define decimal digits. The bit positions T4–T7 correspond to a decimal digit D1; . . . . . . . . ., and the bit positions T44–T47 correspond to decimal digit D11. If a data word is to pass through the processor adder circuits, then the location of the decimal digits within the word must conform to these bit positions.

Figure 14:
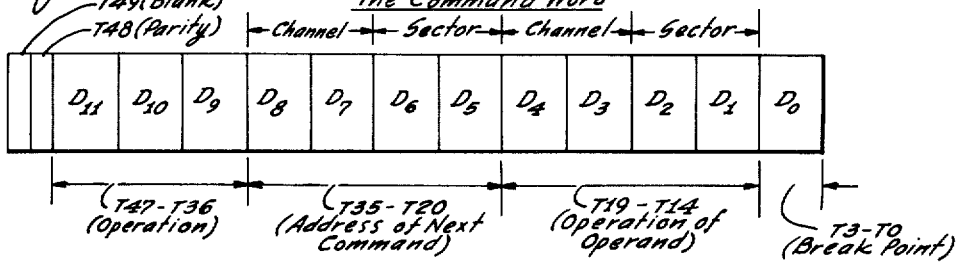
FIGURE 14 is a diagrammate representation of the composition of the individual command words as used in the data processor of FIGURE 12.

The command word utilized in the data processor is illustrated in FIGURE 14. The instruction may be stored within the command word in "excess three" coded decimal form. The first decimal digit (D0) of the command word determines if the command will operate as a break point. Each command within the processor is capable of performing break. That is, if a "break point" switch on the console is "on," then those instructions which are designated as break points will halt the program immediately after their execution. An instruction is designated as a break point by placing a decimal 1 in the least significant digit of the computer word holding the instruction. If an instruction is not to be used as a break point, then a decimal 0 should be placed in this digit position. After a break point halt, the program may be continued by depressing the "start" button of the processor.

The next four decimal digits, D1–D4, of the command word hold the operand address. The digits D1 and D2 store the sector location of the operand on the magnetic drum, and the digits D3 and D4 store the magnetic drum channel location of the operand. These digits are positioned in the T4–T19 bit positions, and the digit D0 is positioned in the T0–T3 bit positions.

The four decimal digits D5–D8 hold the memory address of the next command. These digits are placed in the T20–T35 bit positions in the word. The magnetic drum sector location of the next command is stored in the D5 and D6 digits, and the magnetic drum channel location of the next command is stored in the D7 and D8 digits. The three digits D9, D10 and D11, which are stored in the T36–T47 bit positions, represent the operation to be performed. As in all the machine words, the T48 bit position is the parity bit, and the T49 bit position is blank.

Figure 15:
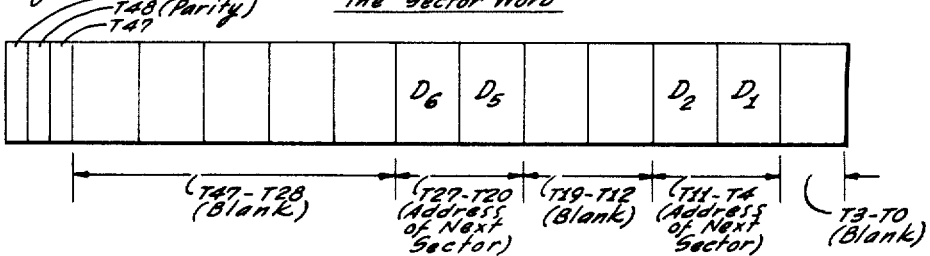
FIGURE 15 is a diagrammatic representation of the composition of a sector word as used in the data processor of FIGURE 12 to identify sectors on a magnetic memory drum which is included in the data processor.

The magnetic memory drum assembly 704 includes a two-track sector address channel, and a plurality of sector words are stored in each of those tracks. One of the sector address tracks stores signals corresponding to sectors 00–49, and the other stores signals corresponding to sectors 50–99. The composition of the sector words recorded in these tracks is as shown in FIGURE 15. The sector number for the next sector to appear is stored in the same place in the sector word as within the command word. That is, the digits D5 and D6 of the sector word are positioned at T27–T20 bit positions to indicate the next sector to appear. These bit positions correspond to the sector address of the next command in the command word. This permits a comparison of the sector words and the command word to determine the sector address of the next command. Likewise, the decimal digits D1 and D2 in the sector word also contain the sector number for the next sector to appear, and these latter digits correspond to the operand sector address digits D1 and D2 in the command word. This permits a comparison between the operand sector address digits in a command word being executed, and the same digits in successive sector words to determine the sector address of a desired operand.

The numbers in the sector word are also "excess three" coded decimal digits. The remaining bit positions in the sector word are blank, with the exception of the parity bit (T48) and the (T47) bit position. In transfers between the memory 704 and the 10-word registers 6100, 6200, 6300 and 6400, it is necessary to indicate every tenth sector of the drum. This is accomplished by placing a bit in the T47 bit position of the sectors 00, 10, 20, 30 and 40 in the first sector track.

Figure 16:
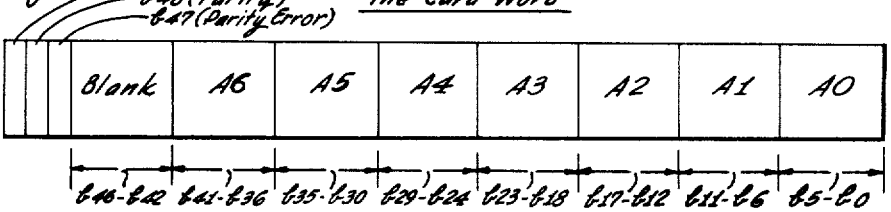
FIGURE 16 is a diagrammatic representation of the composition of an information storage card word pertaining to data recorded on the individual storage cards.

As described in conjunction with FIGURE 2, each channel of the information storage card represents five words of 50 characters each. The composition of such a word is shown in FIGURE 16. The information storage card word, as illustrated, includes seven alphanumeric characters. The following bit positions define the alphanumeric characters of the card word:

$b0$–$b5$ corresponds to alphanumeric digit A0
$b6$–$b11$ corresponds to alphanumeric digit A1
$b36$–$b41$ corresponds to alphanumeric digit A6

The character A6 is the most significant character in the word. The bit positions $b42$–$b46$ are blank. The parity bit appears in the $b48$ position. A binary "one" in the $b47$ digit position indicates that the word has a parity error.

The following tables set out the symbols which will be used in the ensuing description of the data processor of FIGURE 12.

*Group A.—General data flip-flops*

Figure 17:
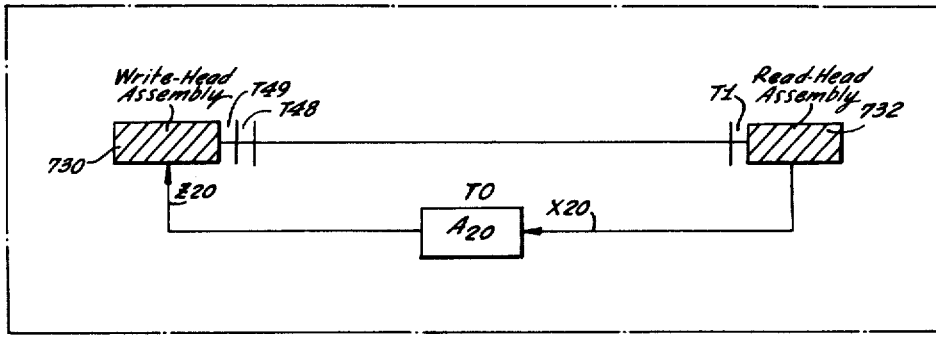
FIGURE 17 shows schematically certain components which are included in an instruction register of the data processor of FIGURE 12.
Figure 18:
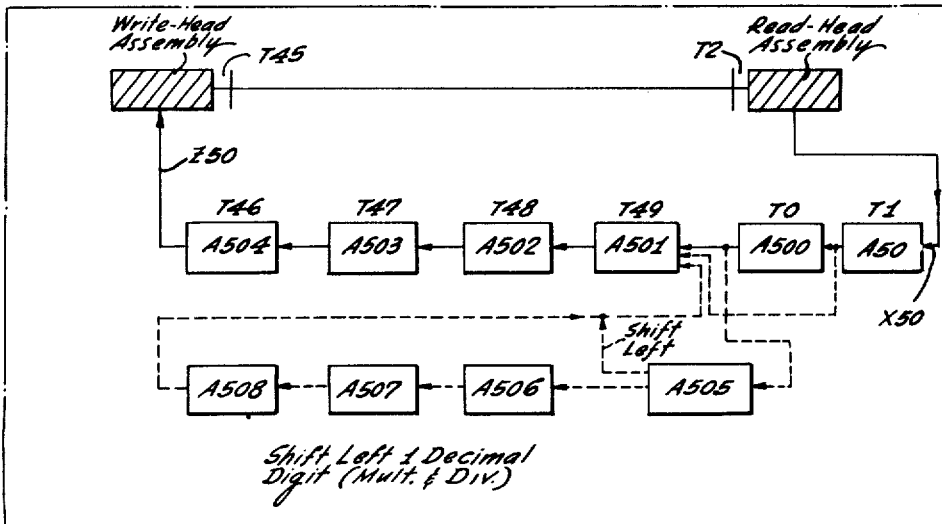
FIGURE 18 shows schematically certain components included in an accumulator register of the data process of FIGURE 12.

A20  Instruction register (COM) output (FIGURE 17)
A36–A47  Operation register (OPR) (FIGURE 23)
A50  Accumulator register—output to memory (FIGURE 18)
A61  Ten-word register 6100—output to memory (FIGURE 21)
A62  Ten-word register 6200—output to memory (FIGURE 21)
A63  Ten-word register 6300—output to memory (FIGURE 21)
A64  Ten-word register 6400— output to memory (FIGURE 21)
A70  MQ register—output (FIGURE 19)
A71  MR register—output (FIGURE 20)
A100  Drum memory—output
A500  Accumulator register—output (FIGURE 18)
A501–A504  Accumulator register—buffer (FIGURE 18)
A505–A508  Accumulator register—extension for digits shift left (FIGURE 18)

Figure 21:
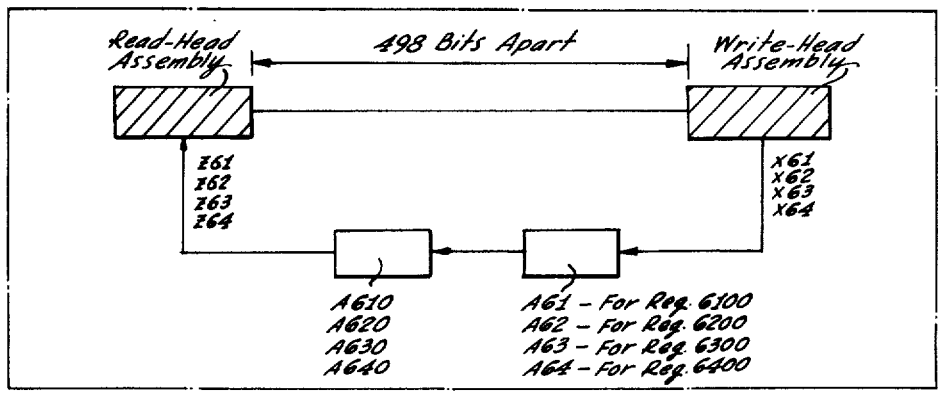
FIGURE 21 is a schematic representation of certain components of each of a plurality of ten-word registers which are included in the processor.

A610  Ten-word register 6100—output
A620  Ten-word register 6200—output
A630  Ten-word register 6300—output
A640  Ten-word register 6400—output
(FIGURE 21)

A700–A705  Buffer—(MQ) register (FIGURE 19)
A706  Input character parity bit (FIGURE 19)
A710–A713  Buffer—(MR) register (FIGURE 20)
A800–A842  Input-output buffer control register 60 (FIGURE 11) for information storage cards
A850–A855  Plugboard control register 54 (MUR) (FIGURE 1)
A856  Plugboard control register 54 (FIGURE 1)— Parity bit

*Group B.—Counting flip-flops*

B11  Track Selector—Channel selection register 724 (FIGURE 22)
B12–B19  Channel selection register 724 (FIGURE 22)
B30–B31  Command cycle counter (FIGURE 24)
B40–B42  Execution cycle counter (FIGURE 24)
B50–B55  Timing counter (FIGURE 25)
B80–B85  Timing counter (FIGURE 26) for buffer 58 (FIGURE 11)

*Group C.—Read-write clock pulses*

C1  Occurs at logic clock time
C1A  Occurs at $C_1$+one-half a bit time

*Group E.—Adder flip-flops*

E1 First adder carry
E2 Adder correction control
E3 Second adder carry

*Group F.—Operation signals*

(Derived by the decimal digit configuration of operation register (OPR) (FIGURE 11)

F000 Input numeric keyboard
F010 Input alphanumeric keyboard
F001 Input numeric low speed reader
F011 Input alphanumeric low speed reader
F002 Input numeric high speed reader
F012 Input alphanumeric high speed reader
F110 Halt
F183 Input information storage card to buffer 58 (FIGURE 11)
F210 Shift right
F220 Shift left
F230 Extract numeric
F405 Output numeric
F415 Output alphanumeric
F505 Enter
F516 Block transfer [memory—register 6100]
F526 Block transfer [memory—register 6200]
F536 Block transfer [memory—register 6300]
F546 Block transfer [memory—register 6400]
F555 Store address
F577 Output to MUR (mechanical unit control register 54 (FIGURE 1)
F589 Buffer store
F599 Block transfer [memory—buffer 58 (FIGURE 11)]
F615 Add decimal
F616 Block add decimal
F625 Add binary
F626 Block add binary
F635 Subtract decimal
F636 Block subtract decimal
F645 Subtract binary
F646 Block subtract binary
F650 Multiply
F670 Divide
F715 Compare equal
F716 Block compare equal
F725 Compare less
F726 Block compare less
F735 Compare greater
F736 Block compare greater
F745 Compare zero
F815 Add logically
F816 Block add logically
F825 Extract
F905 Memory store
F906 Block store
F916 Block transfer (register 6100—memory)
F926 Block transfer (register 6200—memory)
F936 Block transfer (register 6300—memory)
F946 Block transfer (register 6400—memory)
F999 Block transfer (buffer 58—FIGURE 11—memory)
F0XX–F9XX Order register 722—MSD decode
FX0X–FX9X Order register 722—second digit decode
FXX0–FXX9 Order register 722—LSD decode

*Group G.—Count signals*

G111 Track selector count
G112 Channel address register LSD count
G116 Channel address register MSD count
G130 Command cycle count
G140 Execution cycle count
G170 (MQ) register buffer count
G180 Core buffer timing count

*Group H.—Cycle timing signals*

(H0–H3—Command cycle)

H0 ($\overline{B30}.\overline{B31}$)—Halt period
H1 ($\overline{B30}.B31$)—Command look-up period
H2 ($B30.\overline{B31}$)—Command read-in period
H3 ($B30.B31$)—Operations execution period (H30–H37—Operation execution cycle)

H30 ($\overline{B40}.\overline{B41}.\overline{B42}$)—Exit set period
H31 ($\overline{B40}.\overline{B41}.B42$)—Input period
H32 ($\overline{B40}.B41.\overline{B42}$)—Operand look-up period
H33 ($\overline{B40}.B41.B42$)—Execution period
H34 ($B40.\overline{B41}.\overline{B42}$)—Augment period
H35 ($B40.\overline{B41}.B42$)—Control set period
H36 ($B40.B41.\overline{B42}$)—Output period
H37 ($B40.B41.B42$)—Exit period

*Group K.—Timing signals and flip-flops*

K1 Logic clock pulses
K2 Word marker bit
K3 Origin marker bit
K4 Sector 00–49 identification
K5 Sector 50–99 identification
K6 Numeric extract shift timing

*Group L.—Control flip-flops*

L1 General purpose control
L2 Exit
L4 General purpose control
L5 Sectors (00–49)—compare
L6 Branch control
L7 Sectors (50–99)—compare
L8 General purpose control
L9 General purpose control
L10 Halt
L11 General purpose control
L12 Sector compare for operand address
L13 Sector compare for next command address
L14 High speed operation control
L21 Single step control
L30 Input device start-stop
L31 Selects typer output
L32 Selects low speed punch output
L33 Selects high speed punch output
L50 Output timing control
L51 Output timing control
L80 Core buffer 58 off-line input control
L81 Core buffer 58 off-line output control
L82 Core buffer timing counter control
L83 Core buffer general purpose control
L84 Core buffer general purpose control
L100 Input timing control
L101 Input timing control
L102 Input timing control
L401 Lockout—Plugboard control register (MUR)
L402 Rapid advance control
L403 Rapid advance control

*Group P.—Bit positions within a decimal digit*

P0 First bit position in a decimal digit
P1 Second bit position in a decimal digit
P2 Third bit position in a decimal digit
P3 Fourth bit position in a decimal digit

*Group Q.—General data signals*

Q0 Accumulator (A) main input
Q2 Accumulator (A) input for numeric extract shift
Q4 Accumulator (A) input for left shift
Q7 Sector compares
Q47 Operation register (OPR) input
Q70 Input to (MQ) register output F/F A70
Q71 Input to (MR) register output F/F A71
Q80 Buffer 58 "load" synchronizing pulse

Group Q.—Continued

Q81 Buffer 58 "unload" synchronizing pulse
Q82 Buffer 58 full
Q84 Buffer 58 empty
Q86 Buffer 58 clear
Q87 Parity error—storage card
Q88 Parity error—core buffer
Q90 Start of scan—information storage card
Q91 End of scan—information storage card
Q92 Timing mark—information storage card
Q92 Record code
Q94 Code record complete
Q95 Rapid advance complete
Q119 Input to channel address register (CHR)
Q210 Output of first adder
Q211 Output of second adder
Q212 Input to first adder
Q215 Adder decimal correction
Q221 Accumulator contents unequal to compared memory contents
Q225 Output of selected memory cell
Q265 Memory sector 00–49 non-compare
Q266 Memory sector 50–99 non-compare
Q270 Contents of MQ buffer equals 9
Q271 Contents of MQ buffer equals tab character
Q273 Contents of MQ buffer equals stop character
Q275 Contents of MQ buffer equals acceptable character
Q277 Contents of MQ buffer equals EC, AC or ST characters
Q290 Contents of MQ buffer equals $k$, $l$ or $m$
Q291 Contents of MQ buffer equals $a$, $b$ or $c$
Q292 Contents of MQ buffer equals K, L or M
Q293 Contents of MQ buffer equals A, B or C
Q500 Input to accumulator flip-flop A500
Q610 Input to ten-word register 6100
Q620 Input to ten-word register 6200
Q630 Input to ten-word register 6300
Q640 Input to ten-word register 6400
Q700 Alphanumeric serial input to MQ buffer
Q702 Numeric serial input to MQ buffer
Q710 Input to MR buffer flip-flop A710
Q850 Serial input to core buffer register 60
Q900 Serial output from core buffer 58

R channel address register (CHR) decode $R_{x0}$–$R_{x9}$ Channel address register LSD—decode
$R_{0x}$–$R_{9x}$ Channel address register MSD—decode

RD relay drivers

RD1 Keyboard input control relay driver
RD2 Low speed reader input control relay driver
RD3 High speed reader input control relay driver
RD4 Low speed reader start relay driver
RD5 Low speed reader stop relay driver
RD6 Typer output control relay driver
RD7 Output device No. 1 control relay driver
RD8 Output device No. 2 control relay driver
RD9 Halt relay driver
RD20 Output device feed or clutch magnet drive
RD21 Output device bit one magnet driver
RD22 Output device bit 2 magnet driver
RD23 Output device bit 3 magnet driver
RD24 Output device bit 4 magnet driver
RD25 Output device bit 5 magnet driver
RD26 Output device bit 6 magnet driver
RD27 Output device bit 7 magnet driver
RD31 Rapid advance relay driver

S—Shift signals

S47 Operation register shift
S119 Channel address register shift
S700 MQ buffer shift
S710 MR buffer shift
S810 Plugboard control register (MUR) right shift
S841 Plugboard control register (MUR) left shift
S850 Core buffer 58—input-output shift

U—Input-output signals

U0 Data present on input lines
U1 Typer output timing
U2 Typer output timing
U11 High speed punch timing
U12 High speed punch timing
U13 High speed punch timing
U14 High speed punch timing
U20 Input device data strole
U21 Input data bit 1 (MSB)
U22 Input data bit 2
U23 Input data bit 3
U24 Input data bit 4
U25 Input data 5
U26 Input data 6 (LSB)
U27 Input data bit 7 (parity)
U50 Output cycle complete
U60 Select typer output
U61 Select low speed punch output
U62 Select high speed punch output
U71 Output data bit 1 (MSB)
U72 Output data bit 2
U73 Output data bit 3
U74 Output data bit 4
U75 Output data bit 5
U76 Output data bit 6 (LSB)
U77 Output data bit 7 (parity)
U80 Output device operate
U100 Clear MQ buffer for input
U101 Set input data in MQ buffer
U102 Act on input data in MQ buffer
U550 Data to MUR
U800–U842 Bit outputs from storage card sending transducer

X—Output signals from read circuits

X20 Output from command register read circuits
X50 Output from accumulator register read circuits
X61 Output from register 6100 read circuits
X62 Output from register 6200 read circuits
X63 Output from register 6300 read circuits
X64 Output from register 6400 read circuits
X70 Output from MQ register read circuits
X71 Output from MR register read circuits
X80 Output from core buffer 58—bit 1
X81 Output from core buffer 58—bit 2
X82 Output from core buffer 58—bit 3
X83 Output from core buffer 58—bit 4
X84 Output from core buffer 58—bit 5
X85 Output from core buffer 58—bit 6
X86 Output from core buffer 58—bit 7
X100 Output from drum memory read circuits

Y—Memory control signals

Y1 Drum memory write

Z—Input signals to write circuits

Z20 Input to command register write circuits
Z50 Input to accumulator register write circuits
Z61 Input to register 6100 write circuits
Z62 Input to register 6200 write circuits
Z63 Input to register 6300 write circuits
Z64 Input to register 6400 write circuits
Z70 Input to MQ register write circuits
Z71 Input to MR register write circuits
Z80 Input to core buffer 58—bit 1
Z81 Input to core buffer 58—bit 2
Z82 Input to core buffer 58—bit 3
Z83 Input to core buffer 58—bit 4
Z84 Input to core buffer 58—bit 5
Z85 Input to core buffer 58—bit 6
Z86 Input to core buffer 58—bit 7
Z100 Input to memory drum write circuits The instruction register (COM) and its associated components are shown schematically in FIGURE 17. This register includes an electromagnetic write head and associated input circuitry which are represented by the block 730, the write head being coupled to a particular channel on the magnetic drum memory 704. The register also includes an electromagnetic read head and its associated circuitry which are represented by the block 732, the read head also being coupled to the particular channel and spaced 49 bits from the write head.

The schematic representation of the instruction register (COM) in FIGURE 17, and the schematic representations of the other registers in FIGURES 18–21, show the bit positions of the words in the different registers at $t_0$ time in a particular word time. The instruction register (COM) is one word in length (50 bits) and it recirculates through the flip-flop A20. The least significant bit T0 is in the flip-flop A20 at $t_0$ time. As illustrated in FIGURE 16, the output signal from the read head is designated X20, and the input signal to the write head is designated Z20.

The accumulator register (A) and its associated components are illustrated schematically in FIGURE 18. The register (A) includes an electromagnetic write head and its associated circuitry represented by the block 734, the write head being coupled to a selected channel of the magnetic drum memory. The register (A) also includes an electromagnetic read head and its associated circuitry represented by the block 736, the read head being coupled to the same channel of the drum as the write head and spaced 44 bits from the write head.

The accumulator register (A) is one word in length, and it recirculates through the flip-flops A50, A500, A501, A502, A503 and A504. The least significant bit T0 is normally in the flip-flop Q500 at $t_0$ time; and the bit T1 is in the flip-flop A50, the bit T49 is in the flip-flop A501, the bit T48 is in the flip-flop A502, the bit T47 is in the flip-flop A503, and the bit T46 is in the flip-flop A504 at that time.

To shift left one bit in the accumulator register (A), the flip-flop A505 is added to the normal recirculating path of the register. To shift right one bit in the accumulator register, the flip-flop A500 is by-passed. The instructions which require a decimal digit shift left in the accumulator register cause the flip-flops A505, A506, A507 and A508 to be added to the normal recirculating path. To shift right one decimal digit in the accumulator register, the flip-flops A501, A502, A503 and A504, are by-passed. The flip-flops A501, A502, A503 and A504 are also required to provide the four bit delay necessary for the "excess three" adder correction. The output signal from the read head of the accumulator register (A) is designated X50, and the input signal to the write head is designated Z50.

The (MQ) register is illustrated schematically in FIGURE 19. That register includes a write head assembly represented by the block 738, and the assembly includes a write head which is coupled to a particular channel on the magnetic drum memory. An input signal Z70 is introduced to the write head assembly 738. The (MQ) register also includes a read head assembly represented by the block 740, and the latter assembly is coupled to the same channel of the drum as the write head and is spaced 49 bits from the write head assembly 738. The read head assembly 740 produces an output signal X70.

The (MQ) register 716 is one word in length, and it normally recirculates through the flip-flop A70. At $t_0$ time, the least significant bit T0 is in the flip-flop A70. The (MQ) register is used in the input and output instructions for receiving data and other information used during input and output operations of the data processor. To input or output alphanumeric characters, the contents of the (MQ) register is circulated through the flip-flops A700, A701, A702, A703, A704 and A705. To input or output numerics, the register is circulated through the flip-flops A702, A703, A704 and A705. The flip-flops A702–A705 hold the least significant digit of the multiplicand in the multiplier order, and they hold the computed digit of the quotient in the divide order. The (MQ) register holds the multiplican during the multiplier operation as mentioned above; and it holds the quotient in the divide order.

The (MR) register is illustrated schematically in FIGURE 20. This latter register includes a write head and associated circuitry which is designated 742 and which is coupled to a channel on the magnetic drum memory. An input signal Z71 is introduced to the write head assembly. The (MR) register also includes a read head and its associated circuitry, designated as 744, the read head being coupled to the same drum channel as the write head and spaced 44 bits from the write head. The read head assembly produces an output signal X71. The (MR) register is one word in length, and it normally recirculates through the flip-flops A71, A710, A711, A712 and A713. At $t_0$ time, the least significant digit T0 is in the flip-flop A71. To shift right one decimal digit in the (MR) register, the flip-flops A710, A712 and A713 are by-passed. The (MR) register holds the multiplier during the multiply instruction, as noted above, and it holds the divisor during the divide instruction. This register also holds the selected word during the block compare instructions.

The ten-word registers are illustrated schematically in FIGURE 21. Each of these registers includes appropriate read and write heads which are coupled to selected channels on magnetic memory drums, and which for each register are spaced apart by 498 bits. The ten-word registers 6100, 6200, 6300 and 6400 all operate in a similar manner. The register 6100, as an example, recirculates through the flip-flops A61 and A610. These ten-word registers are used to provide more rapid access to any given word, as compared with the main drum memory itself.

The channel address register (CHR) as shown in FIGURE 12 includes the flip-flops B11–B19 referred to above. As each instruction is executed, the address portion of the instruction causes the flip-flops in the channel address register to assume a particular configuration. This configuration, as will be described, corresponds to the address of the operand in the first instance, and it subsequently corresponds to the address of the next instruction. The channel address register is connected to a matrix 750. This matrix is of usual configuration, and it includes a plurality of output terminals. The output signals are produced at the different output terminals of the matrix 750, in correspondence with the different configurations of the channel address register.

The matrix 750 is coupled to the magnetic drum memory assembly 704, and this connection is made over a cable 751 which has a plurality of individual leads respectively connected to a corresponding plurality of output terminals of the matrix 750. Appropriate addresses in the channel address register are made capable of selecting different channels of the magnetic drum by means of the respective connections through the cable 751. As indicated above, each channel on the magnetic drum includes a pair of tracks, and the particular track selector flip-flop B11.

It is also possible for the channel address register to address the other registers in the data processor. For this purpose, appropriate connections are made from selected output terminals of the martix 750 to the accumulator register (A), the (MQ) register, the (MR) register and to each of the ten-word registers 6100, 6200, 6300 and 6400.

The flip-flops B11–B19 in the channel address register (CHR) are set by the channel address decimal digits D7, D8 and D4, D3 of the command word illustrated in FIGURE 14. The resulting outputs from the matrix 750 determine where the next operand or where the next instruction is to be selected. The main memory 704 and the different registers may arbitrarily give the following addresses:

| Element | Output Flip-Flop | Address |
|---|---|---|
| Main memory | A100 | 00-49 |
| Accumulator register (A) | A500 | 50 |
| (MQ) register | A70 | 70 |
| (MR) register | A71 | 71 |
| Register 6100 | A610 | 61 |
| Register 6200 | A620 | 62 |
| Register 6300 | A630 | 63 |
| Register 6400 | A640 | 64 |

Figure 22:
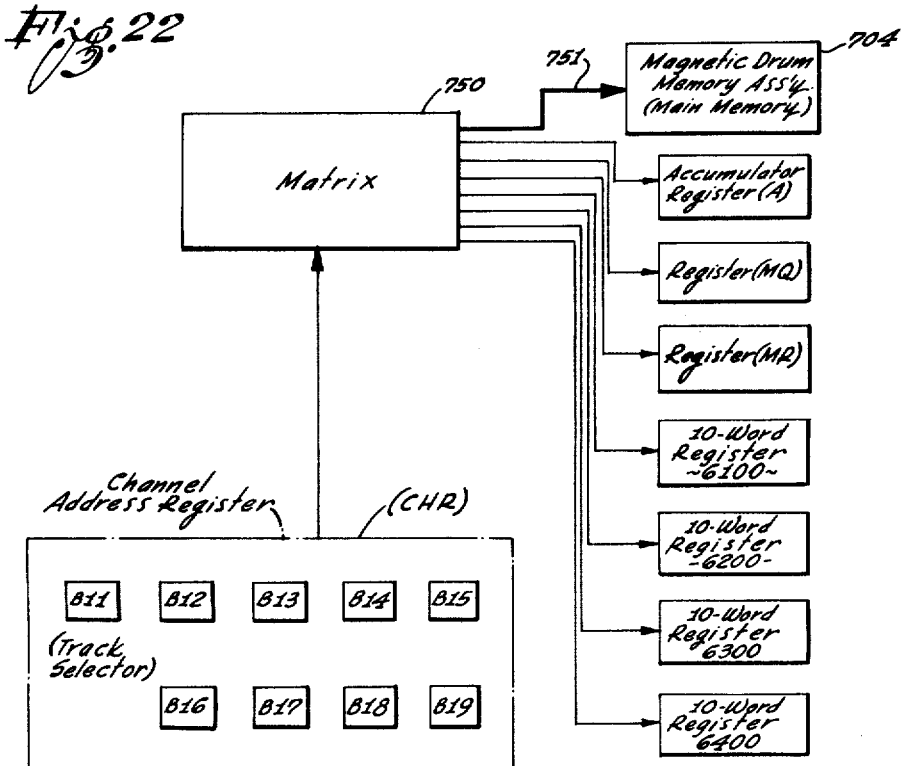
FIGURE 22 is a block diagram of a channel address register which is included in the processor of FIGURE 12, and of a matrix which couples the channel address register to various ones of the other components of the processor.

The above addresses are selectively generated by the matrix 750 under the control of the channel address register (CHR) in accordance with the following code:

RX0 $\overline{B15}.\overline{B14}$
RX1 $\overline{B15}.B14.\overline{B13}.\overline{B12}$
RX2 $\overline{B15}.B14.\overline{B13}.B12$
RX3 $\overline{B15}.B14.B13.\overline{B12}$
RX4 $\overline{B15}.B14.B13.B12$
RX5 $B15.\overline{B14}.\overline{B13}.\overline{B12}$
RX6 $B15.\overline{B14}.\overline{B13}.B12$
RX7 $B15.B14.B13.\overline{B12}$
RX8 $B15.\overline{B14}.B13.B12$
RX9 $B15.B14$
R0X $\overline{B19}.B18$
R1X $\overline{B19}.B18.\overline{B17}.\overline{B16}$
R2X $\overline{B19}.B18.\overline{B17}.B16$
R3X $\overline{B19}.B18.B17.\overline{B16}$
R4X $\overline{B19}.B18.B17.B16$
R5X $B19.\overline{B18}.\overline{B17}.\overline{B16}$
R6X $B19.\overline{B18}.\overline{B17}.B16$
R7X $B19.\overline{B18}.B17.\overline{B16}$
R8X $B19.\overline{B18}.B17.B16$
R9X $B19.B18$ The channel address register (CHR) of FIGURE 22 is two decimal digits plus one bit in length, and this register addresses the channel on the main memory, or addresses the register, where the operand or next command is located, as mentioned above. The flip-flop B11 in the channel address register is used, as noted, to designate which of two tracks in each channel of the main memory is to be selected. The counting ability of the channel address register is used in the input-output instructions and in the shift instructions. The track selector flip-flop B11 is set true for a sector designation of from 0–49 in the sector address portions D6, D5 or D2, D1 of the command word of FIGURE 14; and it is set false by a sector designation of from 50–99 in the above sector address portions of the command word.

It will be observed in the matrix code table set out above, that the flip-flop B19 in the channel address register is false for all main memory addresses (R00–R49), and the flip-flop B19 is true for all the register addresses (R50, R70, R71, R61, R62, R63 and R64).

Therefore, the data signal (Q225) representing data selected from a designated memory cell in the main memory or in a designated one of the registers may be set out as:

Q225 = $A100.\overline{B19} + A500.R50 + A610.R61$
$+ A620.R62 + A630.R63 + A64.R64$
$+ A70.R70 + A71.R71 + \overline{B51}.R99$ where:

A100 is the output flip-flop of the main memory;
A500 is the output flip-flop of the accumulator register (A);
A610 is the output flip-flop of the register 6100;
A620 is the output flip-flop of the register 6200;
A630 is the output flip-flop of the register 6300;
A640 is the output flip-flop of the register 6400;
A70 is the output flip-flop of the register (MQ);
A71 is the output flip-flop of the register (MR);
B51 is a timing flip-flop which causes the channel address register (CHR) to develop count signals during the execution of input-output and shift instructions.

The machine also includes an operation register (OPR) which, as illustrated in FIGURE 23, includes the flip-flops A36–A47. This register is three decimal digits in length, and it is connected to a matrix 760. The matrix 760 may also be a usual diode matrix, and it includes a plurality of output terminals designated F000, F001 ... F999. The matrix 760 develops output signals at its respective output terminals in response to the different configurations of the flip-flops in the order register. Each of the different output signals from the matrix 760 represents a different operation to be performed by the data processor. The flip-flops A36–A47 in the operation register (OPR) are controlled by the operating digits D11, D10 and D9 of the command word of FIGURE 14, and they control the matrix 760 in usual manner.

The data processor also includes four counters. These are a command cycle counter 770, and an operation micro-program execution counter 772, illustrated in FIGURE 24; a timing counter 780 illustrated in FIGURE 25; and a timing counter for the buffer 58, as illustrated in FIGURE 26. The command cycle counter, as shown in FIGURE 24, includes the flip-flops B30 and B31; and the micro-program counter, as also shown in FIGURE 24, includes the flip-flops B40–B42. The timing counter, as shown in FIGURE 25, includes the flip-flops B50–B55; and the buffer timing counter, as shown in FIGURE 26, includes the flip-flops B80–B85.

The timing counter 780 of FIGURE 25 counts the bit times T0–T49 within the machine words, and the counter 782 performs the same function for the card words read into the buffer 58.

The command cycle counter 770 is the micro-program source for the selection of the instructions to be executed. The operation of the micro-program counter is the source of the program steps which carry out the operation defined by the operation register (OPR).

The command cycle counter 770 develops four outputs, as established by the different configurations of the flip-flops B30 and B31. These outputs (as mentioned previously) are:

H0($\overline{B30}.\overline{B31}$)—Halt period
H1($\overline{B30}.B31$)—Command look-up period
H2($B30.\overline{B31}$)—Command read-in period
H3($B30.B31$)—Operation execution period The counter 770, therefore, is first shifted out of the "halt" configuration into the "command look-up" configuration during which a search is made for the next command under the control of the D8–D5 digits of the command word (FIGURE 14), whose execution has just been terminated. When the next command has been found, the counter 770 is shifted to the "command read-in" configuration, during which the next command is read into the instruction register (COM). The counter 770 then shifts to the "operation execution period."

The counter 772 develops eight outputs as established by the different configurations of the flip-flops B40–B42. These output, as previously mentioned, are:

H30—Exit set period
H31—Input period
H32—Operand look-up period
H33—Execution period
H34—Augment period
H35—Control set period
H36—Output period
H37—Exit period This latter counter 772 cannot be operated until the counter 770 is in its H30(B30.B31) configuration. Then, the counter 772 begins to operate and it shifts from the H30 to the H31 configuration during which the channel address register (CHR) is set in accordance with the operand channel address digits D4, D3 of the command word (FIGURE 14) being executed, and the operation register (OPR) is set in accordance with the D9, D10, D11 operation digits of the command.

Then the counter 772 enters its H32 configuration during which a search is made for the operand to be selected from the main memory or from one of the registers in accordance with the D4–D1 digits of the command word of FIGURE 14. When the operand is found, the counter 772 is stepped to its "execution period" (H33) during which the instruction is executed. Some instructions require extra time for execution, and for that purpose the counter 772 is stepped to its "augment period" (H34).

The counter 772 is then stepped to its "control set period" (H35) and then to its "output period" (H36) which permits output numbers to be read out of the machine. Finally, the counter 772 is stepped to its "exit period" (H37) during which the command is exited and the machine is prepared for the next instruction. Then the counter 772 returns to its H30 configuration which returns the counter 770 to its H0 configuration. The data processor is now ready for the next instruction.

As noted above, the machine looks for the next instruction during the H1 configuration of the command cycle counter 770, and it looks for the next operand during the H32 configuration of the counter 772. To address a particular command or operand, the channel position of the command or operand is set by the channel address register (CHR) through the matrix 750 of FIGURE 22. Then the sector digits of the command, or operand, address are compared with the sector words (FIGURE 15) until a successful comparison is made.

For example, during the "command look-up period" (H1), the digits D6, D5 of the command which has just been executed are compared with the corresponding digits of each successive sector word read off the memory drum. Likewise, during the "operand look-up period" (H32), the digits D2, D1 of the command being executed are compared with the corresponding digits of each successive sector word read off the memory drum. When a successful comparison is made in the sectors 00–49, the control flip-flop L51 is set true, and as a successful comparison is made in the sectors 50–99, the control flip-flop L7 is set true.

The operand or next instruction may also be addressed in selected sectors of any selected one of the ten-word registers 6100, 6200, 6300 and 6400, as mentioned above. These latter selections are under the control of the flip-flops L12 and L13. The sectors in the ten-word registers are identified by the digits D5 in the command being executed as compared with the same digits of successive sector words in order to select an addressed instruction; and the sectors are designated by the digits D1 in the command and sector words for an addressed operand.

The flip-flop L7 is set true by the following terms:

$$_1l_7 = T3.H1 + T19.\overline{L6}.H1 + T3.H32$$

The flip-flop L7 is set false by the following terms:

$$_0l_7 = Q265.T20 - 27.\overline{L6}.\overline{L13}.H1 + Q265.T20$$
$$-23.\overline{L6}.L13.H1 + Q265.T4 - 11.L6.\overline{L12}.H1 + Q265.T4$$
$$-7.L6.L12.H1 + Q265.T4 - 11.\overline{L12}.H32$$
$$+Q265.T4 - 7.L12.H32 + T49.H2 + H37$$

The flip-flop L5 is set true by the term:

$$_1l_5 = T3.H1 + T19.\overline{L6}.H1 + T3.H32$$

The flip-flop L5 is set false by the term:

$$_0l_5 = Q266.T20 - 27.\overline{L6}.\overline{L13}.H1 + Q266.T20$$
$$-23.\overline{L6}.L13.H1 + Q266.T4 - 11.L6.\overline{L12}.H1$$
$$+Q266.T4 - 7.L6.L12.H + Q266.T4 - 11.\overline{L12}.H32$$
$$+Q266.T4 - 7.L12.H32 + T49.H2 + H38$$

The flip-flop L12 is set true by the term $$_1l_{12} = Q225.T19.H2$$

where Q225 is the output from the selected memory cell of the selector. The flip-flop L12 is set false by the term $_0l_{12} = T0.H2$. The flip-flop L13 is set true by the term $_1l_{13} = Q225.T35.H2$. The flip-flop L13 is set false by the term $_0l_{13} = T0.H2$.

It will be noted that when the flip-flop L12 is set true, the comparison in the 0–49 sectors is directed to a selected register rather than to the main memory; and when the flip-flop L13 is set true, the comparison in the 50–99 sectors is directed to a selected register rather than to the main memory. It will be remembered that any command exhibiting a "1" at the most significant bit position (T35) of the "next command address" portion or at the most significant digit position (T19) of the "operand address" portion as long as it is being read into the instruction register (COM) at the H2., means that the selection of the next command or operand is to be from one of the registers 6100, 6200, 6300 or 6400, rather than from the main memory. This is effectuated by causing that digit in either instance to trigger the flip-flop L12 or the flip-flop L13 true.

An unsuccessful comparison in the 00–49 sectors is represented by the term Q265, and an unsuccessful comparison in the 50–99 sectors is represented by the term Q266. These terms are derived as follows:

$$Q265 = K4.\overline{A20} + \overline{K4}.A20$$
$$Q266 = K5.\overline{A20} + \overline{K5}.A20$$

where:

K4 is a sector 00–49 identification signal (FIGURE 15)
K5 is a sector 50–99 identification signal (FIGURE 15)
A20 is the output flip-flop of the instruction register (COM).

The successful comparison signal Q7 is derived therefore from the following equation: $Q7 = L5 + L7$.

An input is read into the channel address register (CHR) as noted above, from the instruction register (COM) at H1 time and at H32 time. This input to the channel address register is represented by the term $$Q119 = A20.H1 + A20 + H32$$

The data processor is capable of carrying out the following operations and instructions:

(A) INPUT OPERATIONS

The input instructions to the machine specify:
(1) The input device to be used;
(2) Numeric or alphanumeric coding;
(3) Starting location for storage;
(4) Next instruction address;
(5) Breakpoint.

The first two items are determined by the operation digits D11–D9 of the instruction.

*F000—Input numeric keyboard 706 (FIGURE 12)*

This command calls for the introduction of input information from the keyboard 706 (FIGURE 12) into the (MQ) register for introduction into the memory at successive memory locations beginning with the memory location *m*. Words containing 12 numeric digits continue to be loaded until a control character from the keyboard terminates the instruction.

The data is input serially, character by character, from the keyboard 706. The most significant character of a word is entered first. Each character is filled into the buffer (A702–A705) of the (MQ) register (FIGURE 19), and each digit is then gated into the four least significant bit positions in the register. Then, the contents of the (MQ) register are shifted to the left one digit position, as each new digit is input into the buffer.

The parity of each character is fixed as it is input into the machine. The parity of each individual character is not gated to the (MQ) register. A parity bit is generated for the entire 48 bit word contained in the (MQ) register, after each character is input.

After the input of the last character of a word, followed by a "Tab," the contents of the (MQ) register are transferred to the accumulator register (A), and the (MQ) register is cleared to decimal 0's. At the same time a search is made for the operand address, and the word in the accumulator is then stored in the memory location $m$ designated by that address. The operand address is then augmented by one for the next word location.

The input digits appear in the last significant part of the processor word. The remaining digits (when the input word is less than 12 digits) are four bit decimal 0's.

The instruction is completed when the EC, AC or ST signal is sent. At the termination of the instruction, the contents of the instruction register are sent to the accumulator register. This word is the original instruction word, with the operand address modified to read the address plus one of the final word filled.

The numeric input-output code may be as follows:

| Typed or Punched Character | Input Code | | | | | | | Processor Code | | | | Coding Symbol |
|---|---|---|---|---|---|---|---|---|---|---|---|---|
| | P | 1 | 2 | 3 | 4 | 5 | 6 | | | | | |
| A | 1 | 0 | 1 | 0 | 1 | 0 | 0 | 0 | 0 | 0 | 0 | a |
| B | 0 | 0 | 1 | 0 | 1 | 0 | 1 | 0 | 0 | 0 | 1 | b |
| C | 0 | 0 | 1 | 0 | 1 | 1 | 0 | 0 | 0 | 1 | 0 | c |
| 0 | 1 | 0 | 1 | 0 | 0 | 1 | 1 | 0 | 0 | 1 | 1 | 0 |
| 1 | 0 | 0 | 0 | 0 | 1 | 0 | 0 | 0 | 1 | 0 | 0 | 1 |
| 2 | 1 | 0 | 0 | 0 | 1 | 0 | 1 | 0 | 1 | 0 | 1 | 2 |
| 3 | 1 | 0 | 0 | 0 | 1 | 1 | 0 | 0 | 1 | 1 | 0 | 3 |
| 4 | 0 | 0 | 0 | 0 | 1 | 1 | 1 | 0 | 1 | 1 | 1 | 4 |
| 5 | 0 | 0 | 0 | 1 | 0 | 0 | 0 | 1 | 0 | 0 | 0 | 5 |
| 6 | 1 | 0 | 0 | 1 | 0 | 0 | 1 | 1 | 0 | 0 | 1 | 6 |
| 7 | 1 | 0 | 0 | 1 | 0 | 1 | 0 | 1 | 0 | 1 | 0 | 7 |
| 8 | 0 | 0 | 0 | 1 | 0 | 1 | 1 | 1 | 0 | 1 | 1 | 8 |
| 9 | 1 | 0 | 0 | 1 | 1 | 0 | 0 | 1 | 1 | 0 | 0 | 9 |
| K | 0 | 1 | 1 | 0 | 1 | 0 | 1 | 1 | 1 | 0 | 1 | k |
| L | 0 | 1 | 1 | 0 | 1 | 1 | 0 | 1 | 1 | 1 | 0 | l |
| M | 1 | 1 | 1 | 0 | 1 | 1 | 1 | 1 | 1 | 1 | 1 | m |

The following characters, as mentioned above, may be used to control the input-output operations:

Tab (1100001)—Indicates the end of a word, and causes the contents of the (MQ) register to be transferred to the accumulator register (A), and then to the memory location indicated by the instruction register. After transfer, the (MQ) register is cleared to decimal 0's, and the "put-away" adder is increased by 1.

End of code (EC)—Indicates the end of a data sequence, and terminates the input instruction. The address of the next memory cell to be filled is transferred to the accumulator register (A).

Automatic code (AC)—Indicates the end of a data sequence, and acts the same as the EC term, but also turns on a special AC indicator flip-flop.

Stop code (ST) (1011110)—Indicates the end of a data sequence and acts the same as (EC), but also turns on a stop indicator flip-flop.

*F001—Input numeric low speed reader 710 (FIGURE 12)*

This operation is the same as F00; except that the information here is read from a punched paper tape by the low speed reader. The instruction starts the reader and the terminating control character causes the reader to stop.

*F010—Input alphanumeric keyboard 708 (FIGURE 12)*

This operation is similar in function to F00. Information is input in the form of 6-bit alphanumeric characters. Words containing up to eight alphanumeric characters are input until the instruction is terminated by a control character from the keyboard 708.

*F011—Input alphanumeric tape reader 712 (FIGURE 12)*

The operation is similar to F010 except that 6-bit alphanumeric characters are input.

*F002—Input numeric high speed reader 714 (FIGURE 12)*

The operation is similar to F001, except that the tape is read by a high speed punched paper tape reader, for example, a Ferranti TR–5. The high speed reader has fast start-stop characteristics, and it reads at a rate of 330 characters per second. The instruction starts the reader, and the reader is stopped automatically by the control character punched in the tape at the end of a set of data.

*F012—Input alphanumeric high speed reader 716 (FIGURE 12)*

The operation is the same as F002 except that 6-bit alphanumeric characters are input.

Appropriate logic circuitry for carrying out the input operations described above is illustrated in FIGURES 27a–27m.

The circuitry of FIGURE 27a is used to form the execution cycle count signal G140 for the input operations. It will be remembered that this signal is used to step the execution counter from one configuration to the next as the particular instruction is being executed.

The logic circuitry of FIGURE 27a includes a cathode follower CF1 of any usual construction. The output terminal of the cathode follower is connected to an output terminal at which the term G140 is formed. An "or" gate 1000 is connected to the input terminal of the cathode follower CF1. The "or" gate 1000, and the "or" gates to be referred to subsequently, are well known to the digital computer art. As noted, these gates provide an output term when any one of their input terms is true.

A plurality of "and" gates 1002, 1004, 1006, 1008 and 1010 are connected to respective input terminals of the "or" gate 1000. "And" gates, likewise, are well known to the electronic digital computer art. The "and" gates produce an output term only when all the input terms introduced to the respective input terminals are true. The terms H35, H36 and H37 are also respectively introduced to the "or" gate 1000. These terms, together with other terms to be referred to subsequently, have all been set forth and defined previously herein.

The terms H30 and $\overline{L11}$ are introduced to the "and" gate 1002. The term H31 is applied to the "and" gate 1004, and an "or" gate 1012 is connected to that "and" gate. The terms L1 and L4 are applied to the "or" gate 1012, and an "and" gate 1014 is connected to the "or" gate 1012. The terms $\overline{L1}$ and L8 are introduced to the "and" gate 1014.

The term H32 is introduced to the "and" gate 1006, and an "or" gate 1016 is connected to that "and" gate. A pair of "and" gates 1018 and 1020 are connected to the "or" gate 1016. The terms $\overline{L1}$ and T49 are applied to the "and" gate 1018. The terms L1, Q7 and T48 are applied to the "and" gate 1020.

The term H33 is introduced to the "and" gate 1008, and an "or" gate 1022 is connected to that "and" gate. A pair of "and" gates 1024 and 1026 are connected to the "or" gate 1022. The terms $\overline{L1}$ and T49 are applied to the "and" gate 1024. The terms L1 and T48 are applied to the "and" gate 1026.

The terms L11 and T49 are introduced to an "and" gate 1028. This "and" gate is connected to an "or" gate 1030, and the term $\overline{L11}$ is also introduced to that "or" gate. The "or" gate 1030 is connected to the "and"

gate 1010, and the term H34 is also introduced to that "and" gate.

Figure 27C:
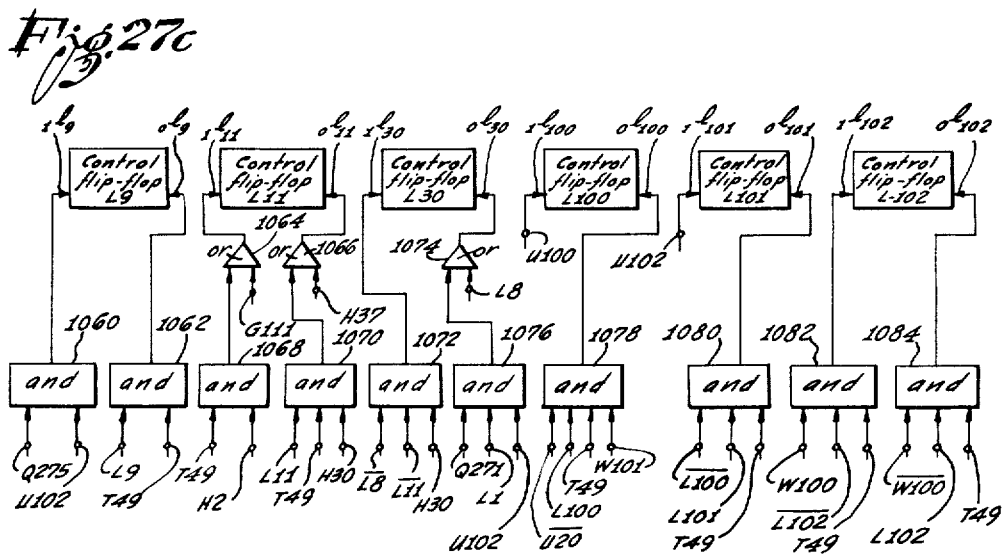

A plurality of control flip-flops L1, L2, L3, L4 and L8 are shown in FIGURE 27b, together with the logic input circuitry which is used for actuating those flip-flops during the input operations. The control flip-flops, and the further control flip-flops shown in FIGURE 27c serve to produce the "L" terms referred to above and which will be referred to subsequently.

An "or" gate 1032 is connected to the true input terminal of the control flip-flop L1, and an "or" gate 1034 is connected to the false input terminal of that flip-flop. Flip-flops are also well known to the electronic digital computer art. These are bi-stable networks which are capable of being set to a true state or to a false state. The flip-flops to be described herein may be set to a true state by the introduction of a trigger signal to its true input terminal, and such a flip-flop may be set to its false state by the introduction of a trigger signal to its false output terminal. These flip-flops also have a true output terminal and a false output terminal, and they produce a true term at the true output terminal when the flip-flop is true and a true term at the false output terminal when the flip-flop is false.

An "and" gate 1036 is connected to the "or" gate 1032, and the term H0 is also introduced to the "or" gate. The terms $\overline{L1}$, L4 and H30 are introduced to the "and" gate 1036. A plurality of "and" gates 1038, 1040 and 1042 are connected to the "or" gate 1034. The terms $\overline{L4}$ and H37 are introduced to the "and" gate 1038. The terms L1, L4 and H30 are introduced to the "and" gate 1040. The terms T48 and H2 are introduced to the "and" gate 1042.

An "and" gate 1044 is connected to the true input terminal of the control flip-flop L2. The terms $\overline{L1}$, $\overline{L4}$ and H35 are all introduced to the "and" gate 1044. The term H37 is applied to the false input terminal of the control flip-flop L2. An "and" gate 1046 is connected to the true input terminal of the control flip-flop L3, and an "and" gate 1048 is connected to the false input terminal of that flip-flop. The terms Q273 and U102 are introduced to the "and" gate 1046. The terms T49 and H2 are introduced to the "and" gate 1048.

An "and" gate 1050 is connected to the true input terminal of the control flip-flop L4, and an "and" gate 1052 is connected to the false input terminal of that flip-flop. The terms Q271 and U102 are introduced to the "and" gate 1050. The terms $\overline{L1}$, L4 and H30 are introduced to the "and" gate 1052. An "and" gate 1054 is connected to the true input terminal of the control flip-flop L8, and an "and" gate 1056 is connected to the false input terminal of that flip flop. The terms $\overline{L1}$, $\overline{L4}$ and H35 are introduced to the "and" gate 1056. The terms Q277 and U102 are introduced to the "and" gate 1054.

As mentioned above, a further group of control flip-flops, and the input logic circuitry associated with respective ones of that group, are illustrated in FIGURE 27c. This latter group includes the control flip-flops L9, L11, L30, L100, L101 and L102.

A pair of "and" gates 1060 and 1062 are connected respectively to the true input terminal and to the false input terminal of the control flip-flop L9. The terms Q275 and U102 are introduced to the "and" gate 1060. The terms L9 and T49 are introduced to the "and" gate 1062.

An "or" gate 1064 is connected to the true input terminal of the control flip-flop L11, and an "or" gate 1066 is connected to the false input terminal of that flip-flop. An "and" gate 1068 is connected to the "or" gate 1064, and an "and" gate 1070 is connected to the "or" gate 1066. The terms T49 and H2 are applied to the "and" gate 1068, and the term G111 is applied to the "or" gate 1064. The term H37 is applied to the "or" gate 1066; and the terms L11, T49 and H30 are applied to the "and" gate 1070.

An "and" gate 1072 is connected to the true input terminal of the flip-flop L30, and an "or" gate 1074 is connected to the false input terminal of that flip-flop. The terms $\overline{L8}$, $\overline{L11}$ and H30 are introduced to the "and" gate 1072. An "and" gate 1076 is connected to the "or" gate 1074, and the term L8 is introduced to that "or" gate. The terms Q271, L1 and U102 are introduced to the "and" gate 1076.

The term U100 is applied to the true input terminal of the control flip-flop L100, and an "and" gate 1078 is connected to the false input terminal of that flip-flop. The terms $\overline{U20}$, L100, T49 and $\overline{W101}$ are introduced to the "and" gate 1078. The term U102 is applied to the true input terminal of the control flip-flop L101, and an "and" gate 1080 is connected to the false input terminal of that flip-flop. The terms $\overline{L100}$, L101 and T49 are applied to the "and" gate 1080. An "and" gate 1082 is connected to the false input terminal of the control flip-flop L102, and an "and" gate 1084 is connected to the false input terminal of that flip-flop. The terms W100, $\overline{L102}$ and T49 are introduced to the "and" gate 1082. The terms $\overline{W100}$, L102 and T49 are applied to the "and" gate 1084.

Figure 27D:
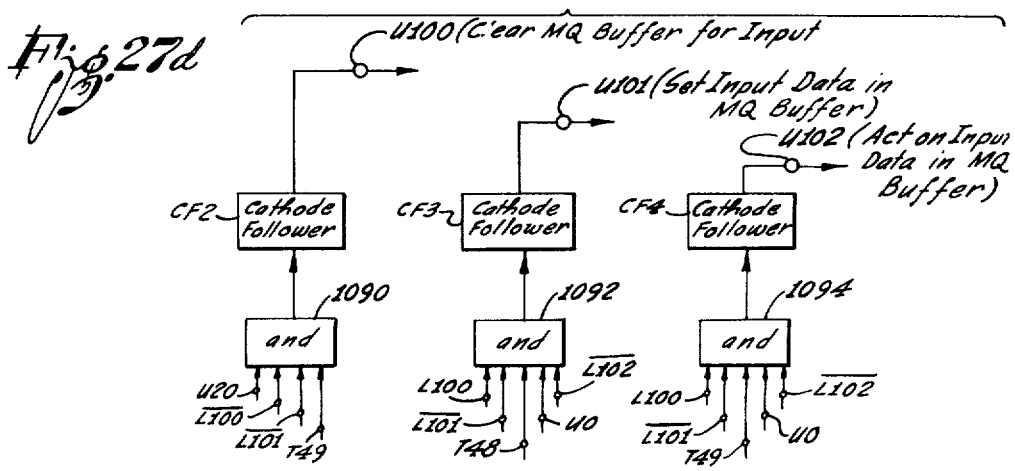

The controls for the MQ buffer are shown in FIGURE 27d. These controls include a group of three cathode followers CF2, CF3 and CF4. The cathode follower CF2 develops the term U100 at its output terminal which serves to clear the MQ buffer for input. The cathode follower CF3 develops the term U101 at its output terminal which serves to send input data in the MQ buffer. The cathode follower CF4 develops the term U102 which serves to act on input data in the MQ buffer.

An "and" gate 1090 is connected to the cathode follower CF2. The terms U20, $\overline{L100}$, $\overline{L101}$ and T49 are introduced to the "and" gate 1090. The "and" gate 1092 is connected to the cathode follower CF3. The terms L100, $\overline{L101}$, T48, U0 and $\overline{L102}$ are all applied to the "and" gate 1092. An "and" gate 1094 is connected to the cathode follower CF4. The terms L100, $\overline{L101}$, T49, U0 and $\overline{L102}$ are all introduced to the "and" gate 1094.

Figure 27E:
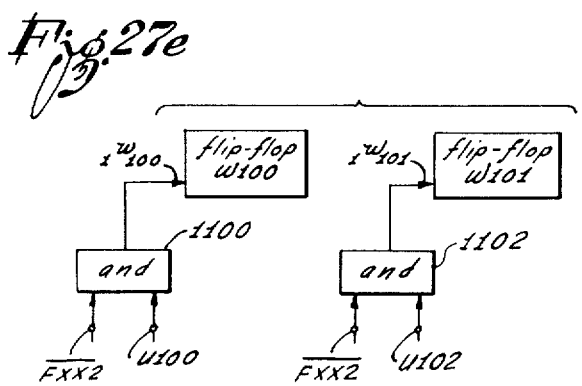

The W100 and W101 terms are formed by the logic circuitry of FIGURE 27e. This circuitry includes a pair of flip-flops W100 and W101. These flip-flops are triggered false by any appropriate signal at the end of the execution of each command. In the presence of the input commands, other than the high speed reader instructions F002 and F012, the terms U100 and U102 are able to trigger the respective flip-flops true. To accomplish the above operations, an "and" gate 1100 is connected to the true input terminal of the flip-flop W100, and an "and" gate 1102 is connected to the true input terminal of the flip-flop W101. The term $\overline{FXX2}$ and the term U100 are introduced to the "and" gate 1100. The term $\overline{FXX2}$ and U102 are introduced to the "and" gate 1102.

The main input Q0 to the accumulator register A is formed by a cathode follower CF5. The input ($\overline{Z50}$) to the write circuits of the accumulator register A is formed by a cathode follower CF6. The input (Z100) to the write circuits of the memory drum is formed by a cathode follower CF7. The write control signal for the drum memory (Y1) is formed by a cathode follower CF8. These cathode followers, together with the logic circuitry associated with them, are shown in FIGURE 27f.

An "or" gate 1104 is connected to the cathode follower CF5. A plurality of "and" gates 1106, 1108, 1110 and 1112 are connected to the "or" gate 1104. The terms A70, $\overline{L1}$, L4 and H33 are introduced to the "and" gate 1106. The terms A500, L1 and H33 are introduced to the "and" gate 1108. The terms A500, $\overline{L4}$ and H33 are introduced to the "and" gate 1110. The terms A20, L1 and H2 are introduced to the "and" gate L112.

An "and" gate 1114 is connected to the input terminal of the cathode folower CF6. A term A504 is applied to the "and" gate 1114, and an "or" gate 1116 is connected to that "and" gate. The terms H33 and H34 are introduced to the "or" gate 1116. The term A50 is introduced to the cathode follower CF7. An "and" gate 1118 is connected to the cathode follower CF8. The terms L1, $\overline{B19}$ and H33 are introduced to the "and" gate 1118.

The input (Z70) to the MQ register write circuits is formed by the cathode follower CF9 in FIGURE 27g. An "or" gate 1120 is connected to the input terminal of the cathode follower CF9. A plurality of "and" gates 1122, 1124, 1126, 1128, 1130 and 1132 are connected to the "or" gate 1120. An "or" gate 1134 is connected to the "and" gate 1122. The terms A70, $\overline{L9}$ and H33 are applied to the "and" gate 1122. The terms L1 and $\overline{L4}$ are applied to the "or" gate 1134.

The terms A705, L9 and $\overline{T48}$ are applied to the "and" gate 1124. The terms $\overline{E70}$, T48 and L9 are applied to the "and" gate 1126. The terms $\overline{B51}$, $\overline{L1}$, L4 and H33 are applied to the "and" gate 1128. The terms A70, $\overline{L9}$, $\overline{L1}$ and $\overline{H33}$ are applied to the "and" gate 1130. The terms $\overline{B51}$, L11 and H30 are applied to the and" gate 1132.

The input (Z20) to the instruction register write circuits is formed by a cathode follower CF10 in FIGURE 27h. An "or" gate 1134 is connected to the input terminal of that cathode follower. A plurality of "and" gates 1136, 1138, 1140, 1142, 1144, 1146, 1148, 1150, 1152 are connected to the "or" gate 1134. The term T49 is also introduced to that "or" gate.

The terms K4, $\overline{B11}$, T4–T11, L1 and H33 are applied to the "and" gate 1136. The terms K5, B11, T4–T11, L1 and H33 are applied to the "and" gate 1138. The terms A20, $\overline{T4-T11}$, $\overline{T48}$ and H33 are applied to the "and" gate 1140. An "or" gate 1154 is connected to the "and" gate 1142. The terms $\overline{E20}$, L1 and T48 are introduced to the "and" gate 1142. The terms H33 and H34 are applied to the "or" gate 1154.

The terms A20, $\overline{L1}$, T48 and H33 are all applied to the "and" gate 1144. The terms B11, T12–T19 and H34 are applied to the "and" gate 1146. The terms K4, $\overline{B11}$, T8–T11, and H34 are introduced to the "and" gate 1148. The terms K5, B11, T8–T11 and H34 are applied to the "and" gate 1150. The terms A20, $\overline{T8-T19}$, $\overline{T48}$ and H34 are introduced to the "and" gate 1152.

The track selector count signal G111 is formed by the cathode follower CF11 in FIGURE 27i. An "and" gate 1156 is connected to the cathode follower CF11. The terms A20, L1, H33 and $\overline{B19}$ are applied to the "and" gate 1156.

The inputs to the write circuits of the registers 6100, 6200, 6300 and 6400 are formed respectively by the cathode followers CF12, CF13, CF14 and CF15 in FIGURE 27j. These inputs are designated Z61, Z62, Z63 and Z64 respectively, as described above.

An "or" gate 1160 is connected to the cathode follower CF12. A pair of "and" gates 1162 and 1164 are connected to the "or" gate 1160. An "or" gate 1166 is connected to the "and" gate 1164. The terms A500, R61, L1 and H33 are introduced to the "and" gate 1162. The terms A610 and H33 are introduced to the "and" gate 1164. The terms $\overline{R61}$ and $\overline{L1}$ are introduced to the "or" gate 1166.

An "or" gate 1168 is connected to the input terminal of the cathode follower CF13. A pair of "and" gates 1170 and 1172 are connected to the "or" gate 1168. The terms A500, R62, L1 and H33 are introduced to the "and" gate 1170. An "or" gate 1174 is connected to the "and" gate 1172. The terms $\overline{R62}$ and $\overline{L1}$ are applied to the "or" gate 1174. The terms A620 and H33 are applied to the "and" gate 1172.

An "or" gate 1176 is connected to the cathode follower CF14. A pair of "and" gates 1178 and 1180 are connected to the "or" gate 1176. An "or" gate 1182 is connected to the "and" gate 1180. The terms A500, R63, L1 and H33 are introduced to the "and" gate 1178. The terms A636 and H33 are introduced to the "and" gate 1180.

An "or" gate 1184 is connected to the cathode follower CF15. A pair of "and" gates 1186 and 1188 are connected to the "or" gate 1184. An "or" network 1190 is connected to the "and" gate 1188. A pair of terms $\overline{R64}$ and $\overline{L1}$ are introduced to the "or" network 1190. A pair of terms A640 and H33 are introduced to the "and" gate 1188. The terms A50, R64, L1 and H33 are introduced to the "and" gate 1186.

The signals associated with the channel address register (CHR) are formed by the cathode followers CF16 and CF17 in FIGURE 27k. The cathode follower CF16 forms the term Q119 which is the input to the channel address register. The cathode follower CF17 forms the term S119 which is the channel address register shift signal. An "and" gate 1200 is connected to the cathode follower CF16, and an "and" gate 1202 is connected to the cathode follower CF17. The terms B11 and H34 are applied to the "and" gate 1200. The terms H34 and T11–T19 are applied to the "and" gate 1202.

The signals associated with the MQ buffer are formed in the circuit of FIGURE 27l. A cathode follower CF18 forms the term Q271 which indicates that the "tab" character is in the MQ buffer. The cathode follower CF20 forms the term Q273 which indicates that the "stop" character is in the MQ buffer. The cathode follower CF20 forms the term Q275 which indicates that an acceptable character is in the MQ buffer. The cathode follower CF21 forms the term Q277 which indicates that the "EC," "AC" or "ST" characters are in the MQ buffer.

An "and" gate 1204 is connected to the cathode follower CF18, and an "and" gate 1206 is connected to the cathode follower CF19. The terms A700, $\overline{A701}$, $\overline{A702}$, $\overline{A703}$, $\overline{A704}$ and A705 are introduced to the "and" gate 1204. The terms $\overline{A700}$, A701, $\overline{A702}$, $\overline{A703}$, $\overline{A704}$ and A705 are introduced to the "and" gate 1206.

An "and" gate 1208 is connected to the cathode follower CF20. An "or" gate 1210 is connected to the "and" gate 1208. A plurality of "and" networks 1212, 1214, 1216, 1218, 1220 and 1222 are connected to the "or" network 1210. The terms $\overline{A702}$ and A703 are introduced to the "and" gate 1212. The terms A702 and $\overline{A703}$ are introduced to the "and" gate 1214. The terms $\overline{A702}$ and A704 are introduced to the "and" gate 1216. The terms A702 and $\overline{A704}$ are introduced to the "and" gate 1218. The terms $\overline{A703}$ and A704 are introduced to the "and" gate 1220. The terms A703 and $\overline{A704}$ are introduced to the "and" gate 1222.

An "or" gate 1224 is connected to the cathode follower CF21. An "and" gate 1226 is connected to the "or" gate 1224, and the term Q273 is introduced to that "or" gate. The terms A701, $\overline{A702}$, $\overline{A703}$, $\overline{A704}$ and A705 are all introduced to the "and" gate 1226. The indication (Q290) that the letters k, l or m are in the MQ buffer is formed by the cathode follower CF22 in FIGURE 27m. The indication (Q291) that the letters a, b or c are in the MQ buffer is formed by the cathode follower CF23 in FIGURE 27m. Likewise, the indication (Q292) that the letters K, L or M are in the MQ buffer is formed by the cathode follower CF22. The indication (Q293) that the letters A, B or C are in the MQ buffer is formed by the cathode follower CF25.

An "and" gate 1230 is connected to the cathode follower CF22, and an "or" gate 1232 is connected to the "and" gate 1230. The terms A702 and A703 are applied to the "and" gate 1230. The terms A704 and A705 are applied to the "or" gate 1232. An "and" gate 1234 is connected to the cathode follower CF23. The terms $\overline{A702}$ and $\overline{A703}$ are introduced to the "and" gate 1234. An "or" gate 1236 is connected to the "and" gate 1234. The terms $\overline{A704}$ and $\overline{A705}$ are introduced to the "or" gate 1236.

An "and" gate 1238 is connected to the cathode follower CF24, and an "or" gate 1240 is connected to the "and" gate. The terms A700, $\overline{A701}$, $\overline{A702}$ and A703 are introduced to the "and" gate 1238. The terms A704 and A705 are introduced to the "or" gate 1240. The terms $\overline{A704}$ and $\overline{A705}$ are applied to an "or" gate 1242. This "or" gate is connected to an "and" gate 1244 which, in turn, is connected to the cathode follower CF25. The terms $\overline{A700}$, A701, $\overline{A702}$ and A703 are also introduced to the "and" gate 1244.

The logic equations for the input operations are as follows, the terms having previously been defined.

*Input-high speed, low speed and keyboard (F0XX)*

$G140 = H30.\overline{L11} + H31(L4+L1+\overline{L1}.L8) + H32(\overline{L1}.T49 + L1.Q7.T48) + H33(\overline{L1}.T49+L1.T48) + H34(\overline{L11}+L11.T49) + H35+H36+H37$ $_1l_1 = \overline{L1}.L4.H30 + H0$
$_0l_1 = \overline{L4}.H37 + L1.L4.H30 + T48.H2$
$_1l_2 = \overline{L1}.\overline{L4}.H35$
$_0l_2 = H37$
$_1l_3 = Q273.U102$
$_0l_3 = T49.H2$
$_1l_4 = Q271.U102$
$_0l_4 = \overline{L1}.L4.H30$
$_1l_8 = Q277.U102$
$_0l_8 = \overline{L1}.\overline{L4}.H35$
$_1l_9 = Q275.U102$
$_0l_9 = L9.T49$
$_1l_{11} = T49.H2 + G111$
$_0l_{11} = L11.T49.H30 + H37$
$_1l_{100} = U100$
$_0l_{100} = \overline{U20}.L100.T49.\overline{W101}$
$_1l_{101} = U102$
$_0l_{101} = \overline{L100}.L101.T49$
$_1l_{102} = W100.\overline{L102}.T49$
$_0l_{102} = \overline{W100}.L102.T49$
$U100 = U20.\overline{L100}.\overline{L101}.T49$
$U101 = L100.\overline{L101}.T48.U0.\overline{L102}$
$U102 = L100.\overline{L101}.T49.U0.\overline{L102}$
$1W100 = \overline{FXX2}.U100$
$1W101 = \overline{FXX2}.U102$
$_1l_{30} = \overline{L8}.\overline{L11}.H30$
$_1l_{30} = L8 + Q271.L1.U102$
$Q0 = A70.\overline{L1}.L4.H33 + A500.L1.H33 + A500.\overline{L4}.H33 + A20.L1.H2$
$Z50 = A504(H33+H34)$
$Z100 = A50$
$Y1 = L1.\overline{B19}.H33$
$Z70 = A70.\overline{L9}(L1+\overline{L4})H33 + A705.L9.\overline{T48} + \overline{E70}.T48.L9 + \overline{B51}.\overline{L1}.L4.H33 + A70.\overline{L9}.\overline{L11}.\overline{H33} + \overline{B51}.L11.H30+T49$
$Z20 = K4.\overline{B11}.T4 - T11.L1.H33 + K5.B11.T4 - T11.L1.H33 + A20.\overline{T4} - T11.\overline{T48}.H33 + \overline{E20}.L1.T48(H33+H34) + A20.\overline{L1}.T48.H33 + B11.T12 - T19.H34 + K4.\overline{B11}.T8 - T11.H34 + K5.B11.T8 - T11.H34 + A20.\overline{T8} - \overline{T19}.\overline{T48}.H34 + T49$
$G111 = A30.L1.H33.\overline{B19}$
$Z61 = A500.R61.L1.H33 + A610(\overline{R61}+\overline{L1})H33$
$Z62 = A500.R62.L1.H33 + A620(\overline{R62}+\overline{L1})H33$
$Z63 = A500.R63.L1.H33 + A630(\overline{R63}+\overline{L1})H33$
$Z64 = A500.R64.L1.H33 + A640(\overline{R64}+\overline{L1})H33$
$Q710 = A500.R71.L1.H33 + A71(\overline{R71}+\overline{L1})H33$
$Z71 = A713$
$S119 = T11 - T19.H34$
$Q119 = B11.H34$
$Q271 = A700.\overline{A701}.\overline{A702}.\overline{A703}.\overline{A704}.A705$
$Q273 = \overline{A700}.A701.\overline{A702}.\overline{A703}.\overline{A704}.A705$
$Q275 = \overline{A702}.A703 + A702.\overline{A703} + \overline{A702}.A704 + A702.\overline{A704} + \overline{A703}.A704 + A703.\overline{A704}$
$Q277 = A701.\overline{A702}.\overline{A703}.\overline{A704}.A705 + Q273$
$Q290 = A702.A703(A704+A705)$
$Q291 = \overline{A702}.\overline{A703}(\overline{A704}+\overline{A705})$
$Q292 = A700.\overline{A701}.\overline{A702}.A703(A704+A705)$
$Q293 = \overline{A700}.A701.\overline{A702}.A703(\overline{A704}+\overline{A705})$ (B) OFF-LINE OPERATIONS

*F110—Halt*

Under this instruction the program is stopped and an indicator light on the console is illuminated. The operand address portion of the instruction has no meaning. However, if the start button on the console is pressed after this "halt" instruction has been obeyed, the next instruction will come from the next instruction address specified by this instruction, unless the instruction register has been manually changed or cleared.

The logic control system required to carry out the "halt" instruction is illustrated in FIGURE 28. The illustrated system includes the control flip-flop L10. An "or" gate 1250 is connected to the true input terminal of the control flip-flop L10. The terms H3 and Vc are introduced to the "or" gate 1250. A pair of "and" gates 1252 and 1254 are also connected to the "or" gate 1250. The terms Q225, T2 and Vbp are introduced to the "and" gate 1252. The terms Vsc, H30 and Vc are introduced to the "and" gate 1254.

The false output terminal $\overline{L10}$ of the control flip-flop L10 is connected to an "and" gate 1256. The terms L21 and H0 are also introduced to the "and" gate 1256. The "and" gate 1256 is connected to an "or" gate 1258, as is a term H3. The output terminal of the "or" gate 1258 is connected to a cathode follower CF26. The output terminal of the cathode follower develops the command cycle count signal G130. This signal, as described above, is used to trigger the command cycle counter from one configuration to the next.

The "halt" instruction can be represented by the following logic equations:

$_1l_{10} = H3 + Q225.T2.Vbp.H2 + Vsc.H30 + Vc$
$_0l_{10} = Ve.Ho$
$G130 = H0.\overline{L10}.L21 + H3$

*F183—Input the information storage card data*

This instruction requires that the code field of the information storage card being processed in the mechanical card handling unit be input into the core buffer 58. This instruction initiates the off-line input operation if the buffer is ready to accept input information. The instruction will cause the machine to wait for access to the buffer if the buffer is in use.

The 42-bits of the card word (FIGURE 16) may be loaded into the buffer 58 in seven groups, or characters, of 6-bits each, for example. An eighth character of 6-bits follows each word as a parity error identification marker. If the card word is found to have correct parity, the eighth character will be coded as "tab." If the word is in error, the eighth character will be coded as CR. The parity of the words on the card is checked as each word is shifted out of the storage card input-output register 705. The result of the check determines the coding of the eighth character.

A parity bit is generated for each character of the word as it is loaded into the core buffer 58. Each 6-bit character is therefore represented by 7-bits in the buffer.

These parity bits are checked then lost when data is transferred out of the buffer.

A timing pulse from the read head processing the information storage card then causes a word of the code from the card to be transferred in parallel to the storage card input-output register 705 of FIGURE 12. The input is terminated when a word containing a "Q" tag followed by a period (.) is read. If there is no such word, then an "end of scan" signal from the read head processing the information storage card terminates the action.

The logic system required for carrying out the input information storage card data instruction is set out in FIGURE 29. The logic control system of FIGURE 29 includes an "and" gate 1260, and the command cycle count signal G130 is formed at the output terminal of that "and" gate. The control flip-flop L80 has its true output terminal connected to the "and" gate 1260, and the term H30 is also introduced to that "and" gate. An "and" gate 1262 is connected to the true input terminal of the control flip-flop L80, and an "or" gate 1264 is connected to the false input terminal of that flip-flop. A pair of "and" gates 1266 and 1268 are connected to the "or" gate 1264. The terms H3, $\overline{L81}$ and $\overline{W800}$ are applied to the "and" gate 1262. The terms L84 and T849 are applied to the "and" gate 1266. The terms Q91 and L83 are applied to the "and" gate 1268.

The term L83 referred to above is derived from the true output terminal of the control flip-flop L83. An "and" gate 1270 is connected to the true input terminal of that flip-flop, and an "and" gate 1272 is connected to the false input terminal of the flip-flop. A pair of terms L80 and Q90 are introduced to the "and" gate 1270. A pair of terms L84 and T849 are applied to the "and" gate 1272.

The logic control system of FIGURE 29 includes a cathode follower CF27. This cathode follower develops at its output terminal the count signal G180 for controlling the core buffer 58 of FIGURE 1. The control flip-flop L82 has its true output terminal connected to the cathode follower CF27. An "and" gate 1274 is connected to the true input terminal of the flip-flop L72, and the term T849 is introduced to the false input terminal of the flip-flop. The terms L83, L80 and Q92 are applied to the "and" gate 1274.

The input-output shift signal S850 for the core buffer 58 is developed by a cathode follower CF28. An "and" gate 1276 is connected to the input terminal of the cathode follower. The control flip-flop L82 has its true output terminal connected to the "and" gate 1276, and the control flip-flop L80 has its true output terminal connected to that "and" gate.

The following logic equations are applicable to this input operation:

$$G130 = H30.L80$$
$$_1l_{80} = H3.\overline{L81}.\overline{W800}$$
$$_0l_{80} = L83.Q91 + L84.T849$$
$$_1l_{82} = L83.Q92.L80$$
$$_0l_{82} = T849$$
$$_1l_{83} = L80.Q90$$
$$_0l_{83} = L80.Q91 + L84.T849$$
$$G180 = L82$$
$$S850 = L80.L82$$
$$Q80 = (T806 + T812 + T818 + T824 + T830 + T836 + T842 + T848)L80$$

*Extract shift and store operations*

*F210: Shift right.*—This instruction directs that the contents of the accumulator register (A) be shifted to the right. The number of bits to be shifted is determined by the channel number in the operand address portion of the instruction. If "n" equals the number of bits to be shifted, then the channel number should be 100−n. The operand sector is chosen for minimum access from the location of the instruction. The n-bits shifted off the right end of the accumulator register (A) are lost. As the bits are shifted, binary 0's are shifted into the left bit-by-bit. The following logic equations apply:

$$G140 = L2.H30.L21 + H31.L21 + T49.H32.L21$$
$$+ R99.G111.H33 + T2.H34 + H35.L21$$
$$+ H36.L21 + H37$$
$$_1l_2 = H30$$
$$_0l_2 = H37$$
$$Q0 = A50.\overline{T47}.H33$$
$$Z50 = A504.\overline{T2}(H33 + H34) + \overline{E51}.T2(H33 + H34) + T3$$
$$G111 = T49.H33$$

*F220: Shift left.*—This instruction directs that the contents of the accumulator register (A) be shifted to the left. The instruction is similar to the shift right instruction F210 above. The n-bits shifted off the left end of the accumulator register (A) are lost as the bits are shifted, and binary 0's are shifted to the right end bit-by-bit. The following logic equations apply:

$$G140 = L2.H30.L21 + H31.L21 + T49.H32.L21$$
$$+ R99.G111.H33 + T2.H34 + H35.L21$$
$$+ H36.L21 + H37$$
$$G111 = T49.H33$$
$$_1l_2 = H30$$
$$_0l_2 = H37$$
$$Q_0 = A505.H33$$
$$Z50 = A504.\overline{T2}(H33 + H34) + T2.\overline{E51}(H33 + H34) + T3$$
$$Q4 = A500.H33.\overline{T49} + B51.\overline{H33}$$

The logic control systems appropriate for carrying out the shift right and shift left instructions are illustrated in FIGURES 30a–30e. The execution cycle count signal G140 for these instructions is formed by a cathode follower CF29 in FIGURE 30a. An "or" gate 1280 is connected to the cathode follower CF29. The term H37 is introduced to the "or" gate 1280. A plurality of "and" gates 1282, 1284, 1286, 1288, 1290, 1292 and 1294 are connected to the "or" gate 1280. The control flip-flop L2 has its true output terminal connected to the "and" gate 1282. The term H30 is introduced to the true input terminal of the flip-flop L2, and the term H37 is introduced to the false input terminal of that flip-flop.

The terms H30 and L21 are applied to the "and" gate 1282. The terms H31 and L21 are applied to the "and" gate 1284. The terms T49, H32 and L21 are applied to the "and" gate 1286. The terms R99, G111 and H33 are applied to the "and" gate 1288. The terms T2 and H34 are applied to the "and" gate 1290. The terms H35 and L21 are applied to the "and" gate 1292. The terms H36 and L21 are applied to the "and" gate 1294.

The main input Q0 to the accumulator register (A) for the shift right or shift left commands is formed by a cathode follower CF30 in FIGURE 30b. An "and" gate 1296 is connected to the cathode follower CF30. The terms T50, $\overline{T47}$ and H33 are introduced to the "and" gate 1296.

The input Z50 to the write circuits of the accumulator register (A) for the shift instructions is formed by a cathode follower CF31 in FIGURE 30c. An "or" gate 1298 is connected to the cathode follower CF31. The term T37 is introduced to the "or" gate 1298, and a pair of "and" gates 1300 and 1302 are connected to that "or" gate. An "or" gate 1304 is connected to the "and" gate 1300, and an "or" gate 1306 is connected to the "and" gate 1302. A pair of terms H33 and H34 are introduced to the "or" gate 1304, and the same terms are introduced to the "or" gate 1306. The terms A504 and $\overline{T2}$ are introduced to the "and" gate 1300. The terms $\overline{E51}$ and T2 are applied to the "and" gate 1302.

The track selector count signal G111 for the shift instructions is formed by the cathode follower CF32 in FIGURE 30d. An "and" gate 1308 is connected to the cathode follower CF32. A pair of terms T49 and H33 are introduced to the "and" gate 1308.

The input Q4 to the accumulator register (A) for the left shift instruction only is formed by a cathode follower CF33 in FIGURE 30e. An "or" gate 1310 is connected to the cathode follower CF33, and a pair of "and" gates 1312 and 1314 are connected to the "or" gate. The terms A500, H33 and $\overline{T49}$ are introduced to the "and" gate 1312. The terms B51 and $\overline{H33}$ are introduced to the "and" gate 1314.

F230—Extract numerics

This instruction calls for the extraction of the numeric data from the data in the accumulator register (A). The operation assumes that there are eight alphanumeric characters located in the accumulator. The operation condenses the eight alphanumeric characters into eight numeric digits, leaving them in the least significant part of the accumulator register. The most significant digits become binary 0's.

Suitable logic for carrying out the extract numerics instruction is shown in FIGURE 31a. A cathode follower CF34 in FIGURE 31a forms the execution count signal G140. An "or" gate 1316 is connected to the cathode follower CF34. A plurality of "and" gates 1318, 1320, 1322, 1324, 1326, 1328 and 1330 are connected to the "or" gate 1316. The term H37 is also introduced to the "or" gate 1316.

The control flip-flop L8 has its true output terminal connected to the "and" gates 1322 and 1324. An "or" gate 1332 is connected to the true input terminal of the control flip-flop L8. A pair of "and" gates 1334 and 1336 are connected to the "or" gate 1332. The terms K4, T46 and H32 are applied to the "and" gate 1334. The terms K4, T47 and T33 are applied to the "and" gate 1336. The term T49 is applied to the false input terminal of the flip-flop L8.

The terms L2, H30 and L21 are applied to the "and" gate 1318. The terms L21 and H31 are applied to the "and" gate 1320. The terms H32 and T49 are applied to the "and" gate 1322. The terms T49 and H33 are applied to the "and" gate 1324. The terms T2 and H34 are applied to the "and" gate 1326. The terms H35 and L21 are applied to the "and" gate 1328. The terms H36 and L21 are applied to the "and" gate 1330.

The input Z50 to the write circuits of the accumulator register (A) for the extract numerics instruction is formed by the logic system of FIGURE 31b. This system includes a cathode follower CF35 which forms the term Z50 and its output terminal. An "or" gate 1340 is connected to the cathode follower CF35. A pair of "and" gates 1342 and 1344 are connected to the "or" gate 1340. An "or" gate 1346 is connected to the "and" gate 1342, and an "or" gate 1348 is connected to the "and" gate 1344. A pair of terms A504 and $\overline{T2}$ are introduced to the "and" gate 1342. A pair of terms H33 and H34 are introduced to the "or" gate 1346. The terms $\overline{E51}$ and T2 are applied to the "and" gate 1344. The terms H33 and H34 are also applied to the "or" gate 1348. The term T3 is applied to the "or" gate 1340.

The main input Q0 to the accumulator register (A) is formed by a cathode follower CF35A in FIGURE 31c. An "and" gate 1349 is connected to the cathode follower. The terms A500, $\overline{K6}$ and H33 are introduced to the "and" gate 1349.

The input Q2 to the accumulator register (A) for numeric extract shift is formed by the cathode follower CF36 in FIGURE 31d. An "or" gate 1350 is connected to the input terminal of the cathode follower CF36. A plurality of "and" gates 1352, 1354 and 1356 are connected to the "or" gate 1350. The term $\overline{A502}$ is also introduced to the "or" gate 1350.

A plurality of terms A502, $\overline{K6}$ and H33 are applied to the "and" gate 1352. A plurality of terms A500, K6 and H33 are applied to the "and" gate 1354. A pair of terms A502 and $\overline{H33}$ are applied to the "and" gate 1356.

The operand address portion of the instruction has no significance. The instruction may be represented by the following logic equations:

$G140 = L2.H30.L21 + H31.L21 + L8.T49.H32$
$\qquad + L8.T49.H33 + T2.H34 + H35.L21$
$\qquad + H36.L21 + H37$ $Z50 = A504.\overline{T2}(H33+H34) + \overline{E51}.T2(H33+H34) + T3$
$_1l_2 = H30$
$_0l_2 = H37$
$_1l_8 = K4.T46.H32 + K4.T47.H33$
$Q0 = A500.\overline{K6}.H33$
$Q2 = A502.\overline{K6}.H33 + A500.K6.H33 + \overline{A502} + A502.\overline{H33}$

(C) OUTPUT OPERATIONS

F405—Output numeric information from the accumulator register (A)

The number of digits which are to be output and the output device to receive the digits, is determined by the channel address portion of the instruction. If X is the number of digits to be output, the channel address is determined by subtracting X from the output device code. Up to 12 numeric digits may be output by one output instruction. The output device codes are, for example, as follows:

(a) Typer _____ 29
(b) Low speed punch _____ 49
(c) High speed punch _____ 69

The number of digits to be output is subtracted from the device code number. To output 10 digits on the high speed punch, by way of example, the instruction would be:

Instruction: 405    1234    5900    0

To output 10 digits on the typer, for example, the instruction would be:

Instruction: 405    1234    1900    0

The contents of the accumulator register (A) are automatically transferred to the (MQ) register, and the most significant 4-bits of the (MQ) register are output first. In order to be able to list the non-excess three codes, a decoding process is used in the operation.

The 4-bits transferred from the (MQ) register go into the least significant end of the 6-bit (MQ) buffer. The two most significant bits are 0's. The 4-bits are checked having non-excess three combination and the contents of the buffer are converted, if necessary, to the special output coding. A seventh bit is generated for a parity check bit on the entire 6-bits in the (MQ) buffer.

It should be pointed out that if a tape being punched is to be read back into the processor, the necessary control characters must be punched on the tape. This would imply the use of at least three instructions:

(1) An instruction to output the numeric number in the accumulator register (A);

(2) An instruction to place a tab character in the accumulator register;

(3) An instruction to output the tab alphanumerically.

F415—Output alphanumeric

This instruction calls for the output of the alphanumeric information from the accumulator register (A). The number of characters and the output device to be used is determined, as in the last command, by the channel address in the same manner as described above. Up to eight characters may be output. The contents of the accumulator register (A) are automatically transferred to the (MQ) register, and the most significant character of the (MQ) register is output first. Thus, the output characters must occur in the most significant part of the (MQ) register. An order parity bit is generated for each character. When outputting alphanumeric information, the contents of the (MQ) register are interpreted 6-bits at a time. If a "1" defined configuration is output, it may be punched, but cannot be typed. The high speed readers 714, 716 in FIGURE 2 are punches which operate, for example, at a speed of 100 characters per second. The typers 718 and 720 in FIGURE 12 operate, for example, at 6 to 10 characters per second, depending on the amount of editing (carriage returns and tabs) done.

Suitable logic control systems for carrying out the output operations are set out in FIGURES 32a–32l. The execution count signal G140 is formed by the cathode follower CF37 in FIGURE 32a. An "or" gate 1360 is connected to that cathode follower. The terms L31, H35 and H37 are introduced to the "or" gate 1360. A plurality of "and" gates 1362, 1364, 1366, 1368 and 1370 are connected to the "or" gate 1360. The control flip-flop L2 has its true output terminal connected to the "and" gate 1362. The term H30 is introduced to the true input terminal of the control flip-flop L2, and the term H37 is introduced to the false input terminal of that flip-flop.

The flip-flop L1 has its true output terminal connected to the "and" gate 1370. An "and" gate 1372 is connected to the true input terminal of the control flip-flop L1. The terms B16, B15, B14, U50 and H36 are introduced to the "and" gate 1372. The term H37 is introduced to the false input terminal of the flip-flop L1. The term H30 is applied to the "and" gate 1362. The terms T49 and H32 are applied to the "and" gate 1364, and the terms T49 and H33 are applied to the "and" gate 1366. The terms T2 and H34 are applied to the "and" gate 1368, and the term H36 is introduced to the "and" gate 1370.

The main input Q0 to the accumulator register (A) is formed by a cathode follower CF38 in FIGURE 32b. An "and" gate 1374 is connected to the cathode follower CF38. The terms A500 and H33 are introduced to the "and" gate 1372. The input Z50 to the write circuits of the accumulator register (A) is formed by a cathode follower CF39 in FIGURE 32c. An "and" gate 1376 is connected to the cathode follower CF39. The term A500 is applied to the "and" gate 1376. An "or" gate 1378 is also connected to the "and" gate 1376. The terms H33 and H34 are applied to the "and" gate 1378.

The input Z70 to the (MQ) register write circuits is formed by a cathode follower CF40 in FIGURE 32d. An "and" gate 1380 is connected to the cathode follower CF40. The input terms A500 and H33 are introduced to the "and" gate 1380.

The logic associated with the control flip-flops L8, L9, L50 and L51 for the output operations instructions is shown in FIGURE 32e. An "or" gate 1382 is connected to the true input terminal of the control flip-flop L8. The term H38 is introduced to that "or" gate, and an "and" gate 1384 is also connected to that "or" gate. The terms U50 and H36 are applied to the "and" gate 1384. An "or" gate 1386 is connected to the "and" gate 1384. The terms $\overline{B16}$, $\overline{B15}$ and $\overline{B14}$ are applied to the "or" gate 1386. An "and" gate 1388 is connected to the false input terminal of the flip-flop L8. The terms L9 and T49 are introduced to the "and" gate 1388.

An "and" gate 1390 is connected to the true input terminal of the control flip-flop L9. The terms T49 and L8 are applied to the "and" gate 1390. An "and" gate 1392 is connected to the false input terminal of the control flip-flop L9. The terms T49 and L9 are applied to the "and" gate 1392. An "and" gate 1394 is connected to the true input terminal of the control flip-flop L50. The terms U80, $\overline{L51}$ and $\overline{W150}$ are applied to the "and" gate 1394. An "or" gate 1396 is connected to the "and" gate 1394. The term U1 is introduced to the "or" gate 1396, and an "and" gate 1398 is connected to that "or" gate. The terms U11 and U13 are applied to the "and" gate 1398. An "or" gate 1400 is connected to the false input terminal of the control flip-flop L50.

An "and" gate 1402 is connected to the "or" gate 1400. The terms L51 and U2 are applied to the "and" gate 1402. The term H37 is also introduced to the "or" gate 1400. An "and" gate 1404 is connected to the true input terminal of the flip-flop L51. The term L50 is introduced to the "and" gate 1404. An "or" gate 1406 is connected to that "and" gate. The term U2 is applied to the "or" gate 1406. An "and" gate 1408 is connected to the "or" gate 1406. The terms U12 and U14 are applied to the "and" gate 1408. An "and" gate 1410 is connected to the false input terminal of the flip-flop L51. The term L51 is introduced to the "and" gate 1410, and an "or" gate 1412 is connected to that "and" gate. The terms L1 and L8 are applied to the "or" gate 1412.

The track selector count signal G111 for the output operations instructions is formed by a cathode follower CF41 in FIGURE 32f. An "and" gate 1414 is connected to the cathode follower CF41. The terms L9 and T49 are introduced to the cathode follower CF41.

The term U50 indicating the completion of the output cycle is formed by a cathode follower CF42 in FIGURE 32g. An "and" gate 1416 is connected to the cathode follower CF42. The term L51 is introduced to the "and" gate 1416. An "or" gate 1418 is also connected to the "and" gate 1416. The term U1 is applied to the "or" gate 1418. An "and" gate 1420 is connected to the "or" gate 1418. The terms U11 and U13 are applied to the "and" gate 1420.

The logic associated with the control flip-flops L31, L32 and L33 for carrying out the output operations instructions is shown in FIGURE 32h. An "and" gate 1424 is connected to the true input terminal of the flip-flop L31. The terms U60 and $\overline{L31}$ are applied to the "and" gate 1424. The term H37 is introduced to the false input terminal of the flip-flop L31.

An "and" gate 1426 is connected to the true input terminal of the control flip-flop L32. The terms U61 and $\overline{L32}$ are applied to the "and" gate 1426. The term H37 is introduced to the false input terminal of the flip-flop L32.

An "and" agate 1428 is connected to the true input termnal of the control flip-flop L33. The terms U62 and $\overline{L33}$ are introduced to the "and" gate 1428. The term H37 is applied to the false input terminal of the flip-flop L33.

The output signal U80 which causes the selected output device to operate is formed by a cathode follower CF43 in FIGURE 32i. An "and" gate 1430 is connected to the cathode follower CF43. An "or" gate 1432 is connected to the "and" gate 1430. The two output command terms F405 and F415 are introduced to the "or" gate 1432. The terms $\overline{L8}$ and H36 are applied to the "and" gate 1430.

The select typer output term U60 is formed by a cathode follower CF44 in FIGURE 32j. An "and" gate 1434 is connected to the cathode follower CF44. An "or" gate 1436 is connected to the "and" gate. The terms F405 and F415 are introduced to the "or" gate 1436. The terms $\overline{B19}$, $\overline{B17}$ and H35 are introduced to the "and" gate 1434.

The select low speed punch term U61 is formed by a cathode follower CF45 in FIGURE 32k. An "and" gate 1438 is connected to the cathode follower CF45. An "or" gate 1440 is connected to the "and" gate. The terms F405 and F415 are introduced to the "or" gate. The terms $\overline{B19}$, B17 and H35 are introduced to the "and" gate 1438.

The select high speed punch term U62 is formed by a cathode follower CF46 in FIGURE 32l. An "and" gate 1442 is connected to the cathode follower CF46. An "or" gate 1444 is connected to the "and" gate 1442. The terms F405 and F415 are applied to the "or" gate 1444. The terms B19 and H35 are applied to the "and" gate 1442.

Both the numeric and alphanumeric operations may be represented by the following logic equations:

$G140 = L2.H30 + L31 + T49.H32 + T49.H33$
$\quad + T2.H34 + H35 + L1.H36 + H37$
$_1I_2 = H30$
$Q0 = A500.H33$
$Z50 = A500(H33 + H34)$
$Z70 = A500.H33$
$_1I_8 = H35 + (\overline{B16} + \overline{B15} + \overline{B14})U50.H36$
$_0I_8 = L9.T49$
$_1I_9 = T49.L8$
$_0I_9 = T49.L9$
$_1I_1 = B16.B15.B14.U50.H36$
$_0I_1 = H37$
$G111 = L9.T49$
$_1I_{50} = U80.\overline{L51}(U1 + U11.U13)\overline{W150}$
$_0I_{50} = L51.U2 + H37$
$_1I_{51} = L50(U2 + U12.U14)$
$_0I_{51} = L51(L1 + L8)$
$U50 = L51(U1 + U11.U13)$
$_1I_{31} = U60.\overline{L31}$
$_0I_{31} = H37$
$_1I_{32} = U61.\overline{L32}$
$_0I_{32} = H37$
$_1I_{33} = U62.\overline{L33}$
$_0I_{33} = H37$
$U80 = F4XX.\overline{L8}.H36$
$U60 = F4XX.\overline{B19}.\overline{B17}.H35$
$U61 = F4XX.\overline{B19}.B17.H35$
$U62 = F4XX.B19.H35$ (D) DATA TRANSFER FROM m OPERATION

*F505—Enter*

This instruction calls for the entering of the contents of the selected memory cell *m* into the accumulator register (A), without alteration. The data held in the selected memory cell is left undisturbed, but the previous contents of the accumulator (A) are destroyed. This instruction may be represented by the following logic equations:

$G140 = L2.H30.L21 + H31.L21 + Q7.T49.H32.L21$
$\quad + T49.H33 + T2.H34 + H35.L21H36.L21 + H37$
$_1I_2 = H30$
$_0I_2 = H37$
$Q0 = Q22.H33$
$Z50 = A504(H33 + H34)$

*F516—Block transfer (m-ten word register 6100)*

This instruction requires that the words contained in the cells starting at the operand address and ending at the next 9 (Mod 10) address, be inserted in the ten-words register 6100. The address of this register is 6100.

The instruction may be carried out by the logic circuitry shown in FIGURES 33a–33c. This circuitry includes a cathode follower CF47 which produces the term G140 at its output terminal. An "or" gate 1450 is connected to the input terminal of the cathode follower CF47. The terms H31, H35, H36 and H37 are introduced to the "or" gate 1450. In addition, a group of "and" gates 1452, 1454, 1456 and 1458 are connected to the "or" gate 1450. The terms L2, and H30 are applied to the "and" gate 1452. The terms Q7, T49 and H32 are applied to the "and" gate 1454. The terms L8, T49 and H32 are applied to the "and" gate 1454. The terms L8, T49 and H33 are applied to the "and" gate 1456. The terms T2 and H34 are applied to the "and" gate 1458.

The logic associated with the control flip-flops L2 and L8 for the execution of the block transfer command F516 is shown in FIGURE 33b. In that figure, the term H30 is applied to the true input terminal of the flip-flop L2 and the term H37 is introduced to the false input terminal. An "and" gate 1460 is connected to the true input terminal of the flip-flop L8, and the terms K4, T47 and H33 are applied to that "and" gate. The term T49 is applied to the false input terminal of the flip-flop L8.

The input 261 to the write circuits of the register 6100 is formed by the circuitry of FIGURE 33c. The latter circuitry includes a cathode follower CF48, and this follower produces the input term Z61 for the register 6100 at its output terminal. An "and" gate 1462 is connected to the input terminal of the cathode follower CF48, and the terms Q22 and H33 are applied to the input terminals of that "and" gate.

This instruction can be represented by the following logic equations:

$G140 = L2.H30 + H31 + Q7.T49.H32 + L8.T49.H33$
$\quad + T2.H34 + H35 + H36 + H37$
$_1I_2H = 30$
$_0I_2 = H37$
$_1I_8 = K4.T47.H33$
$_0I_8 = T49$
$Z61 = Q225.H33$ The logic circuitry for the block transfers F526, F536 and F546 is similar to that of FIGURES 33a, 33b and 33c and will not be repeated.

*F526—Block transfer (m-ten word register 6200)*

This instruction is the same as the previous instruction, except that the transfer is into the 10 word register 6200. This instruction may be represented logically as follows:

$G140 = L2.H30 + H31 + Q7.T49.H32 + L8.T49.H33$
$\quad + T2.H34 + H35 + H36 + H37$
$_1I_2 = H30$
$_0I_2 = H37$
$_1I_8 = K4.T47.H33$
$_0I_8 = T49$
$Z62 = Q225.H33$ All other registers recirculate in a normal manner.

*F536—Block transfer (m-ten word register 6300)*

This instruction is the same as the F516 instruction, except that the transfer is into the 10 word register 6300. This instruction may be represented by the following logic equations:

$G140 = L2.H30 + H31 + Q7.T49.H32 + L8.T49.H33$
$\quad + T2.H34.H35 + H36 + H37$
$_1I_2 = H30$
$_0I_2 = H37$
$_1I_8 = K4.T47.H33$
$_0I_8 = T49$
$Z63 = Q225.H33$ All other registers recirculate normally.

*F546—Block transfer (m-ten word register 6400)*

This instruction is the same as F516 instruction, except that the transfer is made into the 10 word register 6400. The instruction may be represented by the following logic equations:

$G140 = L2.H30 + H31 + Q7.T49.H32$
$\quad + L8.T49.H33 + T2.H34 + H35 + H36 + H37$
$_1I_2 = H33$
$_0I_2 = H37$
$_1I_8 = K4.T47.H33$
$_0I_8 = T49$
$Z64 = Q225.H33$ All other registers recirculate normally.

*F577—Output to MUR*

This instruction transfers the contents of the 20 least significant bits of the memory location *m* to the mechanical unit control register (MUR) 54 (FIGURE 1). The data held in the selected memory location is left undisturbed. The register 54 is cleared after the functions called for have been set into the mechanical unit controls. The set occurs during 315° to 325° rotation of the mechanical unit cycle.

The processor is "locked out" of the mechanical unit control register during 290° to 325° of mechanical unit cycle. The data processor will also be locked out if the mechanical unit control register 54 contains data from a previous "output to MUR" operation, and the mechanical unit 20 has not reached 325° of the mechanical unit cycle. When the data processor is locked out, it waits until the mechanical unit control register 54 is available (at the 325° point of the mechanical unit cycle). At this time, the data processor performs the operand lock-up and data processor.

The twenty least significant bits of memory location $m$ determine the functions the mechanical unit 20 (FIGURE 1) will execute. A binary "1" in a particular bit position will cause the function corresponding to that bit position to be executed. A binary "0" causes no execution of the function.

The logic circuitry for executing the "output to MUR" instruction is illustrated in FIGURES 34a–34c.

The G140 term for this instruction is formed by a cathode follower CF49. An "or" gate 1464 is connected to the input terminal of the cathode follower. The terms H31, H35, H36 and H37 are introduced to the "or" gate 1464. A plurality of "and" networks 1466, 1468, 1470 and 1472 are connected to the "or" gate 1464. The terms L2, H30, $\overline{L401}$ and $\overline{L402}$ are applied to the "and" gate 1466. The terms Q7, T49 and H32 are applied to the "and" gate 1468. The terms T49 and H33 are applied to the "and" gate 1470. The terms T2 and H34 are applied to the "and" gate 1472.

The term L2 is produced at the true output terminal of the control flip-flop L2. The term H30 is applied to the true input terminal of that flip-flop, and the term H37 is applied to the false input terminal. The data term U550 is produced at the output terminal of a cathode follower CF50 in FIGURE 34b. An "and" gate 1474 is connected to that cathode follower, and the terms Q225 and H33 are introduced to that "and" gate.

The control flip-flop L401 in FIGURE 34c is used to lock out the plug board control register. An "and" gate 1476 is connected to the true input terminal of the control flip-flop L401. The terms T49 and H33 are introduced to the "and" gate 1476. A cam operated switch is used to return the flip-flop L401 to its false state a predetermined interval after it is triggered true. The switching term CAM from this switch, and the true term L401 from the flip-flop are introduced to an "and" gate 1748, and the "and" gate is connected to the false input terminal of the control flip-flop L401.

The present operation may be represented by the following logic equations:

$G140 = L2.H30.\overline{L401}.\overline{L402} + H31 + Q7.T49.H32$
$\qquad + T49.H33 + T2.H34 + H35 + H36 + H37$
$_1l_2 = H30$
$_0l_2 = H37$
$W0 = U550.T0$
$W1 = U550.T1$
.
.
.
$W47 = U550.T47$
$U550 = Q225.H33$
$_1l_{401} = T49.H33$
$_0l_{401} = $ (Cam contact) L401

F589—Buffer store

This instruction calls for the storage of the contents of the memory cell $m$ in the core buffer 58 (FIGURE 1). The contents of the memory cell $m$ are transferred to the lowest numbered empty locations in the core buffer. The contents of the selected memory cell are unchanged.

The buffer store instruction is indicated by the logic circuitry of FIGURES 35a–35e. In FIGURE 35a, the term G140 is formed by a cathode follower CF51. An "or" gate 1480 is connected to the cathode follower CF51. The terms H35, H36 and H37 are introduced to the "or" gate 1480. A plurality of "and" gates 1482, 1484, 1486, 1488 and 1490 are also connected to the "or" gate 1480. The terms $\overline{L80}$, $\overline{L81}$ and H30 are applied to the "and" gate 1482. The terms H31 and $\overline{W800}$ are applied to the "and" gate 1484. The terms Q7, T49 and H32 are introduced to the "and" gate 1486. The terms T49 and H33 are applied to the "and" gate 1488. The terms T2 and H34 are applied to the "and" gate 1490.

The control flip-flop L2 for the buffer store instruction is triggered true by the term H30 applied to its true input terminal, as shown in FIGURE 35b. This flip-flop is triggered false by the term H37 applied to its false input terminal. The input data signal Q850 which constitutes the serial input to the core buffer register 60 is formed at the output of a cathode follower CF52 in FIGURE 35c. The output data signal Q225 from the selected memory cell is fed to the cathode follower CF52 to be introduced to the buffer register.

The load synchronizing pulses for the buffer 58 are represented by the term Q80 in FIGURE 35d. This term is formed at the output of a cathode follower CF53. An "and" gate 1492 is connected to the input of the cathode follower CF53. The term H33 is introduced to the "and" gate 1492, and an "or" gate 1494 is also connected to that "and" network. The terms T6, T12, T18, T24, T3, T36, T42 and T48 are all applied to the "or" gate 1494.

The input-output shift signal S850 for the core buffer 58 is formed in FIGURE 35e at the output of a cathode follower CF54. An "and" gate 1496 is connected to the cathode follower CF54. The timing signals T0–T47 are applied to the "and" gate, and the term H33 is also introduced to that gate.

This instruction may be represented by the following logic equations:

$G140 = \overline{L80}.\overline{L81}.H30 + H31.\overline{W800} + Q7.T49.H32$
$\qquad + T49.H33 + T2.H34 + H35 + H36 + H37$
$_1l_2 = H30$
$_0l_2 = H37$
$Q850 = Q225$
$Q80 = (T6 + T12 + T18 + T24 + T3 + T36 + T42 + T48)H33$
$S850 = (T0 - T47)H33$

F599—Block transfer (m-buffer)

This instruction calls for each word of a block of words in the memory to be transferred to the buffer 58. The block of words is defined as those starting at the operand address of the instruction, and ending at the operand address of the word in the (MQ) register. The digits in the (MQ) register, other than those located in the operand address, have no significance.

The block transfer between the memory $m$ and the buffer 58 may be executed by means of the logic circuitry of FIGURES 36a–36h.

The term G140 is formed by the circuitry of FIGURE 36a. This circuitry includes a cathode follower CF55, and the term is developed at the output terminal of the cathode follower. An "or" gate 1500 is connected to the input terminal of the cathode follower. A group of "and" gates 1502, 1504, 1506, 1508 and 1510 are connected to the "or" gate 1500. The terms $\overline{L81}$, H30 and $\overline{L80}$ are all applied to the "and" gate 1502. The terms H31 and $\overline{W800}$ are applied to the "and" gate 1504. The terms Z7, T49 and H32 are applied to the "and" gate 1506. The terms A31, H33 and B19 are applied to the "and" gate 1508. The terms L8, T49 and H33 are applied to the "and" gate 1510.

The command cycle count signal G130 is formed at the output terminal of a cathode follower CF56 in FIG- URE 36b. An "and" gate 1512 is connected to the input terminal of the cathode follower CF56. The true output terminal of the control flip-flop L2 is connected to the "and" gate 1512, and the term H37 is introduced to that gate. The term H37 is also introduced to the false input terminal of the flip-flop L2. An "and" gate 1514 is connected to the true input terminal of that flip-flop. The terms L8 and H35 are applied to the "and" gate 1514.

The logic control circuitry for the flip-flops L1 and L8 for the execution of the block transfer ($m$-buffer 58) command is set out in FIGURE 36c. The term H31 is applied to the true input terminal of the control flip-flop L1, and an "and" gate 1516 is connected to the false input terminal of that flip-flop. The true output terminal of the flip-flop L8 is connected to the "and" gate 1516, and the term H37 is also introduced to that "and" gate.

An "or" gate 1518 is connected to the true input terminal of the flip-flop L8, and an "or" gate 1520 is connected to the false input terminal of that flip-flop. A pair of "and" gates 1522 and 1524 are connected to the "or" gate 1518, and a pair of "and" gates 1526 and 1528 are connected to the "or" gate 1520. The terms T3 and H33 are introduced to the "and" gate 1522. The terms T48, Q82 and H33 are introduced to the "and" gate 1524. The terms A20, $\overline{A70}$, T14–T19 and H33 are introduced to the "and" gate 1526. The terms $\overline{A20}$, A70, H23 and T4–T19 are applied to the "and" gate 1528.

The track selector count signal G111 is developed at the output terminal of a cathode follower CF57. An "and" gate 1530 is connected to the input terminal of that cathode follower. The terms A31, H33 and $\overline{B19}$ are all applied to the "and" gate 1530.

The channel address register shift signal S119 is developed at the output terminal of a cathode follower CF58 in FIGURE 36e, and the input signal Q119 to the channel address register is developed at the output terminal of a cathode follower CF59 in that figure. An "and" gate 1532 is connected to the cathode follower CF58, and an "and" gate 1534 is connected to the cathode follower CF59. The timing signals T11–T19 are applied to the "and" gate 1532, and the term H34 is also applied to that "and" gate. The term B11 is applied to the "and" gate 1534, and the term H34 is also applied to that "and" gate.

The input Z20 to the command register write circuits is developed at the output terminal of a cathode follower CF60 in FIGURE 36f. An "or" gate 1536 is connected to the cathode follower CF60. The timing signal T49 is introduced to the "or" gate 1536, and a plurality of "and" gates 1538, 1540, 1542, 1544, 1546, 1548, 1550, 1552 and 1554 are connected to that "or" gate.

The terms A20, $\overline{T8-T19}$, $\overline{T48}$ and H34 are introduced to the "and" gate 1538. The terms K4, $\overline{B11}$ T4–T11, H33 and $\overline{L1}$ are introduced to the "and" gate 1540. The terms K5, B11, T4–T11, H33 and L1 are introduced to the "and" gate 1542. The terms A20, $\overline{T4-T11,T48}$ and H33 are introduced to the "and" gate 1544. The terms A20, $\overline{L1}$ and H33 are applied to the "and" gate 1546. The terms $\overline{A20}$, T48 and L1 are applied to the "and" gate 1548. An "or" gate 1556 is also connected to that "and" gate, and the terms H33 and H34 are applied to the "or" gate 1556. The terms B11, T12–T19 and H34 are applied to the "and" gate 1550. The terms K4, $\overline{B11}$, T8–T11 and H34 are applied to the "and" gate 1552. The terms K5, B11, H34 and T8–T11 are applied to the "and" gate 1554.

Figure 36G:
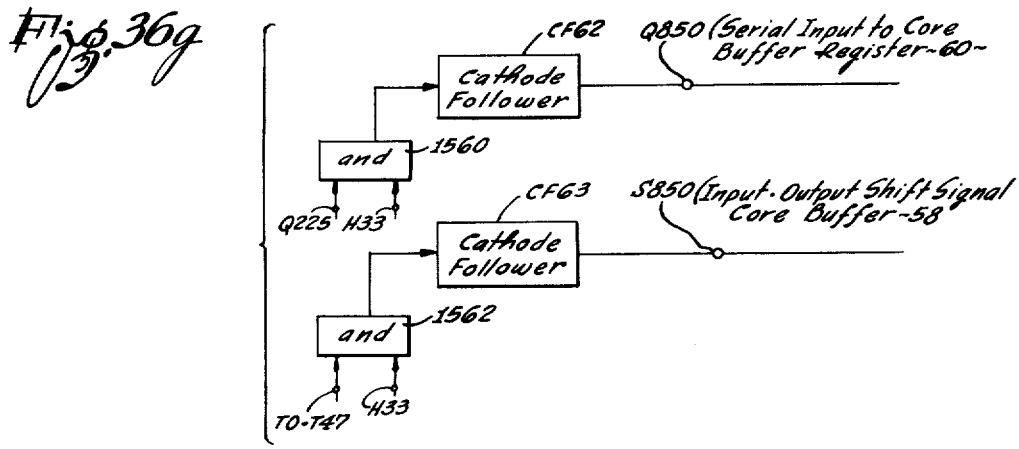

The serial input Q850 to the core buffer register 60 is formed at the output terminal of a cathode follower CF62 in FIGURE 36g, and the input-output shift signal S850 for the core buffer 58 is formed at the output of a cathode follower CF63 in that figure. An "and" gate 1560 is connected to the cathode follower CF62, and an "and" gate 1562 is connected to the cathode follower CF63.

The terms Q225 and H33 are introduced to the "and" gate 1560, and the terms T0–T47 and H33 are introduced to the "and" gate 1562.

Figure 36H:
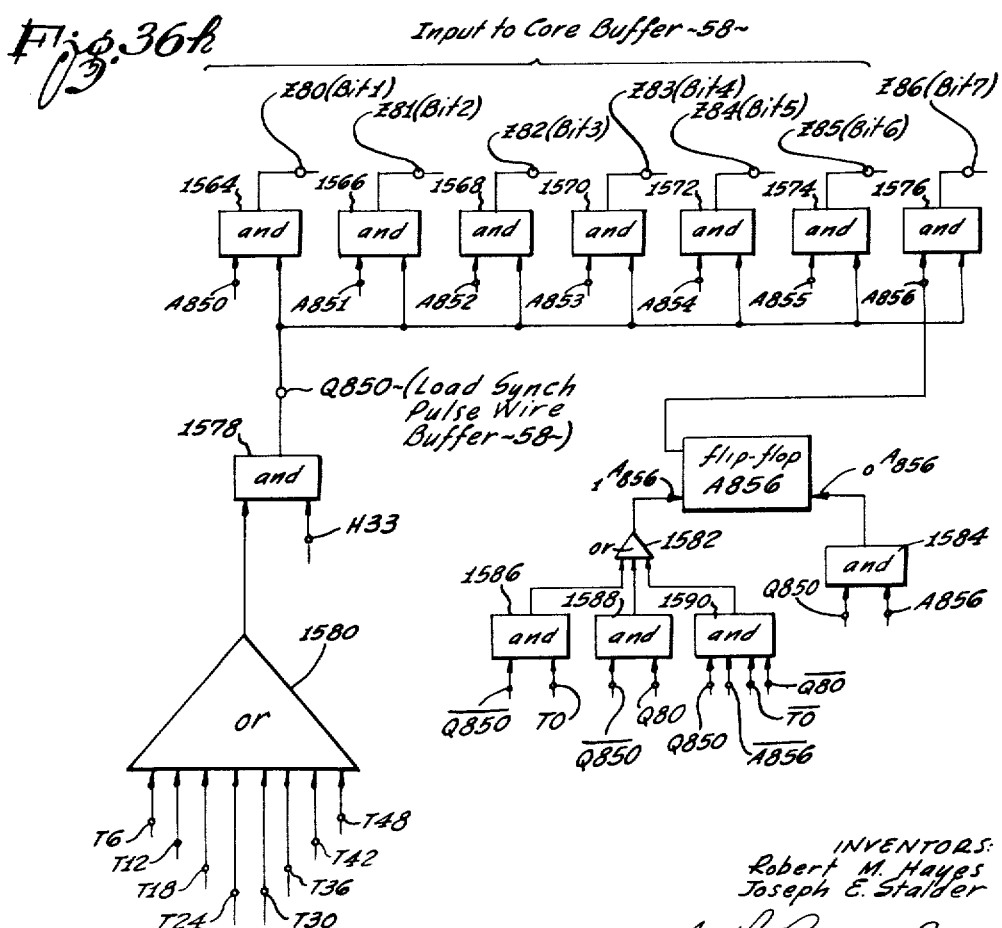

The information fed into the core buffer 58 is so fed in a parallel manner, and this is carried out by the logic circuitry of FIGURE 36h. This circuitry includes a plurality of "and" gates 1564, 1566, 1568, 1570, 1572, 1574 and 1576. These "and" gates are connected to respective output terminals designated Z80–Z86, and these output terminals correspond respectively to the bit 1–bit 7 of the input signal to the core buffer.

A "and" gate 1578, is connected to each of the "and" gates 1564, 1566, 1568, 1570, 1572, 1574 and 1576. The term A850 is applied to the "and" gate 1564, the term A851 is applied to the "and" gate 1566, the term A852 is applied to the "and" gate 1568, the term A853 is applied to the "and" gate 1570, the term A854 is applied to the "and" gate 1572, the term A855 is applied to the "and" gate 1574, and the term A856 is applied to the "and" gate 1576.

The "and" gate 1578 produces the load synchronizing pulse term Q80 for the core buffer 58. An "or" gate 1580 is connected to the "and" gate 1578, and the term H33 is also introduced to the "and" gate. The timing signals T6, T12, T18, T24, T30, T36, T42 and T48 are all introduced to the "or" gate 1580. A flip-flop A856 develops the term A856 at its true output terminal. An "or" gate 1582 is connected to the true input terminal of that flip-flop, and an "and" gate 1584 is connected to the false input terminal of the flip-flop.

A plurality of "and" gates 1586, 1588 and 1590 are connected to the "or" gate 1582. The term $\overline{Q850}$ and the term T0 are applied to the "and" gate 1586. The terms $\overline{Q850}$ and Q80 are applied to the "and" gate 1588. The terms Q850, $\overline{A856}$, $\overline{T0}$ and $\overline{Q80}$ are applied to the "and" gate 1590. The terms Q850 and A856 are applied to the "and" gate 1584.

This instruction may be represented by the following logic equations:

$G140 = \overline{L81}.H30.\overline{L80} + H31.\overline{W800} + Z7.T49.H32$
$\quad + A31.H33.\overline{B19} + L8.T49.H33 + \overline{L8}.T49.H34$
$\quad + L8.H34 + H35 + H36 + H37$
$G130 = L2.H37$
$_1l_2 = L8.H35$
$_0l_2 = H37$
$_1l_1 = H31$
$_0l_1 = L8.H37$
$_1l_8 = T3.H33 + T48.Q82.H33$
$_0l_8 = A20.\overline{A70}(T4-T19)H33 + \overline{A20}.A70(T4-T19)H23$
$G111 = A31.H33.\overline{B19}$
$S119 = (T11-T19)H34$
$Q119 = B11.H34$
$Z20 = K4.\overline{B11}(T4-T11)H33.\overline{L1}$
$\quad + K5.B11(T4-T11)H33.L1$
$\quad + A20(\overline{T4-T11})\overline{T48}.H33 + A20.L1.H33$
$\quad + \overline{E20}.T48(H33+H34)L1 + B11(T12-T19)H34$
$\quad + K4.\overline{B11}(T8-T11)H34 + K5.B11(T8-T11)H34$
$\quad + A20(\overline{T8-T19})\overline{T48}.H34 + T49$
$_1a_{856} = \overline{Q850}.T0 + \overline{Q850}.Q80 + Q850.\overline{A856}.\overline{T0}.\overline{Q80}$
$_0a_{856} = Q850.A856$
$Q82.L8 =$ Buffer overflow error
$Q850 = Q225.H33$
$S850 = (T0-T47)H33$
$Z80 = A850.Q80$
$Z81 = A851.Q80$
$Z82 = A852.Q80$
$Z83 = A853.Q80$
$Z84 = A854.Q80$
$Z85 = A855.Q80$
$Z86 = A856.Q80$
$Q80 = (T6+T12+T18+T24+T30$
$\quad + T36+T42+T48)H33$

(E) ARITHMETIC OPERATIONS

F615—Add decimal

This instruction calls for the addition of the contents of the selected cell $m$ to the contents of the accumulator register (A), leaving the result in the accumulator register. The twelve decimal digits in the selected memory cell $m$ are added to the twelve decimal digits held in the accumulator register. The arithmetic is performed on the basis of 4-bit 2–3 coded numerics. The digits must not be shifted from the normal digit positions. There is no sign associated with the result.

An overflow sum is defined as a sum which exceeds the twelve decimal digit capacity of the accumulator register (A). When an overflow digit, or a carry from the highest digit position occurs, the indicator flip-flop IT is set true.

The add decimal command F615 may be executed by the logic circuitry illustrated in FIGURES 37a–37e. The execution counter term G140 for carrying out this command is forward at the output terminal of the cathode follower CF64 in FIGURE 37a.

An "or" gate 1600 is connected to the cathode follower CF64. The term H37 is applied to the "or" gate 1600. A plurality of "and" gates 1602, 1604, 1606, 1608, 1610, 1612 and 1614 are all connected to the "or" gate 1600. The terms L2, H30 and L21 are introduced to the "and" gate 1602. The terms H31 and L21 are introduced to the "and" gate 1604. The terms Q7, T49, H32 and L21 are introduced to the "and" gate 1606. The terms T49 and H33 are introduced to the "and" gate 1608. The terms T2 and H34 are introduced to the "and" gate 1610. The terms H35 and L21 are introduced to the "and" gate 1612. The terms H36 and L21 are introduced to the "and" gate 1614.

The term L2 is formed at the true output terminal of the control flip-flop L2. The term H30 is applied to the true input terminal of that flip-flop and the term H37 is applied to the false input terminal of the flip-flop.

The main input signal Q0 to the accumulator register (A) is formed at the output of a cathode follower CF65 in FIGURE 37b. An "and" gate 1616 is connected to the cathode follower CF65. An "or" gate 1618 introduces the output Q210 of the first adder to the "and" gate 1616, and the term H33 is also applied to that "and" gate. A plurality of "and" gates 1620, 1622, 1624 and 1626 are connected to the "or" gate 1618 and are considered to form the first adder for this instruction. A cathode follower CF66 introduces the first adder input Q212 to the "and" gate 1622 and 1626. This cathode follower is also connected to an inverter I2, and the inverter introduces the term $\overline{Q212}$ to the "and" gates 1620 and 1624. The selected memory output Q225 is applied to the cathode follower CF66. The accumulator output A500 and carry term $\overline{E1}$ are also applied to the "and" gate 1620, the terms $\overline{A500}$ and $\overline{E1}$ are also applied to the "and" gate 1622, the terms $\overline{A500}$ and E1 are also applied to the "and" gtae 1624, and the terms A500 and E1 are also applied to the "and" gate 1626.

The first adder carry flip-flop E1 forms the term E1 at its true output terminal and the term $\overline{E1}$ at its false output terminal. An "and" gate 1630 is connected to the true input terminal of the flip-flop E1, and an "or" gate 1632 is connected to the false input terminal of the flip-flop. A pair of "and" gates 1634 and 1636 are connected to the "or" gate 1632. The terms A500, Q212, T49 and H33 are applied to the "and" gate 1630. The terms $\overline{A500}$, $\overline{Q212}$ and H33 are applied to the "and" gate 1634, and the terms T49 and H32 are applied to the "and" gate 1636.

The input Z50 to the accumulator register write circuits is formed at the output terminal of a cathode follower CF67 in FIGURE 37c. An "or" gate 1640 is connected to the input terminal of the cathode follower. The term T3 is introduced to the "or" gate 1640. A plurality of "and" gates 1642, 1644 and 1646 are also connected to the "or" gate 1640. The terms A504, $\overline{L6}$, $\overline{T2}$ and H33 are applied to the r'and" gate 1642. The terms Q211, L6, and $\overline{T1}$ are applied to the "and" gate 1644. An "or" gate 1648 is connected to the "and" gate 1644. The terms H33 and H34 are applied to the "or" gate 1648. The terms $\overline{E51}$ and T2 are introduced to the "and" gate 1646. An "or" gate 1650 is connected to the "and" gate 1646. The terms H33 and H34 are introduced to the "or" gate 1650.

The term L6 is formed at the true output terminal, and the term $\overline{L6}$ is formed at the false output terminal of the control flip-flop L6. An "and" gate 1652 is connected to the true input terminal of the control flip-flop L6, and an "and" gate 1654 is connected to the false input terminal of that flip-flop. The terms T2 and H33 are introduced to the "and" gate 1652, and the terms T2 and H34 are introduced to the "and" gate 1654.

The term $\overline{E51}$ is formed at the false output terminal of the flop-flop E51. An "and" gate 1656 is connected to the true input terminal of the flop-flop E51, and an "or" gate 1658 is connected to the false input terminal of that flip-flop. An "and" gate 1660 is connected to the "or" gate 1658, and the term T3 is introduced to that "or" gate. The terms E51 and Z50 are introduced to the "and" gate 1660.

The output Q211 of the second adder is formed at the output terminal of a cathode follower CF68 in FIGURE 37d. An "or" gate 1670 is connected to the cathode follower CF68. A plurality of "and" gates 1672, 1674, 1676 and 1678 are connected to the "or" gate 1670, and these gates are considered to form the second adder for this instruction. The terms A504, $\overline{Q215}$ and $\overline{E3}$ are introduced to the "and" gate 1672. The terms $\overline{A504}$, Q215 and $\overline{E3}$ are introduced to the "and" gate 1674. The terms $\overline{A504}$, $\overline{Q215}$ and E3 are introduced to the "and" gate 1676. The terms A504, Q215 and E3 are introduced to the "and" gate 1678.

The second adder carry flip-flop E3 forms the terms E3 and $\overline{E3}$ at its respective true and false output terminals. An "and" gate 1680 is connected to the true input terminal of that flip-flop, and an "or" gate 1682 is connected to the false input terminal of the flip-flop. A pair of "and" gates 1684 and 1686 are connected to the "or" gate 1682. The terms A504, Q215, $\overline{P3}$ and L6 are applied to the "and" gate 1680. The terms $\overline{A50}$ and $\overline{Q215}$ are applied to the "and" gate 1684. The terms P3 and L6 are applied to the "and" gate 1686.

Figure 37E:
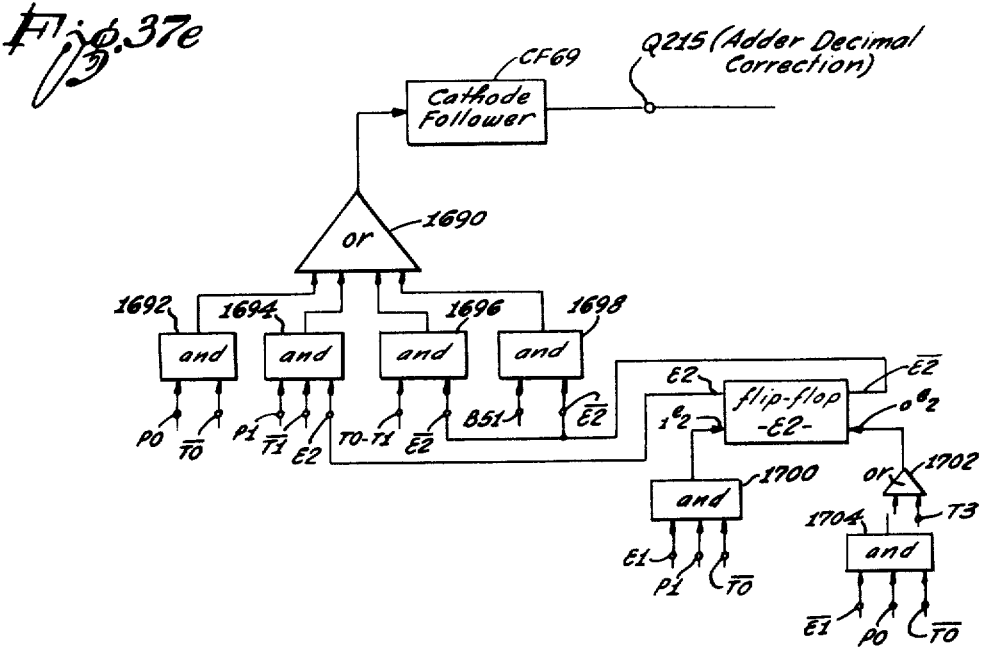

The adder decimal correction signal Q215 is formed at the output terminal of a cathode follower CF69 in FIGURE 37e. An "or" gate 1690 is connected to the input terminal of the cathode follower CF69. A plurality of "and" gates 1692, 1694, 1696 and 1698 are connected to the "or" gate 1690. The terms P0 and $\overline{T0}$ are applied to the "and" gate 1692. The terms P1, $\overline{T1}$ and E2 are applied to the "and" gate 1694. The terms T0–T1 and $\overline{E2}$ are applied to the "and" gate 1696, and the terms B51 and $\overline{E2}$ are applied to the "and" gate 1698.

The flip-flop E2 forms the terms E2 and $\overline{E2}$ at its respective true and false output terminals. An "and" gate 1700 is connected to the true input terminal of the flip-flop E2, and an "or" gate 1702 is connected to the false input terminal of that flip-flop. The terms E1, P0 and $\overline{T0}$ are introduced to the "and" gate 1700. An "and" gate 1704 is connected to the "or" gate 1702. The terms $\overline{E1}$, P0 and $\overline{T0}$ are applied to the "and" gate 1704. The term T3 is introduced to the "or" gate 1702.

The following logical equations apply:

$G140 = L2.H30.L21 + H31.L21 + Q7.T49.H32.L21$
$\quad + T49.H33 + T2.H34 + H35.L21$
$\quad + H36.L21 + H37$
$_1l_2 = H30$
$_0l_2 = H37$
$Q0 = Q210.H33$
$Q210 = A500.\overline{Q212}.\overline{E1} + \overline{A500}.Q212.\overline{E1} + \overline{A500}.\overline{Q212}.E1$
$\quad + A500.Q212.E1$
$Q212 = Q225$
$_1e_1 = A500.Q212.\overline{T49}.H33$
$_0e_1 = \overline{A500}.\overline{Q212}.H33 + T49.H32$
$Z50 = A504.\overline{L6}.\overline{T2}.H33 + Q211.L6.\overline{T1}(H33+H34)$
$\quad + \overline{E51}.T2(H33+H34) + T3$
$_1e_{51} = \overline{E51}.Z50.\overline{T3}$
$_0e_{51} = E51.Z50 + T3$
$_1l_6 = T2.H33$
$_0l_6 = T2.H34$
$Q211 = A504.\overline{Q215}.\overline{E3} + \overline{A504}.Q215.\overline{E3}$
$\quad + \overline{A504}.\overline{Q215}.E3 + A504.Q215.E3$
$_1e_3 = A504.Q215.\overline{P3}.L6$
$_0e_3 = \overline{A50}.\overline{Q215}\ P3.L6$
$Q215 = P0.\overline{T0} + P1.\overline{T1}.E2 + (T0-T1)\overline{E2} + B51.\overline{E2}$
$_1e_2 = E1.P0.\overline{T0}$
$_0e_2 = \overline{E1}.P0.\overline{T0} + T3$
$_1l_3 = E1.T49.H33$
$_0l_3 = T49.H2$ All other registers recirculate normally.

*F616—Block add decimal*

The decimal sum of a block of words is to be added to the contents of the accumulator register (A), leaving the result in the accumulator register. The block of words consists of the words contained in the memory cells $m$ to the end of the track addressed. If the sum overflows the accumulator register (A), the indicator flip-flop is set true.

The block add decimal command may be executed by the logic circuitry of FIGURES 38a–38e. The term G140 for the execution of this command is formed at the output terminal of a cathode follower CF70. A plurality of "and" gates 1712, 1714, 1716, 1718, 1720, 1722 and 1724 are connected to the "or" gate 1710. The term H37 is also introduced to that "or" gate. The control flip-flop L2 has its true output terminal connected to the "and" gate 1712. The term H30 is introduced to the true input terminal of that flip-flop, and the term H37 is introduced to the false input terminal of that flip-flop. The terms H30 and L21 are also introduced to the "and" gate 1712.

The terms H30 and L21 are applied to the "and" gate 1714. The terms Q7, T49, H32 and L21 are applied to the "and" gate 1716. The terms A31 and H33 are applied to the "and" gate 1718. The terms T2 and H34 are applied to the "and" gate 1720. The terms H35 and L21 are applied to the "and" gate 1722. The terms H36 and L21 are applied to the "and" gate 1724.

The main input signal Q0 to the accumulator register is formed at the output terminal of a cathode follower CF71 in FIGURE 38b. An "and" gate 1726 is connected to the cathode follower CF71. An "or" gate 1728 supplies the output Q210 of the first adder to the "and" gate 1726, and a term H33 is also applied to that "and" gate.

A plurality of "and" gates 1730, 1732, 1734 and 1736 are connected to the "or" gate 1728, and these gates are considered to form the first adder for this instruction. The terms A50, $\overline{Q212}$ and $\overline{E1}$ are applied to the "and" gate 1730. The terms $\overline{A500}$, Q212 and $\overline{E1}$ are applied to the "and" gate 1732. The terms $\overline{A500}$, $\overline{Q212}$ and E1 are applied to the "and" gate 1734. The terms A500, Q212 and E1 are applied to the "and" gate 1736. A cathode follower CF72 forms the term Q212, and an inverter I3 connector to the cathode follower forms the term $\overline{Q212}$. The term Q225 is applied to the cathode follower CF72.

An "and" gate 1738 is connected to the true input terminal of the first adder carry flip-flop E1, and an "or" gate 1740 is connected to the false input terminal of that flip-flop. The first adder carry flip-flop E1 forms the term E1 at its true output terminal, and it forms the term $\overline{E1}$ at its false output terminal.

A plurality of "and" gates 1742, 1744 and 1746 are connected to the "or" gate 1740. The terms A500, Q212, $\overline{T49}$ and H33 are introduced to the "and" gate 1738. The terms $\overline{A500}$, $\overline{Q212}$ and H33 are applied to the "and" gate 1742. The terms T49 and H33 are applied to the "and" gate 1744. The terms T49 and H32 are applied to the "and" gate 1746.

The input Z50 to the accumulator register write circuits is formed at the output terminal of a cathode follower CF73 in FIGURE 38c. An "or" gate 1750 is connected to the input terminal of the cathode follower CF73. The term T3 is applied to the "or" gate 1750; and a plurality of "and" gates 1752, 1754 and 1756 are connected to the "or" gate 1750. The terms A504, $\overline{L6}$, $\overline{T2}$ and H33 are applied to the "and" gate 1752. The terms Q211, L6 and $\overline{T2}$ are applied to the "and" gate 1754. An "or" gate 1758 is also connected to the "and" gate 1754, and the terms H33 and H34 are applied to that "or" gate. The term $\overline{E51}$ is applied to the "and" gate 1756, and the term T2 is also applied to that "and" gate. An "or" gate 1760 is connected to that "and" gate 1756. The terms H33 and H34 are applied to the "or" gate 1716.

The control flip-flop L6 develops the terms L6 and $\overline{L6}$. An "and" gate 1762 is connected to the true input terminal of that flip-flop, and an "and" gate 1764 is connected to the false input terminal of the flip-flop. The terms T2 and H33 are applied to the "and" gate 1762, and the terms T2 and H34 are applied to the "and" gate 1764.

The flip-flop E51 develops the term $\overline{E51}$. An "and" gate 1766 is connected to the true input terminal of that flip-flop, and an "or" gate 1768 is connected to the false input terminal of the flip-flop. An "and" gate 1770 is connected to the "or" gate 1768. The terms $\overline{E51}$, Z50 and $\overline{T3}$ are introduced to the "and" gate 1766. The term T3 is applied to the "or" gate 1768, and the terms E51 and Z50 are applied to the "and" gate 1770.

Figure 38A:
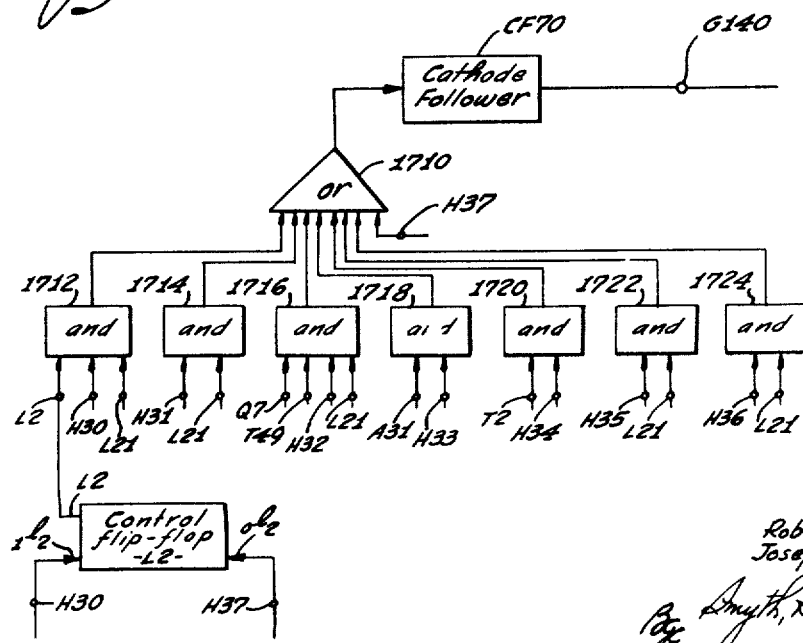
Figure 38D:
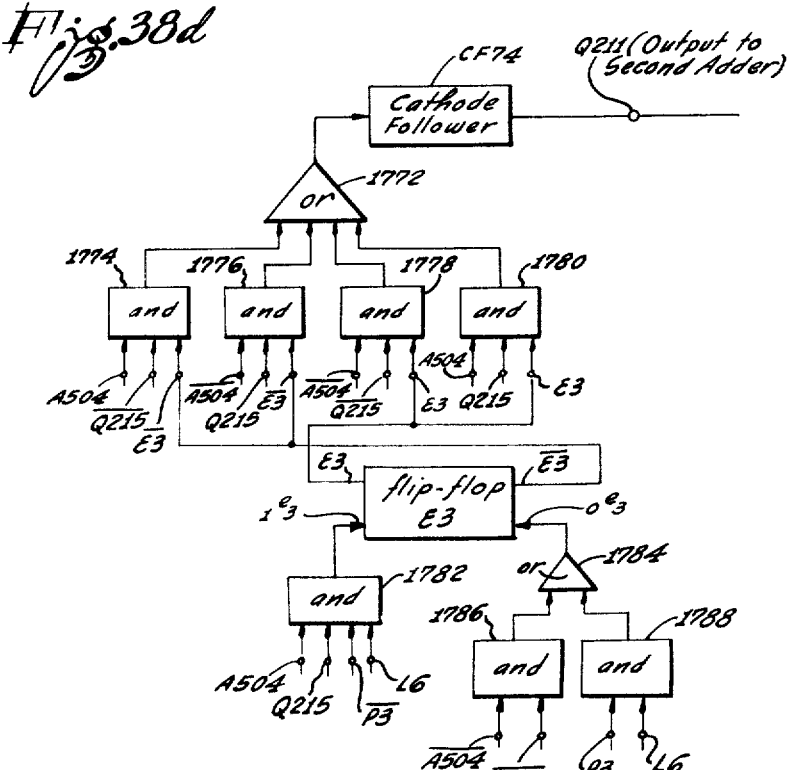

The output Q211 of the second adder in the execution of this command is formed at the output terminal of a cathode follower CF74 in FIGURE 38d. An "or" gate 1772 is connected to the input terminal of the cathode follower CF74, and a plurality of "and" gates 1774, 1776, 1778 and 1780 are connected to the "or" gate 1772. These gates are considered to form the second adder for this instruction. The second adder carry flip-flop E3 has its true output terminal connected to the "and" gates 1778 and 1780, and the false output terminal of that flip-flop is connected to the "and" gates 1774 and 1776. The terms A504 and $\overline{Q215}$ are introduced to the "and" gate 1774. The terms $\overline{A504}$ and Q215 are introduced to the "and" gate 1776. The terms $\overline{A504}$ and $\overline{Q215}$ are introduced to the "and" gate 1778. The terms A504 and Q215 are introduced to the "and" gate 1780.

An "and" gate 1782 is connected to the true input terminal of the second adder carry flip-flop E3, and an "or" gate 1784 is connected to the false input terminal of that flip-flop. A pair of "and" gates 1786 and 1788 are connected to the "or" gate 1784. The terms A504, Q215, $\overline{P3}$ and L6 are applied to the "and" gate 1782. The terms $\overline{A504}$ and $\overline{Q215}$ are applied to the "and" gate 1786. The terms P3 and L6 are applied to the "and" gate 1788.

Figure 38E:
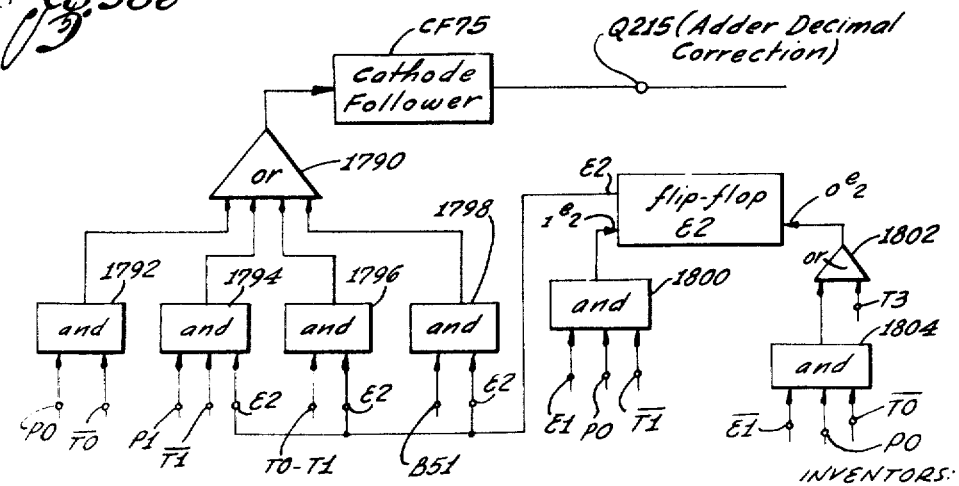

The adder decimal correction signal Q215 is formed at the output terminal of a cathode follower CF74 in FIGURE 38e. An "or" gate 1790 is connected to the cathode follower CF75. A plurality of "and" gates 1792, 1794, 1796 and 1798 are connected to the "or" gate 1790. The terms P0 and $\overline{T0}$ are applied to the "and" gate 1792. The terms P1, $\overline{T1}$ and E2 are introduced to the "and" gate 1794. The terms T0–T1 and E2 are applied to the "and" gate 1796. The terms B51 and E2 are applied to the "and" gate 1798.

The term E2 is formed at the true output terminal of the flip-flop E2. An "and" gate 1800 is connected to the true input terminal of the flip-flop E2, and an "or" gate 1802 is connected to the false input terminal of that flip-flop. An "and" gate 1804 is connected to the "or" gate 1802. The terms E1, P0 and $\overline{T1}$ are introduced to the "and" gate 1800. The terms E1, P0 and $\overline{T0}$ are introduced to the "and" gate 1804. The term T3 is introduced to the "or" gate 1802.

The following logical equations apply:

G140=L2.H30.L21+H31.L21+Q7.T49.H32.L21
$\qquad$+A31.H33+T2.H34+H35.L21+H36.L21+H37
$_1l_2$=H30
$_0l_2$=H37
Q0=Q210.H33
Q210=A500.$\overline{Q212}$.$\overline{E1}$+$\overline{A500}$.Q212.$\overline{E1}$+$\overline{A500}$.$\overline{Q212}$.E1
$\qquad$+A500.Q212.E1
Q212=Q225
$_1e_1$=A500.Q212.$\overline{T49}$.H33
$_0e_1$=$\overline{A500}$.$\overline{Q212}$.H33+T49.H33+T49.H32
$_1l_3$=E1.T49.H33
$_0l_3$=T49.H2
Z50=A504.$\overline{L6}$.$\overline{T2}$.H33+Q211.L6.$\overline{T2}$(H33+H34)
$\qquad$+$\overline{E51}$.T2(H33+H34)+T3
$_1e_{51}$=$\overline{E51}$.Z50.T3
$_0e_{51}$=E51.Z50+T3
$_1l_6$=T2.H33
$_0l_6$=T2.H34
Q211=A504.$\overline{Q215}$.$\overline{E3}$+$\overline{A504}$.Q215.$\overline{E3}$+$\overline{A504}$.$\overline{Q215}$.E3
$\qquad$+A504.Q215.E3
$_1e_3$=A504.Q215.$\overline{P3}$.L6
$_0e_3$=$\overline{A504}$.$\overline{Q215}$+P3.L6
Q215=P0.$\overline{T0}$+P1.$\overline{T1}$.E2(T0–T1)E2+B51.E2
$_1e_2$=E1.P0.$\overline{T1}$
$_0e_2$=$\overline{E1}$.P0.$\overline{T0}$+T3

All other registers recirculate normally.

F625—Add binary

The contents of the memory cell *m* are added to the contents of the accumulator register (A), with the result being left in the accumulator register. The 48 binary bits from the memory cell are added to the forty-eight binary bits held in the accumulator register (A).

The logic circuitry for carrying out the "add binary" instruction is illustrated in FIGURES 39a–39c. The logic circuitry of FIGURE 39a includes a cathode follower CF76 which develops the term G140 at its output terminal. An "or" gate 1810 is connected to the cathode follower CF76. A plurality of "and" gates 1812, 1814, 1816, 1818, 1820, 1822 and 1824 are connected to the "or" gate 1810. The term H37 is also introduced to the "or" gate.

The terms L2, H30 and L21 are introduced to the "and" gate 1812. The terms H31 and L21 are introduced to the "and" gate 1814. The terms Q7, T49, H32 and L21 are introduced to the "and" gate 1816. The terms T49 and H33 are introduced to the "and" gate 1818. The terms T2 and H34 are introduced to the "and" gate 1820. The terms H35 and L21 are introduced to the "and" gate 1822. The terms H36 and L21 are introduced to the "and" gate 1824.

The main input to the accumulator register (A) (Q0) is formed at the output of a cathode follower CF77 in FIGURE 39b. An "and" gate 1830 is connected to the cathode follower CF77. The term H33 is introduced to the "and" gate 1830, together with the first adder output term Q210. The term Q210 is formed at the output of an "or" gate 1832. A plurality of "and" gates 1834, 1836, 1838 and 1840 are connected to the "or" gate 1832. These gates are considered to form the first adder for this instruction. A cathode follower CF78 introduces the first adder input term Q212 to the "and" gate 1836 and to the "and" gate 1840. The output Q225 from the selected memory cell *m* is applied to the cathode follower CF78. The cathode follower CF78 in connected to an inverter I6. The inverter develops the term $\overline{Q212}$ and introduces that term to the "and" gates 1834 and 1838.

The first adder carry flip-flop E1 introduces the term E1 to the "and" gates 1838 and 1840, and that flip-flop introduces the term $\overline{E1}$ to the "and" gates 1834 and 1836. An "and" gate 1842 is connected to the true input terminal of the flip-flop E1, and an "or" gate 1844 is connected to the false input terminal. (A pair of "and" gates 1846 and 1848 are connected to the "or" gate 1844. The terms A500, Q212, $\overline{T49}$ and H33 are applied to the "and" gate 1842. The terms $\overline{A500}$, $\overline{Q212}$ and H33 are applied to the "and" gate 1846. The terms T49 and H32 are applied to the "and" gate 1848. The term A500 is also applied to the "and" gates 1834 and 1840, and the term $\overline{A500}$ is also applied to the "and" gates 1836 and 1838.

The input to the accumulator register write circuits (Z50) is formed at the output of a cathode follower CF79 in FIGURE 39c. An "or" gate 1850 is connected to the cathode follower CF79. The term T3 is introduced to the "or" gate 1850, and a pair of "and" gates 1852 and 1854 are connected to the "or" gate. A pair of "or" gates 1856 and 1858 are respectively connected to the "and" gates 1852 and 1854. The terms H33 and H34 are applied to the "or" gate 1856 and to the "or" gate 1858. The terms A504 and $\overline{T2}$ are applied to the "and" gate 1852. The terms $\overline{E51}$ and T2 are applied to the "and" gate 1854.

This may be expressed logically in the following manner:

G140=L2.H30.L21+H31.L21+Q7.T49.H32.L21
$\qquad$+T49.H33+T2.H34+H35.L21
$\qquad$+H36.L21+H37
$_1e_{51}$=$\overline{E51}$.Z50.$\overline{T3}$
$_0e_{51}$=E51.Z50+T3
$_1l_3$=E1.T49.H33
$_0l_3$=T49.H2
$_1l_2$=H30
$_0l_2$=H37
Q0=Q210.H33
Q210=A500.$\overline{Q212}$.$\overline{E1}$+$\overline{A500}$.Q212.$\overline{E1}$
$\qquad\overline{A500}$.$\overline{Q212}$.E1+A500.Q212.E1
Q212=Q225
$_1e_1$=A500.Q212.$\overline{T49}$.H33
$_0e_1$=$\overline{A500}$.$\overline{Q212}$.H33+T49.H32
Z50=A504.$\overline{T2}$(H33+H34)+$\overline{E51}$.T2(H33+H34)+T3

F626—Block add binary

For this instruction the binary sum of a block of words is added to the contents of the accumulator register (A), with the result being left in the accumulator register. The block is defined as the words contained in the memory cells *m* to the end of the track addressed. If the sum overflows the accumulator register, the indicator flip-flop is set true.

Figure 40A:
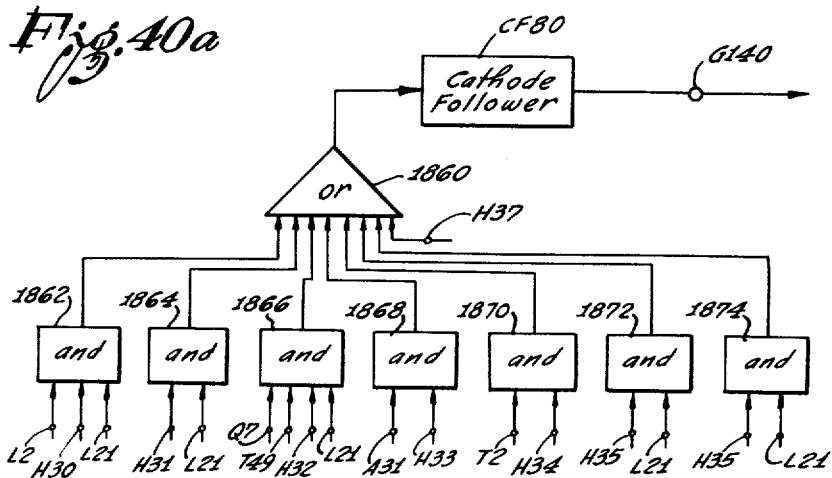
FIGURES 40a–40c represent the logic circuitry for carrying out a "block add binary" instruction in the computer.
Figure 40B:
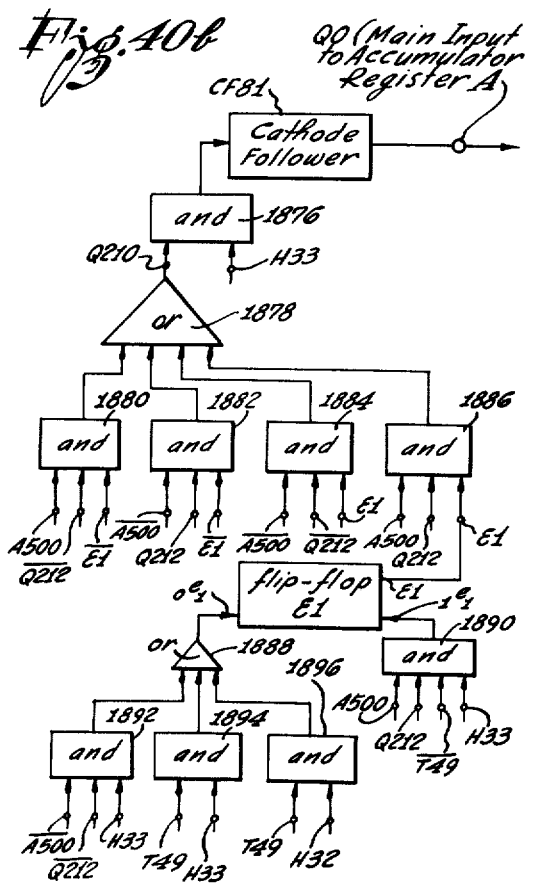
Figure 40C:
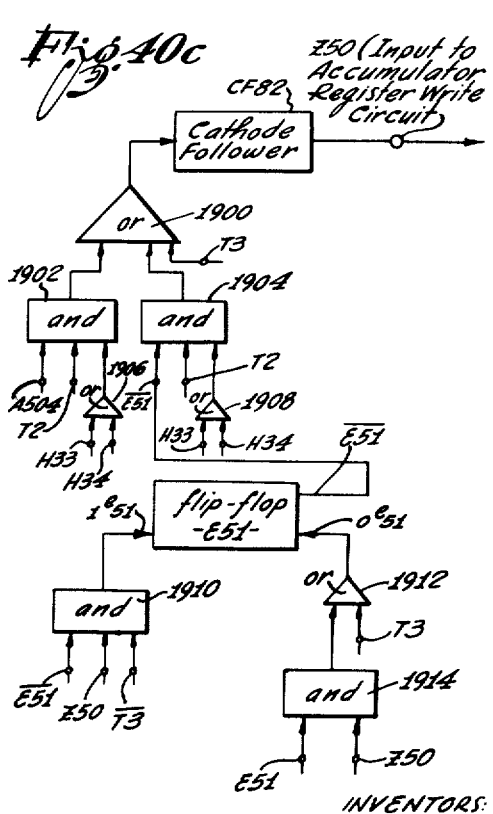

The logic circuitry for carrying out the "block add binary" instruction is set out in FIGURES 40a–40c. The execution counter term G140 is developed at the output of a cathode follower CF80 in FIGURE 40a. An "or" gate 1860 is connected to the cathode follower CF80. A plurality of "and" gates 1862, 1864, 1866, 1868, 1870, 1872 and 1874 are connected to the "or" gate 1860. The term H37 is also introduced to the "or" gate 1860. The terms L2, H30 and L21 are introduced to the "and" gate 1862. The terms H31 and L21 are introduced to the "and" gate 1864. The terms Q7, T49, H32 and L21 are introduced to the "and" gate 1866. The terms A31 and H33 are introduced to the "and" gate 1868. The terms T2 and H34 are introduced to the "and" gate 1870. The terms H35 and L21 are introduced to the "and" gate 1872. The terms H36 and L21 are introduced to the "and" gate 1874.

The main input Q0 to the accumulator register (A) is formed at the output of a cathode follower CF81 in FIGURE 40b. An "and" gate 1876 is connected to the cathode follower CF81, and the first adder output term Q210 and the count timing signal H33 are applied to the "and" gate 1876. The term Q210 is formed at the output of an "or" gate 1878. A plurality of "and" gates 1880, 1882, 1884 and 1886 are connected to the "or" gate 1878. These gates are considered to form the first adder for this instruction. The terms A500, $\overline{Q212}$ and $\overline{E1}$ are applied to the "and" gate 1880. The terms $\overline{A500}$, Q212 and $\overline{E1}$ are applied to the "and" gate 1882. The terms $\overline{A500}$, $\overline{Q212}$ and E1 are applied to the "and" gate 1884. The terms A500, Q212 and E1 are applied to the "and" gate 1886.

The first adder carry term E1 is formed at the true output terminal of the first adder carry flip-flop E1. An "or" gate 1888 is connected to the false input terminal of the flip-flop E1, and an "and" gate 1890, is connected to the true input terminal. A plurality of "and" gates 1892, 1894 and 1896 are connected to the "or" gate 1880. The terms $\overline{A500}$, $\overline{Q212}$ and H33 are applied to the "and" gate 1892. The terms T49 and H33 are applied to the "and" gate 1894. The terms T49 and H32 are applied to the "and" gate 1896. The terms A500, Q212, $\overline{T49}$ and H33 are applied to the "and" gate 1890.

The input Z50 to the accumulator register write circuits is formed at the output terminal of a cathode follower CF82. An "or" gate 1900 is connected to the cathode follower CF82. The term T3 is introduced to the "or" gate 1900 and a pair of "and" gates 1902 and 1904 are connected to that "or" gate. A pair of "or" gates 1906 and 1908 are respectively connected to the "and" gates 1902 and 1904. The terms A504 and $\overline{T2}$ are applied to the "and" gate 1902. The terms $\overline{E51}$ and T2 are applied to the "and" gate 1904. The terms H33 and H34 are applied to the "or" gate 1906 and to the "or" gate 1908.

The flip-flop E51 supplies the term $\overline{E51}$ to the "and" gate 1904. The flip-flop has an "and" gate 1910 connected to its false input terminal and an "or" gate 1912 connected to its true input terminal. An "and" gate 1914 is connected to the "or" gate 1912. The terms $\overline{E51}$, Z50 and $\overline{T3}$ are applied to the "or" gate 1910. The terms E51, Z50 and T3 are applied to the "or" gate 1912.

The instruction may be represented by the following logic equations:

G140=L2.H30.L21+H31.L21+Q7.T49.H32.L21
　　　+A31.H33+T2.H34+H35.L21+H36.L21+H37
$_1l_2$=H30
$_0l_2$=H37
Q0=Q210.H33
Q210=A500.$\overline{Q212}$.$\overline{E1}$+$\overline{A500}$.Q212.$\overline{E1}$+
　　　+$\overline{A500}$.$\overline{Q212}$.E1+A500.Q212.E1
Q212=Q225
$_1e_1$=A500.Q212.$\overline{T49}$.H33
$_0e_1$=$\overline{A500}$.$\overline{Q212}$.H33+T49.H33+T49.H32
Z50=A504.$\overline{T2}$(H33+H34)+$\overline{E51}$.T2(H33+H34)+T3
$_1e_{51}$=$\overline{E51}$.Z50.$\overline{T3}$
$_0e_{51}$=E51.Z50+T3
$_1l_3$=E1.T49.H33
$_0l_3$=T49.H2

*F635—Subtract decimal*

This instruction requires that the contents of a select memory cell m be subtracted from the contents of the accumulator register (A). The 12 decimal digits of the word in the selected memory cell m are subtracted from the 12 decimal digits of the word in the accumulator register. The result appears without a sign, and if the result of the subtraction is negative, it will appear in complementary form. The indicator flip-flop will be set true if the result is positive, but will be left false if the result is negative.

The logic circuitry for executing the "subtract decimal" instruction is set out in FIGURES 41a–41d. The execution cycle counter term G140 is formed at the output of a cathode follower CF83 in FIGURE 41a. An "or" gate 1916 is connected to the cathode follower CF83. A plurality of "and" gates 1918, 1920, 1922, 1924, 1926, 1928, and 1930 are connected to the "or" gate 1916. The term H37 is also introduced to the "or" gate.

The terms L2, H30 and L21 are introduced to the "and" gate 1918. The terms H31 and L21 are introduced to the "and" gate 1920. The terms Q7, T49, H32 and L21 are introduced to the "and" gate 1922. The terms T49 and H33 are introduced to the "and" gate 1924. The terms T2 and H34 are introduced to the "and" gate 1926. The terms H35 and L21 are introduced to the "and" gate 1928. The terms H36 and L21 are introduced to the "and" gate 1930.

The main input Q0 to the accumulator register is formed at the output of a cathode follower CF84 in FIGURE 41b. An "and" gate 1932 is connected to the cathode follower, and the first adder output term Q210 and the timing signal H33 are applied to the "and" gate. An "or" gate 1934 forms the term Q10, and a plurality of "and" gates 1936, 1938, 1940 and 1942 are connected to the "or" gate 1934. These gates are considered to form the first adder for this instruction.

The terms A500, $\overline{Q212}$ and $\overline{E1}$ are applied to the "and" gate 1936. The terms $\overline{A500}$, Q212 and $\overline{E1}$ are applied to the "and" gate 1938. The terms $\overline{A500}$, $\overline{Q212}$ and E1 are applied to the "and" gate 1940. The terms A500, Q212 and E1 are applied to the "and" gate 1942.

The first adder carry term E1 is formed by the first adder carry flip-flop E1. An "or" gate 1944 is connected to the true input terminal of that flip-flop, and an "and" gate 1946 is connected to the false input terminal. A pair of "and" gates 1948 and 1950 are connected to the "or" gate 1944. The terms H32 and T49 are applied to the "and" gate 1948. The terms A500, Q212, $\overline{T49}$ and H33 are applied to the "and" gate 1950. The terms $\overline{A500}$, $\overline{Q212}$ and H33 are applied to the "and" gate 1946.

The input term Z50 to the write circuits of the accumulator register is formed at the output of a cathode follower CF85 in FIGURE 41c. An "or" gate 1952 is connected to the cathode follower CF85. The term T3 is introduced to the "or" gate 1952, and a plurality of "and" gates 1954, 1956 and 1958 are connected to the "or" gate 1952.

An "or" gate 1960 is connected to the "and" gate 1956, and an "or" gate 1962 is connected to the "and" gate 1958. The terms H33 and H34 are introduced to the "or" gate 1960 and to the "or" gate 1962. The terms A504, $\overline{L6}$, $\overline{T2}$ and H33 are introduced to the "and" gate 1954. The terms Q211, L6 and $\overline{T2}$ are introduced to the "and" gate 1956. The terms $\overline{E51}$ and T2 are introduced to the "and" gate 1958.

The control flip-flop L6 develops the term $\overline{L6}$. An "and" gate 1964 is connected to the true input terminal of the control flip-flop, and an "and" gate 1966 is connected to the false input terminal. The terms T2 and H33 are applied to the "and" gate 1964. The terms T2 and H34 are applied to the "and" gate 1966.

The flip-flop E51 develops the term $\overline{E51}$. An "and" gate 1968 is connected to the true input terminal of that flip-flop, and an "or" gate 1970 is connected to the false input terminal of the flip-flop. An "and" gate 1972 is connected to the "or" gate 1970.

The terms $\overline{E51}$, Z50 and $\overline{T3}$ are applied to the "and" gate 1968. The terms E51 and Z50 are applied to the "and" gate 1972. The term T3 is applied to the "or" gate 1970.

The output Q211 of the second adder is formed by a cathode follower CF86 in FIGURE 41d. An "or" gate 1974 is connected to that cathode follower. A plurality or "and" gates 1976, 1978, 1980 and 1982 are connected to the "or" gate 1974. These gates are considered to form the second adder for this instruction. The terms A504, $\overline{Q215}$ and $\overline{E3}$ are applied to the "and" gate 1976. The terms $\overline{E3}$, $\overline{A504}$ and Q214 are applied to the "and" gate 1978. The terms $\overline{Q504}$, $\overline{Q215}$ and E3 are applied to the "and" gate 1980. The terms A504, Q215 and E3 are applied to the "and" gate 1982.

The second adder carry flip-flop E3 forms the term E3 at its true output terminal. An "and" gate 1984 is connected to the true input terminal of the flip-flop E3, and an "or" gate 1986 is connected to the false input terminal. A pair of "and" gates 1988 and 1990 are connected to the "or" gate 1986. The terms $\overline{A504}$ and $\overline{Q215}$ are introduced to the "and" gate 1988. The terms P3 and L6 are introduced to the "and" gate 1990. The terms A504, Q215, $\overline{P3}$ and L6 are introduced to the "and" gate 1984. The adder decimal correction term Q215 is formed by a cathode follower CF86A and an "or" gate 1992 is connected to that cathode follower. A plurality of "and" gates 1994, 1996, 1998 and 2000 are connected to the "or" gate 1992.

The terms P0 and $\overline{T0}$ are applied to the "and" gate 1994. The terms P1, $\overline{T1}$ and E2 are applied to the "and" gate 1996. The terms T0–T7 and $\overline{E2}$ are applied to the "and" gate 1998. The terms B51 and $\overline{E2}$ are applied to the "and" gate 2000.

The adder correction control flip-flop E2 forms the term E2 at its true output terminal. An "and" gate 2002 is connected to the true input terminal of the flip-flop E2, and an "or" gate 2004 is connected to the false input terminal. The terms P0, E1 and T0 are introduced to the "and" gate 2002. The terms $\overline{E1}$, $\overline{T0}$ and P0 are introduced to an "and" gate 2006, which is connected to the "or" gate 2004. The term T3 is also introduced to the "or" gate 2004.

The following logic equations apply:

$G140 = L2.H30.L21 + H31.L21 + Q7.T49.H32.L21$
$\qquad + T49.H33 + T2.H34 + H35.L21 + H36.L21 + H37$
$_1I_2 = H30$
$_0I_2 = H37$
$Q0 = Q210.H33$
$Q210 = A500.\overline{Q212}.\overline{E1} + \overline{A500}.Q212.\overline{E1} + \overline{A500}.\overline{Q212}.E1$
$\qquad + A500.Q212.E1$
$Q212 = \overline{Q225}$
$_1e_1 = T49.H32 + A500.Q212.\overline{T49}.H33$
$_0e_1 = \overline{A500}.\overline{Q212}.H33$
$Z50 = A504.\overline{L6}.\overline{T2}.H33 + Q211.L6.\overline{T2}(H33+H34)$
$\qquad + \overline{E51}.T2(H33+H34) + T3$
$_1e_{51} = \overline{E51}Z50.\overline{T3}$
$_0e_{51} = E51.Z50 + T$
$_1l_6 = T2.H33$
$_0l_6 = T2.H34$
$Q211 = A504.\overline{Q215}.\overline{E3} + \overline{A504}.Q215.\overline{E3} + \overline{A504}.\overline{Q215}.E3$
$\qquad + A504.Q215.E3$
$_1e_3 = A504.Q215.\overline{P3}.L6$
$_0e_3 = \overline{A504}.\overline{Q215} + P3.L6$
$Q215 = P0.\overline{T0} + P1.\overline{T1}.E2 + (T0-T1).\overline{E2} + B51.\overline{E2}$
$_1e_2 = E1.P0.\overline{T0}$
$_0e_2 = \overline{E1}.P0.\overline{T0} + T3$
$_1l_3 = E1.T49.H33$
$_0l_3 = T49.H2$

*F636—Block subtract decimal*

Here the decimal sum of a block of words is subtracted from the contents of the accumulator register, leaving the result in the accumulator register. The block is defined as the words contained in memory cells *m* to the end of the track addressed. If the result of the subtraction is positive, the indicator flip-flop is set true. If the result is negative, the answer will appear in complementary form, and the indicator flip-flop will not be set true.

The logic circuitry for carrying out the "block subtract decimal" instruction is illustrated in FIGURES 42a–42e. The execution cycle term G140 for this instruction is formed at the output of a cathode follower CF87 in FIGURE 42a. An "or" gate 2008 is connected to the cathode follower CF87. A plurality of "and" gates 2010, 2012, 2014, 2016, 2018, 2020 and 2022 are connected to the "or" gate 2008. The term H37 is also introduced to the "or" gate 2008. The terms H36 and L21 are applied to the "and" gate 2010. The terms L2, H30 and L21 are applied to the "and" gate 2012. The terms H31 and L21 are applied to the "and" gate 2014. The terms Q7, T49, H32 and L21 are applied to the "and" gate 2016. The terms A31 and H33 are applied to the "and" gate 2018. The terms T2 and H34 are applied to the "and" gate 2020, and the terms H35 and L21 are applied to the "and" gate 2022.

The main input Q0 to the accumulator register is formed by a cathode follower CF88 in FIGURE 42b. An "and" gate 2024 is connected to the cathode follower CF88. The first adder output term Q210 and the timing signal H33 are applied to the "and" gate 2024. An "or" gate 2026 produces the term Q210. A plurality of "and" gates 2028, 2030, 2032 and 2034 are connected to the "or" gate 2026. These gates are considered to form the first adder for this instruction. The terms A500, $\overline{Q212}$ and $\overline{E1}$ are applied to the "and" gate 2028. The terms $\overline{A500}$, Q212 and $\overline{E1}$ are applied to the "and" gate 2030. The terms $\overline{A500}$, $\overline{Q212}$ and E1 are applied to the "and" gate 2032. The terms A500, Q212 and E1 are applied to the "and" gate 2034.

The first adder carry term E1 is formed at the true output terminal of the flip-flop E1. An "or" gate 2036 is connected to the true input terminal of that flip-flop, and an "and" gate 2038 is connected to the false input terminal. A plurality of "and" gates 2040, 2042 and 2044 are connected to the "or" gate 2036. The terms T49 and H32 are introduced to the "and" gate 2040. The terms A500, Q212, $\overline{T49}$ and H33 are introduced to the "and" gate 2042. The terms T49 and H33 are introduced to the "and" gate 2044. The terms H33, $\overline{T49}$, $\overline{Q212}$ and A500 are applied to the "and" gate 2038.

The input Z50 to the accumulator register write circuits is formed in FIGURE 42c by a cathode follower CF89. An "or" gate 2050 is connected to the cathode follower. The term T3 is applied to the "or" gate 2050, and a plurality of "and" gates 2052, 2054 and 2056 are connected to that "or" gate.

The terms A504, $\overline{L6}$, $\overline{T2}$ and H33 are introduced to the "and" gate 2052. The terms Q211, L6 and $\overline{T2}$ are introduced to the "and" gate 2054. The terms H33 and H34 are applied to an "or" gate 2058, which is connected to the "or" gate 2054. The terms $\overline{E51}$ and T2 are introduced to the "and" gate 2056. The terms H33 and H34 are introduced to an "or" gate 2060, and the latter "or" gate is connected to the "and" gate 2056.

The flip-flop L6 develops the term L6 at its true output terminal. An "and" gate 2062 is connected to the true input terminal of the flip-flop L6, and an "and" gate 2064 is connected to the false input terminal. A pair of terms T2 and H33 are applied to the "and" gate 2062, and a pair of terms T2 and H34 are applied to the "and" gate 2064.

The flip-flop E51 develops the term $\overline{E51}$ at its true output terminal. An "and" gate 2066 is connected to the true input terminal of that flip-flop, and an "or" gate 2068 is connected to the false input terminal. An "and" gate 2070 is connected to the "or" gate 2068. A plurality of terms E51, Z50 and $\overline{T3}$ are introduced to the "and" gate 2066. A pair of terms E51 and Z50 are introduced to the "and" gate 2070. The term T3 is applied to the "or" gate 2068.

The output Q211 of the second adder is formed by a cathode follower CF90 in FIGURE 42d. An "or" gate 2072 is connected to the cathode follower CF90. A plurality of "and" gates 2074, 2076, 2078 and 2080 are connected to the "or" gate 2072. These gates are considered to form the second adder for this instruction. The terms A504, $\overline{Q215}$ and $\overline{E3}$ are applied to the "and" gate 2074. The terms $\overline{A504}$, Q215 and $\overline{E3}$ are applied to the "and" gate 2076. The terms $\overline{A504}$, $\overline{Q215}$ and E3 are applied to the "and" gate 2078. The terms A504, Q215 and E3 are applied to the "and" gate 2080.

The second adder carry flip-flop E3 forms the term E3 at its true output terminal. An "and" gate 2082 is connected to the true input terminal of the flip-flop E3, and an "or" gate 2084 is connected to the false input terminal of that flip-flop. A pair of "and" gates 2086 and 2088 are connected to the "or" gate 2084. The terms A504, Q215, $\overline{P3}$ and L6 are applied to the "and" gate 2082. The terms $\overline{A504}$ and $\overline{Q215}$ are applied to the "and" gate 2086. The terms P3 and L6 are applied to the "and" gate 2088.

The term Q215, which represents the adder decimal correction term is formed at the output of a cathode follower CF91 in FIGURE 42e. An "or" gate 2091 is connected to the cathode follower CF91. A plurality of "and" gates 2092, 2094, 2096 and 2098 are connected to the "or" gate 2090. The terms P0 and $\overline{T0}$ are introduced to the "and" gate 2092. The terms P1, $\overline{T1}$ and E2 are introduced to the "and" gate 2094. The terms T0–T1 and $\overline{E2}$ are introduced to the "and" gate 2096. The terms B51 and $\overline{E2}$ are introduced to the "and" gate 2098.

The adder correction control flip-flop E2 develops the term $\overline{E2}$ at its false output terminal. An "and" gate 2100 is connected to the true input terminal of the flip-flop E2, and an "or" gate 2102 is connected to the false input terminal of the flip-flop. The terms $\overline{T0}$, P0 and E1 are introduced to the "and" gate 2100. The terms $\overline{E1}$, P0 and $\overline{T0}$ are introduced to an "and" gate 2104. The "and" gate 2104 is connected to the "or" gate 2102. A term T3 is also introduced to the "or" gate 2102.

Reference is made to the following logic equations:

G140=L2.H30.L21+H31.L21+Q7.T49.H32.L21
    +A31.H33+T2.H34+H35.L21+H36.L21+H37
$_1l_2$=H30
$_0l_2$=H37
Q0=Q210.H33
Q210=A500.$\overline{Q212}$.$\overline{E1}$+$\overline{A500}$.Q212.$\overline{E1}$+$\overline{A500}$.$\overline{Q212}$.E1
    +A500.Q212.E1
Q212=$\overline{Q225}$
$_1e_1$=T49.H32+A500.Q212.$\overline{T49}$.H33+T49.H33
$_0e_1$=$\overline{A500}$.$\overline{Q212}$.$\overline{T49}$.H33
Z50=A504.$\overline{L6}$.$\overline{T2}$.H33+Q211.L6.$\overline{T2}$(H33+H34)
    +$\overline{E51}$.T2(H33+H34)+T3
$_1e_{51}$=$\overline{E51}$.Z50.$\overline{T3}$
$_0e_{51}$=E51.Z50+T3
$_1l_6$=T2.H33
$_0l_6$=T2.H34
Q211=A504.$\overline{Q215}$.$\overline{E3}$+$\overline{A504}$.Q215.$\overline{E3}$+$\overline{A504}$.$\overline{Q215}$.E3
    +A504.Q215.E3
$_1e_3$=A504.Q215.$\overline{P3}$.L6
$_0e_3$=$\overline{A504}$.$\overline{Q215}$+P3.L6
Q215=P0.$\overline{T0}$+P1.$\overline{T1}$.E2+(T0−T1).$\overline{E2}$+B51.$\overline{E2}$
$_1e_2$=E1.P0.$\overline{T0}$
$_0e_2$=$\overline{E1}$.P0.$\overline{T0}$+T3
$_1l_3$=E1.A31.H33
$_0l_3$=T49.H2

*F645—Subtract binary*

Under this command the contents of a selected memory cell are subtracted from the contents of the accumulator register (A). The 48 binary bits in the selected memory cell m are subtracted from the 48 binary bits held in the accumulator register. The result appears without a sign, and if the result of the subtraction is negative it will appear in complementary form and an indicator flip-flop IT is set true. If the result is positive, as noted above, the indicator flip-flop will not be set true.

Figure 43B:
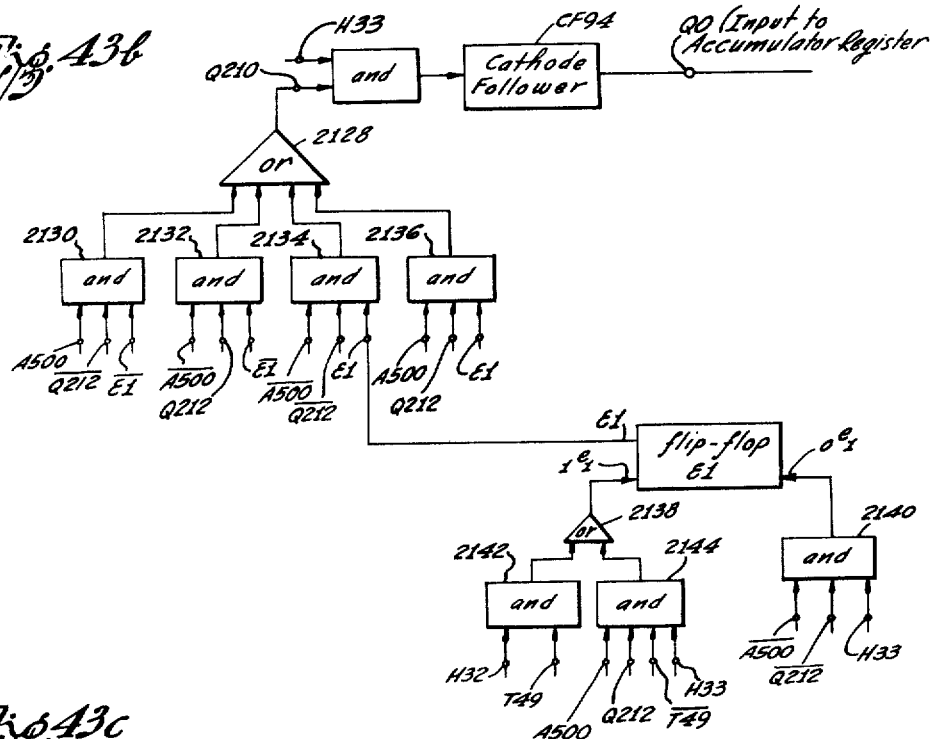
Figure 43C:
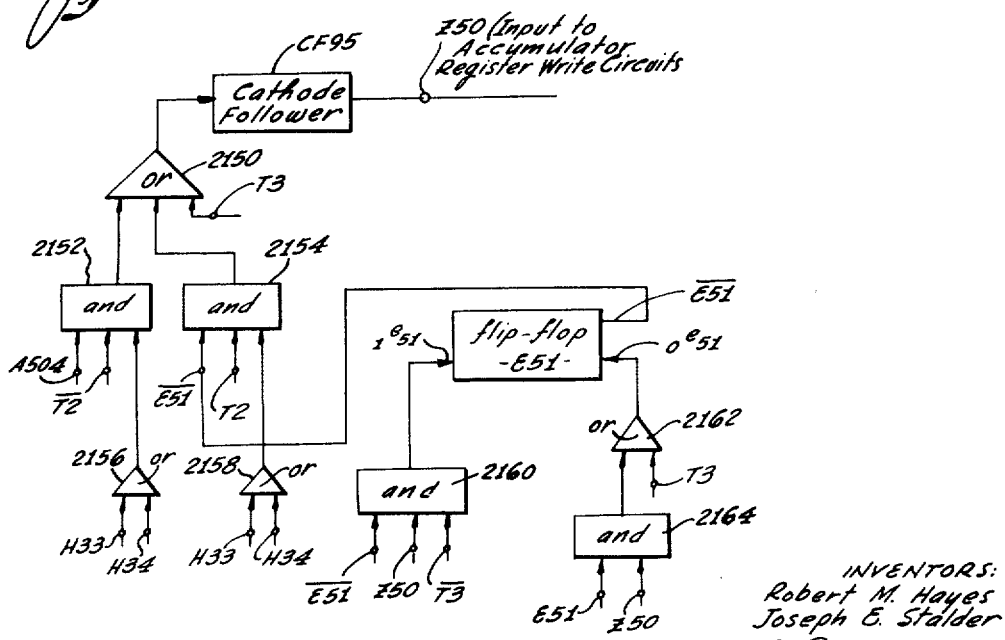

The logic circuitry required for carrying out the "subtract binary" instruction is set out in FIGURES 43a–43c. The term G140 for timing this instruction is formed by a cathode follower CF92 in FIGURE 43a. An "or" gate 2110 is connected to the cathode follower CF92. A plurality of "and" gates 2112, 2114, 2116, 2118, 2120, 2122 and 2124 are connected to the "or" gate 2110. The term H37 is also applied to the "or" gate 2110.

The terms L2, H30 and L21 are introduced to the "and" gate 2112. The terms H31 and L21 are introduced to the "and" gate 2114. The terms Q7, T49 and L21 are introduced to the "and" gate 2116. The terms T49 and H33 are introduced to the "and" gate 2118. The terms T2 and H34 are introduced to the "and" gate 2120. The terms H35 and L21 are introduced to the "and" gate 2122. The terms H36 and L21 are introduced to the "and" gate 2124.

The main input Q0 to the accumulator register is formed by a cathode follower CF94 in FIGURE 43b. An "and" gate 2126 is connected to the cathode follower. The terms H33 and Q210 are introduced to the "and" gate 2126. The first adder output term Q210 is formed at the output of an "or" gate 2128. A plurality of "and" gates 2130, 2132, 2134 and 2136 are connected to the "or" gate 2128. These gates are considered to form the first adder for this instruction. The terms A500, $\overline{Q212}$ and $\overline{E1}$ are introduced to the "and" gate 2130. The terms $\overline{A500}$, Q212 and $\overline{E1}$ are introduced to the "and" gate 2132. The terms $\overline{A500}$, $\overline{Q212}$ and E1 are introduced to the "and" gate 2134. The terms A500, Q212 and E1 are introduced to the "and" gate 2136.

The first adder carry flip-flop E1 forms the term E1 at its true output terminal. An "or" gate 2138 is connected to the true input terminal of the flip-flop E1, and an "and" gate 2140 is connected to the false input terminal of that flip-flop. A pair of "and" gates 2142 and 2144 are connected to the "or" gate 2138. The terms H32 and T49 are applied to the "and" gate 2142. The terms A500, Q212, $\overline{T49}$ and H33 are applied to the "and" gate 2144. The terms $\overline{A500}$, $\overline{Q212}$ and H33 are applied to the "and" gate 2140.

The input Z50 to the accumulator register write circuits for the subtract binary instruction is formed by a cathode follower CF95 in FIGURE 43c. An "or" gate 2150 is connected to the cathode follower CF95, and the term T3 is applied to that "or" gate. A pair of "and" gates 2152 and 2154 are connected to the "or" gate 2150. An "or" gate 2152. The terms H33 and H34 are introduced to "or" gate 2158 is connected to the "and" gate 2154. The terms A504 and $\overline{T2}$ are introduced to the "and" gate 2156 is connected to the "and" gate 2152, and an the "or" gate 2156. The terms $\overline{E51}$ and T2 are introduced to the "and" gate 2154. The terms H33 and H34 are introduced to the "or" gate 2158.

The flip-flop E51 forms the term $\overline{E51}$ at its false output terminal. An "and" gate 2160 is connected to the true input terminal of the flip-flop E51, and an "or" gate 2162 is connected to the false input terminal. The terms $\overline{E51}$, Z50 and $\overline{T3}$ are applied to the "and" gate 2160. The terms E51 and Z50 are applied to an "and" gate 2164. The "and" gate 2164 is connected to the "or" gate 2162. A term T3 is also introduced to the "or" gate 2162.

The logic equations for this instruction are as follows:

G140=L2.H30.L21+H31.L21+Q7.T49.H32.L21
 +T49.H33+T2.H34+H35.L21+H36.L21+H37
$_1l_2$=H30
$_0l_2$=H37
Q0=Q210.H33
Q210=A500.$\overline{Q212}$.$\overline{E1}$+$\overline{A500}$.Q212.$\overline{E1}$+$\overline{A500}$.$\overline{Q212}$.E1
 +A500.Q212.E1
Q212=$\overline{Q225}$
$_1e_1$=T49.H32+A500.Q212.$\overline{T49}$.H33
$_0e_1$=$\overline{A500}$.$\overline{Q212}$.H33
Z50=A504.$\overline{T2}$(H33+H34)+$\overline{E51}$.T2(H33+H34)+T3
$_1e_{51}$=$\overline{E51}$.Z50.$\overline{T3}$
$_0e_{51}$=E51.Z50+T3
$_1l_3$=E1.T49.H33
$_0l_3$=T49.H2

F646—Block subtract binary

Subtract the binary sum of a block of words from the contents of the accumulator register (A) leaving the result in the accumulator register. The block is defined as the words contained in the memory cells $m$ to the end of the track addressed. As before, if the result of the subtraction is positive, the indicator flip-flop IT is set true. If the result is negative, however, the answer will appear in complementary form and the indicator flip-flop will not be set true.

The logic circuitry for carrying out the "block subtract binary" instruction is set out in FIGURES 44a–44c. The term G140 for carrying out this instruction is formed in FIGURE 44a at the output terminal of a cathode follower CF96.

An "or" gate 2170 is connected to the cathode follower CF96. The term H37 is introduced to the "or" gate 2170. A plurality of "and" gates 2172, 2174, 2176, 2178, 2180, 2182 and 2184 are connected to the "or" gate 2170. The terms L2, H30 and L21 are introduced to the "and" gate 2172. The terms H31 and L21 are introduced to the "and" gate 2174. The terms Q7, T49, H32 and L21 are introduced to the "and" gate 2176. The terms A31 and H33 are introduced to the "and" gate 2178. The terms T2 and H34 are introduced to the "and" gate 2180. The terms H35 and L21 are introduced to the "and" gate 2182. The terms H36 and L21 are introduced to the "and" gate 2184.

The input Q0 to the accumulator register for the block substract binary instruction is formed by a cathode follower CF97 in FIGURE 44b. An "and" gate 2186 is connected to the cathode follower CF97, and the terms H33 and Q210 are introduced to that "and" gate. The first adder output term Q210 is formed at the output of an "or" gate 2188. A plurality of "and" gates 2190, 2192, 2194 and 2196 are connected to the "or" gate 2188. These gates are considered to the form the first adder for this instruction. The terms A500, $\overline{Q212}$ and $\overline{E1}$ are introduced to the "and" gate 2190. The terms $\overline{A500}$, Q212 and $\overline{E1}$ are introduced to the "and" gate 2192. The terms $\overline{A500}$, $\overline{Q212}$ and E1 are introduced to the "and" gate 2194. The terms A500, Q212 and E1 are introduced to the "and" gate 2196.

The first adder carry term E1 is formed at the true output terminal of the flip-flop E1. An "or" gate 2198 is connected to the true input terminal of that flip-flop, and an "and" gate 2200 is connected to the false input terminal. A plurality of "and" gates 2202, 2204 and 2206 are connected to the "or" gate 2198. The terms T49 and H32 are introduced to the "and" gate 2202. The terms A500, Q212, $\overline{T49}$ and H33 are introduced to the "and" gate 2204. The terms T49 and H33 are introduced to the "and" gate 2206. The terms $\overline{A500}$, $\overline{Q212}$, $\overline{T49}$ and H33 are introduced to the "and" gate 2200.

The term Z50 is formed at the output of a cathode follower CF97A (FIGURE 44c). An "or" gate 2205 is connected to the cathode follower and a pair of "and" gates 2207 and 2209 are connected to the "or" gate. The term T3 is also introduced to the "or" gate. The terms A504 and $\overline{T2}$ are introduced to the "and" gate 2207, and an "or" gate 2211 is connected to that "and" gate. The terms H33 and H34 are introduced to the "or" gate 2211. The terms $\overline{E51}$ and T2 are introduced to the "and" gate 2209, and an "or" gate 2213 is connected to that "and" gate. The terms H33 and H34 are introduced to the "or" gate 2213.

The logic for this instruction may be set out in the following equations:

G140=L2.H30.L21+H31.L21+Q7.T49.H32.L21
 +A31.H33+T2.H34+H35.L21
 +H36.L21+H37
$_1l_2$=H30
$_0l_2$=H37
Q0=Q210.H33
Q210=A500.$\overline{Q212}$.$\overline{E1}$+$\overline{A500}$.Q212.$\overline{E1}$
 +$\overline{A500}$.$\overline{Q212}$.E1+A500.Q212.E1
Q212—$\overline{Q225}$
$_1e_1$=T49.H32+A500.Q212.$\overline{T49}$.H33+T49.H33
$_0e_1$=$\overline{A500}$.$\overline{Q212}$.$\overline{T49}$.H33
Z50=A504.$\overline{2T}$(H33+H34)+$\overline{E51}$.T2(H33+H34)+T3
$_1e_{51}$=$\overline{E51}$.Z50.$\overline{T3}$
$_0e_{51}$=E51.Z50+T3
$_1l_3$=E1.A31.H33
$_0l_3$=T49.H2

F650—Multiply

This command requires that the contents of the accumulator register (A) be multiplied by the contents of the memory cells. The product is held in the accumulator, and can contain a maximum of 12 digits. If no overflow occurs, the indicator flip-flop IT is set true. There are no facilities for sign. This is an integer operation, and the internal machine decimal point is assumed to be at the right hand end of the word. The operation time for the command depends on the size and number of multiplier digits. The elapsed time, in word times is the number of multiplier digits, plus the sum of the multiplier digits, plus three word times.

The logic circuitry for carrying out the "multiply" instruction is set out in FIGURES 45a–45n. The execution cycle count term G140 for this instruction is formed by a cathode follower CF98 in FIGURE 45a. An "or" gate 2210 is connected to the cathode follower CF98. The term H37 is applied to the "or" gate 2210. A plurality of "and" gates 2212, 2214, 2216, 2218, 2220, 2222 and 2224 are connected to the "or" gate 2210. The terms L2, H30 and L21 are introduced to the "and" gate 2212. The terms H31 and L21 are introduced to the "and" gate 2214. The terms Q7, T49, H33 and L21 are introduced to the "and" gate 2216. The terms L8, Q70, T49 and H33 are introduced to the "and" gate 2218. The terms T2 and H34 are introduced to the "and" gate 2220. The terms H35 and L21 are introduced to the "and" gate 2222. The terms H36 and L21 are introduced to the "and" gate 2224.

The input to the MR register write circuits (Z71) for the multiply instruction is formed by a cathode follower CF99 in FIG. 45b. An "or" gate 2226 is connected to the cathode follower CF99. The term T3 is introduced to the "or" gate 2226. A plurality of "and" gates 2228, 2230, 2232, 2234 and 2236 are connected to the "or" gate 2226.

The terms Q225, $\overline{L1}$, $\overline{L4}$, H33 and T4–T47 are introduced to the "and" gate 2228. The terms A71, L4, H33 and T4–T47 are introduced to the "and" gate 2230. The terms A713, $\overline{L1}$, H33 and T48–T49 are introduced to the "and" gate 2232. The terms A713, $\overline{L1}$, H33 and T0–T1 are introduced to the "and" gate 2234. The terms $\overline{E72}$, T2 and H33 are introduced to the "and" gate 2236.

The input to the MR buffer (Q710) for the multiply instruction is formed by a cathode follower CF100 in FIGURE 45c. An "or" gate 2240 is connected to the cathode follower CF100. A plurality of "and" gates 2242, 2244, 2246 and 2248 are connected to the "or" gate 2240. The terms A71, L1 and H33 are introduced to the "and" gate 2242. The terms Q225, $\overline{L1}$, $\overline{L4}$, T0–T3 and H33 are introduced to the "and" gate 2244. The terms $\overline{B51}$, $\overline{L1}$, T44–T49 and H33 are introduced to the "and" gate 2246. The terms A71, L4, T0–T3 and H33 are introduced to the "and" gate 2248.

The shift signal S710 for the MR buffer is formed by a cathode follower CF101 in the circuitry of FIGURE 45d. An "or" gate 2250 is connected to that cathode follower. A plurality of "and" gates 2252, 2254 and 2256 are connected to the "or" gate 2250. The terms L1 and H33 are introduced to the "and" gate 2252. The terms $\overline{L1}$, T44–T49 and H33 are introduced to the "and" gate 2254. The terms $\overline{L1}$, T0–T3 and H33 are introduced to the "and" gate 2256.

The count signal G170 for the MQ register buffer is formed by a cathode follower CF102 in FIGURE 45e. An "and" gate 2258 is connected to the cathode follower CF102, and a plurality of input terms L1, T48 and H33 are introduced to the "and" gate. The input Z70 to the MQ register write circuits is formed at the output of a cathode follower CF103 in FIGURE 45f. An "or" gate 2260 is connected to the cathode follower CF103. A term T49 is applied to the "or" gate 2260. A plurality of "and" gates 2262, 2264, 2266 and 2268 are connected to the "or" gate 2260. The terms A500, $\overline{L1}$, $\overline{L4}$ and H33 are introduced to the "and" gate 2262. The terms A70, L1 and H33 are introduced to the "and" gate 2264. The terms $\overline{A705}$, L4, $\overline{T48}$ and H33 are introduced to the "and" gate 2266. The terms $\overline{E70}$, T48 and H33 are introduced to the "and" gate 2268.

The numeric serial input signal Q702 to the MQ buffer is formed at the output of a cathode follower CF104 in FIGURE 45g. An "or" gate 2270 is connected to that cathode follower, and a pair of "and" gates 2272 and 2274 are connected to the "or" gate. The terms $\overline{A70}$, L4, T0–T43 and H33 are introduced to the "and" gate 2272. The terms $\overline{A713}$, $\overline{L1}$, T44–T47 and H33 are introduced to the "and" gate 2274.

The MQ buffer shift signal S700 is developed for the multiply instruction by a cathode follower CF105 in FIGURE 45h. An "and" gate 2276 is connected to the cathode follower. The terms $\overline{L1}$, T0–T47 and H33 are introduced to the "and" gate 2276.

The main input signal Q0 for the accumulator register (A) for the multiply instruction is formed by a cathode follower CF106 in FIGURE 45i. An "or" gate 2278 is connected to the cathode follower CF106. A plurality of "and" gates 2280, 2282 and 2284 are connected to the "or" gate 2278. The terms $\overline{B51}$, $\overline{L1}$, $\overline{L4}$ and H33 are introduced to the "and" gate 2280. The terms Q210, L1 and H33 are introduced to the "and" gate 2282. The terms A500, L4 and H33 are introduced to the "and" gate 2284.

The input Z50 to the accumulator register write circuits is formed for the multiply command by a cathode follower CF107 in FIGURE 45j. An "or" gate 2290 is connected to the cathode follower CF107, and the term T3 is applied to that "or" gate. A plurality of "and" gates 2292, 2294 and 2296 are connected to the "or" gate 2290. The terms A504, $\overline{L6}$, H33 and $\overline{T2}$ are introduced to the "and" gate 2292. The terms Q211, L6 and $\overline{T2}$ are introduced to the "and" gate 2294. The terms H33 and H34 are introduced to an "or" gate 2298, and the "or" gate is connected to the "and" gate 2294. The terms E51 and T2 are introduced to the "and" gate 2296, and an "or" gate 2300 is connected to that "and" gate. The terms H33 and H34 are introduced to the "or" gate 2300.

The term Q270 is formed by a cathode follower CF108 in FIGURE 45k. This term is true when the contents of the MQ buffer equals 9. An "and" gate 2302 is connected to the cathode follower CF108. The terms A702, A703, $\overline{A704}$ and $\overline{A705}$ are introduced to the "and" gate 2302.

The output Q210 of the first adder is formed by a cathode follower CF109 in FIGURE 45l. An "or" gate 2304 is connected to the cathode follower CF109. A plurality of "and" gates 2306, 2308, 2310 and 2312 are connected to the "or" gate 2304. These gates are considered to form the first adder for this instruction. The terms A500, $\overline{Q212}$ and $\overline{E1}$ are applied to the "and" gate 2306. The terms $\overline{A500}$, Q212 and $\overline{E1}$ are applied to the "and" gate 2308. The terms $\overline{A500}$, $\overline{Q212}$ and E1 are applied to the "and" gate 2310. The terms A500, Q212 and E1 are applied to the "and" gate 2312.

The first adder carry flip-flop E1 develops the term E1 at its true output terminal. An "and" gate 2314 is connected to the true input terminal of the flip-flop E1, and an "or" gate 2316 is connected to the false input terminal of that flip-flop. A plurality of "and" gates 2318, 2320 and 2322 are connected to the "or" gate 2316. The terms A500, Q212, $\overline{T49}$ and H33 are applied to the "and" gate 2314. The terms $\overline{A500}$, $\overline{Q212}$ and H33 are applied to the "and" gate 2318. The terms T49 and H32 are applied to the "and" gate 2320. The terms T49 and H33 are applied to the "and" gate 2322.

The output Q211 of the second adder for the multiply command is formed by a cathode follower CF110 in FIGURE 45m. An "or" gate 2330 is connected to the cathode follower CF110. A plurality of "and" gates 2332, 2334, 2336 and 2338 are connected to the "or" gate 2330. These gates are considered to form the second adder for the multiply command. The terms A504, $\overline{Q215}$ and $\overline{E3}$ are applied to the "and" gate 2332. The terms $\overline{A504}$, Q215 and $\overline{E3}$ are applied to the "and" gate 2334. The terms $\overline{A504}$, $\overline{Q215}$ and E3 are applied to the "and" gate 2336. The terms A504, Q215 and E3 are applied to the "and" gate 2338.

The second adder carry flip-flop E3 forms the term E3 at its true output terminal. An "and" gate 2340 is connected to the true input terminal of that flip-flop, and an "or" gate 2342 is connected to the false input terminal. A pair of "and" gates 2344 and 2346 are connected to the "or" gate 2342. The terms A504, Q215, $\overline{P3}$ and L6 are introduced to the "and" gate 2340. The terms $\overline{A504}$ and $\overline{Q215}$ are introduced to the "and" gate 2344. The terms P3 and L6 are introduced to the "and" gate 2346.

The adder decimal correction term Q215 for the multiply instruction is formed by a cathode follower CF111 in FIGURE 45n. An "or" gate 2350 is connected to the cathode follower CF111. A plurality of "and" gates 2352, 2354, 2356 and 2358 are connected to the "or" gate 2350. The terms P0 and $\overline{T0}$ are applied to the "and" gate 2352. The terms P1, $\overline{T1}$ and E2 are applied to the "and" gate 2354. The terms T0–T1 and $\overline{E2}$ are applied to the "and" gate 2356. The terms B51 and $\overline{E2}$ are applied to the "and" gate 2358.

The adder correction control flip-flop E2 develops the term $\overline{E2}$ at its false output terminal. An "or" gate 2360 is connected to the false input terminal of the flip-flop E2, and an "and" gate 2362 is connected to the true input terminal of that flip-flop. An "and" gate 2364 is connected to the "or" gate 2360, and the term T3 is also introduced to the "or" gate. The terms $\overline{E1}$, P0 and $\overline{T0}$ are introduced to the "and" gate 2364. The terms E1, P0 and $\overline{T0}$ are introduced to the "and" gate 2362.

The logic equations are as follows:

G140=L2.H30.L21+H31.L21
 +Q7.T49.H33.L21+L8.Q70.T49.H33
 +T2.H34+H35.L21+H36.L21+H37
$_1I_2$=H30
$_0I_2$=H37
Z71=Q225.$\overline{L1}$.$\overline{L4}$(T4–T47).H33
 +A71.L4.(T4–T47).H33
 +A713.$\overline{L1}$.H33.(T48–T49)
 +A713.$\overline{L1}$.(T0–T1).H33+$\overline{E72}$.T2.H33+T3
Q710=A71.L1.H33+Q225.$\overline{L1}$.$\overline{L4}$(T0–T3).H33
 +$\overline{B51}$.$\overline{L1}$.(T44–T49.H33+A71.L4.(T0–T3).H33
S710=L1.H33+$\overline{L1}$.(T44–T49).H33+$\overline{L1}$.(T0–T3).H33
G170=L1.T48.H33
Z70=A500.$\overline{L1}$.$\overline{L4}$.H33+A70.L1.H33
 +$\overline{A705}$.L4.$\overline{T48}$.H33+$\overline{E70}$.T48.H33+T49
Q702=$\overline{A70}$.L4.(T0–T43).H33
 +$\overline{A713}$.$\overline{L1}$.(T44–T47).H33
S700=$\overline{L1}$.(T0–T47).H33
Q0=$\overline{B51}$.$\overline{L1}$.$\overline{L4}$.H33+Q210.L1.H33+A500.L4.H33
Z50=A504.$\overline{L6}$.H33.$\overline{T2}$+Q211.L6.$\overline{T2}$(H33
 +H34)+$\overline{E51}$.T2(H33+H34)+T3
Q270=A702.A703.$\overline{A704}$.$\overline{A705}$
$_1I_1$=$\overline{Q270}$.T49.H33
$_0I_1$=Q270.T49.H33+T48.H2
$_1I_6$=L1.T2
$_0I_6$=$\overline{L1}$.T2
$_1I_4$=$\overline{L8}$.Q70.T49.H33
$_0I_4$=$\overline{Q270}$.T49.H33
$_1I_8$=Q70.T49.H33
$_0I_8$=A71.B51.L4(T4–T47)+$\overline{A71}$.$\overline{B51}$.L4.(T4–T47)
Q212=A70
Q210=A500.$\overline{Q212}$.$\overline{E1}$+$\overline{A500}$.Q212.$\overline{E1}$
 +$\overline{A500}$.$\overline{Q212}$.E1+A500.Q212.E1
$_1e_1$=A500.Q212.$\overline{T49}$.H33
$_0e_1$=$\overline{A500}$.$\overline{Q212}$.H33+T49.H32+T49.H33
Q211=A504.$\overline{Q215}$.$\overline{E3}$+$\overline{A504}$.Q215.$\overline{E3}$
 +$\overline{A504}$.$\overline{Q215}$.E3+A504.Q215.E3
$_1e_3$=A504.Q215.$\overline{P3}$.L6
$_0e_3$=$\overline{A504}$.$\overline{Q215}$+P3.L6
Q215=P0.$\overline{T0}$+P1.$\overline{T1}$.E2+(T0–T1).$\overline{E2}$+B51.$\overline{E2}$
$_1e_2$=E1.P0.$\overline{T0}$
$_0e_2$=$\overline{E1}$.P0.$\overline{T0}$+T3
$_1I_3$=E1.L1.T49.H33
$_0I_3$=T49.H2

F670—Divide

In this instance, the contents of the accumulator register are divided by the contents of the memory cell $m$. The quotient is held in the (MQ) register, and the remainder is held in the accumulator register (A). The divisor must be larger than the dividend. The indicator flip-flop IT will be set true, and the instruction will be terminated, if the divisor is smaller than the dividend. There are no facilities for sign. This is a fractional operation, and the internal machine decimal point is assumed to be one place to the right of the left hand digit. The left hand digit (D11) does not take part in the division process, and it must be a decimal 0. Therefore, a maximum of eleven digits may be divided by a maximum of eleven digits, and the answer will be an eleven digit quotient. The twelfth digit of the quotient will be a decimal 0.

The logic circuitry for carrying out the "divide" instruction is set out in FIGURES 46a–46m. The term G140 is formed at the output terminal of a cathode follower CF112 in FIGURE 46a. An "or" gate 2400 is connected to the cathode follower. A plurality of "and" gates 2402, 2404, 2406, 2408, 2410, 2412 and 2414 are connected to the "or" gate 2400. The term H37 is also introduced to the "or" gate 2400.

The terms L2, H30 and L21 are introduced to the "and" gate 2402. The terms H31 and L21 are introduced to the "and" gate 2404. The terms Q7, T49, H2 and L21 are introduced to the "and" gate 2406. The terms $\overline{L1}$, L4, L8, T49 and H33 are introduced to the "and" gate 2408. The terms T2 and H34 are introduced to the "and" gate 2410. The terms L21 and H35 are introduced to the "and" gate 2412. The terms L21 and H36 are introduced to the "and" gate 2414.

The input Q710 to the MR buffer flip-flop A710 is developed at the output of a cathode follower CF113 in FIGURE 56b. An "or" gate 2416 is connected to the cathode follower CF113. A pair of "and" gates 2418 and 2420 are connected to the "or" gate 2416. An "or" gate 2422 is connected to the "and" gate 2420. The terms Q225, $\overline{L1}$, $\overline{L4}$ and H33 are all introduced to the "and" gate 2418. The terms L1 and L4 are introduced to the "or" gate 2422. The terms A71 and H33 are introduced to the "and" gate 2420.

The input Z70 to the MQ register write circuits is produced at the output of a cathode follower CF114 in FIGURE 46c. An "or" gate 2424 is connected to the cathode follower CF114. A plurality of "and" gates 2426, 2428, 2430 and 2432 are connected to the "or" gate 2424. The term T49 is introduced to the "or" gate 2424.

An "or" gate 2434 is connected to the "and" gate 2426. The terms $\overline{B51}$ and T10 are introduced to the "or" gate 2434. The terms $\overline{L1}$, $\overline{L4}$ and H33 are introduced to the "and" gate 2426. The terms A705, $\overline{L1}$, L4, $\overline{T48}$ and H33 are introduced to the "and" gate 2428. The terms A70, L1 and H33 are introduced to the "and" gate 2430. The terms H33, T48 and $\overline{E70}$ are introduced to the "and" gate 2432.

The numeric input signal Q702 to the MQ buffer is formed at the output of a cathode follower CF115 in FIGURE 46d. And "or" gate 2436 is connected to the cathode follower CF115. A pair of "and" gates 2438 and 2440 are connected to the "or" gate 2436. The terms A70, $\overline{L1}$, T0–T43 and H33 are applied to the "and" gate 2438. The terms $\overline{B51}$, $\overline{L1}$, T44–T47 and H33 are applied to the "and" gate 2440.

The MQ buffer shift signal S700 is formed at the output of a cathode follower CF116 in FIGURE 46e. An "and" gate 2442 is connected to that cathode follower. The terms $\overline{L1}$, T0–T47 and H33 are introduced to the "and" gate 2442.

The MQ register buffer count signal G170 is formed at the output of a cathode follower CF117 in FIGURE 46f. The terms E1, L1, $\overline{L4}$, T48 and H33 are all introduced to an "and" gate 2444, and the "and" gate is connected to the cathode follower.

The main input Q0 to the accumulator register (A) for the divide instruction is formed at the output of a cathode follower CF118 in FIGURE 56g. An "or" gate 2446 is connected to the cathode follower CF118, and a plurality of "and" gates 2448, 2450 and 2452 are connected to the "or" gate 2446. The terms A508, $\overline{L1}$, $\overline{L8}$ and H33 are introduced to the "and" gate 2448. The terms A500, $\overline{L1}$, L8 and H33 are applied to the "and" gate 2450. The terms Q210, L1 and H33 are applied to the "and" gate 2452.

The input Z50 to the accumulator register write circuits is formed at the output of a cathode follower CF119 in FIGURE 46h. An "or" gate 2454 is connected to the cathode follower CF119, and a plurality of "and" gates 2456, 2458 and 2460 are connected to the "or" gate 2454. The term T3 is also applied to the "or" gate 2454.

The terms A504, $\overline{L6}$, $\overline{T2}$ and H33 are introduced to the "and" gate 2456. The terms Q211, L6, $\overline{T2}$ and H33 are introduced to the "and" gate 2458. The terms $\overline{E51}$, T2 and H33 are introduced to the "and" gate 2460.

The left shift input signal Q4 to the accumulator register (A) is formed at the output of a cathode follower CF120 in FIGURE 46i. An "or" gate 2462 is connected to the cathode follower CF120, and a plurality of "and" gates 2464, 2466 and 2468 are connected to the "or" gate. The terms A500, $\overline{L1}$, $\overline{L8}$ and H33 are introduced to the "and" gate 2464. The terms B51, L1 and H33 are introduced to the "and" gate 2466. The terms B51 and H33 are introduced to the "and" gate 2468.

The term Q70, representing that the contents of the MQ buffer equals 9, is formed at the output of a cathode follower CF121 in FIGURE 46j. An "and" gate 2470 is connected to that cathode follower. The terms A702, A703, $\overline{A704}$ and $\overline{A705}$ are introduced to the "and" gate 2470.

The input Q212 to the first adder is formed at the output of a cathode follower CF122 in FIGURE 46k. An "or" gate 2472 is connected to the cathode follower CF122, and a pair of "and" gates 2474 and 2476 are connected to the "or" gate. The terms A71 and L4 are introduced to the "and" gate 2474. The terms $\overline{A71}$ and $\overline{L4}$ are introduced to the "and" gate 2476.

The output Q210 of the first adder is formed by a cathode follower CF123 in FIGURE 46l. An "or" gate 2478 is connected to the cathode follower CF123. A plurality of "and" gates 2480, 2482, 2484 and 2486 are connected to the "or" gate 2478. These gates are considered to form the first adder for this instruction. The terms A500, $\overline{Q212}$ and $\overline{E1}$ are introduced to the "and" gate 2480. The terms $\overline{A500}$, Q212 and $\overline{E1}$ are introduced to the "and" gate 2482. The terms $\overline{A500}$, $\overline{Q212}$ and E1 are introduced to the "and" gate 2484. The terms A500, Q212 and E1 are introduced to the "and" gate 2486.

The first adder carry term E1 is formed at the true output terminal of the flip-flop E1. An "or" gate 2490 is connected to the true input terminal of that flip-flop, and an "and" gate 2492 is connected to the false input terminal. A pair of "and" gates 2494 and 2496 are connected to the "or" gate 2490. The terms A500, Q212, T0–T47 and H33 are introduced to the "and" gate 2494. The terms $\overline{L1}$, $\overline{L8}$, T49 and H33 are introduced to the "and" gate 2496. The terms $\overline{A500}$, $\overline{Q212}$, T0–T47 and H33 are introduced to the "and" gate 2492.

The adder decimal correction signal Q215 is formed at the output of a cathode follower CF124 in FIGURE 46m. An "or" gate 2500 is connected to the cathode follower CF124. A plurality of "and" gates 2502, 2504, 2506 and 2508 are connected to the "or" gate 2500. The terms P0 and $\overline{T0}$ are applied to the "and" gate 2502. The terms P1, $\overline{T1}$ and E2 are introduced to the "and" gate 2504. The terms T0–T1 are introduced to the "and" gate 2506. The terms B51 and $\overline{E2}$ are introduced to the "and" gate 2508.

The adder corection control term $\overline{E2}$ is developed at the false output terminal of the flip-flop E2. An "and" gate 2510 is connected to the true input terminal of the flip-flop E2, and an "or" gate 2512 is connected to the false input terminal. An "and" gate 2514 is connected to the "or" gate 2512. The terms E1, P0 and $\overline{T0}$ are introduced to the "and" gate 2510. The terms $\overline{E1}$, P0 and $\overline{T0}$ are introduced to the "and" gate 2514. The term T3 is introduced to the "or" gate 2512.

The logical equations for the "divide" instruction are as follows:

G140=L2.H30.L21+H31.L21+Q7.T49.H2.L21
 +$\overline{L1}$.L4.L8.T49.H33+T2.H34
 +H35.L21+H36.L21+H37
$_1l_2$=H30
$_0l_2$=H37
Z71=A713
Q710=Q225.$\overline{L1}$.$\overline{L4}$.H33+(L1+L4)A71.H33
Z70=($\overline{B51}$+T10)$\overline{L1}$.$\overline{L4}$.H33+A705.$\overline{L1}$.L4.$\overline{T48}$.H33
 +A70.L1.H33.+$\overline{E70}$.T48.H33+T49
Q702=A70.$\overline{L1}$(T0–T43)H33+$\overline{B51}$.$\overline{L1}$(T44–T47)H33

S700=$\overline{L1}$(T0–T47)H33
G170=E1.L1.$\overline{L4}$.T48.H33
Q0=A508.$\overline{L1}$.$\overline{L8}$.H33+A500.$\overline{L1}$.L8.H33+Q210.L1.H33
Z50=A504.$\overline{L6}$.$\overline{T2}$.H33+Q211.L6.$\overline{T2}$.H33
 +$\overline{E51}$.T2.H33+T3
Q4=A500.$\overline{L1}$.$\overline{L8}$.H33+B51.L1.H33+B51.$\overline{H33}$
$_1l_1$=T49.$\overline{L1}$.$\overline{L8}$.H33
$_0l_1$=L1.L4.T49.H33
$_1l_4$=$\overline{E1}$.L1.T49.H33
$_0l_4$=$\overline{L1}$.L4.T49.H33
$_1l_8$=L9.T49.H33
$_0l_8$=H37
$_1l_9$=A70.T46.H33
$_0l_9$=H37
$_1l_3$=Q270.G170
$_0l_3$=T49.H33
$_1l_6$=L1.T2
$_0l_6$=$\overline{L1}$.T2
Q270=A702.A703.$\overline{A704}$.$\overline{A705}$
Q212=A71.L4+$\overline{A71}$.$\overline{L4}$
Q210=A500.$\overline{Q212}$.$\overline{E1}$+$\overline{A500}$.Q212.$\overline{E1}$
 +$\overline{A500}$.$\overline{Q212}$.E1+A500.Q212.E1
$_1e_1$=A500.Q212(T0–T47)H33+$\overline{L1}$.$\overline{L8}$.T49.H33
$_0e_1$=$\overline{A500}$.$\overline{Q212}$(T0–T47)H33
Q211=A504.$\overline{Q215}$.$\overline{E3}$+$\overline{A504}$.Q215.$\overline{E3}$
 +$\overline{A504}$.$\overline{Q215}$.E3+A504.Q215.E3
$_1e_3$=A504.Q215.$\overline{P3}$.L6
$_0e_3$=$\overline{A504}$.$\overline{Q215}$+P3.L6
Q215=P0.$\overline{T0}$+P1.$\overline{T1}$.E2+(T0–T1)$\overline{E2}$+B51.$\overline{E2}$
$_1e_2$=E1.P0.$\overline{T0}$
$_0e_2$=$\overline{E1}$.P0.$\overline{T0}$.T3

(F) COMPARE OPERATIONS

*F715—Compare equal*

In performing this operation, the computer compares the contents of a selected memory location *m* with the contents of the accumulator register (A). If they are equal, the indicator flip-flop IT will be set true. The contents of the cell *m* and the contents of the accumulator are left unchanged.

The logic circuitry for carrying out the "compare equal" instruction is set forth in FIGURES 47a–47d. The execution cycle count signal G140 is formed at the output of a cathode follower CF125 in FIGURE 47a. An "or" gate 2516 is connected to the cathode follower CF125, and the term H37 is introduced to the "or" gate. A plurality of "and" gates 2518, 2520, 2522, 2524, 2526, 2528 and 2530 are connected to the "or" gate 2516. The terms L2, H30 and L21 are introduced to the "and" gate 2518. The terms H31 and L21 are introduced to the "and" gate 2520. The terms Q7, T49, H33 and L21 are introduced to the "and" gate 2522. The terms T49 and H33 are introduced to the "and" gate 2524. The terms T2 and H34 are introduced to the "and" gate 2526. The terms L21 and H35 are introduced to the "and" gate 2528. The terms H36 and L21 are introduced to the "and" gate 2530.

The main input Q0 to the accumulator register A is formed at the output of a cathode folower CF126 in FIGURE 47b for the compare equal instruction. An "and" gate 2532 is connected to the cathode follower CF126. A pair of terms A500 and H33 are introduced to the "and" gate 2532.

The input Z50 to the accumulator register write circuits is formed at the output of a cathode follower CF127 in FIGURE 47c. An "and" gate 2534 is connected to that cathode follower, and an "or" gate 2536 is connected to the "and" gate. The term A504 is introduced to the "and" gate 2534. The terms H33 and H34 are introduced to the "or" gate 2536. The term Q221, indicating that the contents of the accumulator register are unequal to the compared memory contents is formed at the output of a cathode follower CF128 in FIGURE 47d. An "or" gate 2538 is connected to the cathode follower, and a pair of "and" gates 2540 and 2542 are connected to the "or" gate. The terms A500 and $\overline{Q225}$ are introduced to the "and" gate 2540. The terms $\overline{A500}$ and Q225 are introduced to the "and" gate 2542.

The following logical equations apply:

$G140 = L2.H30.L21 + H31.L21 + Q7.T49.H33.L21$
$\quad + T49.H33 + T2.H34 + H35.L21 + H36.L21 + H37$
$_1I_2 = H30$
$_0I_2 = H37$
$Q0 = A500.H33$
$Z50 = A504(H33 + H34)$
$_1I_1 = H31$
$_0I_1 = Q221(T0-T47)H33 + H37$
$Q221 = A500.\overline{Q225} + \overline{A500}.Q225$
$_1I_3 = L1.T49.H33$
$_0I_3 = T49.H2$

F716—Block compare equal

Compare the contents of each word in a block of words with the contents of the accumulator register (A). The block of words is defined as the words contained in the memory cells $m$ to the end of the track addressed. Comparison between each word and the contents of the accumulator (A) is made only over selected bits, as specified by binary 1's in corresponding bit positions of the (MQ) register. If a word in the block compares with the contents of the accumulator register (A) over the bits specified by the (MQ) register, the following operations occur:

(1) The indicator flip-flop IT is set true;
(2) The address, plus one, of the first word in the block equal to the specified contents of the accumulator register (A), appears in the accumulator register;
(3) The word itself appears in the (MR) register;
(4) The computer exits from the instruction.

The logic circuitry for carrying out the "block compare equal" instruction is illustrated in FIGURES 48a–48f. The G140 content signal is formed at the output of a cathode follower CF129 in FIGURE 48a. An "or" gate 2544 is connected to that cathode follower. A plurality of "and" gates 2546, 2548, 2550, 2552, 2554, 2556, 2558 and 2560 are connected to the "or" gate 2544. The term H37 is also introduced to the "or" gate.

The terms L2, H30 and L21 are introduced to the "and" gate 2546. The terms H31 and L21 are introduced to the "and" gate 2548. The terms Q7, T49, H32 and L21 are introduced to the "and" gate 2550. The terms A21 and H33 are introduced to the "and" gate 2552. The terms L1, T49 and H33 are introduced to the "and" gate 2554. The terms T2 and H34 are introduced to the "and" gate 2556. The terms L21 and H35 are introduced to the "and" gate 2558. The terms H36 and L21 are introduced to the "and" gate 2560.

The main input Q0 to the accumulator register (A) for the "block compare equal" instruction is formed at the output of a cathode follower CF130 in FIGURE 48b. An "or" gate 2562 is connected to the cathode follower CF130. A pair of "and" gates 2564 and 2566 are connected to the "or" gate 2562. The terms A500 and H33 are introduced to the "and" gate 2564. The terms L1, A20 and H2 are introduced to the "and" gate 2566.

The input Z50 to the accumulator register write circuits for the "block compare equal" instruction is formed at the output of a cathode follower CF131 in FIGURE 48c. An "and" gate 2568 is connected to the cathode follower CF131. An "or" gate 2570 is connected to the "and" gate 2568. The term A504 is introduced to the "and" gate 2568. The terms H33 and H34 are introduced to the "or" gate 2570.

The input Q710 to the MR buffer flip-flop A710 is developed at the output of a cathode follower CF132 in FIGURE 48d. An "and" gate 2572 is connected to the cathode follower CF132. A pair of terms Q225 and H33 are introduced to the "and" gate 2572.

The input Z71 to the MR register write circuits is formed at the output of a cathode follower CF133 in FIGURE 48e. An "and" gate 2574 is connected to the cathode follower CF133, and an "or" gate 2576 is connected to the "and" gate. The term A713 is introduced to the "and" gate 2574, and a pair of terms H33 and H34 are applied to the "or" gate 2576.

The input to the instruction register write circuits Z20 is formed at the output of a cathode follower CF134 in FIGURE 48f. An "or" gate 2578 is connected to the cathode follower CF134. A plurality of "and" gates 2580, 2582, 2584 and 2586 are connected to the "or" gate 2578. The term T49 is introduced to the "or" gate 2578.

The terms A20, $\overline{T4-T11}$, $\overline{T48}$ and H33 are introduced to the "and" gate 2580. The terms K4, $\overline{B11}$, T4–T11 and H33 are introduced to the "and" gate 2582. The terms K5, B11, T4–T11 and H33 are introduced to the "and" gate 2584. The terms $\overline{E20}$, T48 and H33 are introduced to the "and" gate 2586. The term T49 is applied to the "or" gate 2578.

The logic for this instruction is as follows:

$G140 = L2.H30.L21 + H31.L21 + Q7.T49.H32.L21$
$\quad + A21.H33 + L1.T49.H33 + T2.H34$
$\quad\quad + H35.L21 + H36.L21 + H37$
$_1I_2 = H30$
$_0I_2 = H37$
$Q0 = A500.H33 + L1.A20.H2$
$Z50 = A504(H33 + H34)$
$Z70 = A70$
$Q710 = Q225.H33$
$Z71 = A713(H33 + H34)$
$_1I_1 = H31 + T49.\overline{A31}.H33 + L3.H0$
$_0I_1 = Q221.(T0-T47).A70.H33 + H37 + T48.H2$
$_1I_3 = L1.T49.H33$
$_0I_3 = T49.H2$
$Z20 = A20(\overline{T4-T11})\overline{T48}.H33 + K4.\overline{B11}(T4-T11)H33$
$\quad + K5.B11(T4-T11)H33 + \overline{E20}.T48.H33 + T49$

F725—Compare less

Compare the contents of the memory location $m$ against the contents of the accumulator register (A). If the contents of the memory location $m$ are less than the contents of the accumulator register (A), the indicator flip-flop IT is set true. The contents of the accumulator register and of the memory location are left undisturbed.

The logic circuitry for carrying out the "compare less" instruction is illustrated in FIGURES 49a–49c. The count signal G140 is formed at the output of a cathode follower CF135 in FIGURE 49a. An "or" gate 2590 is connected to the cathode follower CF135. A plurality of "and" gates 2592, 2594, 2596, 2598, 2600, 2602 and 2604 are connected to the "or" gate 2590. The term H37 is also introduced to the "or" gate 2590.

The terms L2, H30 and L21 are introduced to the "and" gate 2592. The terms H31 and L21 are introduced to the "and" gate 2594. The terms Q7, T49, H32 and L21 are introduced to the "and" gate 2596. The terms T49 and H33 are introduced to the "and" gate 2598. The terms T2 and H34 are introduced to the "and" gate 2600. The terms H35 and L21 are introduced to the "and" gate 2602. The terms H36 and L21 are introduced to the "and" gate 2604.

The main input (Q0) to the accumulator register (A) is formed by a cathode follower CF35A in FIGURE 49b. An "and" gate 2605 is connected to the cathode follower CF135A, and the terms A500 and H33 are introduced to the "and" gate.

The input Z50 to the accumulator register write circuits is formed at the output of a cathode follower CF136 of FIGURE 49c. An "and" gate 2606 is connected to the cathode follower CF136. An "or" gate 2608 is connected to the "and" gate 2606. The term A504 is introduced to the "and" gate 2606. The terms H33 and H34 are introduced to the "or" gate 2608.

The logic equations are as follows:

$G140 = L2.H30.L21 + H31.L21 + Q7.T49.H32.L21$
$\quad + T49.H33 + T2.H34 + H35.L21 + H36.L21 + H37$
$_1l_2 = H30$
$_0l_2 = H37$
$Q0 = A500.H33$
$Z50 = A504(H33 + H34)$
$_1l_1 = \overline{Q225}.A500(T0-T47)H33$
$_0l_1 = Q225.\overline{A500}(T0-T47)H33 + H37$
$_1l_3 = L1.T49.H33$
$_0l_3 = T49.H2$

F726—Block compare less

Compare the contents of each word in a block of words with the contents of the accumulator register (A). The block of words is defined as the words contained in the memory cells $m$ to the end of the track addressed. The comparison between the successive memory cells and the contents of the accumulator register is made only over selected bits, as specified by binary 1's in the corresponding bit positions of the (MQ) register. If a word in the block is less than the contents of the accumulator register over the bits specified by the (MQ) register, the indicator flip-flop is set true; the address, plus one, of the first word in the block less than the contents of the accumulator register, appears in the accumulator register; the word itself appears in the (MR) register; the processor exits from the order.

The logic for carrying out the "block compare less" instruction is illustrated in FIGURES 50a–50f. The execution cycle count signal G140 for this instruction is developed at the output of a cathode follower CF137 in FIGURE 50a. An "or" gate 2610 is connected to the cathode follower CF137. A plurality of "and" gates 2612, 2614, 2616, 2618, 2620, 2622 and 2624 are connected to the "or" gate 2610. The term H37 is also introduced to the "or" gate 2610.

The terms L2, H30 and L21 are introduced to the "and" gate 2612. The terms H31 and L21 are introduced to the "and" gate 2614. The terms Q7, T49, H32 and L21 are introduced to the "and" gate 2616. The terms A31, H33, L1 and T49 are introduced to the "and" gate 2618. The terms T2 and H34 are introduced to the "and" gate 2620. The terms H35 and L21 are introduced to the "and" gate 2622. The terms H36 and L21 are introduced to the "and" gate 2624.

The main input Q0 to the accumulator register (A) is formed at the output of a cathode follower CF138 in FIGURE 50b. An "or" gate 2626 is connected to the cathode follower CF138. A pair of "and" gates 2628 and 2630 are connected to the "or" gate 2626. The terms A500 and H33 are introduced to the "and" gate 2628. The terms L1, A2 and H2 are introduced to the "and" gate 2630. The input Z50 to the accumulator register write circuits is formed at the output of a cathode follower CF140 in FIGURE 50c. An "and" gate 2632 is connected to the cathode follower CF140. An "or" gate 2634 is connected to the "and" gate 2632. The term A504 is introduced to the "and" gate 2632. The terms H33 and H34 are introduced to the "or" gate 2634.

The input Q710 to the MR buffer flip-flop A710 is formed at the output of a cathode follower CF142 in FIGURE 50d. An "and" gate 2636 is connected to the cathode follower CF142. A pair of terms Q225 and H33 are introduced to the "and" gate 2636.

The term Z71 which is the input to the MR register write circuits is formed at the output of a cathode follower CF143 in FIGURE 50e. An "and" gate 2638 is connected to the cathode follower CF143, and an "or" gate 2640 is connected to the "and" gate. The term A713 is introduced to the "and" gate 2638. A pair of terms H33 and H34 are introduced to the "or" gate 2640.

The input to the instruction register write circuits (Z20) is formed at the output of a cathode follower CF144 in FIGURE 50f. An "or" gate 2640 is connected to that cathode follower. A plurality of "and" gates 2642, 2644, 2646 and 2648 are connected to the "or" gate 2640. The term T49 is also introduced to the "or" gate.

The terms A20, $\overline{T4-T11}$, $\overline{T48}$ and H33 are introduced to the "and" gate 2642. The terms K4, T4–T11 and H33 are introduced to the "and" gate 2644. The terms K5, B11, T4–T11 and H33 are introduced to the "and" gate 2646. The terms $\overline{E20}$, T48 and H33 are introduced to the "and" gate 2648.

The logic equations are as follows:

$G140 = L2.H30.L21 + H31.L21 + Q7.T49.H32.L21$
$\quad + A31.H33.L1.T49 + T2.H34$
$\quad + H35.L21 + H36.L21 + H37$
$_1l_2 = H30$
$_0l_2 = H37$
$Q0 = A500.H33 + L1.A20.H2$
$Z50 = A504(H33 + H34)$
$Z70 = A70$
$Q710 = Q225.H33$
$Z71 = A713(H33 + H34)$
$_1l_1 = Q225.A500.A70(T0-T47)H33 + L3.H0$
$_0l_1 = Q225.\overline{A500}.A70(T0-T47)H33 + H37 + T48H$
$_1l_3 = L1.T49.H33$
$_0l_3 = T49.H2$
$Z20 = A20(\overline{T4-T11})\overline{T48}.H33 + K4.\overline{B11}(T4-T11)H33$
$\quad + K5.B11(T4-T11)H33 + \overline{E20}.T48.H33 + T49$

F735—Compare greater

Compare the contents of the memory location $m$ with the contents of the accumulator register (A). If the contents of the memory location are greater than the contents of the accumulator register, the indicator flip-flop IT is set true. The contents of the memory location and of the accumulator register are left undisturbed.

The logic circuitry for carrying out the "compare greater" instruction is shown in FIGURES 51a–51c. The count signal G140 for that instruction is derived from a cathode follower CF145 in FIGURE 51a. An "or" gate 2650 is connected to the cathode follower CF145. A plurality of "and" gates 2652, 2654, 2656, 2658, 2660, 2662 and 2664 are connected to the "or" gate 2650. The term H37 is also introduced to the "or" gate 2650.

The terms L2, H30 and L21 are introduced to the "and" gate 2652. The terms H31 and L22 are introduced to the "and" gate 2654. The terms L21, Q7, T49 and H32 are introduced to the "and" gate 2656. The terms T49 and H33 are introduced to the "and" gate 2658. The terms T2 and H34 are introduced to the "and" gate 2660. The terms H35 and L21 are introduced to the "and" gate 2662. The terms H36 and L21 are introduced to the "and" gate 2664.

The accumulator register main input Q0 for the compare greater instruction is developed at the output of a cathode follower CF146 in FIGURE 51b. An "and" gate 2666 is connected to the cathode follower. A pair of terms A500 and H33 are introduced to the "and" gate.

The input Z50 to the accumulator register write circuits for the compare greater instruction is formed at the output of a cathode follower CF147 in FIGURE 51c. An "and" gate 2668 is connected to the cathode follower CF147. An "or" gate 2670 is connected to that "and" gate. The term A504 is introduced to the "and" gate 2668. The terms H33 and H34 are introduced to the "or" gate 2670.

The logic of this instruction may be set out in the following equations:

$G140 = L2.H30.L21 + H31.L21 + Q7.T49.H32.L21$
$\qquad + T49.H33 + T2.H34 + H35.L21 + H36.L21 + H37$
$_1l_2 = H30$
$_0l_2 = H37$
$Q0 = A500.H33$
$Z50 = A504.(H33 + H34)$
$_1l_1 = \overline{Q225}.A500(T0-T47)H33 + H31$
$_0l_1 = Q225.\overline{A500}(T0-T47)H33 + H37$
$_1l_3 = \overline{L1}.T49.H33$
$_0l_3 = T49.H2$

F736—Block compare greater

Compare the contents of each word in a block of words with the contents of the accumulator register (A). The block of words is defined as the words contained in the memory cells $m$ to the end of the track addressed. The comparison is made only over selected bits, as specified by binary 1's in corresponding bit position of the (MQ) register. If a word in the block is greater than the contents of the accumulator register over the bits specified by the (MQ) register, the following occurs:

(1) The indicator flip-flop is set true;
(2) The address, plus one, of the first word in the block is greater than the contents of the accumulator register appears in the accumulator register;
(3) The word itself appears in the (MR) register;
(4) The precessor exits from the order.

The logic circuitry for carrying out the "block compare greater" command is set out in FIGURES 52a–52f. The G140 term is formed by a cathode follower CF148 in FIGURE 52a. An "or" gate 2672 is connected to the cathode follower CF148. The term H37 is introduced to the "or" gate. A plurality of "and" gates 2674, 2676, 2678, 2680, 2682, 2684, 2686 and 2688 are connected to the "or" gate 2672. The terms L2, H30 and L21 are introduced to the "and" gate 2674. The terms H31 and L21 are introduced to the "and" gate 2676. The terms Q7, T49, H32 and L21 are introduced to the "and" gate 2678. The terms A31 and H33 are introduced to the "and" gate 2680. The terms $\overline{L1}$, T49 and H33 are introduced to the "and" gate 2682. The terms T2 and H34 are introduced to the "and" gate 2684. The terms H35 and L21 are introduced to the "and" gate 2686. The terms H36 and L21 are introduced to the "and" gate 2688.

The main input Q0 to the accumulator register (A) for the block compare greater command is formed by a cathode follower CF149 in FIGURE 52b. The terms A500 and H33 are introduced to an "and" gate 2690 in FIGURE 52b. The terms L1, A20 and H2 are introduced to an "and" gate 2692. The "and" gates 2690 and 2692 are connected to an "or" gate 2694, and the "or" gate is connected to the cathode follower CF149.

The input Z50 to the accumulator register write circuits is produced by a cathode follower CF150 in FIGURE 52c. An "and" gate 2696 is connected to the cathode follower CF150, and the term A504 is introduced to the "and" gate. An "or" gate 2698 is also connected to the "and" gate, and the terms H33 and H34 are applied to the "or" gate.

The input Q710 to the (MR) buffer flip-flop A710 is formed by a cathode follower CF151 in FIGURE 52d. An "and" gate 2700 is connected to the cathode follower CF151, and the terms Q225 and H33 are introduced to the "and" gate.

A cathode follower CF152 in FIGURE 52e produces the term Z71. This term represents the input to the MR register write circuits. An "and" gate 2702 is connected to the cathode follower CF152. The term A713 is introduced to the "and" gate, and an "or" gate 2704 is also connected to the "and" gate. The terms H33 and H34 are introduced to the "or" gate 2704.

The input to the instruction register write circuits, as represented by the term Z20, is formed at the output of a cathode follower CF153 in FIGURE 52f. An "or" gate 2706 is connected to the cathode follower CF153. The timing signal T49 is applied to the "or" gate 2706. A group of three "and" gates 2708, 2710 and 2712 are also connected to the "or" gate 2706. The terms A20, $\overline{T4-T11}$, $\overline{T48}$ and H33 are introduced to the "and" gate 2708. The terms K4, $\overline{B11}$, T4–T11 and H33 are introduced to the "and" gate 2710. The terms $\overline{E20}$, T48 and H33 are introduced to the "and" gate 2712.

The logic equations are as follows:

$G140 = L2.H30.L21 + H31.L21 + Q7.T49.H32.L21$
$\qquad + A31.H33 + \overline{L1}.T49.H33 + T2.H34 + H35.L21$
$\qquad\qquad + H36.L21 + H37$
$_1l_2 = H30$
$_0l_2 = H37$
$Q0 = A500.H33 + L1.A20.H2$
$Z50 = A504(H33 + H34)$
$Z70 = A70$
$Q710 = Q225.H33$
$Z71 = A713(H33 + H34)$
$_1l_1 = \overline{Q252}.A70(T0-T47)H33 + L3.H0 + H31$
$_0l_1 = Q225.\overline{A500}.A70(T0-T47)H33 + H37 + T48.H2$
$_1l_3 = \overline{L1}.T49.H33$
$_0l_3 = T49.H2$
$Z20 = A20(\overline{T4-T11})\overline{T48}.H33 + K4.\overline{B11}(T4-T11)H33$
$\qquad + \overline{E20}.T48.H33 + T49$

F745—Compare zero

Test the contents of the memory location $m$ for all decimal 0's. If the selected contents are all decimal 0's, the indicator flip-flop IT will be set true. The contents of the selected memory location are left undisturbed.

The execution cycle count term G140 for the "compare zero" instructions is formed by a cathode follower CF154 in FIGURE 53a. In addition, the input Q0 to the accumulator register is formed by a cathode follower CF155 in FIGURE 53b for the compare zero command. Likewise, the input Z50 to the accumulator register write circuits is formed by a cathode follower CF156 in FIGURE 53c for that command.

An "or" gate 2714 is connected to the cathode follower CF154, and the term H37 is introduced to the "or" gate. A plurality of "and" gates 2716, 2718, 2720, 2722, 2724, 2726 and 2728 are connected to the "or" gate 2714. The terms L2, H30 and L21 are introduced to the "and" gate 2716. The terms H31 and L21 are introduced to the "and" gate 2718. The terms Q7, T49, H32 and L21 are introduced to the "and" gate 2720. The terms T49 and H33 are introduced to the "and" gate 2722. The terms T2 and H34 are introduced to the "and" gate 2724. The terms H35 and L21 are introduced to the "and" gate 2726. The terms H36 and L21 are introduced to the "and" gate 2728.

An "and" gate 2730 is connected to the cathode follower CF155. The terms A500 and H33 are introduced to the "and" gate 2730. An "and" gate 2732 is connected to the cathode follower CF156, and the term A504 is introduced to that "and" gate. An "or" gate 2734 is also connected to the "and" gate 2732. The terms H33 and H34 are introduced to the "or" gate 2734.

The logic equations are as follows:

$G140 = L2.H30.L21 + H31.L21 + Q7.T49.H32.L21$
$\qquad + T49.H33 + T2.H34 + H35.L21 + H36.L21 + H37$
$_1l_2 = H30$
$_0l_2 = H37$
$Q0 = A500.H33$
$Z50 = A504(H33 + H34)$
$_1l_1 = H31$
$_0l_1 = Q225.B51.(T0-T47).H33$
$\qquad + \overline{Q225}.\overline{B51}.(T0-T47).H33 + H37$
$_1l_3 = L1.T49.H33$
$_0l_3 = T49.H2$

(G) LOGICAL OPERATIONS

F815—Add logically

For this instruction the contents of the selected memory cell $m$ are added logically to the contents of the accumulator register (A), leaving the result in the accumulator register. This operation takes the corresponding bit positions of the word in the selected memory location and the word in the accumulator register, and combines them in such a way that if a "1" appears in either word in a particular bit position, the result will have a "1" in that bit position. In other words, a logical "or" is performed on all 48 bits of each word. The word in the selected memory location remains unaltered.

The logic circuitry for carrying out the "add logically" command is illustrated in FIGURES 54a–54c. The term G140 is formed by a cathode follower CF157 in FIGURE 54a. The input Q0 to the accumulator register (A) for this command is formed by a cathode follower CF158 in FIGURE 54b. The term Z50, which represents the input to the accumulator register write circuits, is formed by a cathode follower CF159 in FIGURE 54c.

An "or" gate 2736 is connected to the cathode follower CF157, and the term H37 is introduced to that "or" gate. A plurality of "and" gates 2738, 2740, 2742, 2744, 2746, 2748 and 2750 are connected to the "or" gate 2736. The terms L2, L21 and H30 are introduced to the "and" gate 2738. The terms L21 and H31 are introduced to the "and" gate 2740. The terms Q7, T49, H32 and L21 are introduced to the "and" gate 2742. The terms T49 and H33 are introduced to the "and" gate 2744. The terms T2 and H34 are introduced to the "and" gate 2746. The terms H35 and L21 are introduced to the "and" gate 2748. The terms H36 and L21 are introduced to the "and" gate 2750. An "and" gate 2752 is connected to the cathode follower CF158. An "or" gate 2754 is connected to the "and" gate 2752, and the term H33 is introduced to that "and" gate. The terms Q225 and A500 are introduced to the "or" gate 2754.

An "or" gate 2756 is connected to the cathode follower CF159. A pair of "and" gates 2758 and 2760 are connected to the "or" gate 2756. The term T3 is also introduced to the "or" gate 2756. An "or" gate 2762 is connected to the "and" gate 2758, and an "or" gate 2764 is connected to the "and" gate 2760. The terms A504 and $\overline{T2}$ are introduced to the "and" gate 2758. The terms H33 and H34 are introduced to the "or" gate 2762. The terms E51 and T2 are introduced to the "and" gate 2760. The terms H33 and H34 are introduced to the "or" gate 2764.

The following logic equations apply:

$G140 = L2.H30.L21 + H31.L21 + Q7.T49.H32.L21$
$\qquad + T49.H33 + T2.H34 + H35.L21 + H36.L21 + H37$
$_1I_2 = H30$
$_0I_2 = H37$
$Q0 = (Q225 + A500)H33$
$Z50 = A504.\overline{T2}(H33 + H34) + E51.T2(H33 + H34) + T3$
$_1e_{51} = \overline{E51}.Z50.\overline{T3}$
$_0e_{51} = E51.Z50 + T3$

F816—Block add logically

The sum of a block of words is to be added logically to the contents of the accumulator register, leaving the result in the accumulator register. The block is defined as the words contained in the memory cells from $m$ to the end of the track addressed.

The logic circuitry for executing the "block add logically" command is illustrated in FIGURES 55a–55c. The term G140 for this command is formed by a cathode follower CF160 in FIGURE 55a. The input Q0 to the accumulator register (A) for this command is formed by the cathode follower CF161 in FIGURE 55b. The input Z50 to the accumulator register write circuits is formed by the cathode follower CF161 in FIGURE 55c.

An "or" gate 2766 is connected to the cathode follower CF160, and the term H37 is introduced to that "or" gate. A plurality of "and" gates 2768, 2770, 2772, 2774, 2776, 2778 and 2780 are connected to the "or" gate 2766. The terms L2, H30 and L21 are introduced to the "and" gate 2768. The terms H31 and L21 are introduced to the "and" gate 2770. The terms Q7, T49, H32 and L21 are introduced to the "and" gate 2772. The terms A31 and H33 are introduced to the "and" gate 2774. The terms T2 and H34 are introduced to the "and" gate 2776. The terms H35 and L21 are introduced to the "and" gate 2778. The terms H36 and L21 are introduced to the "and" gate 2780.

An "and" gate 2782 is connected to the cathode follower CF161, and the term H33 is introduced to that "and" gate. An "or" gate 2784 is also connected to the "and" gate 2782. A pair of terms Q225 and A500 are applied to the "or" gate 2784.

An "or" gate 2786 is connected to the cathode follower CF162, and the timing signal T3 is introduced to that "or" gate. A pair of "and" gates 2788 and 2790 are also connected to the "or" gate 2786. The true output terminal of the flip-flop E51 is connected to the "and" gate 2790, and an "or" gate 2792 is also connected to that "and" gate. The term T2 is introduced to the "and" gate 2790, and the terms H33 and H34 are introduced to the "or" gate 2792. An "or" gate 2794 is connected to the "and" gate 2788. The terms A500 and $\overline{T2}$ are introduced to the "and" gate 2788, and the terms H33 and H34 are introduced to the "or" gate 2794. An "and" gate 2796 is connected to the true input terminal of the flip-flop E51, and an "or" gate 2798 is connected to the false input terminal of the flip-flop. An "and" gate 2800 is connected to the "or" gate 2798. The terms $\overline{E51}$, Z50 and $\overline{T3}$ are introduced to the "and" gate 2796. The term T3 is introduced to the "or" gate 2798 and the terms E51 and Z50 are introduced to the "and" gate 2800.

This instruction may be expressed by the following logic equations:

$G140 = L2.H30.L21 + H31.L21 + Q7.T49.H32.L21$
$\qquad + A31.H33 + T2.H34 + H35.L21 + H36.L21 + H37$
$_1I_2 = H30$
$_0I_2 = H37$
$Q0 = (Q225 + A500)H33$
$Z50 = A504.\overline{T2}(H33 + H34) + E51.T2(H33 + H34) + T3$
$_1e_{51} = \overline{E51}.Z50.\overline{T3}$
$_0e_{51} = E51.Z50 + T3$

F825—Extract

The contents of the selected memory cell $m$ are extracted with respect to the contents of the accumulator register (A), the result being left in the accumulator register. This instruction inspects, in serial manner, the corresponding bits of the word in the selected memory cell and the word in the accumulator register. If a "1" appears in both the word in the memory cell and in the word in the accumulator register in a particular bit position, the result in the accumulator register will have a "1" in that bit position. Otherwise, a "0" will occur in the result. That is, this instruction performs a logical "and" operation over the 48 bits in the two words.

The logic circuitry for carrying out the "extract" command is shown in FIGURES 56a–56c. The term G140 for this command is formed by a cathode follower CF164 in FIGURE 56a. The main input Q0 to the accumulator register (A) for the extract command is formed by a cathode follower CF165 in FIGURE 56b. The input Z50 to the write circuits of the accumulator register (A) is formed by a cathode follower CF166 in FIGURE 56c.

An "or" gate 2802 is connected to the cathode follower CF164, and the term H37 is introduced to that "or" gate. A plurality of "and" gates 2804, 2806, 2808, 2810, 2812, 2814 and 2816 are connected to the "or" gate 2802. The terms L2, H30 and L21 are introduced to the "and" gate 2804. The terms H31 and L21 are introduced to the "and" gate 2806. The terms Q7, T49, H32 and L21 are introduced to the "and" gate 2808. The terms T49 and H33 are introduced to the "and" gate 2810. The terms T2 and H34 are introduced to the "and" gate 2812. The terms H35 and L21 are introduced to the "and" gate 2814. The terms H36 and L21 are introduced to the "and" gate 2816.

An "and" gate 2818 is connected to the cathode follower CF165. The terms A500, Q225 and H33 are introduced to the "and" gate 2818.

An "or" gate 2820 is connected to the cathode follower CF166. The timing signal T3 is introduced to the "or" gate 2820, and a pair of "and" gates 2822 and 2824 are connected to that "or" gate. A pair of "or" gates 2826 and 2828 are connected respectively to the "and" gates 2822 and 2824. The terms A500 and $\overline{T2}$ are introduced to the "and" gate 2822. The terms H33 and H34 are introduced to the "or" gate 2826. The terms $\overline{E51}$ and T2 are introduced to the "and" gate 2824. The terms H33 and H34 are introduced to the "or" gate 2828.

This instruction may be expressed by the following logic equations:

$$G140 = L2.H30.L21 + H31.L21 + Q7.T49.H32.L21$$
$$+ T49.H33 + T2.H34 + H35.L21 + H36.L21 + H57$$
$$_1I_2 = H30$$
$$_0I_2 = H37$$
$$Q0 = A500.Q225.H33$$
$$Z50 = A500.\overline{T2}(H33+H34) + \overline{E51}.T2(H33+H34) + T3$$

(H) DATA TRANSFER FROM $m$

F905—Memory store

Store the contents of the accumulator register in the selected memory location $m$. The contents of the accumulator are left undisturbed. In all previous instructions, the result of an operation was left in the accumulator. Using this instruction, we are able to send the result to the memory for storage. The previous contents of the selected memory cell will be destroyed when the new word is inserted. This instruction may send the contents of the accumulator register to any of the following locations:

(1) The main memory 704 by addressing any of the cells 0000–4999.

(2) A cell in the 10-word register 6100, by addressing any one of the cells 6100–6199.

(3) A cell in the 10-word register 6200, by addressing any of the cells 6200–6299.

(4) A cell in the 10-word register 6300, by addressing any of the cells 6300–6399.

(5) A cell in the 10-word register 6400, by addressing any of the cells 6400–6499.

(6) The (MQ) register, by addressing any of the cells 7000–7099.

(7) The (MR) register by addressing any of the cells 7100–7199.

The logic circuitry for carrying out the "memory store" instruction is set out in FIGURES 57a–57j. The term G140 for this instruction is formed by a cathode follower CF167 in FIGURE 57a. The input Q0 to the accumulator register for the memory store instruction is formed by a cathode follower CF168 in FIGURE 57b. The input Z50 to the accumulator register write circuits is formed by a cathode follower CF170 in the circuit of FIGURE 57c.

The drum memory write control signal Y1 is formed in FIGURE 57d by a cathode follower CF171. The inputs to the write circuits of the registers 6100, 6200, 6300 and 6400 are respectively formed by cathode followers CF172, CF173, CF174 and CF175 in FIGURES 57e, 57f, 57g and 57h respectively. The input Z70 to the MQ register write circuits is formed by a cathode follower CF176 in FIGURE 57i, and the input Q710 to the MR buffer flip-flop A710 is formed by a cathode follower CF177 in FIGURE 57j.

An "or" gate 2830 is connected to the cathode follower CF167, and the term H37 is introduced to that "or" gate. A plurality of "and" gates 2832, 2834, 2836, 2838, 2840, 2842 and 2844 are connected to the "or" gate 2830. The terms L2, H30 and L21 are introduced to the "and" gate 2832. The terms H31 and L21 are introduced to the "and" gate 2834. The terms Q7, T49, H32 and L21 are introduced to the "and" gate 2836. The terms T48 and H33 are introduced to the "and" gate 2838. The terms T2 and H34 are introduced to the "and" gate 2840. The terms H35 and L21 are introduced to the "and" gate 2842, and the terms H36 and L21 are introduced to the "and" gate 2844.

An "and" gate 2846 is connected to the cathode follower CF168. The terms A500 and H33 are introduced to the "and" gate 2846. An "and" gate 2848 is connected to the cathode follower CF170. The term A504 is introduced to the "and" gate 2848, and an "or" gate 2850 is also connected to the "and" gate. A pair of terms H33 and H34 are introduced to the "or" gate 2850. An "and" gate 2852 is connected to the cathode follower CF171, and a pair of terms $\overline{B19}$ and H33 are introduced to the "and" gate 2852.

A plurality of "or" gates 2854, 2856, 2858 and 2860 are respectively connected to the cathode followers CF172–CF175. A pair of "and" gates 2862 and 2864 are connected to the "or" gate 2856, a pair of "and" gates 2870 and 2872 are connected to the "or" gate 2858, and a pair of "and" gates 2874 and 2876 are connected to the "or" gate 2860. The terms A500, R61 and H33 are introduced to the "and" gate 2862. The terms A610, $\overline{R61}$ and H33 are introduced to the "and" gate 2864. The terms A500, R2 and H33 are introduced to the "and" gate 2866. The terms A620, $\overline{R62}$ and H33 are introduced to the "and" gate 2868. The terms A500, R63 and H33 are introduced to the "and" gate 2870. The terms A630, R63 and H33 are introduced to the "and" gate 2872. The terms A500, R64 and H33 are introduced to the "and" gate 2874. The terms A640, $\overline{R64}$ and H33 are introduced to the "and" gate 2876.

An "or" gate 2878 is connected to the cathode follower CF176, and a pair of "and" gates 2880 and 2882 are connected to the "or" gate 2878. An "or" gate 2884 is connected to the cathode follower CF177, and a pair of "and" gates 2886 and 2888 are connected to the "or" gate 2884.

The terms A500, R70 and H33 are introduced to the "and" gate 2880. The terms A70, $\overline{R70}$ and H33 are introduced to the "and" gate 2882. The terms A500, R71 and H33 are introduced to the "and" gate 2886. The terms A71, $\overline{R71}$ and H33 are introduced to the "and" gate 2888.

This instruction may be expressed by the following logic equations:

$$G140 = L2.H30.L21 + H31.L21 + Q7.T48.H32.L21$$
$$+ T48.H33 + T2.H34 + H35.L21 + H36.L21 + H37$$
$$_1I_2 = H30$$
$$_0I_2 = H37$$
$$Q0 = A500.H33$$
$$Z50 = A504(H33+H34)$$
$$Z100 = A50$$
$$Y1 = \overline{B19}.H33$$
$$Z61 = A500.R61.H33 + A610.\overline{R61}.H33$$
$$Z62 = A500.R62.H33 + A620.\overline{R62}.H33$$
$$Z63 = A500.R63.H33 + A630.\overline{R63}.H33$$
$$Z64 = A500.R64.H33 + A640.\overline{R64}.H33$$
$$Z70 = A500.R70.H33 + A70.\overline{R70}.H33$$
$$Q710 = A500.R71.H33 + A71.\overline{R71}.H33$$

F906—Block store

For this instruction the contents of the accumulator register are stored in every cell of a block of words. The contents of the accumulator register are left undisturbed, and the block of words is changed to contain the contents of the accumulator register in cells $m$ to the end of the track addressed.

The logic circuitry for carrying out the "block store" instruction is set out in FIGURES 58a–58j. The term G140 for this instruction is formed by a cathode follower CF178 in FIGURE 58a. The input Q0 to the accumulator register for the block store instruction is formed by a cathode follower CF179 in FIGURE 58b.

The input Z50 to the accumulator register write circuits is formed by a cathode folower CF180 in FIGURE 58c. The drum memory write control signal Y1 for the block store instruction is formed by a cathode follower CF181 in FIGURE 58d. The inputs Z61, Z62, Z63 and Z64 to the write circuits of the respective registers 6100, 6200, 6300 and 6400 are respectively formed by a group of cathode followers CF182, CF183, CF184 and CF185 in FIGURES 58e–58h respectively. The input Z70 to the MQ register write circuits is formed by a cathode follower CF186 in FIGURE 58i, and the input Q710 to the MR buffer flip-flop A710 is formed by a cathode follower CF187 in FIGURE 58j.

An "or" gate 2890 is connected to the cathode follower CF178, and the term H37 is applied to that "or" gate. A plurality of "and" gates 2892, 2894, 2896, 2898, 2900, 2902 and 2904 are connected to the "or" gate 2890. The terms L2, H30 and L21 are introduced to the "and" gate 2892. The terms H31 and L21 are introduced to the "and" gate 2894. The terms Q7, T48, H32 and L21 are introduced to the "and" gate 2896. The terms A30 and H33 are introduced to the "and" gate 2898. The terms T2 and H34 are introduced to the "and" gate 2900. The terms H35 and L21 are introduced to the "and" gate 2902. The terms H36 and L21 are introduced to the "and" gate 2904.

An "and" gate 2906 is connected to the cathode follower CF179, and the terms H33 and A500 are introduced to that "and" gate. An "and" gate 2908 is connected to the cathode follower CF180, and the term A504 is introduced to that "and" gate. An "or" gate 2910 is also connected to the "and" gate 2908, and the terms H33 and H34 are introduced to that "or" gate. An "and" gate 2912 is connected to the cathode follower CF181, and the terms $\overline{B19}$ and H33 are introduced to that "and" gate.

A plurality of "or" gates 2914, 2916, 2918 and 2920 are respectively connected to the cathode followers CF182–CF185. A corresponding plurality of pairs of "and" gates 2922, 2924, 2926, 2928, 2930, 2932, 2934 and 2936 are connected to the "or" gates 2914, 2916, 2918 and 2920, respectively. The terms A500, R61 and H33 are introduced to the "and" gate 2922. The terms A610, $\overline{R61}$ and H33 are introduced to the "and" gate 2924. The terms A500, R62 and H33 are introduced to the "and" gate 2926. The terms A620, $\overline{R62}$ and H33 are introduced to the "and" gate 2928. The terms A500, R63 and H33 are introduced to the "and" gate 2930. The terms A630, $\overline{R63}$ and H33 are introduced to the "and" gate 2932. The terms A500, R64 and H33 are introduced to the "and" gate 2934. The terms A640, $\overline{R64}$ and H33 are introduced to the "and" gate 2936.

An "or" gate 2940 is connected to the cathode follower CF186, and an "or" gate 2942 is connected to the cathode follower CF187. A pair of "and" gates 2944 and 2946 are connected to the "or" gate 2940. A pair of "and" gates 2948 and 2950 are connected to the "or" gate 2942. The terms A500, R71 and H33 are introduced to the "and" gate 2948. The terms A71, $\overline{R71}$ and H33 are introduced to the "and" gate 2950.

The following logic equations apply:

G140=L2.H30.L21+H31.L21+Q7.T48.H32.L21
    +A30.H33+T2.H34+H35.L21+H36.L21+H37
$_i$I$_2$=H30
$_o$I$_2$=H37
Q0=A500.H33
Z50=A504(H33+H34)
Z100=A50
Y1=$\overline{B19}$.H33
Z61=A500.R61.H33+A610.$\overline{R61}$.H33
Z62=A500.R62.H33+A620.$\overline{R62}$.H33
Z63=A500.R63.H33+A630.$\overline{R63}$.H33
Z64=A500.R64.H33+A640.$\overline{R64}$.H33
Z70=A500.R70.H33+A70.$\overline{R70}$.H33
Q710=A500.R71.H33+A71.$\overline{R71}$.H33

F916—Block transfer (register 6100—m)

This instruction requires that the words in the 10-word register 6100 be transferred to selected memory cells in the main memory, starting at the operand address of the instruction word. This instruction always loads up to 9 (Mod 10) of the block of sectors specified; that is, the least significant digit of the ending address will be a 9.

The logic circuitry for carrying out the "block transfer (register 6100—m)" is illustrated in FIGURES 59a–59c. The execution cycle count term G140 for this instruction is formed by a cathode follower CF188 in FIGURE 59a. The drum memory write control signal Y1 is formed by a cathode follower CF189 in FIGURE 59b, and the input Z100 to the memory drum write circuits is formed by a cathode follower CF190 in FIGURE 59c.

An "or" gate 2952 is connected to the cathode follower CF188, and the terms H31, H35, H36 and H37 are introduced to that "or" gate. A plurality of "and" gates 2954, 2956, 2958 and 2960 are also connected to the "or" gate 2952. The terms L21 and H30 are introduced to the "and" gate 2954. The terms Q7, T48 and H33 are introduced to the "and" gate 2956. The terms L8, T48 and H33 are introduced to the "and" gate 2958. The terms T2 and H34 are introduced to the "and" gate 2960.

An "and" gate 2962 is connected to the cathode follower CF189. A pair of terms H33 and $\overline{B19}$ are introduced to the "and" gate 2962. The term A61 is introduced to the cathode follower CF190.

The following logic equations apply:

G140=L2.H30+H31+Q7.T48.H33
    +L8.T48.H33+T2.H34+H35+H36+H37
$_i$I$_2$=H30
$_o$I$_2$=H37
$_i$I$_8$=K4.T47.H33
$_o$I$_8$=T49
Z100=A61
Y1=H33.$\overline{B19}$

F926—Block transfer (register 6200—m)

This is similar to the F916 command, except that the transfer occurs between the register 6200 and the main memory.

The logic circuitry for carrying out the "block transfer (register 6200—m)" is set out in FIGURES 60a–60c. The term G140 is formed by a cathode follower CF191 in FIGURE 60a for this instruction. Likewise, the memory write circuit control signal Y1 is formed by a cathode follower CF192 in FIGURE 60b and the memory write signal Z100 is formed by a cathode follower CF193 in FIGURE 60c.

An "or" gate 2964 is connected to the cathode follower CF191. The terms H31, H35, H36 and H37 are all introduced to the "or" gate 2964. A plurality of "and" gates 2966, 2968, 2970 and 2972 are connected to the "or" gate 2964. The terms L2 and H30 are introduced to the "and" gate 2966. The terms Q7, T48 and H33 are introduced to the "and" gate 2968. The terms L8, T8 and H33 are introduced to the "and" gate 2970. The terms T2 and H34 are introduced to the "and" gate 2972.

An "and" gate 2974 is connected to the cathode follower CF192. The terms H33 and $\overline{B19}$ are introduced to the "and" gate 2974. The term A62 is introduced to the cathode follower CF193.

The following logic equations apply:

G140=L2.H30+H31+Q7.T48.H33
        +L8.T48.H33+T2.H34+H35+H36+H37
$_1l_2$=H30
$_0l_2$=H37
$_1l_8$=K4.T47.H33
$_0l_8$=T49
Z100=A62
Y1=H33.$\overline{B19}$

F936—Block transfer (register 6300—m)

This is similar to the F916 command, except that the transfer occurs between the register 6300 and the main memory.

The G140 term for the "block transfer (register 6300—m)" is formed by a cathode follower CF194 in FIGURE 61a, the Z100 term for that instruction is formed by a cathode follower CF195 in FIGURE 61b, and the Y1 control signal for that instruction is formed by a cathode follower CF196 in FIGURE 61c. An "or" gate 2976 is connected to the cathode follower CF194. The terms H31, H35, H36 and H37 are introduced to the "or" gate 2976. A plurality of "and" gates 2978, 2980, 2982 and 2984 are also connected to the "or" gate 2976. The terms L2 and H30 are introduced to the "and" gate 2978. The terms Q7, T48 and H32 are introduced to the "and" gate 2980. The terms L8, T48 and H33 are introduced to the "and" gate 2982. The terms T2 and H34 are introduced to the "and" gate 2984.

An "and" gate 2986 is connected to the cathode follower CF195, and an "and" gate 2988 is connected to the cathode follower CF196. The terms A63 and H33 are introduced to the "and" gate 2986, and the terms H33 and $\overline{B19}$ are introduced to the "and" gate 2988.

The following logic equations apply:

G140=L2.H30+H31+Q7.T48.H32
        +L8.T48.H33+T2.H34+H35+H36+H37
$_1l_2$=H30
$_0l_2$=H37
$_1l_8$=K4.T47.H33
$_0l_8$=T49
Z100=A63.H33
Y1=H33.$\overline{B19}$

F946—Block transfer (register 6400—m)

This is similar to the F916 command, except that the transfer occurs between the register 6400 and the main memory.

The logic circuitry for carrying out the "block transfer (register 6400—m)" is illustrated in FIGURES 62a, 62b and 62c. The term G140 is formed by a cathode follower CF197 in FIGURE 62a, the term Z100 is formed by a cathode follower CF198 in FIGURE 62b, and the control term Y1 is formed by a cathode follower CF199 in FIGURE 62c.

An "or" gate 2990 is connected to the cathode follower CF197. The terms H31, H35, H36 and H37 are introduced to the "or" gate 2990. A plurality of "and" gates 2992, 2994, 2996 and 2998 are connected to the "or" gate 2990. The terms L2 and H3 are introduced to the "and" gate 2992. The terms Q7, T48 and H32 are introduced to the "and" gate 2994. The terms L8, T48 and H33 are introduced to the "and" gate 2996. The terms T2 and H34 are introduced to the "and" gate 2998.

The term A64 is applied to the cathode follower CF198 in FIGURE 62b. An "and" gate 3000 is connected to the cathode follower CF199 in FIGURE 62c, and the terms H33 and $\overline{B19}$ are introduced to that gate.

The following logic equations apply:

G140=L2.H30+H31+Q7.T48.H32+L8.T48.H33
        +T2.H34+H35+H36+H37
$_1l_2$=H30
$_0l_2$=H37
$_1l_8$=K4.T47.H33
$_0l_8$=T49
Z100=A64
Y1=H33.$\overline{B19}$ All loops recirculate normally.

F999—Block transfer (buffer 58—m)

Transfer the block of words in the core buffer 58 (FIGURE 1) to the memory 704 (FIGURE 12), starting at the operand address in the instruction. The address of the last word loaded into the memory, plus one, appears in the accumulator register at the end of the order. The words are loaded alphanumerically, eight characters per word.

The logic circuitry for carrying out the "block transfer (buffer 58—m)" is illustrated in FIGURES 63a–63n. The term G140 is formed by a cathode follower CF200 in FIGURE 63a. An "or" gate 3002 is connected to the cathode follower CF200 and the terms H35, H36 and H37 are introduced to that "or" gate. A plurality of "and" gates 3004, 3006, 3008, 3010, 3012, 3014 and 3016 are connected to the "or" gate 3002. The terms $\overline{L80}$, H30 and $\overline{L81}$ are introduced to the "and" gate 3004. The terms $\overline{W800}$ and H31 are introduced to the "and" gate 3006. The terms Q7, T48 and H32 are introduced to the "and" gate 3008. The terms A30, H33 and $\overline{B19}$ are introduced to the "and" gate 3010. The terms L8, T48 and H33 are introduced to the "and" gate 3012. The terms $\overline{L11}$ and H34 are introduced to the "and" gate 3014. The terms H34, T49 and L11 are introduced to the "and" gate 3016.

The signal indicating that the buffer 58 is empty, namely the signal Q84, is formed by a cathode follower CF202 in FIGURE 63b. An "or" gate 3018 is connected to that cathode follower, and the term Q83 is introduced to the "or" gate. An "and" gate 3020 is also connected to the "or" gate 3018. The terms $\overline{A850}$, $\overline{A851}$, $\overline{A852}$, $\overline{A853}$, $\overline{A854}$, $\overline{A855}$ and $\overline{A856}$ are introduced to the "and" gate 3020. The track selector count signal G111 for the block transfer (buffer—m) command is formed by a cathode follower CF204 in FIGURE 63c. An "and" gate 3022 is connected to that cathode follower. The terms A30, H33, L1 and B19 are introduced to the "and" gate 3022.

The channel address register shift signal S119 is formed by a cathode follower CF204 in FIGURE 63d. An "and" gate 3024 is connected to that cathode follower, and the terms T11–T19 and H34 are introduced to that "and" gate. The input Q119 to the channel address register (CHR) is formed by a cathode follower CF206 in FIGURE 63e. An "and" gate 3026 is connected to the cathode follower and the terms B11 and H34 are introduced to that "and" gate.

The input Z20 to the instruction register write circuits for the block transfer (buffer—m) command is formed by a cathode follower CF207 in FIGURE 63f. An "or" gate 3028 is connected to that cathode follower, and the timing signal T49 is introduced to the "or" gate. A plurality of "and" gates 3030, 3032, 3034, 3036, 3038, 3040, 3042, 3044 and 3046 are connected to the "or" gate 3028. The terms K4, $\overline{B11}$, T4–T11, H33 and L1 are introduced to the "and" gate 3030. The terms K5, B11, T4–T11, H33 and L1 are introduced to the "and" gate 3032. The terms A20, $\overline{L1}$ and H33 are introduced to the "and" gate 3034. The terms A20, $\overline{T4-T11}$, $\overline{T48}$ and H33 are introduced to the "and" gate 3036. The terms $\overline{E20}$, T48 and L1 are introduced to the "and" gate 3038. The terms H33 and H34 are introduced to an "or" gate 3048 and the "or" gate is connected to the "and" gate 3038. The terms B11, T12–T19 and H34 are introduced to the "and" gate 3040. The terms K4, $\overline{B11}$, T8–T11 and H34 are introduced to the "and" gate 3042. The terms K5, T8–T11 and H34 are introduced to the "and" gate 3044. The terms A20, $\overline{T8-T19}$, $\overline{T48}$ and H34 are introduced to the "and" gate 3046.

The signal Q85 indicating that the buffer 58 is empty, is formed by a cathode follower CF208 in FIGURE 63g. An "and" gate 3050 is connected to that cathode follower. The terms $\overline{L80}$, H30, $\overline{L1}$ and $\overline{L81}$ are all introduced to the "and" gate 3050.

The term Q81 representing the load synchronizing pulse of the buffer 58 is formed by a cathode follower CF209 in FIGURE 63h. An "or" gate 3052 is connected to that cathode follower, and a pair of "and" gates 3054 and 3056 are connected to the "or" gate 3052. An "or" gate 3058 is connected to the "and" gate 3054, and an "or" gate 3060 is connected to the "and" gate 3056. The timing signals T40 and T46 are introduced to the "or" gate 3058. The terms Q7, H32 and $\overline{L1}$ are introduced to the "and" gate 3054. The term H33 is introduced to the "and" gate 3056. The timing signals T4, T10, T16, T22, T34, T40 and T46 are introduced to the "or" gate 3060.

The input-output shift signal S850 for the core buffer 58 is formed by a cathode follower CF210 in FIGURE 63j. An "and" gate 3062 is connected to that cathode follower. The terms $\overline{Q81}$, $\overline{T47}$, $\overline{T48}$ and H33 are introduced to that "and" gate. The signal Q86, indicating that the buffer 58 is clear, is formed by a cathode follower CF211 in FIGURE 63k. An "and" gate 3064 is connected to that cathode follower, and the terms H35 and L1 are introduced to that "and" gate. The memory write circuit control signal Y1 is formed by a cathode follower CF212 in FIGURE 63l. An "and" 3066 is connected to that cathode follower. The terms $\overline{B19}$, H33 and L1 are introduced to that "and" gate. The input signal Z100 to the memory drum write circuits for the block transfer (buffer $-m$) command is formed by a cathode follower CF213 in FIGURE 63m. The term Z800 is introduced to the cathode follower CF213.

The input to the accumulator register (A), namely the term Q0, is formed by a cathode follower CF214 in FIGURE 63n. An "and" gate 3068 is connected to the cathode follower CF214. The terms A20, L1 and H2 are introduced to that "and" gate.

The following logic equations apply:

$G140 = \overline{L80}.H30.\overline{L81} + \overline{W800}.H31 + Q7.T48.H32$
$\quad + A30.H33.\overline{B19} + L8.T48.H33$
$\quad + \overline{L11}.H34 + L11.T49.H34 + H35 + H36 + H37$
$_1l_2 = L8.H35$
$_0l_2 = H37$
$_1l_3 = Q84.T47.H33$
$_0l_3 = H37$
$Q84 = \overline{A850}.\overline{A851}.\overline{A852}.\overline{A853}.\overline{A854}.\overline{A855}.\overline{A856} + Q83$
$G111 = A30.H33.L1.\overline{B19}$
$S119 = (T11-T19)H34$
$Q119 = B11.H34$
$_1w_{800} = Q85.Q86$
$_1l_{11} = G111$
$_1l_{11} = H37$
$_1l_1 = H0 + \overline{Q84}.Q7.T48.H32$
$_0l_1 = T48.H2 + L8.H37$
$Z20 = K4.\overline{B11}(T4-T11)H33.L1 + K5.B11(T4$
$\quad -T11)H33.L1 + A20.\overline{L1}.H33$
$\quad + A20(\overline{T4-T11}).\overline{T48}.H33 + \overline{E20}.T48(H33$
$\quad + H34)L1 + B11(T12-T19)H34 + K4.\overline{B11}(T8$
$\quad -T11)H34 + K5.B11(T8-T11)H34$
$\quad + A20(\overline{T8-T19})\overline{T48}.H34 + T49$
$Q85 = \overline{L80}.H30.\overline{L1}.\overline{L81}$
$Q81 = (T40+T46)Q7.H32.\overline{L1} + (T4+T10+T16$
$\quad + T22+T28+T34+T40+T46)H33$ $S850 = \overline{Q81}.\overline{T47}.\overline{T48}.H33$
$Q86 = H35.L1$
$_1a_{850} = Q850.S850 + X80.Q81$
$_0a_{850} = \overline{Q850}.S850 + \overline{X80}.Q81$
$_1a_{851} = A850.S850 + X81.Q81$
$_0a_{851} = \overline{A850}.S850 + \overline{X81}.Q81$
$_1a_{852} = A851.S850 + X82.Q81$
$_0a_{852} = \overline{A851}.S850 + \overline{X82}.Q81$
$_1a_{853} = A852.S850 + X83.Q81$
$_0a_{853} = \overline{A852}.S850 + \overline{X83}.Q81$
$_1a_{854} = A853.S850 + X84.Q81$
$_0a_{854} = \overline{A853}.S850 + \overline{X84}.Q81$
$_1a_{855} = A854.S850 + X85.Q81$
$_0a_{855} = \overline{A854}.S850 + \overline{X85}.Q81$
$_1a_{856} = A855.\overline{A856}.S850 + X86.Q81$
$_0a_{856} = A855.A856.S850 + \overline{X86}.Q81$
$_1e_{800} = X800.\overline{E800}.\overline{T48}$
$_0e_{800} = X800.E800 + T48$
$Y1 = \overline{B19}.H33.L1$
$Z100 = X800$
$Q610 = R61.X800$
$Q620 = R62.X800$
$Q630 = R63.X800$
$Q640 = R64.X800$
$Q70 = R70.X800$
$Q71 = R71.X800$
$Q500 = R50.X800$
$Q0 = A20.L1.H2$ $(A855.A856 + \overline{A855}.\overline{A856})Q81.H33 + >$ character parity error.

The logic circuitry of FIGURE 64 is used to step the command cycle counter 770 of FIGURE 24 from one configuration to the next. It will be remembered from the previous discussion that the command cycle counter 770 develops four distinct outputs, as established by the different configurations of the flip-flops B30 and B31 in that counter. These different outputs, in turn, establish the "halt" period, the "command look-up" period, the "command read-in" period and the "operation execution" period. The time at which the command cycle counter 770 is shifted from one configuration to the next are controlled in accordance with the different commands being executed, and this control is effectuated by the logic circuitry of FIGURE 64. The term G130 which successively actuates the command cycle counter 770 from one configuration to the next is produced by an "or" gate 3100. A plurality of "and" gates 3102, 3104, 3106, 3108 and 3110 are connected to the "or" gate 3100. The terms H0, $\overline{L10}$ and L21 are applied to the "and" gate 3102. The terms H1, Q7, L21 and T49 are applied to the "and" gate 3104. The terms H2 and T49 are applied to the "and" gate 3106. The terms H3 and F110 are applied to the "and" gate 3108. The terms H37 and L2 are applied to the "and" gate 3110.

Figure 65:
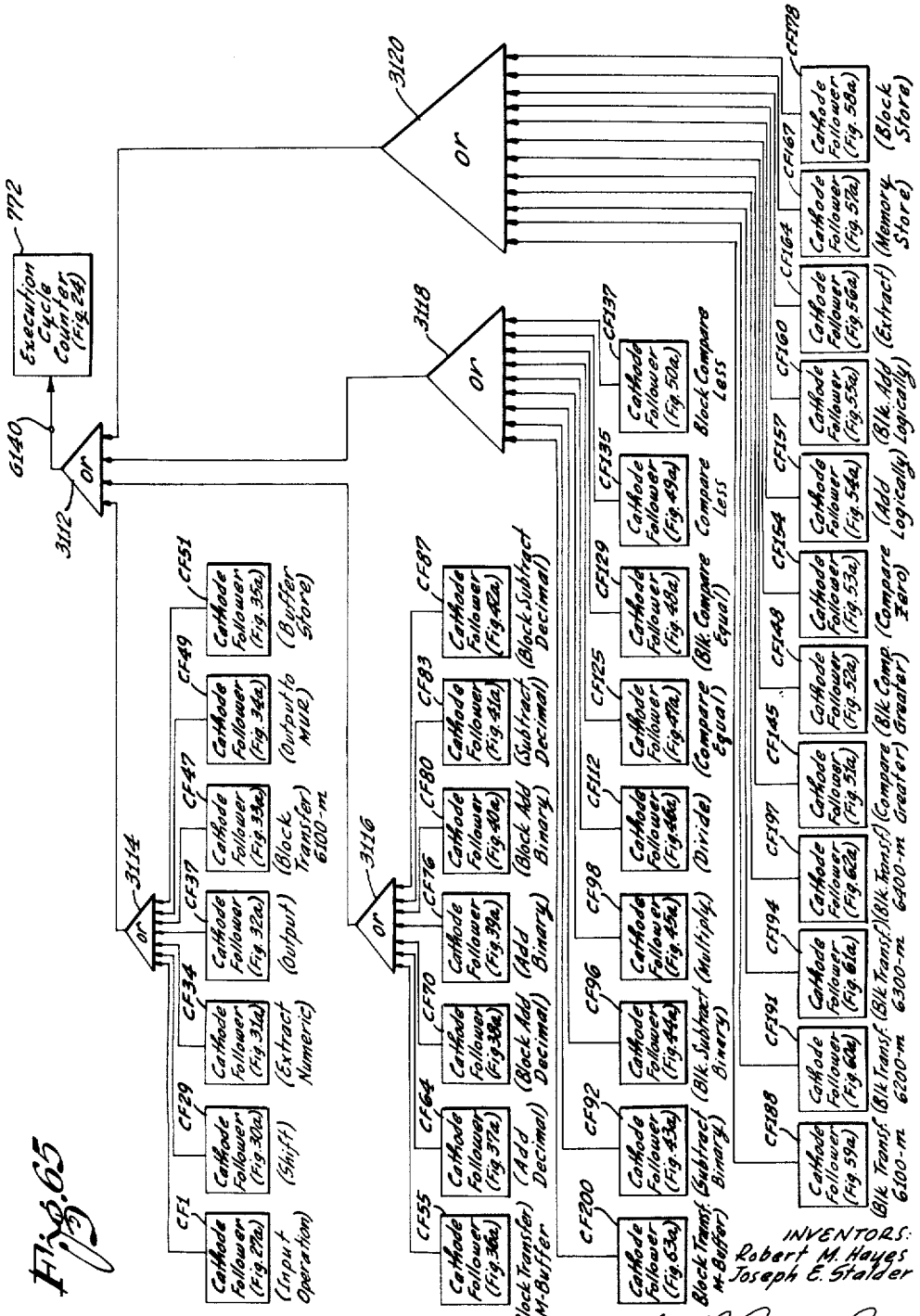
FIGURE 65 shows the logic circuitry used to step the execution counter of FIGURE 24 from one configuration to another.

The logic circuitry of FIGURE 64 can be represented by the following logic equations:

$G130 = H0.\overline{L10}.L21 + H1.Q7.L21.T49 + H2.T49$
$\quad + H3.F110 + H37.L2$ The circuitry of FIGURE 65 is used to step the execution counter 772 of FIGURE 24 from one configuration to the next. As described above, this counter is controlled for each command to set up the successive sub-cycle steps in the respective commands. The counter 772 develops the outputs H30–H37 which establish the successive sub-cycle periods, as described. The counter is stepped from one configuration to the next by the count signal G140. This signal is formed in the manner described above for the various commands, and it is introduced to the execution cycle counter 772 in accordance with the logic circuitry of FIGURE 65.

In the logic circuitry of FIGURE 65 an "or" gate 3112 is connected to the execution cycle counter 772.

A plurality of "or" gates 3114, 3116, 3118 and 3120 are connected to the execution cycle counter 772. The cathode followers CF1, CF29, CF34, CF37, CF47, CF49 and CF51 described above are connected respectively to the "or" gate 3114. The cathode followers CF55, CF64, CF70, CF76, CF80, CF83 and CF87 are connected to the "or" gate 3116. The cathode followers CF92, CF96, CF98, CF112, CF125, CF129, CF135, CF137 and CF200 are connected to the "or" gate 3118. The cathode followers CF188, CF191, CF194, CF197, CF145, CF147, CF154, CF157, CF160, CF164, CF167 and CF168 are connected to the "or" gate 3120. These cathode followers individually develop the G140 term for the different instructions, as described above, and as indicated in FIGURE 65.

The main input Q0 for the accumulator register (A) of FIGURE 18 is formed by the plurality of cathode followers described above for the different instructions. These cathode followers are illustrated in the logic circuitry of FIGURE 66, and they respectively feed their outputs into the accumulator register upon the execution of the corresponding instruction.

The logic circuitry of FIGURE 66 includes an "or" gate 3122 which is connected to the accumulator register (A). The cathode followers CF5, CF30, CF35A, CF38, CF65 and CF 71 are connected to the "or" gate 3122. An "or" gate 3124 is also connected to the "or" gate 3122. The cathode followers CF77, CF84, CF88, CF94 and CF97 are connected to the "or" gate 3124.

An "or" gate 3126 is also connected to the "or" gate 3122. The cathode followers CF106, CF118, CF126, CF130, CF135A, CF138 and CF146 are all connected to the "or" gate 3126. An "or" gate 3128 is also connected to the "or" gate 3122. The cathode followers CF149, CF155, CF158, CF161, CF165, CF168 and CF179 are all connected to the "or" gate 3128.

The input Z50 to the write circuits of the accumulator register (A) is formed at the output of an "or" gate 3130 in FIGURE 67. The cathode followers CF6, CF31, CF35, CF39, CF67 and CF73 are connected to that "or" gate.

An "or" gate 3132 is connected to the "or" gate 3130. The cathode followers CF79, CF85, CF89, CF95, CF97A and CF107 are connected to the "or" gate 3132. An "or" gate 3134 is connected to the "or" gate 3130. The cathode followers CF119, CF127, CF131, CF136, CF140 and CF147 are connected to the "or" gate 3134. An "or" gate 3136 is connected to the "or" gate 3130. The cathode followers CF150, CF156, CF159, CF162, CF166, CF176 and CF180 are connected to the "or" gate 3136.

The input to the magnetic drum memory 704 of FIGURE 22 (Z100) is formed, as shown in FIGURE 68, by the cathode follower CF7 in FIGURE 27f. At the same time, the cathode follower CF8 of FIGURE 27f forms the write control signal Y1 which is also introduced to the memory drum assembly.

The input to the write circuits of the instruction register of FIGURE 17 (Z20) is formed by an "or" gate 3138 in FIGURE 69. The cathode followers CF10, CF134, CF44, CF153 and CF207 are all connected to the "or" gate 3138.

The input Z61 to the write circuit of the 10-word register 6100 in FIGURE 21 is formed at the output of an "or" gate 3140 in FIGURE 70. It will be understood that the inputs of the write circuits of the other 10-word registers may be similarly formed. The cathode follower CF12 of FIGURE 27j and CF48 of FIGURE 33 are connected to the "or" gate 3140.

The input to the write circuits (Z70) of the MQ register of FIGURE 19 are formed at the output of an "or" gate 3142 in FIGURE 71. The cathode follower CF40 of FIGURE 32d and the cathode follower CF114 of FIGURE 46c are connected to the "or" gate.

The input Z71 to the MR register write circuits are formed at the output of an "or" gate 3144 in FIGURE 72. The cathode followers CF99, CF133, CF143 and CF152 are connected to that "or" gate. The input Q710 to the MR buffer flip-flop A710 is formed at the output of an "or" gate 3146 in FIGURE 72. The cathode followers CF100, CF113, CF132, CF142 and CF151 are connected to that "or" gate.

The logic circuitry associated with a first adder 3150 and with a second adder 3152 to carry out the different arithmetic instructions is set forth briefly in FIGURES 73–82. These adders were reduced to "and" and "or" gates in the previous description.

The circuitry associated with the first adder 3150 for carrying out the "add decimal" instruction is shown in FIGURE 73a, and the circuitry associated with the second adder for this instruction is shown in FIGURE 73b. The output flip-flop of the accumulator register (A) introduces the term A500 to the first adder, and the output signal Q225 of a selected memory cell is introduced as an input signal Q212 to the first adder. The first adder produces the term Q210 which is circulated back into the accumulator register. The first adder flip-flop E1 has the term $A500.Q212.\overline{T49}.H33$ introduced to its true input terminal, and it has the term $$\overline{A500.Q212}.H33 + T49.H32$$

introduced to its false input terminal.

The buffer flip-flop A504 of the accumulator register (A) introduces its output A504 to the second adder 3152 in FIGURE 73b. The adder decimal correction term Q215 is produced by the cathode follower CF69 of FIGURE 37e, and that term also is introduced to the second adder. The second adder carry flip-flop E3 has the term $A504.Q215.\overline{P3}.L6$ introduced to its true input terminal, and the flip-flop has the term $\overline{A504.Q215} + P3.L6$ introduced to its false input terminal. The second adder produces the term Q211.

The logic circuitry and terms associated with the first and second adders for carrying out the block and decimal command are illustrated in FIGURES 74a and 74b. For this particular command, the term $A500.Q212.\overline{T49}.H33$ is introduced to the true input terminal of the first adder carry flip-flop E1, and the term $$\overline{A500.Q212}.H33 + T49.H33 + T49.H32$$

is introduced to the false input terminal of that flip-flop.

The first adder 3150 only is used for the add binary instruction, as shown in FIGURE 75. For that instruction, the term $A500.Q212.\overline{T49}.H33$ is introduced to the true input terminal of the first adder carry flip-flop E1, and the term $\overline{A500.Q212}.H33 + T49.H32$ is introduced to the false input terminal of that flip-flop.

The block add binary instruction, as shown in FIGURE 76, also uses only the first adder 3150. For the latter instruction, the term $$\overline{A500.Q212}.H33 + T49.H33 + T49.H32$$

is introduced to the false input terminal of the first adder carry flip-flop E1.

For the subtract decimal instruction, and as shown in FIGURES 77a and 77b, the output $\overline{Q225}$ of the selected memory cell is introduced to the first adder 3150 as the input Q212, and the cathode follower CF86A introduces the decimal correction term Q215 to the second adder 3152.

The term $T49.H32 + A500.Q212.\overline{T49}.H33$ is applied to the true input terminal of the first adder carry flip-flop E1. The term $\overline{A500.Q212}.H33$ is introduced to the false input terminal of that flip-flop. The term $$A504.Q215.\overline{P3}.L6$$

is introduced to the true input terminal of the second adder carry flip-flop E3, and the term $\overline{A504.Q215} + P3.L6$ is introduced to the false input terminal of that flip-flop.

For the block subtract instruction, and as shown in FIGURES 78a and 78b, the output $\overline{Q225}$ of the selected memory cell forms the input Q212 of the first adder, and the cathode follower CF91 of FIGURE 42e forms the decimal correction term Q215 for the second adder. The term T49.H32+A500.Q212.$\overline{T49}$.H33+T49.H33 is introduced to the true input terminal of the first adder flip-flop E1, and the term $\overline{A500.Q212.T49}$.H33 is introduced to the false input terminal of that flip-flop. The term A504.Q215.$\overline{P3}$.L6 is introduced to the true input terminal of the second adder carry flip-flop E3, and the term $\overline{A504.Q215}$+P3.L6 is introduced to the false input terminal of that flip-flop.

The subtract binary instruction of FIGURE 79 uses only the first adder 3150. Again, the output term $\overline{Q225}$ of the selected memory cell forms the input Q212 to the first adder 3150. The term T49.H32.A500.Q212.$\overline{T49}$.H33 is introduced to the true input terminal of the first adder carry flip-flop E1. The term $\overline{A500.Q212}$.H33 is introduced to the false input terminal of the flip-flop.

The block subtract binary instruction, as shown in FIGURE 80, also uses the first adder 3150 only. For the latter instruction, the term, $$T49.H32+A500.Q212.\overline{T49}.H33+T49.H33$$

is introduced to the true input terminal of the first adder carry flip-flop E1. The term $\overline{A500.Q212.T49}$.H33 is introduced to the false input terminal of that flip-flop.

The multiply instruction, as shown in FIGURES 81a and 81b uses the first adder 3150 and the second adder 3152. The output A500 of the accumulator register (A) is introduced to the first adder, and the output A70 of the MQ register is used to form the input Q212 of that adder. The term A500.Q212.$\overline{T49}$.H33 is introduced to the true input terminal of the first adder carry flip-flop E1. The term $\overline{A500.Q212}$.H33+T49.H32+T49.H33 is applied to the false input terminal of that flip-flop.

The accumulator register (A) introduces its output A504 to the second adder, and the cathode follower CF111 of FIGURE 45n forms the term Q215 for that adder. The term A504.Q215.$\overline{P3}$.L6 is applied to the true input terminal of the second adder carry flip-flop E3, and the term $\overline{A504.Q215}$.P3.L6 is introduced to the false input terminal of that flip-flop.

The divide instruction also uses the first adder 3150 and the second adder 3152. This is shown in FIGURES 82a and 82b. The accumulator register (A) introduces the term A500 to the first adder 3150. The cathode follower CF122 of FIGURE 56k forms the input term Q212 for the first adder. The term $$A500.Q212(T0-T47)H33+\overline{L1.L8}.T49.H33$$

is introduced to the true input terminal of the first adder carry flip-flop E1. The term $\overline{A500.Q212}$(T0-T47)H33 is introduced to the false input terminal of that flip-flop.

The accumulator register (A) introduces its output term A504 to the second adder 3152. The cathode follower CF124 of FIGURE 46m forms the input term Q215 for that adder. The term A504.Q215.$\overline{P3}$.L6 is introduced to the true input terminal of the second adder carry flip-flop E3. The term $\overline{A504.Q215}$+P3.L6 is introduced to the false input terminal of that flip-flop.

The data processor described above may be more particularly adapted for use in the system of the invention by incorporating, for example, additional circulating registers that may be of the five word type. These registers may include, for example, a "buffer input register," a "comparator register No. 1," a "comparator register No. 2" and a "compare control register." Each register is addressable and may be used for storage of data or programs. Transfer of data to and from these registers may be carried out in a manner similar to that described above for the ten word registers.

These additional registers may be used to speed up the flow of information to and from the buffer 58 (FIGURE 1), and also to speed up certain compare operations during the processing of the cards by the mechanical handling unit. Various additional instructions may also be incorporated into the processor. These may include, for example: "input information storage card continuously." For this instruction, the channel of the information card to be read is specified in the channel portion of the operand address, and the contents of the selected channel of each card which passes the read heads 40 or 42 (FIGURE 1) after the command is issued is read into the buffer 58. When sufficient characters have been loaded into the buffer 58, a ready-to-unload signal may be made available to the computer. "Input information storage cards singly"—this operation may be the same as the preceding operation, except that the contents of the selected channel of only the first card to pass the read head is read into the buffer 58.

"Output to information storage card"—for this instruction the contents of the buffer 58 is recorded on the first information storage card which passes the write head 44 (FIGURE 1) after the command is issued. The channel of the card is selected by the channel portion of the operand address.

"Unload buffer 58"—this instruction transfers the contents of the buffer 58 to the five word buffer input register which, as suggested above, is incorporated into the processor. If a ready-to-unload signal has not been given by the buffer, the operation will "idle" until such a signal is received, at which time the transfer will be made. As the contents of the buffer are being transferred to the buffer input register, they are compared against the contents of a five word comparator register over the bits in a five word compare control register which contains a binary "1." These latter registers may also be included in the processor to facilitate these operations. Indicators are set as to whether the contents of the buffer is greater than, less than, or equal to the contents of the comparator register over the specified bits. A comparator register No. 1 or a comparator register No. 2 may be selected by the channel portion of the operand address. The sector portion of the operand address has no meaning for these operations.

"Compare buffer input register"—here the contents of the buffer input register are compared with the contents of a selected memory cell. If the command is located in sector $i$, then the contents of the buffer input register are compared against the contents of the channel or register specified by the channel portion of the operand address from sector $i+2$ up to the sector specified in the sector portion of the operand address. The compare is made only over those bits in the compare control register which contain a binary "1" in the appropriate sectors. Indicators are set as to whether the contents of the buffer input register are greater than, less than, or equal to the contents of the selected memory cell over the specified bits.

The processor described above may be suitably programmed so that it is capable of controlling the mechanical handling unit in the manner described above. By so programming the processor, any desired operation, or series of operations, may be carried out on the cards transported by the mechanical card handling unit.

The invention provides, therefore, an improved card processing system and apparatus which is capable of handling information storage cards, so that such cards may be sorted, collated or otherwise processed in accordance with information recorded on the cards. The system and apparatus of the present invention also provides that desired cards may be quickly selected from a stack of cards, so that the information on the desired cards may be read or so that new information may be recorded on such cards. The apparatus and system of the invention has universal application in that it may perform any desired one or more of a large number of different card handling and processing operations.

What is claimed is:

1. A system for processing a plurality of information storage elements to provide various types of operations including a selection of individual elements and transcribing operations on the elements and selective sensing of information from the elements, including, continuously movable transport means constructed to obtain a movement of the elements with the continuously movable transport means, in accordance with information processed on the elements, first station means disposed relative to the transport means to obtain a controlled transfer of elements from the station means to the transport means and a movement of the selected elements with the transport means in accordance with the information processed on the elements, second station means disposed relative to the transport means to obtain a transfer of elements to the second station means from the transport means upon the processing of the information on such elements, gate means disposed relative to the transport means to obtain a controlled movement of the elements with the transport means between the first and second station means in accordance with the operation of the gate means, storage means including an accumulator for storing information obtained from the elements on the transport means, means including an instruction register operatively coupled to the storage means for obtaining a processing of the information in the storage means in accordance with instructions provided by the instruction register and in accordance with the type of operation being performed, and processing means operatively coupled to the instruction register and responsive to the processed information and operatively coupled to the gate means and the first and second station means to obtain a transfer of storage elements selectively from the first station means to the transport means and with the transport means and a transfer of the storage elements from the transport means to the second station means a movement of the elements in accordance with the processed information.

2. A system for processing a plurality of information storage elements to provide various types of operations including selections of individual elements and transcribing operations of the elements, including, a plurality of transport means each constructed to obtain a movement of the elements and each disposed in paired relationship to other transport means in the plurality for obtaining a transfer of the elements between the transport means, a plurality of station means each disposed relative to associated transport means in the plurality and constructed to obtain a transfer of elements between the station means and the associated transport means, a plurality of gate means disposed between the pairs of transport means in the plurality to obtain a controlled transfer of the elements between the paired transport means, means including an instruction register for providing instructions at each instant as to the type of operation being performed and as to the particular command being performed at each instant, storage means including an accumulator for storing information from the cards, means operatively coupled to the instrutcion register and the storage means for processing the information in the storage means in accordance with the instructions from the instruction register, means operatively coupled to the instruction register and the storage means for obtaining a transfer of information between particular elements on the transport means and the accumulator in accordance with instructions from the instruction register, means operatively coupled to the station means in the plurality and to the instruction means and the storage means for providing for a transfer of elements between the different station means and the transport means in accordance with the instructions from the instruction means and the information processed on the elements, and means operatively coupled to the gate means in the plurality and to the instruction means and the storage means for obtaining an operation of the gate means in accordance with the instructions from the instruction means and the information processed on the elements to obtain a controlled movement of the elements on the transport means.

3. A system for processing a plurality of information storage elements to provide various types of operations including selection of individual elements and transcribing operations on the elements, including, a plurality of transport means each constructed to obtain a movement of the elements and each disposed in paired relationship to other elements in the plurality for obtaining a transfer of the elements between the transport means, a plurality of stations each constructed to hold a plurality of elements in stacked relationship and disposed relative to the individual transport means to obtain a transfer of elements between the stations and the transport means, a plurality of reversible means each operatively coupled to a different one of the stations in the plurality and operative in a first relationship to obtain a transfer of elements from the associated station to the transport means and operative in a second relationship to obtain a transfer of elements from the transport means to the associated station, an instruction register constructed to provide a sequential presentation of instructional information on a recirculating basis for controlling the type of operation being performed and the sequence of routines in the type of operation, an accumulator constructed to provide a sequential presentation of information on a recirculating basis, instruction means including the instruction register for providing a controlled choice as to the type of operation being provided and for providing a controlled choice as to the sequence of routines in the chosen type of operation, means including the accumulator operatively coupled to the instruction means for processing the information in the accumulator in accordance with the chosen type of operation and the particular routine benig performed in the chosen type of operation, means operatively coupled to the reversible means and to the instruction means and to the processing means in the plurality for obtaining an operation of the reversible means in the plurality in the first and second states in accordance with the chosen instruction and the particular routine being performed in the chosen instruction and the processing of information by the processing means, and means operatively coupled to the gate means in the plurality and to the instruction means and to the processing means for obtaining an operation of the gate means in the plurality in accordance with the chosen instruction and the particular routine being performed in the chosen instruction and the processing of information by the processing means to obtain a movement of the elements in different paths.

4. A system for processing a plurality of information storage elements to provide various types of operations including selection of individual elements and transcribing operations on the elements, including, a plurality of transport means constructed to obtain a movement of the elements and disposed in paired relationship to obtain a transfer of elements between the transport means in the pair, a plurality of station means each constructed to hold the elements and to provide an individual transfer of elements into and out of the station means, a plurality of reversible means each operatively coupled to an individual one of the station means and operative in a first relationship to obtain a transfer of elements from the associated transport means to the associated station means and operative in a second relationship to obtain a transfer of elements from the associated station means to the associated transport means, gate means disposed relative to the paired transport means and operative to obtain a transfer of elements between one of the elements in the paired transport means and the other transport means in the pair, instruction means for providing instructions as to the type of operation to be performed at each instant and as to the sequence of routines in the type of operation to be performed, an accumulator register for providing a storage of information, a second register for providing a storage of information, means operatively coupled to the accumulator register and the second register and to the instruction means for obtaining a transfer to the accumulator register and the second register of information from particular elements on the transport means in accordance with instructions from the instruction means, means operatively coupled to the accumulator register and the second register and to the instruction means for processing the information in the accumulator register and the second register in accordance with instructions from the instruction means, means operatively coupled to the instruction means and to the reversible means in the plurality and responsive to the processed information for obtaining a controlled operation of the reversible means in the plurality in particular patterns of the first and second states of operation at each instant of time in accordance with the instructions from the instruction means and the processed information, and means operatively coupled to the instruction means and to the gate means in the plurality and responsive to the processed information for obtaining a controlled operation of the gate means at successive instants of time in accordance with the instructions from the instruction means and the processed information.

5. A system of processing a plurality of information storage elements to provide various types of operations including selection of individual elements and transcribing operations on the elements, including, a plurality of transport means constructed to provide a movement of the elements and disposed in paired relationship to each other to provide a transfer of elements between the transport means in the pair, a plurality of station means constructed to hold the elements in stacked relationship and disposed relative to the transport means to obtain a transfer of the elements between the station means and the transport means, a plurality of reversible means disposed relative to the transport means and the station means and operative in a first relationship to provide for a transfer of elements from the station means to the transport means and operative in a second relationship to provide a transfer of elements from the transport means to the station means, gate means disposed relative to the paired transport means to obtain a controlled transfer of elements between the transport means in the pair, an external source of information, storage means constructed to hold information and to obtain a transfer of information into and out of the storage means, instruction means constructed to hold information as to the particular type of operation to be performed and as to the sequence of routines in the particular type of operation and constructed to obtain a transfer of instructions into and out of the instruction means, means operatively coupled to the instruction means and to the storage means and to the external source for obtaining a transfer to first particular elements in the plurality of information from the external source and from the storage means in accordance with the instructions from the instruction means as to the type of operation being performed and as to the particular routine being performed and in accordance with the information from the external source and the storage means, means operatively coupled to the storage means and to the instruction means for obtaining a transfer of information to the storage means from second particular elements in the plurality in accordance with the instructions from the instruction means as to the type of operation being performed and as to the particular routine being performed and in accordance with the information in the second particular elements, means operatively coupled to the storage means and to the instruction means for obtaining a processing of the information in the storage means in accordance with the instructions from the instruction means as to the type of operation being performed and as to the particular routine being performed and in accordance with the information in the storage means, means operatively coupled to the storage means and to the instruction means for storing the processed information in the storage means in accordance with the instructions from the instruction means as to the type of operation being performed and as to the particular routine being performed, means operatively coupled to the storage means and to the instruction means and to the reversible means in the plurality for obtaining an operation of the reversible means in the first and second states in accordance with the instructions from the instruction means as to the type of operation and the particular routine being performed and in accordance with the information in the storage means, and means operatively coupled to the storage means and the instruction means and the gate means for obtaining a controlled operation of the gate means in accordance with the instructions from the instruction means as to the particular type of operation and routine being performed and in accordance with the information in the storage means to obtain a controlled movement of the elements in different paths on the transport means.

6. A system of processing a plurality of information storage elements to provide various types of operations including selection of individual elements and transcribing operations on the elements, including, a plurality of transport means constructed to provide a transport of the elements and disposed in paired relationship to each other to provide a transfer of elements between the transport means in the pair, station means constructed to hold the elements in stacked relationship and disposed relative to the transport means to provide a transfer of elements between the transport means and the station means, transfer means operatively disposed relative to the transport means and the station means and operative in a first relationship to obtain a transfer of elements from the station means to the transport means and operative in a second relationship to obtain a transfer of elements from the transport means to the station means, gate means disposed relative to the transport means in each pair and operative to provide a transfer of elements between one of the transport means in the pair and the other transport means in the pair, an external source of information, storage means including an accumulator register for storing information and for providing for a sequential presentation of the information, instruction means including an instruction register for storing instructions representing the particular type of operation to be performed and representing the sequence of routines in the particular type of operation and for providing for a sequential presentation of the instructions, means responsive to the instructions from the instruction register and to the information from the external source and from the elements on the transport means for introducing such information to the storage means in accordance with the type of operation being performed and the particular routine being performed in the particular type of operation, means responsive to the instructions from the instruction register for processing the information in the storage means in accordance with the particular type of operation being performed and the particular routine in the particular type of operation, means responsive to the processed information and the instructions from the instruction register for obtaining a controlled operation of the transfer means in accordance with the processed information and the particular type of operation being performed and the particular routine in the particular type of operation to obtain a controlled transfer of elements into and out of the different station means in the plurality, and means responsive to the processed information and the instructions from the instruction register for obtaining a controlled operation of the gate means in accordance with the processed information and the particular type of operation being performed and the particular routine in the particular type of operation to obtain a controlled movement of the elements in the different paths on the transport means.

7. A system of processing a plurality of information storage elements to provide various types of operations including selection of individual elements and transcribing operations on the elements, including, a plurality of transport means constructed to obtain a movement of the elements and disposed in paired relationship to obtain a transfer of elements between the transport means in the pair, a plurality of station means each constructed to hold elements in stacked relationship and disposed relative to the transport means to provide a transfer of elements between the transport means and the station means, a plurality of reversible means each operatively associated with a different one of the station means in the plurality and each operative in a first relationship to provide for a transfer of elements from the associated station means to the transport means and operative in a second relationship to provide for a transfer of elements from the transport means to the associated station means, first transfer means disposed relative to the transport means and the station means and operative with the reversible means in the first state to obtain a transfer of elements from the associated station means to the transport means, second transfer means disposed relative to the transport means and the station means and operative with the reversible means in the second state to obtain a transfer of elements from the transport means to the associated station means, a plurality of gate means disposed relative to the different pairs of transport means and operative in a first relationship to obtain a transfer of elements from one of the transport means in the pair to the other, an instruction register constructed to store instructions relating to the type of operation to be performed at each instant and relating to the sequence of routines in the particular type of operation, an accumulator register constructed to store information obtained from elements in the plurality, a second register constructed to store information obtained from elements in the plurality, means operatively coupled to the instruction means and to the accumulator register and the second register and responsive to particular information on the elements for obtaining a transfer of information from the elements to the accumulator register and the second register in accordance with the type of operation being performed and the routine being performed in the particular operation, means operatively coupled to the instruction means and to the accumulator register and the second register and responsive to the information transferred to the accumulator register and the second register for processing such information in accordance with the type of operation being performed and the routine being performed in the particular operation, means operatively coupled to the instruction means and to the reversible means and responsive to the processed information for obtaining an operation of the reversible means in the first and second states in particular patterns in accordance with the processed information and the type of operation being performed and the routine being performed in the particular operation, means operatively coupled to the instruction means and to the first and second transfer means and responsive to the processed information for obtaining an operation of the transfer means in particular patterns in accordance with the processed information and the type of operation being performed and the routine being performed in the particular operation, and means operatively coupled to the gate means and to the instruction means and responsive to the processed information for obtaining an operation of the gate means in particular patterns in accordance with the processed information and the type of operation being performed and the routine being performed in the particular operation.

8. A system of processing a plurality of information storage elements to provide various types of operations including selection of individual elements and transcribing operations on the elements, including, a plurality of transport means constructed to provide a movement of the elements and disposed in paired relationship to each other to provide a transfer of elements between the transport means in the pair, a plurality of station means constructed to hold the elements in stacked relationship and disposed relative to the transport means to obtain a transfer of the elements between the station means and the transport means, a plurality of reversible means disposed relative to the transport means and the station means and operative in a first state to provide a transfer of elements from the transport means to the station means and operative in a second state to provide a transfer of elements from the station means to the transport means, a plurality of gate means disposed relative to the paired transport means and operative to obtain a transfer of elements from one of the transport means in the pair to the other transport means in the pair, storage means constructed to store information and to sequentially present the information for computation, instruction means constructed to store instructions and to sequentially present the instructions for controlling the type of operation to be performed and the sequence of routines in the particular type of operation, means operatively coupled to the storage means and to the instruction means for obtaining the introduction of information to the storage means from particular elements on the transport means in accordance with the instructions from the instruction means as to the particular type of operation to be performed and the particular routine being performed in the sequence, means operatively coupled to the storage means and the instruction means for processing the information in the storage means in various types of operations including addition, subtraction, multiplication, division and comparison and shifting in accordance with the instructions from the instruction means as to the particular type of operation being performed and as to the particular routine being performed in the sequence to obtain processed information for storage in the storage means, means operatively coupled to the storage means and the instruction means for obtaining a transfer of the processed information in the storage means to particular elements in the plurality in accordance with the significance of the processed information and in accordance with the instructions from the instruction means as to the particular type of operation and the particular routine being performed in the sequence, means operatively coupled to the storage means and the instruction means for obtaining the operation of each one of the reversible means in a particular one of the first and second states in accordance with the significance of the processed information and in accordance with the instructions from the instruction means as to the particular type of operation and the particular routine being performed in the sequence, and means operatively coupled to the storage means and the instruction means for obtaining the selective operation of the gate means in accordance with the significance of the processed information and in accordance with the instructions from the instruction means as to the particular type of operation and the particular routine being performed in the sequence to obtain a controlled movement of the elements in different paths.

9. The system set forth in claim 8 in which an external source is provided to introduce information to the elements on the transport means and in which the external source is operatively coupled to the storage means and the instruction means to provide an introduction of information from the external source to particular elements in the plurality in accordance with the significance of the processed information and in accordance with the instructions from the instruction means as to the particular type of operation and the particular routine being performed in the sequence.

10. The system set forth in claim 8 in which an external source is provided to introduce information to the storage means and in which the external source is operatively coupled to the storage means and the instruction means to provide an introduction of information from the external source of the storage means in accordance with the significance of the particular information and in accordance with the instructions from the instruction means as to the particular type of operation and the particular routine being performed in the sequence.

11. A system for processing a plurality of information storage elements to provide various types of operations including selections of individual elements and transcribing operations on the elements where the elements are constructed to store a plurality of bits of information as words and blocks of words, a plurality of transport means constructed to obtain a movement of the elements and disposed in paired relationship to obtain a transfer of the elements between the transport means in the pair and to obtain a movement of the elements in different paths in accordance with information processed on the elements, a plurality of station means constructed to hold the elements in stacked relationship and disposed relative to the transport means to obtain a transfer of the elements between the station means and the transport means, a plurality of reversible means disposed relative to the station means and the transport means and operative in a first relationship to obtain a transfer of elements from the transport means to the station means and operative in a second relationship to obtain a transfer of elements from the station means to the transport means, a plurality of gate means disposed relative to the paired transport means and operative to obtain a transfer of elements between the transport means in the pair, storage means constructed to store a plurality of bits of information, instruction means constructed to store a plurality of bits of information relating to instructions as to the type of operation to be performed and as to the sequence of routines to be performed in each type of operation, means operatively coupled to the instruction means and to the storage means and responsive to the bits of information on the elements on the transport means for obtaining a controlled transfer to the storage means of particular bits in the form of words and blocks in accordance with the type of operation being performed and the particular routine being performed and the particular routine being performed in the sequence, means operatively coupled to the storage means and the instruction means for processing the information in the storage means in various types of operations including addition, subtraction, multiplication, division, comparison, and shifting and for processing the information as words and blocks in accordance with the particular type of operation being performed and the particular routine in the sequence, means operatively coupled to the storage means and the instruction means and the reversible means in the plurality for obtaining an operation of the reversible means in the plurality in particular patterns of the first and second relationships at different times in accordance with the significance of the processed information and in accordance with the particular type of operation being performed and the particular routine in the sequence to obtain a controlled transfer of the elements into and out of the different station means in the plurality, and means operatively coupled to the storage means and the instruction means and the gate means in the plurality for obtaining an operation of the gate means in the plurality in particular patterns in accordance with the significance of the processed information and in accordance with the particular type of operation being performed to obtain a controlled movement of the elements in different paths on the transport means.

12. The system set forth in claim 11, including, means operatively coupled to the storage means and the instruction means for obtaining a controlled transfer of the processed information to particular elements on the transport means in accordance with the significance of the processed information and the instructions from the instruction means as to the particular type of operation being performed and as to the particular routine being performed in the sequence.

13. The system set forth in claim 11, including, an external source of information, and means operatively coupled to the external source and to the storage means and to the instruction means for obtaining a transfer of bits of information from the source to the storage means in accordance with the type of operation being performed and in accordance with the particular routine being performed in the sequence.

14. The system set forth in claim 12, including, an external source of information, and means operatively coupled to the external source and to the storage means and the instruction means for obtaining a controlled transfer of bits of information from the storage means and the source to particular elements on the transport means in accordance with the significance of the information from the source and from the storage means and in accordance with the particular type of operation being performed and in accordance with the particular routine being performed in the sequence.

15. A system for processing a plurality of information storage elements to provide various types of operations including a selection of individual elements and transcribing operations on the elements and information-sensing operations on the elements, including, first continuously movable transport means constructed to obtain a movement of the elements with the first continuously movable transport means, second means constructed to facilitate a continuous movement of the elements transferred to the second means from the first continuously movable transport means, first station means disposed relative to the first continuously movable transport means to obtain a controlled transfer of selected elements from the first station means to the first continuously movable transport means and a movement of the selected elements with the first continuously movable transport means in accordance with information processed on the elements, second station means disposed relative to the second means to obtain a transfer of the selected elements to the second station means upon the processing of the information on the selected cards, gate means disposed relative to the first continuously movable transport means and the second means to obtain a transfer of the elements between the first continuously movable transport means and the second means in accordance with the operation of the gate means, transducer means disposed relative to the elements on the first continuously movable transport means for sensing information on the selected elements transferred from the first station means to the first continuously movable transport means and for transferring information to the selected elements, storage means including an accumulator for storing information obtained from the elements on the first continuously movable transport means, means operatively coupled to the storage means and to the transducer means for obtaining a transfer of information between the storage means and the transducer means, instruction means including an instruction register operatively coupled to the storage means for obtaining a processing of the information in the storage means in accordance with instructions provided by the instruction means and in accordance with the type of operation being performed, and processing means operatively coupled to the instruction means and to the storage means and to the gate means for controlling the introduction of instructions to the instruction means and for controlling the transfer of information between the storage means and the transducer means and for obtaining a transfer of storage elements selectively from the first station means to the first transport means and for obtaining a movement of the elements with the first transport means and an operation of the gate means to provide a transfer of the elements from the first transport means to the second means and for obtaining a transfer of the elements from the second means to the second station means in accordance with the processed information.

16. A system for processing a plurality of information storage elements to provide various types of operations including a selection of individual elements and transcribing operations on the elements and selective sensing of information from the elements, including, first continuously movable transport means constructed to obtain a movement of the elements with the continuously movable transport means, second means constructed to facilitate a continuous movement of the elements transferred to the second means from the first continuously movable transport means, first station means disposed relative to the first continuously movable transport means to obtain a transfer of selected elements from the station means to the first continuously movable transport means and a movement of the selected elements with the first continuously movable transport means, second station means disposed relative to the second continuously movable transport means to obtain a transfer of the selected elements from the second means to the second station means upon the processing of the information on the selected elements, gate means disposed relative to the first continuously movable transport means and the second means to obtain a controlled transfer of the elements between the first continuously movable transport means and the second means in accordance with the operation of the gate means, instruction means including an instruction register for storing information controlling the type of operation to be performed, storage means including an accumulator for storing information obtained from the elements on the first continuously movable transport means, transducer means disposed relative to the elements on the first continuously movable transport means for selectively sensing information on such elements and for selectively writing information on the elements, buffer means operatively coupled to the storage means and to the transducer means for controlling the transfer of information between the storage means and the transducer means, means including an instruction register operatively coupled to the storage means for controlling the transfer of information between the transducer means and the storage means through the buffer means and for obtaining a processing of the information in the storage means in accordance with instructions provided by the instruction means and in accordance with the type of operation being performed, and processing means operatively coupled to the instruction means and to the storage means for processing the information from the storage means in accordance with the instructions from the instruction means and operatively coupled to the gate means for obtaining a controlled transfer of storage elements from the first station means to the first continuously movable transport means and for obtaining a controlled transfer of the selective elements from the first continuously movable transport means to the second means and for obtaining a transfer of the elements from the second means to the second station means in accordance with the processed information.

17. A system for processing a plurality of information storage elements to provide various types of operations including a selection of individual elements and transcribing operations on the elements and information-sensing operations on the elements, including, first transport means constructed to obtain a continuous movement of the elements transferred to the transport means, second means constructed to facilitate a continuous movement of the elements transferred to the second means, first station means disposed relative to the first transport means to obtain a transfer of selective elements from the first station means to the first transport means, second station means constructed to obtain a transfer of elements from the second means to the second station means, gate means disposed relative to the first transport means and the second means to obtain a selective transfer of elements between the first transport means and the second means, an instruction register constructed to provide a sequential presentation of instructional information on a recirculating basis for controlling the type of operation being performed and the sequence of routines in the type of operation, an accumulator constructed to provide a sequential presentation of information on a recirculating basis, instruction means including the instruction register for providing a controlled selection as to the type of operation to be performed and as to the sequence of routines in the selected type of operation, storage means including the accumulator and operatively coupled to the instruction means for processing the information in the accumulator in accordance with the selected type of operation and the particular routine being performed in the selected type of operation, transducer means disposed relative to the selected elements on the first transport means for selectively sensing information on such elements and for selectively writng information on such elements, and processing means operatively coupled to the instruction means and to the storage means for processing the information from the storage means in the sequence of routines in the selected type of operation in accordance with the instructions from the instruction means and operatively coupled to the gate means for obtaining a controlled transfer of storage elements from the first station means to the first continuously movable transport means and for obtaining a controlled transfer of elements from the first continuously movable transport means to the second means and for obtaining a transfer of the elements from the second means to the second station means.

18. A system for processing a plurality of information storage elements to provide various types of operations including selection of individual elements and transcribing operations on the elements and information-sensing operations on the elements, including, first transport means constructed to provide a continuous transport of the elements second means disposed in contiguous relationship to the first continuously movable transport means and constructed to facilitate a continuous movement of the elements transferred from the first continuously movable transport means to the second means, first station means disposed relative to the first transport means to provide a transfer of elements from the first station means to the first transport means, second station means disposed relative to the second means to provide a transfer of elements to the second station means from the second means, gate means disposed in contiguous relationship to the first transport means and the second means to provide a transfer of elements between the first transport means and the second means, storage means including an accumulator register for storing information and for providing for a sequential presentation of the information, instruction means including an instruction register for storing instructions representing the particular type of operation to be performed and representing the sequence of routines in the particular type of operation and for providing for a sequential presentation of the instructions, an external source of information, transducer means disposed relative to the elements on the first transport means for selectively sensing information on such elements and for selectively writing information on such elements, means responsive to the insructions from the instruction register and to the information from the external source and from the transducer means for introducing information between the transducer means and the storage means in accordance with the type of operation being performed and the particular routine being performed in the particular type of operation, means responsive to the instructions from the instruction register for processing the information in the storage means in accordance with the particular type of operation being performed and the particular routine in the particular type of operation, means responsive to the processed information and the instructions from the instruction register for obtaining a controlled transfer of elements from the first station means to the first transport means in accordance with the processed information and the particular type of operation being performed and the particular routine in the particular type of operation, and means responsive to the processed information and the instructions from the instruction register for obtaining a controlled operation of the gate means in accordance with the processed information and the particular type of operation being performed and the particular routine in the particular type of operation to obtain a controlled movement of the elements from the first transport means to the second means and then to the second station means.

19. In the system set forth in claim 15, the second means constituting a continuously movable transport means.

20. In the system set forth in claim 16, the second means constituting a continuously movable transport means.

21. A system for processing a plurality of information storage elements to provide various types of operations including a selection of individual elements and transcribing operations on the elements and information-sensing operations on the elements, including, first continuously movable transport means constructed to obtain a movement of the elements with the first continuously movable transport means, second means constructed to facilitate a continuous movement of the elements transferred to the second means from the first continuously movable transport means, station means disposed relative to the first continuously movable transport means and the second means to obtain a controlled transfer of selected elements between the station means and the first continuously movable transport means and between the station means and the second means, gate means disposed relative to the first continuously movable transport means and the second means to obtain a transfer of the elements between the first continuously movable transport means and the second means in accordance with the operation of the gate means, transducer means disposed relative to the elements on the first continuously movable transport means for sensing information on the selected elements transferred from the station means to the first continuously movable transport means and for transferring information to the selected elements, storage means including an accumulator for storing information obtained from the elements on the first continuously movable transport means, means operatively coupled to the storage means and to the transducer means for obtaining a transfer of information between the storage means and the transducer means, instruction means including an instruction register operatively coupled to the storage means for obtaining a processing of the information in the storage means in accordance with instructions provided by the instruction means and in accordance with the type of operation being performed, and processing means operatively coupled to the instruction means and to the storage means and to the gate means for controlling the introduction of instructions to the instruction means and for controlling the transfer of information between the storage means and the transducer means and for obtaining a transfer of storage elements selectively from the station means to the first continuously movable transport means and for obtaining a movement of the elements with the first continuously movable transport means and an operation of the gate means to provide a transfer of the elements from the first continuously movable transport means to the second means and for obtaining a transfer of the elements from the second means to the station means in accordance with the processed information.

22. A system for processing a plurality of information storage elements to provide various types of operations including a selection of individual elements and transcribing operations on the elements and selective sensing of information from the elements, including, first continuously movable transport means constructed to obtain a movement of the elements with the continuously movable transport means, second means constructed to facilitate a continuous movement of the elements transferred to the second means from the first continuously movable transport means, station means disposed relative to the first continuously movable transport means and the second means to obtain a transfer of selected elements between the station means and the first continuously movable transport means and between the second means and the station means, gate means disposed relative to the first continuously movable transport means and the second means to obtain a controlled transfer of the elements between the first continuously movable transport means and the second means in accordance with the operation of the gate means, instruction means including an instruction register for storing information controlling the type of operation to be performed, storage means including an accumulator for storing information obtained from the elements on the first continuously movable transport means, transducer means disposed relative to the elements on the first continuously movable transport means for selectively sensing information on such elements and for selectively writing information on the elements, buffer means operatively coupled to the storage means and to the transducer means for controlling the transfer of information between the storage means and the transducer means, means including an instruction register operatively coupled to the storage means for controlling the transfer of information between the transducer means and the storage means through the buffer means and for obtaining a processing of the information in the storage means in accordance with instructions provided by the instruction means and in accordance with the type of operation being performed, and processing means operatively coupled to the instruction means and to the storage means for processing the information from the storage means in accordance with the instructions from the instruction means and operatively coupled to the gate means for obtaining a controlled transfer of storage elements from the station means to the first continuously movable transport means and for obtaining a controlled transfer of the selective elements from the first continuously movable transport means to the second means and for obtaining a transfer of the elements from the second means to the station means in accordance with the processed information.

23. A system for processing a plurality of information storage elements to provide various types of operations including a selection of individual elements and transcribing operations on the elements and information-sensing operations on the elements, including, first transport means constructed to obtain a continuous movement of the elements transferred to the transport means, second means constructed to facilitate a continuous movement of the elements transferred to the second means from the first transport means, station means disposed relative to the first transport means to obtain a transfer of selective elements from the first station means to the first transport means and disposed relative to the second means to obtain a transfer of elements from the second means to the station means, gate means disposed relative to the first transport means and the second means to obtain a selective transfer of elements between the first transport means and the second means, an instruction register constructed to provide a sequential presentation of instructional information on a recirculating basis for controlling the type of operation being performed and the sequence of routines in the type of operation, an accumulator constructed to provide a sequential presentation of information on a recirculating basis, instruction means including the instruction register for providing a controlled selection as to the type of operation to be performed and as to the sequence of routines in the selected type of operation, storage means including the accumulator and operatively coupled to the instruction means for processing the information in the accumulator in accordance with the selected type of operation and the particular routine being performed in the selected type of operation, transducer means disposed relative to the selected elements on the first transport means for selectively sensing information on such elements and for selectively writing information on such elements, and processing means operatively coupled to the instruction means and to the storage means for processing the information from the storage means in the sequence of routines in the selected type of operation in accordance with the instructions from the instruction means and operatively coupled to the gate means for obtaining a controlled transfer of storage elements from the station means to the first continuously movable transport means and for obtaining a controlled transfer of elements from the first continuously movable transport means to the second means and for obtaining a transfer of the elements from the second means to the station means.

24. A system for processing a plurality of information storage elements to provide various types of operations including selection of individual elements and transcribing operations on the elements and information-sensing operations on the elements, including, first transport means constructed to provide a continuous transport of the elements, second means disposed in contiguous relationship to the first continuously movable transport means and constructed to facilitate a continuous movement of the elements transferred from the first continuously movable transport means to the second means, station means disposed relative to the first transport means to provide a transfer of elements from the station means to the first transport means and disposed relative to the second means to provide a transfer of elements to the station means from the second means, gate means disposed in contiguous relationship to the first transport means and the second means to provide a transfer of elements between the first transport means and the second means, storage means including an accumulator register for storing information and for providing for a sequential presentation of the information, instruction means including an instruction register for storing instructions representing the particular type of operation to be performed and representing the sequence of routines in the particular type of operation and for providing for a sequential presentation of the instructions, an external source of information, transducer means disposed relative to the elements on the first transport means for selectively sensing information on such elements and for selectively writing information on such elements, means responsive to the instructions from the instruction register and to the information from the external source and from the transducer means for introducing information between the transducer means and the storage means in accordance with the type of operation being performed and the particular routine being performed in the particular type of operation, means responsive to the instructions from the instruction register for processing the information in the storage means in accordance with the particular type of operation being performed and the particular routine in the particular type of operation, means responsive to the processed information and the instructions from the instruction register for obtaining a controlled transfer of elements from the station means to the first transport means in accordance with the processed information and the particular type of operation being performed and the particular routine in the particular type of operation, and means responsive to the processed information and the instructions from the instruction register for obtaining a controlled operation of the gate means in accordance with the processed information and the particular type of operation being performed and the particular routine in the particular type of operation to obtain a controlled movement of the elements from the first transport means to the second means and then to the station means.

25. In the system set forth in claim 23, the second means constituting a continuously movable transport means.

References Cited by the Examiner

UNITED STATES PATENTS

| | | | |
|---|---|---|---|
| 2,658,602 | 11/53 | Lake et al. | 235—61.9 |
| 2,658,682 | 11/53 | Lake et al. | 235—61.9 |
| 2,795,328 | 6/57 | Tyler et al. | 209—74 |
| 2,905,465 | 9/59 | Armstrong et al. | 271—5 |
| 2,956,800 | 10/60 | Gray et al. | 271—5 |
| 2,969,979 | 1/61 | Nelson et al. | 271—5 |
| 2,983,507 | 5/61 | Azari et al. | 271—5 |
| 2,996,184 | 8/61 | Barton et al. | 209—72 |

OTHER REFERENCES

Publication I: IBM Reference Manual—Ramac 305 (pp. 27 to 30), (copyright 1958 by IBM Corp.).

Publication II: Handbook of Automation, Computation and Control, edited by Grabbe, Remo and Wooldridge (vol. 2, pp. 2–146 to 2–147—Digital Sorting) (John Wiley and Sons, Inc., New York; copyright October 12, 1959).

MALCOLM A. MORRISON, *Primary Examiner.*

IRVING L. SRAGOW, *Examiner.*